(12) United States Patent
Abramson et al.

(10) Patent No.: US 9,986,084 B2
(45) Date of Patent: May 29, 2018

(54) CONTEXT-BASED MOBILITY STOPPAGE CHARACTERIZATION

(71) Applicant: Cellepathy Inc., Sammamish, WA (US)

(72) Inventors: Dan Abramson, New Yok, NY (US);
Sean Ir, Tel Aviv (IL); Oren Musicant, Tel Aviv (IL)

(73) Assignee: Cellepathy Inc., Sammamish, WA (US)

( * ) Notice: Subject to any disclaimer, the term of this patent is extended or adjusted under 35 U.S.C. 154(b) by 0 days. days.

(21) Appl. No.: 14/410,082

(22) PCT Filed: Jun. 21, 2013

(86) PCT No.: PCT/IB2013/001582
§ 371 (c)(1),
(2) Date: Dec. 21, 2014

(87) PCT Pub. No.: WO2013/190380
PCT Pub. Date: Dec. 27, 2013

(65) Prior Publication Data
US 2015/0312404 A1    Oct. 29, 2015

Related U.S. Application Data

(60) Provisional application No. 61/662,659, filed on Jun. 21, 2012, provisional application No. 61/676,704, (Continued)

(51) Int. Cl.
*H04M 3/00*    (2006.01)
*H04M 1/725*   (2006.01)
(Continued)

(52) U.S. Cl.
CPC ... *H04M 1/72569* (2013.01); *H04M 1/72572* (2013.01); *H04M 1/72577* (2013.01);
(Continued)

(58) Field of Classification Search
CPC ......... H04M 1/72569; H04M 1/72572; H04M 1/72577; H04W 4/027; H04W 4/046; H04W 52/0254; H04W 8/02
(Continued)

(56) References Cited

U.S. PATENT DOCUMENTS 5,504,482 A    4/1996  Schreder
5,874,905 A    2/1999  Nanba et al.
(Continued)

FOREIGN PATENT DOCUMENTS

WO    2011058224 A1    5/2011
WO    WO-2013043228 A1  3/2013

OTHER PUBLICATIONS

PCT International Search Report dated Mar. 21, 2014 for International Application No. PCT/IB2013/001582, 5 pages.
(Continued)

*Primary Examiner* — Timothy Pham
(74) *Attorney, Agent, or Firm* — FisherBroyles, LLP; Ariel Reinitz

(57) ABSTRACT

Systems and methods are provided for context determination. In one implementation one or more indications can be received, each of the one or more indications corresponding to a perception of one or more access points in relation to a user device. The one or more indications can be processed to determine one or more characteristics of at least one of the one or more access points. Based on the one or more characteristics, a context of the user device can be determined.

20 Claims, 51 Drawing Sheets

Related U.S. Application Data filed on Jul. 27, 2012, provisional application No. 61/694,172, filed on Aug. 28, 2012, provisional application No. 61/694,180, filed on Aug. 28, 2012, provisional application No. 61/704,113, filed on Sep. 21, 2012, provisional application No. 61/731,394, filed on Nov. 29, 2012, provisional application No. 61/732,693, filed on Dec. 3, 2012, provisional application No. 61/793,633, filed on Mar. 15, 2013, provisional application No. 61/815,998, filed on Apr. 25, 2013, provisional application No. 61/825,034, filed on May 19, 2013, provisional application No. 61/825,358, filed on May 20, 2013, provisional application No. 61/829,967, filed on May 31, 2013.

(51) Int. Cl.
  *H04W 4/02* (2018.01)
  *H04W 52/02* (2009.01)
  *H04W 8/02* (2009.01)
  *H04W 4/04* (2009.01)

(52) U.S. Cl.
  CPC ............ *H04W 4/027* (2013.01); *H04W 8/02* (2013.01); *H04W 52/0254* (2013.01); *H04W 4/046* (2013.01); *Y02D 70/00* (2018.01); *Y02D 70/1224* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/22* (2018.01); *Y02D 70/23* (2018.01); *Y02D 70/26* (2018.01)

(58) Field of Classification Search
  USPC ........................................................ 455/418
  See application file for complete search history.

(56) References Cited

U.S. PATENT DOCUMENTS

| | | | |
|---|---|---|---|
| 6,061,628 A | 5/2000 | Hayashi et al. | |
| 6,321,161 B1 | 11/2001 | Herbst et al. | |
| 6,381,534 B2 | 4/2002 | Takayama et al. | |
| 6,408,187 B1 | 6/2002 | Merriam | |
| 6,480,783 B1 | 11/2002 | Myr | |
| 6,944,539 B2 | 9/2005 | Yamada et al. | |
| 7,395,152 B2 | 7/2008 | Watanabe et al. | |
| 7,483,786 B1 | 1/2009 | Sidoti et al. | |
| 7,546,206 B1 | 6/2009 | Miller et al. | |
| 8,046,162 B2 | 10/2011 | Nonaka | |
| 8,219,309 B2 | 7/2012 | Nirhamo | |
| 8,306,556 B2 | 11/2012 | Chao | |
| 8,385,946 B2 | 2/2013 | Forstall et al. | |
| 8,417,448 B1 | 4/2013 | Denise | |
| 8,452,529 B2 | 5/2013 | Alten | |
| 8,452,771 B2 | 5/2013 | Kurciska et al. | |
| 8,700,308 B2 | 4/2014 | Ng et al. | |
| 8,731,828 B2 | 5/2014 | Nishikawa | |
| 8,781,716 B1 | 7/2014 | Wenneman et al. | |
| 8,848,879 B1 | 9/2014 | Coughlan et al. | |
| 8,983,772 B2 | 3/2015 | Lee | |
| 9,043,143 B2 | 5/2015 | Han | |
| 9,086,294 B2 | 7/2015 | Geelen | |
| 9,175,967 B2 | 11/2015 | Abramson et al. | |
| 9,423,262 B2 | 8/2016 | Nesbitt | |
| 9,581,460 B1 | 2/2017 | Mcnew et al. | |
| 9,638,537 B2 | 5/2017 | Abramson et al. | |
| 2001/0029425 A1 | 10/2001 | Myr | |
| 2002/0082771 A1 | 6/2002 | Anderson et al. | |
| 2003/0135304 A1 | 7/2003 | Sroub et al. | |
| 2004/0243307 A1 | 12/2004 | Geelen | |
| 2005/0131626 A1 | 6/2005 | Ignatin | |
| 2005/0131627 A1 | 6/2005 | Ignatin | |
| 2005/0131629 A1 | 6/2005 | Ignatin | |
| 2005/0131634 A1 | 6/2005 | Ignatin | |
| 2005/0164673 A1 | 7/2005 | Ehlers | |
| 2005/0176420 A1 | 8/2005 | Graves et al. | |
| 2005/0203703 A1 | 9/2005 | Chang | |
| 2005/0222751 A1 | 10/2005 | Uyeki | |
| 2005/0222760 A1 | 10/2005 | Cabral et al. | |
| 2005/0222761 A1 | 10/2005 | Uyeki | |
| 2005/0222763 A1 | 10/2005 | Uyeki | |
| 2005/0222764 A1 | 10/2005 | Uyeki et al. | |
| 2005/0288856 A1 | 12/2005 | Uyeki et al. | |
| 2006/0074553 A1 | 4/2006 | Foo et al. | |
| 2007/0005233 A1 | 1/2007 | Pinkus et al. | |
| 2007/0135990 A1 | 6/2007 | Seymour et al. | |
| 2007/0138347 A1 | 6/2007 | Ehlers | |
| 2007/0208498 A1 | 9/2007 | Barker et al. | |
| 2007/0290839 A1 | 12/2007 | Uyeki et al. | |
| 2007/0293958 A1 | 12/2007 | Stehle et al. | |
| 2008/0004802 A1 | 1/2008 | Horvitz | |
| 2008/0054072 A1 | 3/2008 | Katragadda et al. | |
| 2008/0094250 A1 | 4/2008 | Myr | |
| 2008/0248815 A1 | 10/2008 | Busch | |
| 2008/0255754 A1 | 10/2008 | Pinto | |
| 2008/0299954 A1* | 12/2008 | Wright ................... H04W 4/02 455/414.1 |
| 2008/0305779 A1 | 12/2008 | Wright et al. | |
| 2009/0005965 A1 | 1/2009 | Forstall et al. | |
| 2009/0048776 A1 | 2/2009 | Bouillet et al. | |
| 2009/0157294 A1 | 6/2009 | Geelen et al. | |
| 2009/0254272 A1 | 10/2009 | Hendrey | |
| 2010/0036606 A1 | 2/2010 | Jones | |
| 2010/0062788 A1 | 3/2010 | Nagorniak | |
| 2010/0113073 A1* | 5/2010 | Schlesener ............. H04W 4/02 455/466 |
| 2010/0121571 A1 | 5/2010 | Cabral et al. | |
| 2010/0185388 A1 | 7/2010 | Horvitz | |
| 2010/0201478 A1 | 8/2010 | Veen et al. | |
| 2010/0207787 A1 | 8/2010 | Catten et al. | |
| 2010/0309895 A1 | 12/2010 | Hunn et al. | |
| 2010/0332119 A1 | 12/2010 | Geelen et al. | |
| 2011/0009107 A1* | 1/2011 | Guba ....................... G08G 1/20 455/418 |
| 2011/0021234 A1 | 1/2011 | Tibbitts et al. | |
| 2011/0060519 A1 | 3/2011 | Hunter | |
| 2011/0068923 A1 | 3/2011 | Burket et al. | |
| 2011/0098915 A1 | 4/2011 | Disatnik et al. | |
| 2011/0098917 A1 | 4/2011 | Lebeau et al. | |
| 2011/0125398 A1 | 5/2011 | Bos | |
| 2011/0159842 A1* | 6/2011 | Vander Veen .......... G01S 19/14 455/410 |
| 2011/0224893 A1 | 9/2011 | Scofield et al. | |
| 2011/0238609 A1 | 9/2011 | Aben et al. | |
| 2012/0021717 A1 | 1/2012 | Schmidt | |
| 2012/0030133 A1 | 2/2012 | Rademaker | |
| 2012/0071151 A1* | 3/2012 | Abramson .............. H04L 67/12 455/418 |
| 2012/0087303 A1 | 4/2012 | Kwon et al. | |
| 2012/0098677 A1 | 4/2012 | Geelen | |
| 2012/0123806 A1 | 5/2012 | Schumann, Jr. et al. | |
| 2012/0226434 A1 | 9/2012 | Chiu | |
| 2012/0244883 A1 | 9/2012 | Tibbitts et al. | |
| 2013/0084847 A1 | 4/2013 | Tibbitts et al. | |
| 2013/0131986 A1 | 5/2013 | Van Seggelen et al. | |
| 2013/0143528 A1 | 6/2013 | Randazzo et al. | |
| 2013/0190978 A1* | 7/2013 | Kato ..................... G01C 21/3664 701/36 |
| 2013/0211705 A1 | 8/2013 | Geelen et al. | |
| 2013/0238239 A1 | 9/2013 | Rowley et al. | |
| 2013/0311081 A1 | 11/2013 | Yamakawa et al. | |
| 2013/0344859 A1 | 12/2013 | Abramson et al. | |
| 2013/0345979 A1 | 12/2013 | Oostveen | |
| 2014/0032104 A1 | 1/2014 | Witkemper | |
| 2014/0195143 A1 | 7/2014 | Kandangath et al. | |
| 2014/0214322 A1 | 7/2014 | Tsimhoni et al. | |
| 2014/0244111 A1 | 8/2014 | Gross et al. | |
| 2014/0278070 A1 | 9/2014 | Mcgavran et al. | |
| 2014/0333431 A1 | 11/2014 | Abdelsamie et al. | |
| 2014/0358437 A1 | 12/2014 | Fletcher | |
| 2015/0051826 A1 | 2/2015 | Basson et al. | |
| 2015/0081162 A1 | 3/2015 | Mitchell et al. | |

(56) References Cited

U.S. PATENT DOCUMENTS

| | | |
|---|---|---|
| 2015/0106012 A1 | 4/2015 | Kandangath et al. |
| 2015/0141043 A1 | 5/2015 | Abramson et al. |
| 2015/0160025 A1 | 6/2015 | König |
| 2015/0168174 A1 | 6/2015 | Abramson et al. |
| 2015/0168175 A1 | 6/2015 | Abramson et al. |
| 2015/0173040 A1 | 6/2015 | Gao et al. |
| 2015/0177010 A1 | 6/2015 | Abramson et al. |
| 2015/0276419 A1 | 10/2015 | Hashem et al. |
| 2016/0003621 A1 | 1/2016 | Koenig et al. |
| 2016/0195405 A1 | 7/2016 | Kreifeldt |
| 2016/0203422 A1 | 7/2016 | Demarchi et al. |
| 2016/0205238 A1 | 7/2016 | Abramson et al. |
| 2016/0216130 A1 | 7/2016 | Abramson et al. |
| 2016/0341564 A1 | 11/2016 | Cheng |
| 2017/0234691 A1 | 8/2017 | Abramson et al. |

OTHER PUBLICATIONS

PCT Written Opinion dated Mar. 21, 2014 for International Application No. PCT/IB2013/001582, 8 pages.

PCT International Preliminary Report on Patentability dated Oct. 10, 2014 for International Application No. PCT/IB13/001582, 32 pages.

Supplementary European Search Report dated Jan. 6, 2016 for EP13806922, 6 pages.

"Australian Application Serial No. 2013279017, First Examiner Report dated Nov. 30, 2016", 7 pgs.

"European Application Serial No. 13806922.4, Response filed Aug. 11, 2016 to Extended European Search Report dated Jan. 15, 2016", 9 pgs.

"European Application Serial No. 13806922.4, Response filed Aug. 13, 2015 to Communication pursuant to Rules 161(1) and 162 EPC dated Feb. 4, 2015", 5 pgs.

"International Application Serial No. PCT/IB2013/001582, Invitation to Pay Add'l Fees dated Dec. 31, 2013", 2 pgs.

"U.S. Appl. No. 14/540,932, Advisory Action dated Jul. 28, 2016", 3 pgs.

"U.S. Appl. No. 14/540,932, Final Office Action dated May 16, 2016", 16 pgs.

"U.S. Appl. No. 14/540,932, Non Final Office Action dated Mar. 9, 2017", 17 pgs.

"U.S. Appl. No. 14/540,932, Non Final Office Action dated Oct. 16, 2015", 15 pgs.

"U.S. Appl. No. 14/540,932, Response filed Mar. 16, 2016 to Non Final Office Action dated Oct. 16, 2015", 10 pgs.

"U.S. Appl. No. 14/540,932, Response filed Jul. 18, 2016 to Final Office Action dated May 16, 2016", 13 pgs.

"U.S. Appl. No. 14/540,932, Response filed Nov. 16, 2016 to Advisory Action dated Jul. 28, 2016", 14 pgs.

"U.S. Appl. No. 14/540,936, Non Final Office Action dated Mar. 9, 2017", 15 pgs.

"U.S. Appl. No. 14/540,936, Preliminary Amendment filed Nov. 29, 2016", 17 pgs.

"U.S. Appl. No. 14/540,936, Response filed Nov. 29, 2016 to Restriction Requirement dated Aug. 15, 2016", 2 pgs.

"U.S. Appl. No. 14/540,936, Restriction Requirement dated Aug. 15, 2016", 6 pgs.

"U.S. Appl. No. 14/540,951, Non Final Office Action dated Jun. 8, 2015", 13 pgs.

"U.S. Appl. No. 14/540,954, Non Final Office Action dated Sep. 27, 2016", 53 pgs.

"U.S. Appl. No. 14/540,954, Response filed Feb. 27, 2017 to Non Final Office Action dated Sep. 27, 2016", 11 pgs.

"U.S. Appl. No. 14/706,954 Non Final Office Action dated Jun. 9, 2015", 13 pgs.

"U.S. Appl. No. 14/706,954, Response filed Aug. 9, 2015 to Non Final Office Action dated Jun. 9, 2015", 16 pgs.

"U.S. Appl. No. 14/706,954, 312 Amendment filed Sep. 10, 2015", 12 pgs.

"U.S. Appl. No. 14/706,954, Examiner Interview Summary dated Jul. 15, 2015", 3 pgs.

"U.S. Appl. No. 14/706,954, Non Final Office Action dated Jun. 9, 2015", 13 pgs.

"U.S. Appl. No. 14/706,954, Notice of Allowance dated Sep. 8, 2015", 10 pgs.

"U.S. Appl. No. 15/089,186, Applicant Interview Summary filed Nov. 11, 2016", 1 pgs.

"U.S. Appl. No. 15/089,186, Corrected Notice of Allowance dated Mar. 23, 2017", 2 pgs.

"U.S. Appl. No. 15/089,186, Non Final Office Action dated Jul. 8, 2016", 12 pgs.

"U.S. Appl. No. 15/089,186, Notice of Allowance dated Dec. 5, 2016", 10 pgs.

"U.S. Appl. No. 15/089,186, Response filed Oct. 11, 2016 to Non Final Office Action dated Jul. 8, 2016", 17 pgs.

"U.S. Appl. No. 15/506,327, Preliminary Amendment filed Feb. 21, 2017", 3 pgs.

"U.S. Appl. No. 15/583,140, Preliminary Amendment filed May 1, 2017", 11 pgs.

"Application Serial No. PCT/US2016/066222, Invitation to Pay Add'l Fees and Partial Search Rpt dated Feb. 16, 2017".

"International Application Serial No. PCT/US2014/052583, International Preliminary Report on Patentability dated Jul. 22, 2015", 5 pgs.

"International Application Serial No. PCT/US2014/052583, International Search Report dated Feb. 9, 2015", 4 pgs.

"International Application Serial No. PCT/US2014/052583, Invitation to Pay Additional Fees dated Oct. 17, 2014", 2 pgs.

"International Application Serial No. PCT/US2014/052583, Written Opinion dated Feb. 9, 2015", 6 pgs.

\* cited by examiner

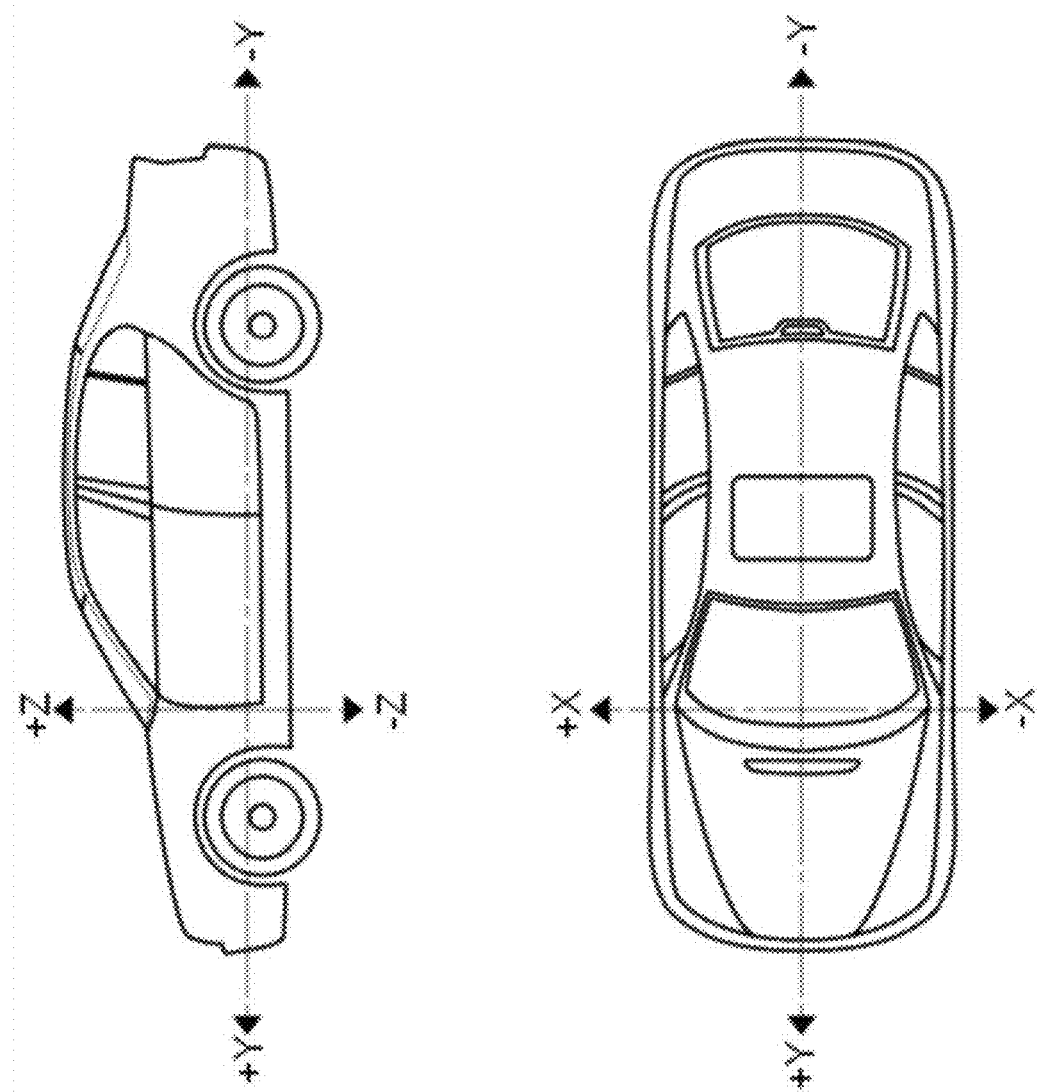

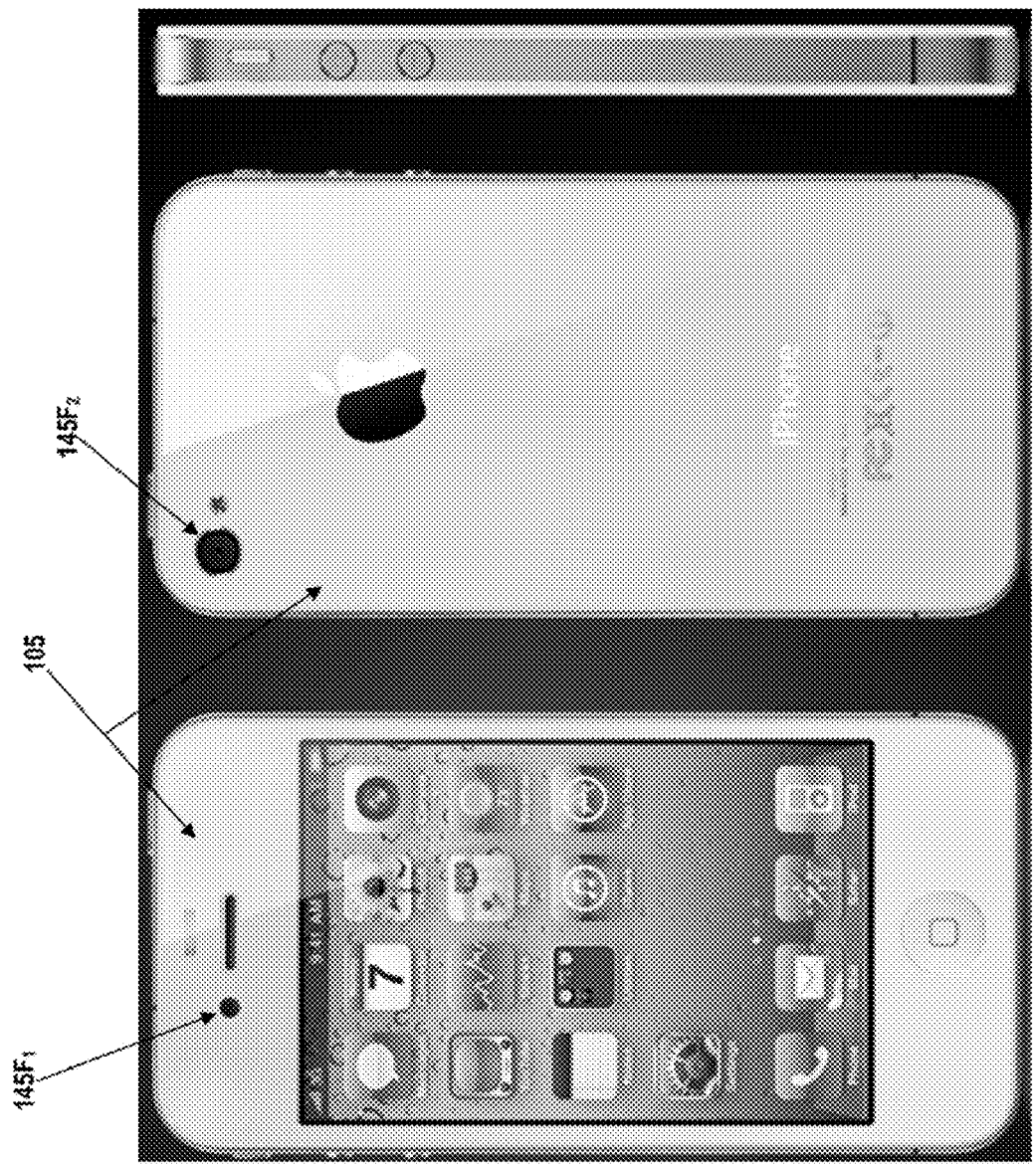

CONTEXT-BASED MOBILITY STOPPAGE CHARACTERIZATION

CROSS-REFERENCE TO RELATED APPLICATIONS

This application is a US National Stage application of International Application No. PCT/IB2013/001582, filed Jun. 21, 2013, which is related to and claims the benefit of: U.S. Patent Application No. 61/662,659, filed Jun. 21, 2012, U.S. Patent Application No. 61/676,704, filed Jul. 27, 2012, U.S. Patent Application No. 61/694,172, filed Aug. 28, 2012, U.S. Patent Application No. 61/694,180, filed Aug. 28, 2012, U.S. Patent Application No. 61/704,113, filed Sep. 21, 2012, U.S. Patent Application No. 61/731,394, filed Nov. 29, 2012, U.S. Patent Application No. 61/732,693, filed Dec. 3, 2012, U.S. Patent Application No. 61/793,633, filed Mar. 15, 2013, U.S. Patent Application No. 61/815,998, filed Apr. 25, 2013, U.S. Patent Application No. 61/825,034, filed May 19, 2013, U.S. Patent Application No. 61/825,358, filed May 20, 2013, and U.S. Patent Application No. 61/829,967, filed May 31, 2013 each of which is incorporated herein by reference in their respective entireties.

TECHNICAL FIELD

This disclosure relates generally to the field of mobile device identification, and, in particular, to computer-implemented systems and methods for context determination.

BACKGROUND

There are approximately 4.6 billion cellular phone subscriptions in the world over which it is estimated that more than 2 trillion text (SMS) messages are sent annually. There are also over 800 million transportation vehicles in the world. The magnitude of these statistics indicates that cellular phone use in vehicles is inevitable and is likely to remain quite common, unless preventative measures are taken.

Drivers using a hand-held cellular phone or smartphone for talking, text messaging, and/or for executing other applications or 'apps' while driving has become a problem of near-epidemic proportions. Studies on distracted driving have shown that by talking on a cell phone, a driver increases his/her risk of an accident by a factor of four. Even worse, sending text messages increases a driver's accident risk 23-fold. Additionally, studies have shown that the temptation to use a cellular phone for texting, talking, and other activities while operating a vehicle is not limited to younger drivers—adult drivers have been shown to text more often than younger ones.

In response to this growing concern and danger, numerous regulatory actions have been put in place to attempt to mitigate such phone-based distractions to drivers. For example, in the United States, thirty states have banned drivers of vehicles from texting, and many have subsequently increased the penalties for such violations. Driving-while-texting has also been banned throughout Europe and many other countries around the world. Additionally, talking on a hand-held cellular phone while driving a vehicle has been banned in eight US states, and such cell phone use has been banned in all of Europe and in many other countries.

The effectiveness of these laws alone, without an effective means of enforcement, is questionable. Being that cellular phones are generally small and discreet and drivers are frequently in motion, it is often difficult for law enforcement personnel to effectively police for such violations. Indeed, statistics show that accidents arising from cellular phone-based distractions are increasing as the popularity of such devices increases.

Given the easy accessibility of cell phones to drivers, many drivers' apparent desire to operate their cellular phones while driving, and the difficulties attendant with enforcing laws prohibiting cellular phone use, it is likely that drivers will continue to use cellular phones for texting, talking, and/or other activities (e.g., playing games or running applications), for the foreseeable future.

Moreover, it can be appreciated that the usage of mobile devices in various locations and/or settings can be detrimental on a number of levels. For instance, anecdotal evidence suggests that the proliferation of mobile devices such as smartphones has resulted in an increase of mobile device usage by students during classes/lectures, serving to distract such students from properly absorbing the material being taught. Additionally, many students have become adept at using such devices discreetly, resulting in many instances of cheating being facilitated through the use of mobile devices.

It is with respect to these and other considerations that the disclosure made herein is presented.

SUMMARY

Technologies are presented herein in support of a system and method for context determination. According to one aspect, one or more indications can be received, each of the one or more indications corresponding to a perception of one or more access points in relation to a user device. The one or more indications can be processed to determine one or more characteristics of at least one of the one or more access points. Based on the one or more characteristics, a context of the user device can be determined.

According to another aspect, one or more operational characteristics of a device can be identified and one or more contextual determination methods can be selectively employed in relation to the device, based on the operational characteristics.

According to another aspect, one or more power charging aspects can be determined in relation to a user device, the one or more power charging aspects can be processed to determine a context of the user device, and one or more operations can be initiated, based on the context, in relation to the user device.

These and other aspects, features, and advantages can be appreciated from the accompanying description of certain embodiments and the accompanying drawing figures.

BRIEF DESCRIPTION OF THE DRAWINGS

FIG. 10 is a diagram depicting an exemplary coordinate system used in relation to a vehicle;

FIG. 15F depicts a mobile device, and specifically the locations of the forward-facing and rear-facing cameras of the mobile device, in accordance with at least one embodiment disclosed herein;

DETAILED DESCRIPTION OF CERTAIN EMBODIMENTS

Figure 1:
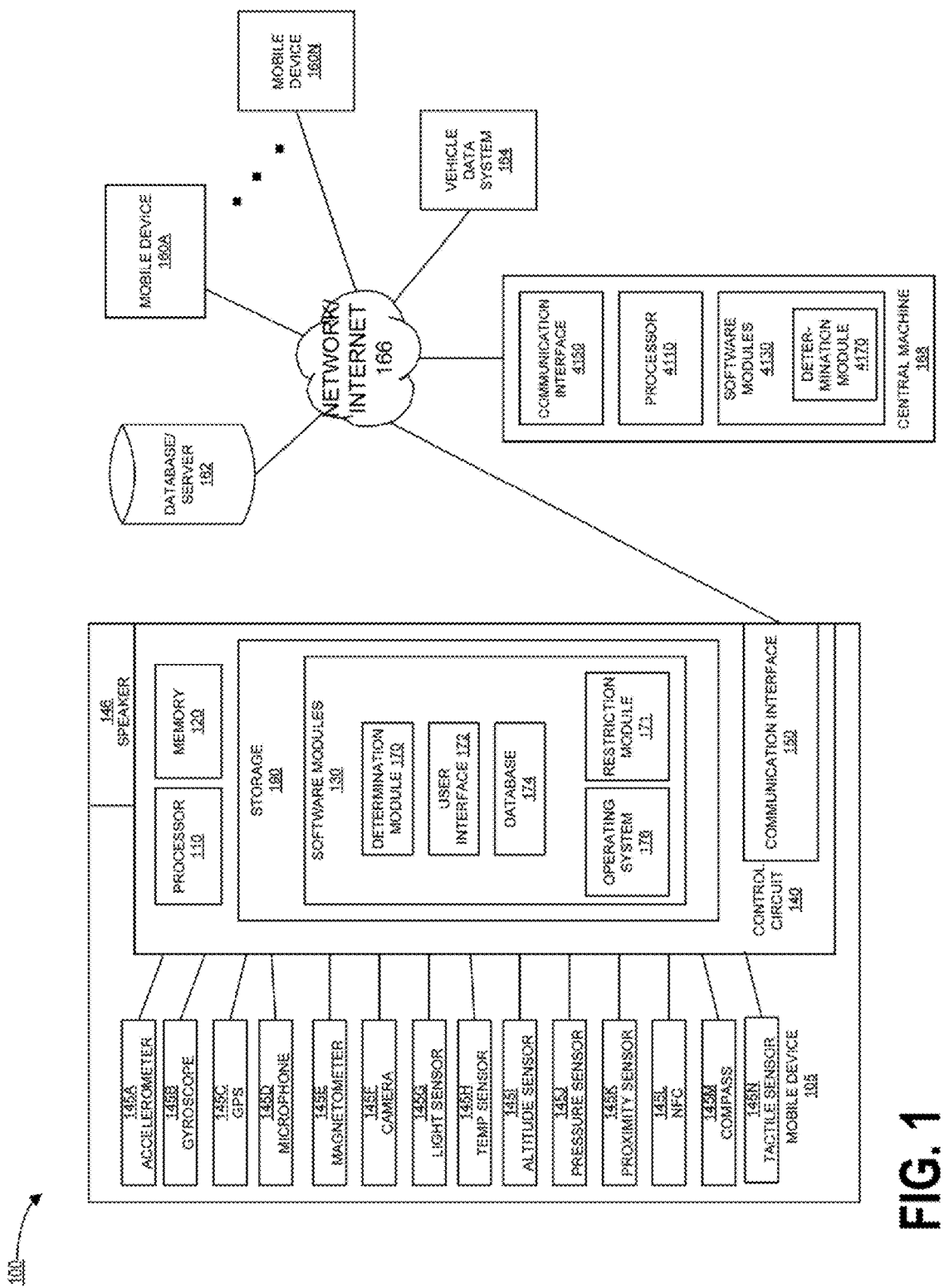
FIG. 1 is a high-level diagram illustrating an exemplary configuration of an in-vehicle determination system.

By way of overview and introduction, the present disclosure details systems and methods for determining various user roles and actions as they relate to the operation of a mobile device within a vehicle such as a car. Being that the usage of mobile devices while driving has been identified as a significant cause of car accidents, in addition to laws that have been enacted preventing certain use of mobile phones while driving, various systems and methods are provided herein which serve to identify the user of a particular mobile device (for instance, with respect to their role as a driver or passenger in the car), to identify various aspects of the usage of the device itself (for instance that the device is executing a text messaging application), and to identify instances when a mobile device deviates from its expected or regular operation.

As will be described in detail herein, many of these identifications and/or determinations are made possible through various sensors, components, and elements that are integrated within and/or accessible to a mobile device. As is well known to those of ordinary skill in the art, contemporary smartphones incorporate a plethora of sensors, including accelerometers, GPS receivers, and gyroscopes. Various inputs and/or notifications can be received from these sensors, components, and elements, and can further be processed in a number of ways in order to arrive at various conclusions regarding, among others, the user of the mobile device (such as whether the user is a driver or passenger in a car) and/or the status of the mobile device itself, and various probabilities can be ascribed to the conclusions. The operation of the mobile device can further be adjusted based on such conclusions, for example, disabling or limiting the operation of a mobile device upon reaching a likely conclusion that the device is being operated by a user who is driving a car.

It will also be appreciated that the systems and methods disclosed herein can be arranged and/or deployed across a number of scenarios. In one scenario, the systems and methods can be principally employed at a mobile device itself, such as in the form of a mobile application or 'app' executing on the mobile device. In other scenarios, a central machine such as a server in communication with a mobile device can employ the present systems and methods. Such a centralized architecture can enable efficient processing and use of a larger database of user determination characteristics, eliminates power constraints and enables third parties, such as law-enforcement agencies and/or insurance companies, to easily monitor and/or adjust the operation of various mobile devices.

Moreover, it can be appreciated that today, over 70% of teenagers in the developed world own mobile devices, and most bring those devices to school every day. The ability to use these devices clandestinely in class results in student distraction, cheating on tests, and frequent disruptions of the learning environment. The inappropriate use of mobile devices in class has become one of the major problems in western educational systems today, affecting many millions of students and teachers in a very direct way.

The systems and methods described herein define a solution that renders the surreptitious use of mobile devices in school impossible, directly improving student attention and learning, and empowering educators to decide how (if at all) they may be used in classrooms. In doing so, the present systems and methods can limit distraction without interfering with legitimate device use, which until now has been a major barrier to the adoption of other proposed solutions.

The following detailed description is directed to systems and methods for determining an in-vehicle role of a user of a mobile device, selectively restricting a mobile device, and/or configuring various operations of a mobile device. The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.) or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

The terms "determining," "determine," and "determination" as used herein are intended to encompass the determination, identification, computation, calculation, and/or selection, with any degree of certainty or precision, and/or any other such operation, function, or action as it relates to the determination, identification, and/or selection of a user of a device such as a mobile device, an in-vehicle role of a user of a device such as a mobile device, a vehicle or vehicle model/type/class, a device or device model/type/class (e.g., handheld or wired), an operation and/or operation state of a device, and/or any other such similar or related operation, function, or action.

The terms "identifying event" and "identifying events" as used herein are intended to encompass one or more occurrences or instances of events, stimuli, or phenomena, including explicitly the perceived coordinated or correlated occurrence or instance of two or more such events, stimuli, and/or phenomena, such as those originating at one or more devices. It should be understood that the referenced occurrences or instances of events, stimuli, or phenomena include single/singular events, stimuli, or phenomena as well as a set or series of multiple events, stimuli, or phenomena over a period of time. In addition, the referenced occurrences or instances of events, stimuli, or phenomena should also be understood to include one or more coordinations or correlations of the occurrence or instance of any number of such events, stimuli, and/or phenomena over any period of time.

The terms "user interface" and "user interfaces" as used herein are intended to encompass one or more input devices, software modules executing in conjunction with one or more operating systems and/or input devices, or any other such similar or related device, accessory, apparatus, and/or software application or module that enable or facilitate input and/or interaction with a computing device.

The terms "detect," "detected," "detects," "detecting," "detection," and "detections" as used herein are intended to encompass the detection, measurement, and/or receipt, with any degree of certainty or precision, one or more occurrences or instances of events, stimuli, phenomena, or any other such similar or related inputs that are detectable through one or more devices, implements or apparatuses.

The term "processing" as used herein is intended to encompass comparing, analyzing, weighing, correlating and/or computing one or more data items, elements, or structures, individually or in conjunction with one another, using a digital processor in conjunction with one or more software modules and/or applications.

The term "communicatively coordinated" as used herein is intended to encompass direct or indirect communication between two or more devices, accessories, and/or apparatuses, expressly including communications between a first device and a central machine, wherein the central machine is in turn in communication at some interval with a second device. In such a scenario, though the first device and the second device are not, necessarily, in direct or indirect communication with one another, it can be said that they are communicatively coordinated with one another by virtue of their mutual connection to the referenced central machine.

The terms "feature" and "features" as used herein are intended to encompass operations, functions, activities, or any other such similar or related actions, whether automated/automatic or user-initiated, that occur at or in conjunction with one or more devices, machines, applications, and/or apparatuses.

The terms "notification" and "notifications" as used herein are intended to encompass one or more messages, transmissions, and/or data packets, such as electronic messages, which contain one or more data elements (such as inputs) related or relevant to one or more of the steps, operations, and/or processes disclosed herein. An illustration of one such notification can be one or more electronic messages which contain information or data reflecting a first input from an accelerometer, a gyroscope, and/or a GPS receiver at a mobile device. Such inputs can be grouped together into one or more notifications, and these notifications can in turn be transmitted to and/or received by other devices (such as a central machine) where they can be further processed.

The terms "vehicle class" and "vehicle classes" as used herein are intended to encompass one or more types, categories, and/or models of vehicle. By way of example, airplanes, trains, automobiles, motorcycles, and boats can all be said to be different vehicle classes. By way of further example, sub-categories within a given vehicle class can also be understood to be different vehicle classes. Thus, the automobile vehicle class can be further sub-divided into further vehicle classes such as sedans, vans, sport utility vehicles (SUVs), and convertibles. These sub-categories can also be said to be vehicle classes within the meaning of the term as used herein.

The terms "operation state" and "operation states" as used herein are intended to encompass the states of a device, including any and all operations, functions, capacities, and/or capabilities, including, explicitly, a set and/or series of any number of operations, functions, capacities, and/or capabilities, that can be achieved by and/or in conjunction with a device, such as a mobile device. Examples of an operation state include, but are not limited to: an execution of an application (such as an internet browser application) at a mobile device, a transmission of a notification (such as sending a text message or email message), a capacity to receive text messages, and a capability to type text using a keyboard. Accordingly, the various transformations, adjustments, and/or modifications disclosed herein that relate to an operation state and/or operation states should be understood to refer to such transformations, adjustments, and/or modifications that pertain to practically any and all operations, functions, capacities, and/or capabilities that can be achieved by and/or in conjunction with a device, such as a mobile device.

The terms "handheld state" and "handheld states" as used herein are intended to encompass one or more states of a mobile device with respect to whether or not a user is in direct or indirect physical contact with the device. For example, the handheld state of a device in instances where a user holds the device in his/her hand, carries the device in his/her pocket, and/or balances the device on his/her knee can all be said to be "handheld." By way of further example, the handheld state of a device in instances where the device is positioned in a dock or cradle, and/or is otherwise not in direct or indirect contact with a user can be said to be "non-handheld."

The terms "operational capacity" and "operational capacities" as used herein are intended to encompass one or more operation states of a mobile device, particularly with respect to a central machine such as a server. By way of example, an operational capacity of a mobile device can be a voice or data connection that is provided to a mobile device through a central machine, such as that of a voice/data service provider. Accordingly, it can be appreciated that a transformation, modification, and/or adjustment of such an operational capacity preferably entails such a transformation, modification, and/or adjustment that is initiated and/or effected by a central machine, preferably in relation to a mobile device. For example, a central machine can transmit an instruction and/or notification to a mobile device, such instruction/notification directing the transformation, modification, and/or adjustment be implemented at the mobile device. By way of further example, a central machine can implement a transformation, modification, and/or adjustment at the central machine itself, wherein such a transformation, modification, and/or adjustment—such as the stopping of voice and/or data connections to a mobile device—ultimately effect the functionality of the device itself. In both such cases it can be said that the central machine has transformed, modified, and/or adjusted the operational capacity of the mobile device.

The terms "user" and "users" as used herein are intended to encompass one or more individuals, persons, and/or entities whose presence a device or machine can preferably be directly or indirectly aware. It should be understood that while in certain scenarios a user can interact with a device, in other scenarios a particular individual, person, and/or entity can be said to be a "user" within the context of the present disclosure, despite not interacting with a particular device.

The terms "tactile sensor" and "tactile sensor(s)" as used herein are intended to encompass one or more buttons, touchscreens, and/or components that enable a user to interact with a device in a tactile fashion. Examples of such tactile sensors include, but are not limited to, buttons (such as those that comprise a keyboard), switches, as well as touch screen displays (such as capacitive and resistive displays) which both display information and allow the tactile interaction with such information. It should be further understood that such tactile sensors are preferably further capable of perceiving a plurality of simultaneous tactile interactions. Examples of such functionality include multi-touch technologies, as are known to those of ordinary skill in the art.

The terms "visual capture" and "visual captures" as used herein are intended to encompass one or more operations, functions, and/or actions that relate to the optical perception and/or documentation of one or more visual items, elements, and/or phenomena. Examples of such visual captures include, but are not limited to, photographs, images, videos, and/or any other such method of visual perception and/or documentation. Accordingly, it can be appreciated that certain visual captures correspond to a single instance (such as a photograph) while other visual captures correspond to multiple instances (such as a series of photographs and/or a video).

The term "in-vehicle role indicator" as used herein is intended to encompass one or more items, elements, and/or indicators that relate to one or more aspects associated with and/or corresponding to the in-vehicle role of a user in a vehicle (e.g., whether a user is or is not a driver, is or is not a passenger, etc.). For example, one such in-vehicle role indicator is identifying in a picture of two hands of a driver grasping the steering wheel of a vehicle. Using one or more optical recognition methods, such as those known to one of ordinary skill in the art, one or more images and/or videos can be processed in order to identify the presence of two hands grasping a steering wheel, thus indicating that a particular vehicle is being operated by a driver using two hands and therefore it can be reasonable concluded that the user who took such an image is not the driver. By way of further example, another such in-vehicle role indicator can be capturing a picture that can be processed to identify that a seatbelt extends from the right shoulder to left thigh of the wearer. Such an identification also reasonably suggests that the wearer is not a driver (as the seatbelt of a driver traditionally extends from the left shoulder to the right thigh).

It should be further understood that while the various computing devices and machines referenced herein, including but not limited to the first mobile device, the second mobile device, the central machine, or any other such similar or related devices or machines are referred to herein in a as individual/single devices and/or machines, in certain arrangements the referenced devices and machines, and their associated and/or accompanying operations, features, and/or functionalities can be arranged or otherwise employed across any number of devices and/or machines, such as over a network connection, as is known to those of skill in the art.

In addition, it should be understood that while the term "input" is used herein in the singular form, this is merely for the sake of clarity and convention. However, the referenced terms should be understood to encompass both singular inputs as well as a plurality (two or more) inputs, such as a set of inputs.

It should be understood that the terms "lateral acceleration," "x-acceleration," and "x-axis acceleration" as used herein are used interchangeably, and should thus be understood to possess the same meaning and connotation. Additionally, the terms "forward acceleration," "y-acceleration," and "y-axis acceleration" as used herein are used interchangeably and should thus be understood to possess the same meaning and connotation. In addition, the terms "upward acceleration," "z-axis acceleration," "z-acceleration" as used herein are used interchangeably and should thus be understood to possess the same meaning and connotation.

It should also be understood that the terms "yaw," "gyroscopic yaw," "angular velocity around the z-axis," and "rotation around the z-axis" as used herein are used interchangeably, and should thus be understood to possess the same meaning and connotation. In addition, the terms "roll," "gyroscopic roll," "angular velocity around the y-axis," and "rotation around the y-axis," as used herein are used interchangeably, and should thus be understood to possess the same meaning and connotation. Additionally, the terms "pitch," "gyroscopic pitch," "angular velocity around the x-axis," and "rotation around the x-axis" as used herein are used interchangeably, and should thus be understood to possess the same meaning and connotation.

An exemplary computer system is shown as a block diagram in FIG. 1 which is a high-level diagram illustrating an exemplary configuration of a determination system 100. In one arrangement, mobile device 105 can be a portable computing device such as a mobile phone, smartphone, or PDA. In other arrangements, mobile device 105 can be a tablet computer, a laptop computer, a personal computer, or an in-vehicle computer (e.g., ECU/OBD) though it should be understood that mobile device 105 of determination system 100 can be practically any computing device capable of embodying the systems and/or methods described herein.

Mobile device 105 of determination system 100 includes a control circuit 140 which is operatively connected to various hardware and software components that serve to enable operation of the determination system 100. The control circuit 140 is operatively connected to a processor 110 and a memory 120. Processor 110 serves to execute instructions for software that can be loaded into memory 120. Processor 110 can be a number of processors, a multi-processor core, or some other type of processor, depending on the particular implementation. Further, processor 110 can be implemented using a number of heterogeneous processor systems in which a main processor is present with secondary processors on a single chip. As another illustrative example, processor 110 can be a symmetric multi-processor system containing multiple processors of the same type.

Preferably, memory 120 and/or storage 190 are accessible by processor 110, thereby enabling processor 110 to receive and execute instructions stored on memory 120 and/or on storage 190. Memory 120 can be, for example, a random access memory (RAM) or any other suitable volatile or non-volatile computer readable storage medium. In addition, memory 120 can be fixed or removable. Storage 190 can take various forms, depending on the particular implementation. For example, storage 190 can contain one or more components or devices. For example, storage 190 can be a hard drive, a flash memory, a rewritable optical disk, a rewritable magnetic tape, or some combination of the above. Storage 190 also can be fixed or removable.

One or more software modules 130 are encoded in storage 190 and/or in memory 120. The software modules 130 can comprise one or more software programs or applications having computer program code or a set of instructions executed in processor 110. Such computer program code or instructions for carrying out operations for aspects of the systems and methods disclosed herein can be written in any combination of one or more programming languages, including an object oriented programming language such as Java, Smalltalk, C++ or the like and conventional procedural programming languages, such as the "C" programming language or similar programming languages. The program code can execute entirely on the mobile device 105, partly on mobile device 105, as a stand-alone software package, partly on mobile device 105 and partly on a remote computer/device or entirely on the remote computer/device or server. In the latter scenario, the remote computer can be connected to mobile device 105 through any type of network, including a local area network (LAN) or a wide area network (WAN), or the connection can be made to an external computer (for example, through the Internet using an Internet Service Provider).

Software modules 130, including program code/instructions, are located in a functional form on one or more computer readable storage devices (such as memory 120 and/or storage 190) that can be selectively removable. The software modules 130 can be loaded onto or transferred to mobile 105 for execution by processor 110. It can also be said that the program code of software modules 130 and one or more computer readable storage devices (such as memory 120 and/or storage 190) form a computer program product.

It should be understood that in some illustrative embodiments, one or more of software modules 130 can be downloaded over a network to storage 190 from another device or system via communication interface 150 for use within determination system 100. For instance, program code stored in a computer readable storage device in a server can be downloaded over a network from the server to determination system 100.

Preferably, included among the software modules 130 is a determination module 170 that is executed by processor 110. During execution of the software modules 130, and specifically the determination module 170, the processor 110 configures the control circuit 140 to determine an in-vehicle role of a user of the mobile device 105, as will be described in greater detail below. It should be understood that while software modules 130 and/or determination module 170 can be embodied in any number of computer executable formats, preferably software modules 130 and/or determination module 170 comprise one or more applications or 'apps' that are configured to be executed at mobile device 105 and/or in relation to mobile device 105. In other arrangements, software modules 130 and/or determination module 170 are incorporated and/or integrated within operating system 176. Furthermore, in certain arrangements, software modules 130 and/or determination module 170 can be configured to execute at the request or selection of a user of mobile device 105 (or any other such user having the ability to execute a program in relation to mobile device 105, such as a network administrator), while in other arrangements mobile device 105 can be configured to automatically execute software modules 130 and/or determination module 170, without requiring an affirmative request to execute. The advantages of such an automatic arrangement can be appreciated in context of a regulatory scheme that mandates or recommends that software modules 130 and/or determination module 170 be executed by a mobile device 105 some or all of the time, in furtherance of a campaign to improve driver safety. It should also be noted that while FIG. 1 depicts memory 120 oriented on control circuit 140, in an alternate arrangement, memory 120 can be operatively connected to the control circuit 140. In addition, it should be noted that other software modules (such as user interface 172 and operating system 176) and other information and/or data relevant to the operation of the present systems and methods (such as database 174) can also be stored on storage 190, as will be discussed in greater detail below.

A communication interface 150 is also operatively connected to control circuit 140. Communication interface 150 can be any interface that enables communication between the mobile device 105 and external devices, machines and/or elements. Preferably, communication interface 150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, or any other such interfaces for connecting mobile device 105 to other computing devices and/or communication networks such as the Internet. Such connections can include a wired connection or a wireless connection (e.g. 802.11) though it should be understood that communication interface 150 can be practically any interface that enables communication to/from the control circuit 140.

At various points during the operation of determination system 100, mobile device 105 can communicate with one or more mobile devices 160A-N (collectively mobile devices 160). The mobile devices 160 transmit and/or receive data to/from the mobile device 105, thereby preferably enhancing the operation of the determination system 100, as will be described in greater detail below. It should be understood that mobile devices 160 can be in direct communication with mobile device 105, indirect communication with mobile device 105, and/or can be communicatively coordinated with mobile device 105, as will be described in greater detail below. While mobile device 160 can be practically any device capable of communication with mobile machine 105, in the preferred embodiment mobile device 160 is a handheld/portable computer, smartphone, personal digital assistant (PDA), tablet computer, and/or any portable device that is capable of transmitting and receiving data to/from mobile device 105. It should also be appreciated that in many arrangements, mobile device 160 will be substantially identical, from a structural and functional perspective, to mobile device 105.

It should be noted that while the FIG. 1 depicts the determination system 100 with respect to mobile device 160A and mobile device 160N, it should be understood that any number of mobile devices 160 can interact with determination system 100 in the manner described herein.

Also preferably connected to and/or in communication with control circuit 140 are one or more sensors 145A-145N (generically sensors 145). Generally, sensors 145 are various components, devices, and/or receivers that are preferably incorporated within and/or in communication with mobile device 105. Sensors 145 preferably detect one or more stimuli, phenomena, or any other such inputs, as will be described in greater detail below. Examples of such sensors 145 include, but are not limited to, an accelerometer 145A, a gyroscope 145B, a GPS receiver 145C, a microphone 145D, a magnetometer 145E, a camera 145F, a light sensor 145G, a temperature sensor 145H, an altitude sensor 145I, a pressure sensor 145J, a proximity sensor 145K, a near-field communication (NFC) device 145L, a compass 145M, and a tactile sensor 145N. As will be described in greater detail below, mobile device 105 can preferably receive one or more inputs from one or more sensors 145 in order to determine an in-vehicle role of a user of mobile device 105 and/or to selectively restrict the operation of the mobile device.

In certain arrangements, one or more external databases and/or servers 162 are also in communication with mobile device 105. As will be described in greater detail below, database/server 162 is preferably a computing and/or storage device, and/or a plurality of computing and/or storage devices, that contain(s) information, such as determination characteristics, that can be relevant to the determination of an in-vehicle role of a user of mobile device 105.

Additionally, in certain arrangements a vehicle data system 164, such as an on board diagnostic (OBD) computer or computing device (e.g., OBD-I, OBD-II), an engine control unit (ECU), a roll system, an airbag system, a seat-weight sensor system, a seat-belt sensor system, and/or an anti-lock braking system (ABS) can also be in communication with mobile device 105. Vehicle data system 164 preferably provides data and/or information from the vehicle itself that can also be relevant to various determinations disclosed herein, such as the determination of an in-vehicle role of a user of mobile device 105, as will be described in greater detail below.

At this juncture it should be noted that in certain arrangements, such as the one depicted in FIG. 1, mobile devices 160, database/server 162, and/or vehicle data system 164 can be in periodic or ongoing communication with mobile device 105 thorough a computer network such as the Internet 166. Although not depicted in FIG. 1, it should be understood that in certain other arrangements, mobile devices 160, database/server 162, and/or vehicle data system 164 can be in periodic or ongoing direct communication with mobile device 105, such as through communications interface 150, thus not requiring the presence of a network (such as the Internet 166) in order to initiate and maintain communications.

In the description that follows, certain embodiments and/or arrangements are described with reference to acts and symbolic representations of operations that are performed by one or more devices, such as the determination system 100 of FIG. 1. As such, it will be understood that such acts and operations, which are at times referred to as being computer-executed, include the manipulation by the processor of the computer of electrical signals representing data in a structured form. This manipulation transforms the data and/or maintains them at locations in the memory system of the computer, which reconfigures and/or otherwise alters the operation of the computer in a manner understood by those skilled in the art. The data structures in which data is maintained are physical locations of the memory that have particular properties defined by the format of the data. However, while an embodiment is being described in the foregoing context, it is not meant to provide architectural limitations to the manner in which different embodiments can be implemented. The different illustrative embodiments can be implemented in a system including components in addition to or in place of those illustrated for the determination system 100. Other components shown in FIG. 1 can be varied from the illustrative examples shown. The different embodiments can be implemented using any hardware device or system capable of running program code. In another illustrative example, determination system 100 can take the form of a hardware unit that has circuits that are manufactured or configured for a particular use. This type of hardware can perform operations without needing program code to be loaded into a memory from a computer readable storage device to be configured to perform the operations.

For example, mobile device 105 can take the form of a circuit system, an application specific integrated circuit (ASIC), a programmable logic device, or some other suitable type of hardware configured to perform a number of operations. With a programmable logic device, the device is configured to perform any number of operations. The device can be reconfigured at a later time or can be permanently configured to perform any number of operations. Examples of programmable logic devices include, for example, a programmable logic array, programmable array logic, a field programmable logic array, a field programmable gate array, and other suitable hardware devices. With this type of implementation, software modules 130 can be omitted because the processes for the different embodiments are implemented in a hardware unit.

In still another illustrative example, determination system 100 and/or mobile device 105 can be implemented using a combination of processors found in computers and hardware units. Processor 110 can have a number of hardware units and a number of processors that are configured to execute software modules 130. In this example, some of the processors can be implemented in the number of hardware units, while other processors can be implemented in the number of processors.

In another example, a bus system can be implemented and can be comprised of one or more buses, such as a system bus or an input/output bus. Of course, the bus system may be implemented using any suitable type of architecture that provides for a transfer of data between different components or devices attached to the bus system. Additionally, communications interface 150 can include one or more devices used to transmit and receive data, such as a modem or a network adapter.

Embodiments and/or arrangements can be described in a general context of computer-executable instructions, such as program modules, being executed by a computer. Generally, program modules include routines, programs, objects, components, data structures, etc., that perform particular tasks or implement particular abstract data types.

The operation of the determination system 100 and the various elements and components described above will be further appreciated with reference to the method for determining an in-vehicle role of a user of a mobile device as described below, in conjunction with FIGS. 2A-2C.

Figure 2A:
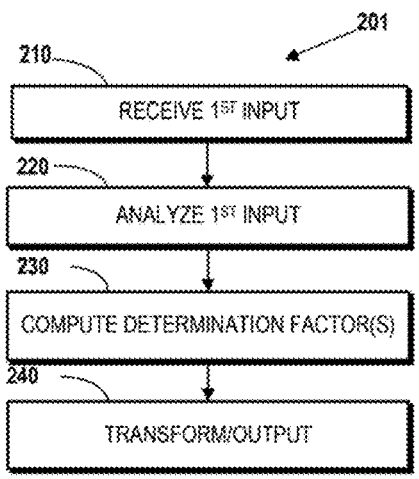
FIGS. 2A-2C are flow diagrams showing routines that illustrate broad aspects of methods for determining an in-vehicle role of a user and/or an in-vehicle location of a mobile device in accordance with various exemplary embodiments disclosed herein.

Turning now to FIG. 2A, a flow diagram is described showing a routine 201 that illustrates a broad aspect of a method for determining an in-vehicle role of a user of a mobile device 105 in accordance with at least one embodiment disclosed herein. It should be appreciated that several of the logical operations described herein are implemented (1) as a sequence of computer implemented acts or program modules running on determination system 100 and/or (2) as interconnected machine logic circuits or circuit modules within the determination system 100. The implementation is a matter of choice dependent on the requirements of the device (e.g., size, energy, consumption, performance, etc.). Accordingly, the logical operations described herein are referred to variously as operations, structural devices, acts, or modules. Various of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

The process begins at step 210 where processor 110 executing one or more of software modules 130, including, preferably, determination module 170, receives a first input, such as from one or more of sensors 145, software modules 130, user interface 172, operating system 176, and/or communication interface 150. Preferably, the first input originates from one or more identifying events that are perceptible to at least one of sensors 145, user interface 172, operating system 176, and/or communication interface 150. Examples of such an input include, but are not limited to, an acceleration input that originates from an acceleration event (e.g., the speeding up or slowing down of a car) that is perceived by accelerometer 145A, a change in geographic location input that originates from a location changing event (e.g., the movement from one place to another) that is perceived by GPS receiver 145C, and/or one or more instances or user interaction (e.g., typing) that are detected by user interface 172.

Then, at step 220, processor 110 executing one or more of software modules 130, including, preferably, determination module 170, analyzes at least the first input, such as to identify one or more determination characteristics within the first input, including but not limited to user determination characteristics. As will be described in greater detail below, user determination characteristics are one or more aspects originating at and/or derived from an input that provide insight regarding the in-vehicle role and/or identity of the user that is exerting control over and/or otherwise associated with a mobile device, such as mobile device 105. For example, where the first input (received at step 210) is the typing of one or more letters into user interface 172 (such as to compose a SMS message), determination module 170 can analyze the typing to identify one or more user determination characteristics (that is, characteristics that contribute to a determination of the identity of the particular user that is associated with mobile device 105, as will be described below). In this case, determination module 170 can analyze the typing patterns within the first input (such as the time interval in between the typing of individual letters in the SMS message, the average time interval in between the typing of individual letters in the SMS message, and/or the variability among one or more time intervals between the typing of individual letters in the SMS message). If there are substantial time intervals in between the typing of various letters, and/or if the time intervals in between typed letters vary widely, these factors can indicate that the user of mobile device 105 is likely distracted and thus unable to type consistently. Additional examples of analyzing an input to identify one or more determination characteristics are provided below in EXAMPLE 1.

Upon identifying one or more determination characteristics, such as user determination characteristics, based on the analysis of an input, at step 230 the processor 110 executing one or more of software modules 130, including, preferably, determination module 170, computes one or more determination factors (that is, factors that reflect and/or suggest one or more determinations that can be arrived at with respect to one or more of the mobile device, its location, the user, and/or the vehicle). By way of example, a probability can be computed, based on the user determination characteristics, that the in-vehicle role of the user of mobile device 105 is a driver and/or that the in-vehicle role of the user of the mobile device 105 is a passenger. That is, in certain arrangements the user determination characteristics identified at step 220 can provide varying degrees of certitude as to the identity or role of a user. So, continuing the example provided with regard to step 220, while, on the one hand, significant time intervals between typed letters can indicate that the in-vehicle role of the user is a driver, on the other hand if the time intervals in between the various letters are, on average, consistent and/or substantially similar this can indicate that the user is not necessarily distracted (due to being a driver), but rather is a passenger and is simply not adept at typing. Accordingly, in such a case, in one arrangement the computed probability for such user determination characteristic(s) is preferably a lesser degree of certainty that the user is a driver (and/or a passenger), accounting for the potentially conflicting indications from the various user determination characteristics. By way of further example, when the user determination characteristics indicate that a lesser degree of typing inconsistency and/or shorter intra-character time intervals exists, processor 110 executing software modules 130 preferably computes a probability that the in-vehicle role of the user of mobile device 105 is a passenger. Similarly, when a greater degree of typing inconsistency and/or longer intra-character time intervals exists, processor 110 executing software modules 130 preferably computes a probability that the in-vehicle role of the user of mobile device 105 is a driver (being that the user determination characteristics appear consistent with the activity of a driver within a vehicle). It should be appreciated that because ranges exist for a particular user determination characteristic (such as typing consistency), a probability of an in-vehicle role is preferably computed, reflecting a degree of certainty that the user of mobile device is a driver and/or that the user of mobile device is a passenger.

Then, at step 240, the processor 110 executing one or more of software modules 130, including, preferably, determination module 170, transforms an operation state of the mobile device 105 based on the determination factors (such as the probability computed at step 230), and/or outputs at least one operation state based on the at least one determination factor, and/or outputs at least one in-vehicle role of the user based on at least one determination factor, and/or outputs at least one in-vehicle location of the mobile device 105 based on at least one determination factor, and/or outputs at least one result based on the at least one determination factor. Various of these operations will be described in greater detail herein. For example, if the computed probability indicates that the in-vehicle role of a user of mobile device 105 is likely to be a driver, processor 110 can coordinate the disabling of one or more features of the mobile device 105, such as the disabling of any and/or all features that enable the entry of text into mobile device 105. In doing so, existing safety risks can be reduced by preventing a user who has been determined to be likely to be a driver of a vehicle from using various regular functions of mobile device 105 that are likely to distract the user and increase safety risks while driving and/or are restricted and/or prohibited based on the vehicle's current (or most recently known) location, as preferably determined in conjunction with GPS 145C. In other arrangements, one or more other transformations to the operation state of mobile device can be similarly applied based on the computed probability. For example, notifications (such as warning notifications) can be provided at the mobile device 105, notifications can be transmitted to third parties (notifying a third party, such as a law enforcement agency, of the in-vehicle role of the user of mobile device 105 and/or of the particular operation of the mobile device 105, such as that typing is being performed upon mobile device 105), instructions can be provided to third parties (such as a cellular service provider) to change an operation state of mobile device 105 (such as temporarily disabling the communication ability of mobile device 105), and/or one or more applications executing or executable on mobile device 105 can be disabled (such as a text messaging application).

At this juncture, it can be appreciated that the operations corresponding to transforming step 240 can be customized and/or configured in relation to various probabilities computed at step 230. That is, certain transformations of the operation state of mobile device 105 (for example, notifying law enforcement authorities) may only be appropriate when there is a high probability (such as greater than 90%) that the in-vehicle role of a user of mobile device 105 is a driver (and further that the driver is interacting with mobile device 105 in an illegal manner while driving), while other transformations may be appropriate even for lower degrees of probability (for example, it may be appropriate to provide a warning notification at mobile device 105 even for a 60% probability that the user is a driver). Yet other transformations can be employed preemptively, wherein the transformation is applied even before a prohibited interaction (e.g., typing into an SMS program) occurs, thereby avoiding restricted or prohibited interaction with mobile device 105, even at the first instance. Furthermore, as referenced above, in certain arrangements the user can configure how (that is, the type of transformation) and when (that is, the probability threshold that must be met in order to trigger the transformation) the operation of mobile device 105 is to be transformed. In other arrangements, a third party can establish such configurations. For example, a regulatory agency can dictate that one or more transformations be employed on some or all mobile devices when a particular probability threshold that a user of the device is a driver is met. By way of further example, a car insurance provider can provide incentives to its customers who utilize one or more transformations and/or probability thresholds suggested and/or dictated by the insurance company.

Figure 2C:
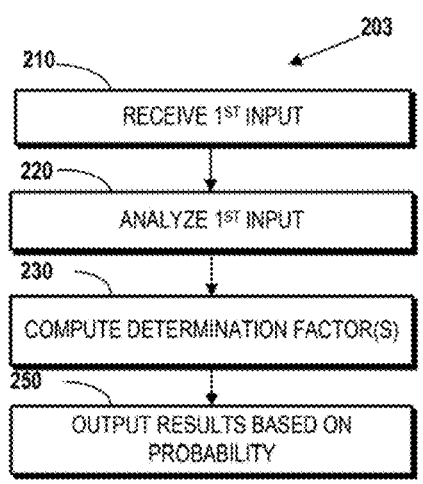
Figure 2B:
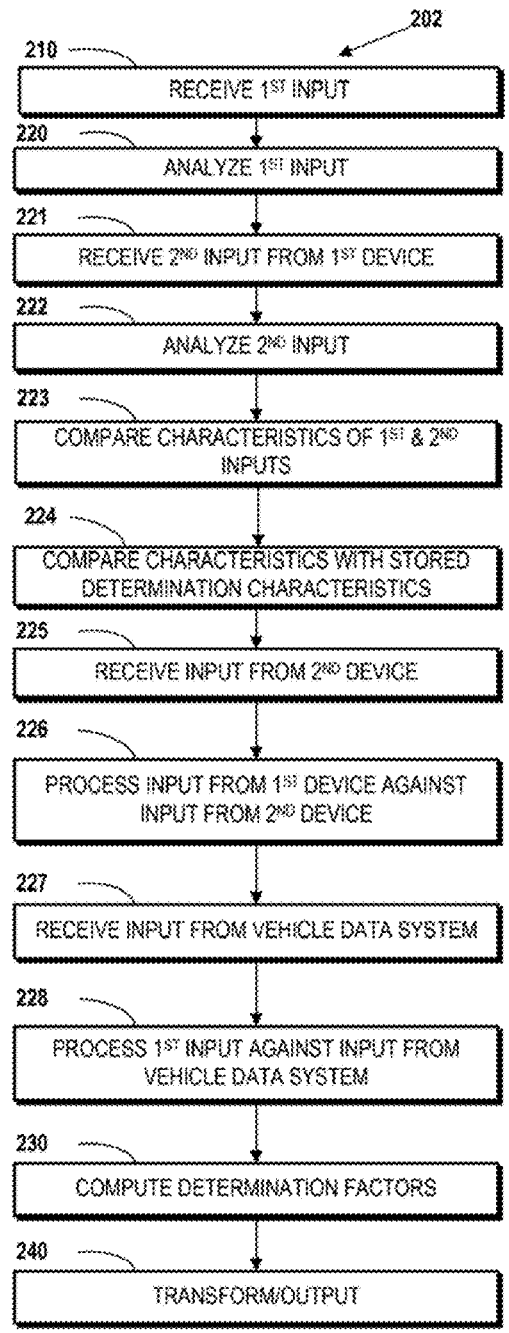

Turning now to FIG. 2B, a flow diagram is described showing a routine 202 that illustrates a further aspect of a method for determining an in-vehicle role of a user of a mobile device 105 in accordance with at least one embodiment disclosed herein. Though already noted above, it should be particularly appreciated with reference to FIG. 2B that more or fewer operations can be performed than shown in the figures and described herein, and that these operations can be performed in a different order than those described herein. Thus, in certain arrangements certain of the operations of FIG. 2B can be performed while others are not, and further that in certain arrangements can be performed in a sequence other than that depicted in FIG. 2B.

The process begins at step 210 where a first input of a first device 105 is received, and proceeds to step 220 where the first input is analyzed. Steps 210 and 220 have already been described above with reference to FIG. 2A and thus will not be further elaborated upon here as their operation is substantially identical to steps 210 and 220 described above.

Then, at step 221, processor 110 executing one or more of software modules 130, including, preferably, determination module 170, receives a second input from one or more of sensors 145, software modules 130, user interface 172, operating system 176, and/or communication interface 150. As described above with reference to step 210, examples of such an input include, but are not limited to, an input corresponding to an acceleration perceived by accelerometer 145A, and/or an input corresponding to a change in geographic location as perceived by GPS receiver 145C.

At step 222, the second input is analyzed by processor 110 executing determination module 170, in a manner substantially similar to that described above with reference to step 220, in order to identify one or more determination characteristics such as user determination characteristics within the second input. For example, where the second input (received at step 221) comprises one or more accelerations detected by accelerometer 145A, determination module 170 can analyze the accelerations to identify one or more user determination characteristics within the second input. Here, determination module 170 can analyze various patterns within the second input (such as the time and duration of acceleration and deceleration). Certain patterns, such as frequent periods of sustained forward acceleration interspersed with periodic intervals of rapid and/or brief forward deceleration can indicate that the user of mobile device 105 is likely traveling in, if not operating, a car which often follows such an acceleration/deceleration pattern. As described in detail herein, by identifying one or more user determination characteristics (such as identifying that the user of mobile device 105 is likely traveling in a car, as described above), the context and significance of one or more other user determination characteristics can be better evaluated and/or quantified. For example, the typing patterns of a user determined to be traveling in a moving car are, on average, of greater significance in determining whether the user of the device is a driver/passenger. On the other hand, the typing patterns of a user of a mobile device 105 that has been determined not to be traveling in a moving car can be understood to be, on average, of lesser significance in determining whether the user of the device is a driver/passenger.

Then, at step 223, the processor 110 executing one or more of software modules 130, including, preferably, determination module 170, can compare the determination characteristics such as user determination characteristics identified within the first input (such as those identified at step 220) with the determination characteristics such as user determination characteristics identified within the second input (such as those identified at step 222). In doing so, one or more patterns, correlations and/or relationships can be identified between the user determinations characteristics of the first input and the user determination characteristics of the second input. By way of illustration, referring to the examples discussed above, the typing patterns identified at step 220 can be compared with the acceleration/deceleration patterns identified at step 222. In doing so, patterns, correlations, and/or relationships between the typing patterns and acceleration/deceleration patterns can be identified. For example, if time intervals between typed characters and/or typing inconsistencies increase at the same time as substantial and/or sudden forward and/or lateral acceleration and/or deceleration, this can further indicate that the user of a mobile device 105 is a driver. Being that for a driver to engage in a maneuver with sudden acceleration and/or deceleration the driver is expected to have temporarily stopped typing due to the increased attention a driver must pay to his driving activities, if such accelerations correlate closely with inconsistent typing speeds and/or slower typing speed and/or such accelerations are just prior to typing delays, this can be a strong indication that the user of mobile device 105 is a driver.

Additional illustrations of scenarios and/or arrangements wherein multiple inputs are analyzed, compared, correlated, and/or processed in order to determine various aspects of the roles of one or more users of a mobile device 105, are provided throughout the present disclosure.

At step 224, the processor 110 executing one or more of software modules 130, including, preferably, determination module 170, compares determination characteristics such as user determination characteristics (including, but not limited to, the user determination characteristics from the first input, as identified at step 220, and/or the user determination characteristics from the second input, as identified at step 222) with stored determination characteristics such as user determination characteristics, such as those stored at one or more databases, such as database 174 (that is local to mobile device 105) and/or database/server 162 (that is external to mobile device 105). Stored user determination characteristics can be archived user determination characteristics that have been retained from previous user determinations that have been performed, can be generated based on statistical analyses of previous user determinations, and/or can be defined or established independent of any particular previous user determination. In comparing user determination characteristics (such as those identified at step 220 and/or step 222) with stored user determination characteristics (such as stored user determination characteristics that have historically demonstrated a high degree of prediction accuracy in determining an in-vehicle role of a user), the processor 110 can more accurately compute the probability that the in-vehicle role of the user of mobile device 105 is a driver or that the in-vehicle role of the user of mobile device 105 is a passenger. For instance, following the example referenced above with regard to typing inconsistencies, if certain typing patterns have historically been demonstrated as very reliable in determining the in-vehicle role, of the user, various identified user determination characteristics (such as those identified at step 220 and/or step 222) can be compared to such stored determination characteristics (e.g., highly predictive typing patterns). If the identified determination characteristics closely correlate to highly reliable/predictive stored determination characteristics, the identified determination characteristics can be similarly considered highly reliable and this correlation can further enhance the reliability of the computation of a probability regarding the in-vehicle role of a particular user. Additional examples and illustrations of such comparisons are provided below at EXAMPLE 1.

At step 225, processor 110 executing one or more of software modules 130, including, preferably, determination module 170, receives an input from another device, such as one of mobile devices 160. It should be understood that the input received from mobile device 160 is preferably from among the various types of inputs referenced above at steps 210 and 221 (for example, an acceleration input that originates from an acceleration event that is perceived by accelerometer 145A, and/or a change in geographic location input that originates from a location changing event that is perceived by GPS receiver 145C), and thus will not be described at length here. However, it should be appreciated that this input originates at mobile device 160 (that is, a device external to mobile device 105), and thus the input from mobile device 160 is preferably received by mobile device 105 through communication interface 150.

Then, at step 226, processor 110 executing one or more of software modules 130, including, preferably, determination module 170, processes an input of mobile device 105 against an input of one or more mobile devices 160. In doing so, one or more determination characteristics such as user determination characteristics can be identified within the input of the first mobile device 105. By way of example, various typing patterns and/or tendencies (referenced above) of mobile device 160 can be processed against similar typing patterns/tendencies of mobile device 105 (or, alternatively, various typing patterns and/or tendencies of mobile device 105 can be processed against similar typing patterns/tendencies of mobile device 160). In doing so, processor 110 can analyze and/or identify the degree to which the input from mobile device 105 deviates from the input received from mobile device(s) 160, in a manner similar to the comparison discussed above at step 224 (except that here the input of mobile device 105 is being processed against an input received from another mobile device 160, as opposed to comparing one user determination characteristic with stored characteristics). Thus, continuing with the provided example, in a case where the typing tendencies of mobile device 105 are relatively inconsistent, if, when processing the typing tendencies received from mobile device(s) 160 against those of mobile device 105 it is revealed that the typing across many or all of the devices 105 and 160 is similarly inconsistent, this can indicate that it there is not necessarily a high probability that the user of mobile device 105 is a driver, despite the inconsistent typing inputs received at the device 105 (rather, such inconsistent typing may be the result of the various devices 105 and 160 traveling along an off-road or bumpy road, which would make consistent typing difficult, even for passengers in a vehicle). Additionally, if the typing tendencies of mobile device 105 are relatively consistent, however when processing such input(s) against inputs from mobile device(s) 160 it is revealed that the typing tendencies of the user of mobile device 105 are actually relatively inconsistent, this can indicate a higher probability that the user of mobile device 105 is a driver of a vehicle (even though the input from mobile device 105, in-and-of-itself, may not have generated the same conclusion).

It should be noted that various limitations and/or filters can be imposed upon the receiving at step 225 and/or the processing at step 226, to ensure the most accurate results possible. That is, while in certain arrangements it can be beneficial to receive inputs from practically any mobile device 160 that is capable of communication with mobile device 105, in other arrangements it can be preferably to limit the number of devices and/or inputs that are received by mobile device 105 on the basis of one or more factors to ensure that the inputs being received by mobile device 105 from such external devices 160 are those that can be expected to be of greatest relevance. Examples of factors that can be considered in imposing such limitations and/or filters include proximity to mobile device 105 and/or similarity/compatibility with mobile device 105. To illustrate, in processing the typing tendencies of device 105 against those of another device 160, it can be preferable to ensure that device 160 is in close proximity to mobile device 105 (such as through a comparison of the location coordinates obtained from their respective GPS receivers or by causing one or more of the mobile devices to emit one or more tones and/or signals (e.g., an audio tone) that can then be received on other mobile devices that are in close proximity, as described in detail in EXAMPLE 2), thereby establishing a high likelihood that mobile device 105 and mobile device 160 are operating within the same vehicle (and are thus subjected to substantially identical conditions). To further illustrate, being that various mobile devices such as smartphones utilize different user interfaces and button configurations, it can be advantageous in certain arrangements to compare inputs from one mobile device 105 with those of another mobile device 160 that is either identical to or at least highly compatible with mobile device 105 (such as a device using the same operating system). Due to differences across various mobile devices and operating systems, ensuring that mobile device 105 and mobile device(s) 160 are similar (if not identical) ensures that the inputs received from each can be assumed to be highly comparable.

Additional examples of processing inputs from one device 105, 160 against those of one or more other devices to identify one or more determination characteristics are provided below in EXAMPLE 2.

In addition, in certain arrangements it is preferable that the inputs from mobile device 105 and those of mobile device 160 that are to be processed against one another/compared are substantially synchronized from a chronological standpoint. That is, it is preferable that each of the various inputs be associated with a particular time (and that the source of such time be a central clock, such as a server, which can synchronize the various devices, though it should be understood that in other arrangements one or more of devices 105, 160 can broadcast timing data that enables the calibration of the various devices), thereby enabling the processing of inputs from mobile device 105 with inputs from mobile device 160 that correspond to the same point in time. Doing so ensures that the various inputs being processed/compared are highly comparable, in that they reflect the operations of the various devices 105 and 160 in response to the same events (e.g, accelerating/decelerating over the course of a driver). Additional examples and illustrations of such further processing operations are provided below in EXAMPLE 3.

At step 227, processor 110 executing one or more of software modules 130, including, preferably, determination module 170, receives an input from vehicle data system 164, such as an on board diagnostic (OBD) computer or computing device (e.g., OBD-I, OBD-II, ECU, roll system, airbag system, and/or an ABS), preferably through communication interface 150. As noted above, vehicle data system 164 preferably provides data and/or information originating at the vehicle itself. For example, vehicle data system 164 can provide one or more inputs that reflect various actions or events, such as a car's acceleration and/or deceleration, steering, braking, and/or any other such car-related operations. Such inputs can provide further insight into determining the in-vehicle role of a user of mobile device 105, as will be described below.

Then, at step 228, processor 110 executing one or more of software modules 130, including, preferably, determination module 170, processes an input of mobile device 105 against an input of vehicle data system 164, in a manner similar to that described above with respect to step 226. However, here an input of mobile device 105, such as various typing tendencies (as illustrated above) is processed against an input from vehicle data system 164 that preferably pertains to an operation of a car (e.g., the car accelerating, braking, and/or swerving) and which is qualitatively different than the input of mobile device 105 because vehicle data system 164 cannot necessarily detect the various stimuli perceptible to mobile device 105, owing in part to the fact that mobile device 105 is preferably not fixed relative to the car's coordinate system. As such, the various inputs (that is, the inputs from mobile device 105 and those from vehicle data system 164) are compared and/or synchronized from a chronological standpoint, substantially in the manner described above with respect to step 226. In doing so, inputs from mobile device 105 can be processed against inputs from vehicle data system 164 (which, in turn, originate at the car itself), thereby enabling the association of various inputs from mobile device 105 with events such as the accelerating, braking, and/or swerving of the car. Thus, following the typing tendencies example provided, if certain highly erratic typing tendencies perceived at mobile device 160, occur just prior and/or closely correlate to various driving operations (reflected in the inputs from vehicle data system 164) such as accelerating, braking, and/or swerving, one or more user determination characteristics can be identified with regard to the input(s) from mobile device 105, indicating that there is a high likelihood that the in-vehicle role of the user of mobile device 105 is a driver.

At this juncture, it can be appreciated that although several sections of the forgoing disclosure have referenced the processing and/or comparison of various inputs against one another in context of inputs that are qualitatively comparable (such as at steps 224 and 226, above, referring to the comparison of typing tendencies from various sources), in other arrangements various inputs that are not necessarily qualitatively comparable (or, at least, do not appear to be qualitatively comparable). For example, in a manner similar to that described above with respect to step 223, an input of typing tendencies from one source (such as mobile device 105) can be compared with/analyzed against an input of accelerations/decelerations originating at mobile device 160. The respective inputs preferably have a timestamp to enable the chronological comparison between the inputs, as described in greater detail above with respect to step 226.

At step 230, processor 110 executing one or more of software modules 130, including, preferably, determination module 170, computes one or more determination factors, such as a probability, based on the various determination characteristics, that the in-vehicle role of the user of mobile device 105 is a driver and/or a probability that the in-vehicle role of the user of the mobile device 105 is a passenger, substantially in the manner described in detail above with regard to step 230. Then, at step 240, the processor 110 executing one or more of software modules 130, including, preferably, determination module 170, transforms an operation state of the mobile device 105 and/or outputs at least one operation state based on the at least one determination factor, and/or outputs at least one in-vehicle role of the user based on at least one determination factor, and/or outputs at least one in-vehicle location of the mobile device 105 based on at least one determination factor, and/or outputs at least one result based on the at least one determination factor, as also described in detail above.

Turning now to FIG. 2C, a flow diagram is described showing a routine 203 that illustrates a further aspect of a method for determining an in-vehicle role of a user of a mobile device 105 in accordance with at least one embodiment disclosed herein. The process begins at step 210 where an input is received from mobile device 105, and proceeds to step 220 where the first input is analyzed. At step 230, a determination factor such as a probability is computed, based on the various determination characteristics, as referenced above. Steps 210, 220, and 230 have already been described above with reference to FIG. 2A and thus will not be further elaborated upon here as their operation is substantially identical to steps 210, 220, and 230 described above.

Then, at step 250, processor 110 executing one or more of software modules 130, including, preferably, determination module 170, outputs one or more results based on the determination factor(s) computed at step 230. Such results can include, but are not limited to, one or more files, notifications, and/or communications that contain and/or reflect operations of the mobile device 105, and/or one or more operation states of the first mobile device 105, and the outputting of such results can be dependent upon a certain probability threshold, as described in detail herein. For example, in a scenario where mobile device 105 is configured to output results (such as that the in-vehicle role of a user is a driver/passenger) when the probability (that is, the reliability) of such results are greater than 75%, when mobile device 105 determines with a probability of 80% that the in-vehicle role of a user of mobile device 105 is a driver, a corresponding notification can be outputted reflecting such results. Thus, it can be appreciated that the referenced results can be output based on the calculated probability that the user of mobile device 105 is a driver or that the user of mobile device 105 is a passenger. It should be understood that the outputting referenced at this step can be employed in a number of ways depending on the particular arrangement. For example, in certain arrangements the referenced results can be transmitted to an external device or third-party, such as a law enforcement agency, insurance company, and/or other device 160 (for example, a parent receiving results from a child's device 105), via communication interface 150. It can be appreciated that, as referenced above with regard to step 240, the outputting of such results to a law enforcement agency, insurance company, and/or another device 160 can ensure that such entities are notified of the various operations and/or operation states of a particular mobile device 105, especially when it has been determined that it is highly probable that device 105 is being operated by a driver of a car. In another arrangement, such results can be outputted to mobile device 105 itself in any number of ways, such as by logging the operations and/or operation state(s) of mobile device 105 at times/intervals when it has been determined, for instance, that there is a high probability that the user of mobile device 105 is a driver. Irrespective of whether the results are output to a third-party or to the device 105 itself, it should be appreciated that the outputting of such results can provide insight regarding the operations of the mobile device 105 at a particular moment and/or interval, which can be utilized later, such as in investigating car accidents. For example, if a car accident occurs, a law-enforcement agency can review such outputted results to determine whether the driver was engaged in various distracting activities during and/or near the time of the accident (e.g., mobile device 105 was being used by driver with 93% certainty, was being used in a hand-held state with 94% certainty, and was being used for texting with 100% certainty at least 30 seconds prior to the crash). As such, it can be further appreciated in certain arrangements the various referenced results can be outputted across any and/or all degrees of probability, thereby ensuring a comprehensive log of a user results, reflecting the various operations and/or operation states throughout the course of operation of the mobile device 105.

Figure 43:
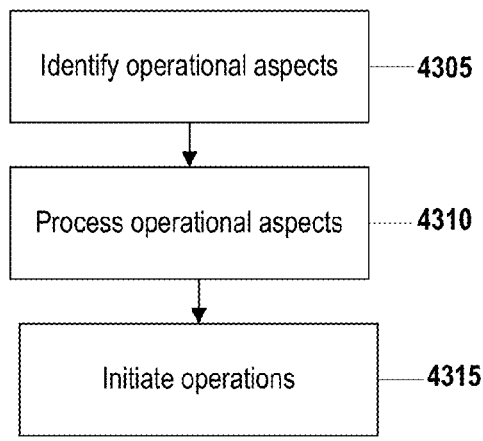
FIG. 43 is a flow diagram showing a routine that illustrates aspects of one or more methods, such as those described in relation to one or more embodiments described herein

In certain implementations, a device can be determined to be operated by a driver or a passenger based on one or more applications running at the device (and/or that are installed on the device but not necessarily running). FIG. 43 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 4305 one or more operational aspects of a user device can be identified. In certain implementations the one or more operational aspects can include one or more applications executing at the mobile device. Moreover, in certain implementations the one or more operational aspects can include one or more resources being utilized at the mobile device. At 4310 the one or more operational aspects can be processed, such as in order to determine one or more characteristics of a user of the user device. At 4315, one or more operations can be initiated, such as based on the one or more characteristics.

For example, a device determined to be within a moving vehicle that is running a SatNav application can be determined to be relatively more likely to be operated by a driver than by a passenger. Moreover, based on the resources that the device is using (e.g., whether Bluetooth is paired on the device), it can be determined that it is more likely that a driver is operating the device, while if a headset is plugged into the device's headset jack and music is playing while the device is determined to be within a moving vehicle, it is more likely that a passenger is operating the device.

Figure 3:
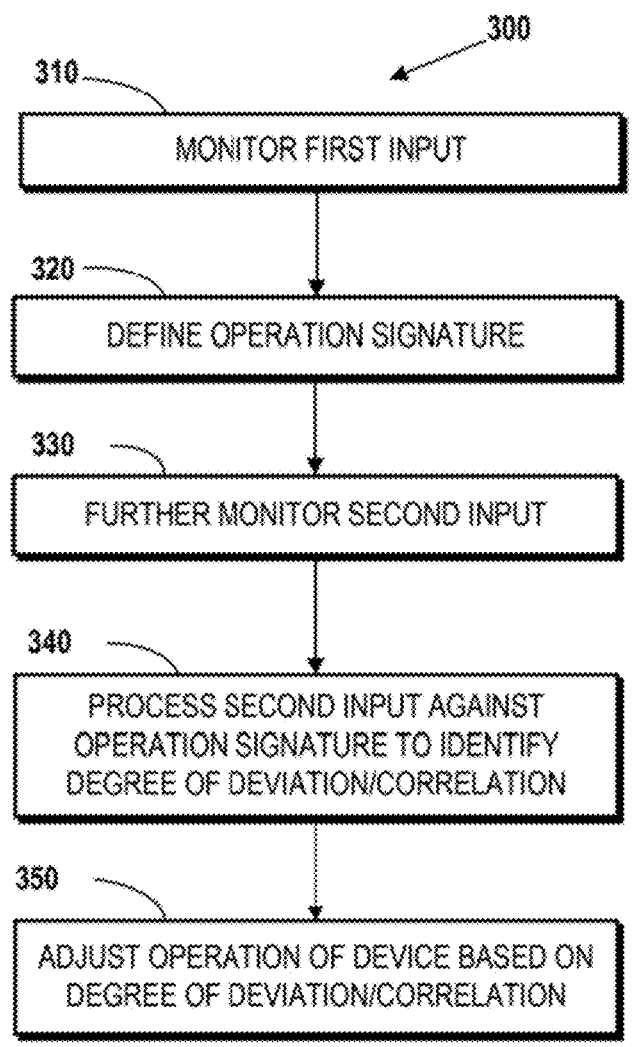
FIG. 3 is a flow diagram showing a routing that illustrates a broad aspect of a method for enabling, disabling and/or modifying at least a feature of a mobile device in accordance with at least one exemplary embodiment disclosed herein.

Turning now to FIG. 3, a flow diagram is described showing a routine 300 that illustrates an aspect of a method for enabling, disabling and/or modifying at least a feature of a mobile device 105 in accordance with at least one embodiment disclosed herein.

The process begins at step 310 where processor 110 executing one or more of software modules 130, including, preferably, determination module 170, monitors one or more inputs from one or more of sensors 145, software modules 130, user interface 172, operating system 176, and/or communication interface 150. As described in detail above with reference to step 210, examples of such inputs include, but are not limited to, an acceleration input, a geographic location input, and/or one or more instances or user interaction (e.g., typing).

Then, at step 320, processor 110 executing one or more of software modules 130, including, preferably, determination module 170 defines an operation signature based on the inputs monitored at step 310. The defined operation signature preferably reflects a normal operation state and/or a range of normal operation states of the mobile device 105. That is, based on the various inputs monitored at mobile device 105, over a defined time interval (for example, a day, a week, and/or a month) an operation signature or profile can be defined that reflects one or more values or ranges of values that have been identified as the normal or regular operation of the device 105, the normal or regular usage of the device 105 by a particular user, and/or the normal or regular usage of device 105 and/or a series or class of such devices by a particular user and/or a series or range of users. For example, after monitoring inputs from the accelerometer 145A of mobile device 105 for a period of time, a range of normal acceleration inputs of the device 105 can be determined. Similarly, upon monitoring inputs from the user interface 172 of mobile device 105, a range of normal typing tendencies (e.g., typing speeds, typing consistency, etc., as described herein) can be determined. These various inputs can be used to define an operation signature for the mobile device 105 that reflects the normal operation and/or operating range of the device 105. It should be appreciated that the referenced operation signature is not limited to a single input or type of input, but rather in certain arrangements can be made up of signatures of two or more types of inputs. For example, in one arrangement a normal operation signature can be made up of a range normal accelerometer inputs together with a range of normal typing tendencies.

At step 330, processor 110 executing one or more of software modules 130, including, preferably, determination module 170, further monitors one or more second inputs from one or more of sensors 145, software modules 130, user interface 172, operating system 176, and/or communication interface 150, substantially in the manner described above with respect to step 310.

Then, at step 340, processor 110 executing one or more of software modules 130, including, preferably, determination module 170, processes one or more of the second input(s) (monitored at step 330) against one or more of the operation signature(s) (defined at step 320). In doing so, processor 110 executing one or more of software modules 130, including, preferably, determination module 170, can identify a degree of deviation and/or a degree of correlation between the second input(s) and the operation signature(s). By way of example, various typing patterns and/or tendencies (referenced above) of mobile device 105 can be processed against an operation signature reflecting a range of normal typing tendencies of mobile device 105, as referenced above with respect to step 320 and described in detail herein. In doing so, processor 110 can analyze and/or identify the degree to which the one or more second input(s) (monitored at step 330) deviate from the operation signature of mobile device 105 (defined at step 320). Thus, continuing with the provided example, even in a case where the monitored typing tendencies of mobile device 105 are not necessarily highly inconsistent, from an objective standpoint, upon processing such inputs against an operation signature (such as an operation signature reflecting that the typing tendencies of the user of mobile device 105 are generally highly consistent/accurate), it can be revealed that the monitored typing tendencies/inputs actually deviate substantially from the mobile device's 105 operation signature. In this example, such a deviation from the operation signature (which reflects the normal and/or expected operation of mobile device 105) can indicate that the mobile device 105 is being operated under conditions that distract the user from interacting normally with the device 105, such as during driving. Similarly, in an alternative example, in a case where the monitored typing tendencies of mobile device 105 are relatively inconsistent, from an objective standpoint, upon processing such inputs against an operation signature (such as an operation signature reflecting that the typing tendencies of the user of mobile device 105 are also generally inconsistent, such as in the case of a new user who is not adept at typing), it can be revealed that the monitored typing tendencies/inputs (which otherwise reflect significantly inconsistent typing tendencies) actually correlate substantially with the mobile device's 105 operation signature. In such an example, the correlation with the operation signature (which reflects the normal and/or expected operation of mobile device 105) can indicate that the mobile device 105 is actually being operated under relatively normal/consistent conditions, and thus should not be assumed to be operated under distracting conditions, such as driving, as may have otherwise been concluded based on the inconsistent typing tendencies alone.

At this juncture, it should be noted that steps 310 and 320 can be repeated on a periodic and/or constant basis, in order to further refine the operation signature defined at step 320. That is, it can be appreciated that in certain scenarios a user's interaction with mobile device 105 can change and/or improve over time (such as in the case of a new user whose typing skills gradually improve with repeated use of device 105), and thus the operation signature of mobile device 105 should be adjusted, modified, and/or refined accordingly. It can be appreciated that this process can be achieved in any number of ways. In one arrangement, mobile device 105 can be configured to periodically reset its operation signature (such as every month), such that only recent operations are accounted for in defining the operation signature. In other arrangements, further inputs that are monitored can be factored into and/or averaged with previously monitored inputs, thereby updating an existing operation signature. In yet other arrangements, further inputs can be factored into and/or averaged with previously monitored inputs, and the more recent inputs can be weighted to place greater emphasis upon them, thereby updating an existing operation signature while accounting for the fact that more recent inputs are of greater value in defining an accurate operation signature of a mobile device 105.

At step 350, processor 110 executing one or more of software modules 130, including, preferably, determination module 170, adjusts one or more operations of mobile device 105. Preferably, this adjustment corresponds to the degree of deviation and/or the degree of correlation between one or more monitored inputs (such as the input monitored at step 330) and one or more operation signature(s) of mobile device 105 (such as the operation signature defined at step 320). It should be understood that in certain arrangements, this adjustment is similar to the transformation of the operation state of mobile device 105 discussed in detail above with respect to step 240, and/or the outputting of one or more results discussed in detail above with respect to step 250. For example, in certain arrangements, processor 110 can coordinate the disabling of one or more features of the mobile device 105, such as the disabling of any and/or all features that enable the entry of text into mobile device 105, while in other arrangements notifications (such as warning notifications) can be provided at or transmitted to mobile device 105. Various other examples of adjustments to one or more operations of mobile device 105 are described in greater detail above with reference to steps 240 and 250.

As also described in detail above with respect to step 240, it should be noted that various of the adjustments employed at step 350 can be customized and/or configured in relation to various degrees of correlation and/or deviation identified at step 340. Thus, it can be appreciated that certain adjustments of the operation of mobile device 105 (for example, notifying law enforcement authorities) may only be appropriate when a high degree of deviation from a normal operation state (that is, from the operation signature) is identified (and, preferably, further that such a deviation is indicative of restricted or prohibited activity on the part of the user of mobile device 105). Other adjustments, such as providing a notification at mobile device 105, may be appropriate even for lower degrees of correlation/deviation, as described in detail above.

In certain implementations, information regarding whether and how a device user uses his/her device, such as when in a moving vehicle, can be measured and/or recorded, whether or not the device user is determined to be the driver (or irrespective of a likelihood that the device user is the driver). Such technologies/techniques can be used, among other things, to log and analyze how large a "distracted driving" problem the device user has, i.e., based on how much and in what ways the device's usage deviates from a particular device usage policy (e.g., a state or federal law, a company policy, a parental policy, etc.) in conjunction with various determinations pertaining to the identity of the user (e.g., as a driver of a vehicle).

In certain implementations, such technologies can utilize information obtained directly from the device (e.g., information about calls made or received, texts made or received, applications used, URLs visited, intermediate or final sources or destinations of data transmissions, device movement information, location information, network connectivity or visibility information, GPS, accelerometer, etc.) and/or information obtained from third parties (e.g., mobile server providers, telematics, etc.).

The referenced information can also be saved to the device and/or to a remote server.

Figure 4:
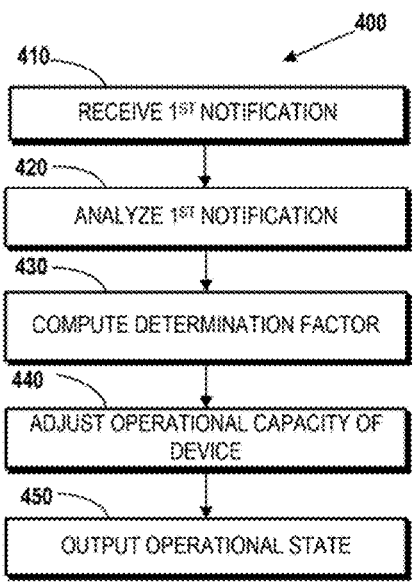
FIG. 4 is a flow diagram showing a routine that illustrates a broad aspect of a method for determining an in-vehicle role of a user of a mobile device and/or a handheld state of a mobile device and/or a vehicle class of a vehicle containing the first mobile device using a central machine in accordance with at least one exemplary embodiment disclosed herein.

Turning now to FIG. 4, a flow diagram is described showing a routine 400 that illustrates an aspect of a method of determining at least one of an in-vehicle role of a user of a first mobile device and/or a handheld state of the first mobile device and/or a vehicle class of a vehicle containing the first mobile device using a central machine in accordance with at least one embodiment disclosed herein. As will be described in greater detail below, various of the steps and operations that make up routine 400 share substantial similarities to those described above in connection with FIGS. 2A-C and 3. However, it should be understood that while FIGS. 2A-C and 3 principally concern determinations occurring at mobile device 105, routine 400 is primarily directed to determinations performed at central machine 168, as will be described in greater detail below. It should be further noted that, as described in greater detail below, while any one of the particular steps, operations, and/or functions are described throughout the present disclosure as being performed at and/or upon a particular machine or device (such as mobile device 105, mobile device 160, and/or central machine 168), such description should be understood as being exemplary and/or illustrative and not limiting. Accordingly, it can be appreciated that any and all steps, operations, and/or functions described herein with regard to a particular device and/or machine (such as central machine 168) should be similarly understood to be similarly capably of employment at another device and/or machine (such as mobile device 105), substantially in the manner described herein, without departing from the scope of the present disclosure.

The process begins at step 410 where processor 4110 of central machine 168 (depicted in FIG. 1) executing one or more of software modules 4130, including, preferably, determination module 4170, receives (preferably through communication interface 4150) a first notification from mobile device 105, the first notification preferably corresponding to an input originating from one or more of sensors 145, software modules 130, user interface 172, operating system 176, and/or communication interface 150 of mobile device 105. As described in detail above with respect to step 210, the first input originates from one or more identifying events that are perceptible to at least one of sensors 145, user interface 172, operating system 176, and/or communication interface 150 of mobile device 105, such as an acceleration input perceived by accelerometer 145A, a change in geographic location input perceived by GPS receiver 145C, and/or one or more instances or user interaction (e.g., typing) detected by user interface 172. A notification, such as a computer readable file containing information that reflects the input itself as well as information that is pertinent to the input (such as the time, date, and a unique identifier such as a MAC address of mobile device 105) is preferably generated by mobile device 105 based on the input, and is transmitted by communication interface 150 of mobile device 105 to central machine 168, preferably via communications network 166. As noted above, it should be recognized that while FIG. 1 depicts central machine 168 communicating with mobile device 105 via network/Internet 166, it should be understood that in other arrangements central machine 168 communicates with mobile device 105 directly, such as through a direct Bluetooth pairing and/or through an ad-hoc wireless network.

Then, at step 420, processor 4110 of central machine 168 executing one or more of software modules 4130, including, preferably, determination module 4170, analyzes at least the first notification to identify one or more determination characteristics, such as one or more of user determination characteristics and/or one or more handheld state characteristics and/or one or more vehicle determination characteristics within the notification. As described in detail above with respect to step 220, user determination characteristics are one or more aspects originating at and/or derived from one or more input(s) and/or notification(s) that provide insight regarding the in-vehicle role, and/or identity of the user that is exerting control over and/or otherwise associated with a mobile device, such as mobile device 105. Similarly, handheld state characteristics are one or more aspects originating at and/or derived from one or more input(s) and/or notification(s) that provide insight regarding the handheld state of a mobile device, such as mobile device 105, such as whether mobile device 105 is being operated by a user in a handheld or non-handheld state (for example, various angles and/or sudden changes perceived by gyroscope 145B can indicate that mobile device 105 is being operated in a handheld state by a user). It can thus be appreciated that while the underlying analysis performed at the present step 420 and at step 220, as described above, are substantially similar, here the analysis is performed by central machine 168 based on notifications received from mobile device 105, while at step 220 the analysis is preferably performed by mobile device 105 itself. Having this analysis performed at central machine 168 (as opposed to at mobile device 105, from which the notification analyzed at this step originates) provides several advantages in certain scenarios over having the analysis performed at mobile device 105, as described at step 220. For example, the analysis performed at the present step can be quite resource intensive, and shifting this analysis to central machine 168 ensures that the system resources of mobile device 105 remain relatively free. Additionally, in certain arrangements central machine 168 can be operated by a law enforcement agency, and, as such, a centralized approach, such as the one described with respect to FIG. 4, can provide such an agency with the ability to monitor and/or adjust the operational capacity of mobile device 105 as necessary, as will be described in greater detail below. Moreover, in certain scenarios this centralized approach can be easier to implement with respect to regulatory compliance and preventing tampering. It is expected that both regulatory authorities who are interested in implementing a solution such as that described with reference to FIG. 4 are more likely to succeed in obtaining compliance from mobile device manufacturers and/or mobile communications providers when requiring a solution that primarily only requires, from the standpoint of the mobile device 105, periodic notification transmissions from mobile device 105 to central machine 168. In addition, such a solution can be more difficult for users to manipulate, modify, and/or 'hack,' given that the primary analysis is performed by central machine 168, as opposed to mobile device 105.

At step 430, processor 4110 of central machine 168 executing one or more of software modules 4130, including, preferably, determination module 4170, computes one or more determination factor(s), such as probabilities, based on the determination characteristics identified at step 420. It should be understood that, for instance, based on the particular inputs upon which a notification (which is analyzed at step 420) is based, various user determination characteristics and/or handheld state characteristics are generated. For example, as referenced above, in certain arrangements user determination characteristics are identified (such as typing tendencies, as referenced above), while in other arrangements handheld state characteristics (such as one or more angles detected by mobile device 105, as referenced above) can be identified, while in yet other arrangements both user determination characteristics and handheld state characteristics can be identified. In any event, at step 430, one or more probabilities are computed by central machine 168, reflecting a probability that the in-vehicle role of the user of mobile device 105 is a driver, a probability that the in-vehicle role of the user of the mobile device 105 is a passenger, a probability that the handheld state of the mobile device 105 is handheld, and/or a probability that the handheld state of the mobile device 105 is non-handheld, all in a manner substantially similar to that described in detail above with respect to step 230. It should be understood that, as described in detail above, in certain arrangements the user determination characteristics and/or handheld state characteristics identified at step 420 can provide varying degrees of certitude as to the identity/role of a user and/or the handheld state of mobile device 105. Accordingly, it should be appreciated that because ranges exist across the spectrum of a particular user determination and/or handheld state characteristic (such as typing consistency and/or device angle), a probability that an in-vehicle role of the user of mobile device 105 is a driver/passenger and/or a probability that a handheld state of mobile device 105 is handheld/non-handheld preferably reflects a degree of certainty across such a probability spectrum, as described in detail above.

Then, at step 440, processor 4110 of central machine 168 executing one or more of software modules 4130, including, preferably, determination module 4170, adjusts an operational capacity of mobile device 105 based on the one or more determination factor(s), such as at least one of the probabilities computed at step 430, substantially in the manner described in detail above with respect to step 240. However, it should again be understood that while the description pertaining to step 240 above relates to adjustments and transformations initiated by mobile device 105 upon itself, here the adjustments to the operation of mobile device 105 are initiated by central machine 168. For example, in certain arrangements central machine 168 can transmit an operation command, such as a command in the form of one or more notifications, messages, and/or instructions that reflect various adjustments that are to be made to the operational capacity of mobile device 105, and such adjustments can then be applied to mobile device 105 upon its receipt of the transmitted operation command(s), and/or their application/execution, effecting similar and/or identical results as those described in detail above with respect to step 240 (e.g., providing notifications at mobile device 105, restricting operation of mobile device 105, and/or transmitting notifications from mobile device 105 to third parties). In other arrangements, central machine 168 can adjust the operational capacity of mobile device 105 based primarily and/or exclusively on adjustments made at and/or by central machine 168 which, in turn, preferably effect or otherwise adjust the operational capacity of mobile device 105. For instance, in an arrangement where central machine 168 is controlled by a mobile communications provider such as a cellular communications provider, an adjustment can be implemented at central machine 168 whereby one or more of the services provided by mobile communications provider to mobile device 105 (such as phone, SMS, and/or data services) can be interrupted and/or otherwise adjusted or modified, thereby effecting the operation of mobile device 105 through an adjustment occurring at central machine 168 based on the probability computed at step 430. It should be noted that in other arrangements, substantially similar adjustments can be implemented upon and/or through one or more service providers that provide one or more services, whether directly or indirectly, to mobile device 105. By way of illustration, various voice over IP (VoIP) providers, such as Skype, enable users to achieve voice communications (akin to telephone calls) over data connections (such as an internet connection). By way of further illustrations, the 'Viber' app enables similar SMS capabilities over an internet connection. In any event, it should be understood that the methods and systems disclosed herein can be configured such that any necessary adjustment can be implemented upon and/or through the requisite service provider (for example, by limiting the calling capabilities of Skype and/or the SMS capabilities of Viber) substantially in the manner described in detail above.

At step 450, processor 4110 of central machine 168 executing one or more of software modules 4130, including, preferably, determination module 4170, outputs one or more results and/or operation states of mobile device 105 based on the one or more determination factor(s), such as the probability or probabilities computed at step 430, substantially in the same manner as described in detail above with respect to step 250. But again, as noted above, it should be understood that while the description provided above with respect to step 250 pertains to one or more operations performed at mobile device 105, step 450 primarily pertains to operations initiated and/or performed by central machine 168. Accordingly, it can be appreciated that the one or more operation state(s) outputted by central machine 168 reflect the operation state(s) of mobile device 105 (for example, that the device is being used in a handheld state and/or that the device is being used by a driver). As noted in detail above with respect to step 250, the outputting of the operation state(s) can be further based upon one or more determination factor(s), such as one or more probabilities computed at step 430, which reflects the likelihood or degree of certainty that a user of mobile device 105 is a driver/passenger and/or that mobile device 105 is being used in a handheld/non-handheld state. As also noted in detail above, in certain arrangements the operation state of mobile device 105 can be outputted by central machine 168 to an external device or third-party, such as a law enforcement agency, insurance company, and/or other device 160, via communication interface 4150. Such functionality can be advantageous in jurisdictions where administrative regulations recommend and/or require that entities such as mobile communications providers provide information to law enforcement agencies that reflects the unauthorized usage of mobile devices such as mobile device 105 while the user of the device is driving. Similarly, such functionality can be advantageous to insurance companies when processing an insurance claim. Even in situations where the user of a mobile device, such as mobile device 105, is uncooperative in providing information to the insurance company, and/or in situations where the mobile device associated with an involved party is no longer available or has been destroyed, central machine 168 (which receives and retains the various pertinent notifications/inputs provided by the various devices such as mobile device 105) can output the necessary data, such as the operation state of mobile device 105, thereby assisting the insurance company to make necessary decisions regarding the validity of a particular insurance claim.

Figure 5:
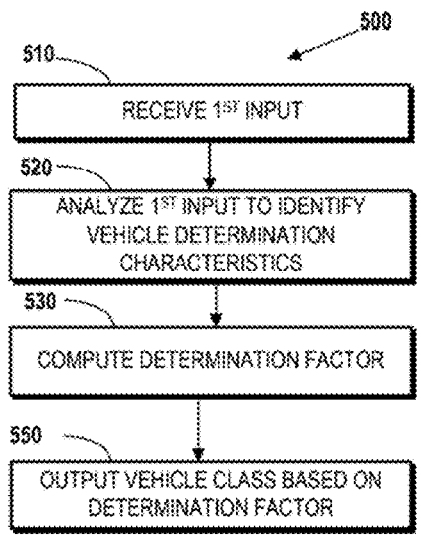
FIG. 5 is a flow diagram showing a routine that illustrates a broad aspect of a method for determining a vehicle class of a vehicle using a mobile device in accordance with at least one exemplary embodiment disclosed herein.

Turning now to FIG. 5, a flow diagram is described showing a routine 500 that illustrates an aspect of a method of determining a vehicle class of a vehicle using a first mobile device in accordance with at least one embodiment disclosed herein. As will be described in greater detail below, determining the vehicle class of a particular vehicle can provide further insight and accuracy in the determination of an in-vehicle role of a user of a mobile device. In addition, it should be understood that the various steps and/or operations that make up routine 500 share substantial similarities to those described above in connection with FIGS. 2A-C and 3-4.

The process begins at step 510 where processor 110 executing one or more of software modules 130, including, preferably, determination module 170, receives a first input from one or more of sensors 145, software modules 130, user interface 172, operating system 176, and/or communication interface 150.

Then, at step 520, processor 110 executing one or more of software modules 130, including, preferably, determination module 170, analyzes at least the first input to identify one or more vehicle determination characteristics within the first input. As will be described in greater detail below, vehicle determination characteristics are one or more aspects originating at and/or derived from an input that provide insight regarding the vehicle class within or upon which and/or in relation to mobile device 105 is traveling.

Upon identifying one or more vehicle determination characteristics based on the analysis of an input, at step 530 processor 110 executing one or more of software modules 130, including, preferably, determination module 170, computes at least one determination factor based on the vehicle determination characteristic(s), such as a probability that the vehicle corresponds to a particular vehicle class.

Then, at step 550, processor 110 executing one or more of software modules 130, including, preferably, determination module 170, outputs a vehicle class based on the one or more determination factor(s), such as the probability or probabilities computed at step 530.

It should also be noted that, in certain arrangements, the processor 110 executing one or more of software modules 130, including, preferably, determination module 170, can transform an operation state of mobile device 105 based in whole or in part on the determination factor(s), such as the probability computed at step 530. This operation can be further appreciated when employed in conjunction with a determination of an in-vehicle role of a user of mobile device 105, such as that depicted in FIGS. 2A-C and described in detail above. For example, in certain arrangements, upon determining (preferably to a certain minimum probability) that a mobile device 105 is traveling within a certain class of vehicle, there can be little need to further determine the in-vehicle role of the user of the device 105 (e.g., if the vehicle is an airplane, all device usage can be prohibited, irrespective of a particular user's in-vehicle role). By way of further example, in other arrangements, a transformation (substantially similar to that described in detail above with respect to step 240) can be employed based upon both the computed probability that mobile device 105 is traveling in a car, together with the computed probability (such as that described in detail above with respect to step 230) that the in-vehicle role of a user of mobile device 105 is a driver. In such a scenario, processor 110 can coordinate various transformations and/or adjustments to the operation(s) of mobile device 105, as described in detail above with respect to step 240. As also noted above, in certain arrangements various of the referenced transformations can be employed only when either one or both of the probabilities pertaining to the vehicle class within which mobile device 105 is traveling and/or the in-vehicle role of the user of mobile device 105 is a driver meet and/or exceed a certain minimum threshold.

Figure 6:
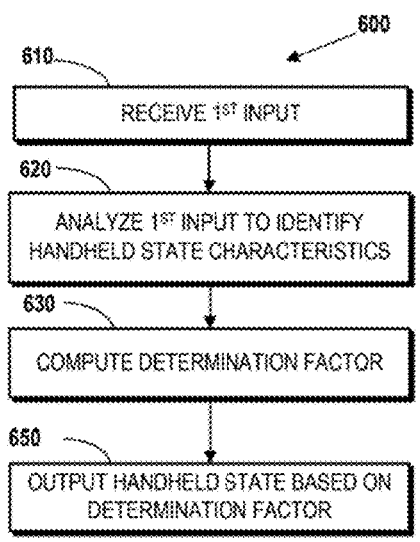
FIG. 6 is a flow diagram showing a routine that illustrates a broad aspect of a method of determining a handheld state a mobile device in accordance with at least one embodiment disclosed herein.

Turning now to FIG. 6, a flow diagram is described showing a routine 600 that illustrates an aspect of a method of determining a handheld state a mobile device in accordance with at least one embodiment disclosed herein. As will be described in greater detail below, various of the steps and operations that make up routine 600 share substantial similarities to those described above in connection with FIGS. 2A-C, 3, 4, and 5. However, it should be understood that while at least FIG. 4 principally concerns determinations occurring at central machine 168, routine 600 is primarily directed to determinations performed at mobile device 105, as will be described in greater detail below.

The process begins at step 610 where processor 110 executing one or more of software modules 130, including, preferably, determination module 170, receives a first input from one or more of sensors 145, software modules 130, user interface 172, operating system 176, and/or communication interface 150. Preferably, the first input originates from one or more identifying events that are perceptible to at least one of sensors 145, user interface 172, operating system 176, and/or communication interface 150. As described in detail above with respect to step 210, the first input originates from one or more identifying events that are perceptible to at least one of sensors 145, user interface 172, operating system 176, and/or communication interface 150 of mobile device 105, such as an acceleration input perceived by accelerometer 145A and/or a change in orientation input perceived by gyroscope 145B. It should be noted that in certain arrangements a series of inputs (such as a number of acceleration inputs over a certain period of time) and/or a combination of inputs (such as a number of acceleration inputs and orientation inputs over a period of time) are received, such as one or more inputs that reflect the incidence of shaking or vibration at mobile device 105.

Then, at step 620, processor 110 executing one or more of software modules 130, including, preferably, determination module 170, analyzes at least the first input to identify one or more handheld state characteristics within the notification. As described in detail above with respect to step 420, handheld state characteristics are one or more aspects originating at and/or derived from one or more input(s) that provide insight regarding the handheld state of a mobile device, such as mobile device 105, such as whether mobile device 105 is being operated by a user in a handheld or non-handheld state. For example, various orientations and/or sudden changes perceived by gyroscope 145B (preferably, in certain scenarios, in combination with one or more inputs from various other sensors 145 such as accelerometer 145A, GPS 145C, and/or magnetometer 145E) can indicate that mobile device 105 is being operated in a handheld state by a user. By way of further example, a relatively constant pattern of inputs from accelerometer 145A and/or gyroscope 145B can indicate that mobile device 105 is positioned in a relatively stable manner, thus indicating that it is being operated in a non-handheld state.

At step 630, processor 110 executing one or more of software modules 130, including, preferably, determination module 170, computes one or more determination factor(s), based on the handheld state determination characteristic(s), such as a probability that that the handheld state of mobile device 105 is handheld, or that the handheld state of mobile device 105 is non-handheld. By way of example, based on a series of accelerometer 145A and gyroscope 145B inputs, the pattern of which indicates ongoing vibration and/or movement, it can be computed that there is a high probability (e.g., greater than 90%) that mobile device 105 is being operated in a handheld state. This is because a user of handheld mobile device 105—and particularly a driver who is further distracted by his/her driving responsibilities—is liable to produce far more vibration/shaking that is perceptible by mobile device 105, especially as compared to a non-handheld device that is stationed in a dock, for instance. In any event, at step 630, such probabilities are computed, reflecting a probability that the handheld state of the mobile device 105 is handheld, and/or a probability that the handheld state of the mobile device 105 is non-handheld, in a manner substantially similar to that described in detail above with respect to steps 230 and 430. It should be understood that, as described in detail above, in certain arrangements the handheld state characteristics identified at step 620 can provide varying degrees of certitude as to the handheld state of mobile device 105. Accordingly, it should be appreciated that because ranges exist of a particular handheld state characteristic (such as device shake patterns), a probability that a handheld state of mobile device 105 is handheld/non-handheld preferably reflects a degree of certainty across such a probability spectrum, as described in detail above.

At step 650, processor 110 executing one or more of software modules 130, including, preferably, determination module 170, outputs one or more handheld states of mobile device 105 based on the one or more determination factor(s), such as the probability or probabilities computed at step 630, substantially in the same manner as described in detail above with respect to steps 250, 450, and 550. For example, if, at step 630, it is computed that it is 90% likely that mobile device 105 is being operated in a handheld state, at step 650 a notification can be provided at mobile device 105 indicating that it has been determined that the device is being so operated. In certain arrangements such a notification can further include a suggestion/instruction that the user of the device 105 refrain from further use of the device, in deference to regulatory guidelines. In other arrangements, the handheld state of mobile device 105 can be output to a third-party, such as a law enforcement agency, under appropriate circumstances. Additionally, as noted in detail above with respect to step 250, such outputting can, in certain arrangements, be contingent upon a certain minimum probability being computed (e.g., a 90% or greater probability that a mobile device 105 is operating in a handheld state), while in other arrangements the handheld state can be outputted across any and/or all degrees of probability.

Described herein in various implementations are techniques (including methods, systems, etc.) that are operative to improve the accuracy of various determinations, including determinations pertaining to whether a device is in a particular context (or not) and/or reducing the power consumed/expended (such as by the device) in order to make such determination(s). Such techniques can be advantageous, for example, in situations in which such determinations are to be made repeatedly over extended periods of time. It should be understood that, in certain situations, particular sources of information that may otherwise be considered/analyzed in order to make certain context-based determinations/decisions may not be available. For example, in various urban locations or in certain climatic conditions (e.g., during cloudy/stormy weather) GPS information may not be available, and such inputs are thus unavailable to be used in determining movement and/or speed by/in relation to a device. It can also be appreciated that usage of such sensors can consume substantial amounts of power at the device. As such, it can be advantageous (such as in circumstances in which one or more sensors/inputs are unavailable or unreliable) to employ determination techniques that use different/alternative sources of information (such as other sensors) in order to determine a context of the device.

Figure 27:
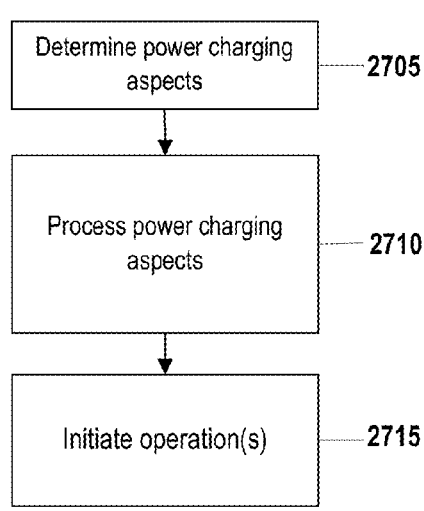
FIG. 27 is a flow diagram showing a routine that illustrates aspects of one or more methods, such as those described in relation to one or more embodiments described herein.

FIG. 27 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 2705, one or more power charging aspects can be determined, such as in relation to a user device. At 2710, the one or more power charging aspects can be processed. In doing so, a context of the user device can be determined. At 2715 one or more operations can be initiated. In certain implementations, such operations can be initiated based on the context. Moreover, in certain implementations, such operations can be initiated in relation to the user device.

Figure 28:
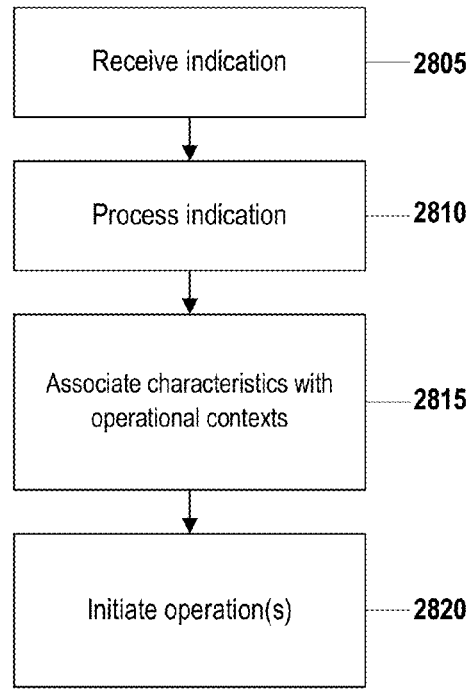
FIG. 28 is a flow diagram showing a routine that illustrates aspects of one or more methods, such as those described in relation to one or more embodiments described herein.

FIG. 28 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 2805, one or more indications can be received. In certain implementations each of the one or more indications can correspond to a perception of one or more access points. Moreover, in certain implementations each of the one or more indications can being associated with an operational context of a device. At 2810, the one or more indications can be processed. In certain implementations, such indications can be processed in order to determine one or more characteristics associated with one or more respective perceptions of at least one of the one or more access points. At 2815, the one or more characteristics can be associated with one or more operational contexts. At 2820, one or more operations can be initiated. In certain implementations, such operations can be initiated based on a determination of at least one of the one or more characteristics in relation to a user device. Moreover, in certain implementations such operations can be initiated in relation to the user device based on at least one of the one or more operational contexts.

Figure 29:
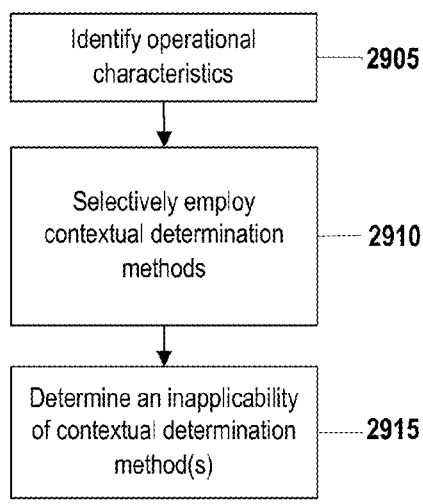
FIG. 29 is a flow diagram showing a routine that illustrates aspects of one or more methods, such as those described in relation to one or more embodiments described herein.

FIG. 29 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 2905, one or more operational characteristics of a device can be identified. At 2910, one or more contextual determination methods can be selectively employed, such as in relation to the device. In certain implementations, such determinations can be employed based on the operational characteristics. At 2915, an inapplicability of at least one of the one or more contextual determination methods can be determined, such as in relation to the device. In certain implementations such an inapplicability can be determined based on at least one of the operational characteristics.

Figure 30:
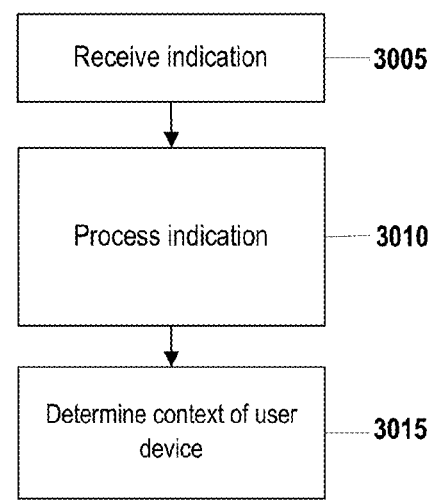
FIG. 30 is a flow diagram showing a routine that illustrates aspects of one or more methods, such as those described in relation to one or more embodiments described herein.

FIG. 30 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 3005 one or more indications can be received. In certain implementations, each of the one or more indications can correspond to a perception of one or more access points, such as in relation to a user device. In certain implementations, at least one of the one or more indications can include one or more locations, such as those corresponding to the at least one of the one or more access points. At 3010, the one or more indications can be processed, such as in relation to one or more access point records. In doing so, one or more characteristics of at least one of the one or more access points can be determined. In certain implementations, the one or more characteristics can include (a) nomadic or (b) stationary. In certain implementations, the one or more locations can be processed, such as in order to determine a locational variability, such as with respect to the at least one of the one or more access points. In certain implementations, the locational variability can include a difference between (a) a location associated with a connection to the at least one of the one or more access points and (b) a location associated with a disconnection from the at least one of the one or more access points. At 3015, a context of the user device can be determined. In certain implementations, such a context can be determined based on the one or more characteristics. In certain implementations, the context can include at least one of: (a) within a vehicle, (b) not within a vehicle, (c) within a trip, or (d) not within a trip. In certain implementations, it can be determined that the user device is at least one of (a) not within a vehicle or (b) not within a trip, such as based on a determination that the user device perceived a stationary access point throughout a chronological period. In certain implementations, a context of the user device can be determined, such as based on the locational variability.

Figure 31:
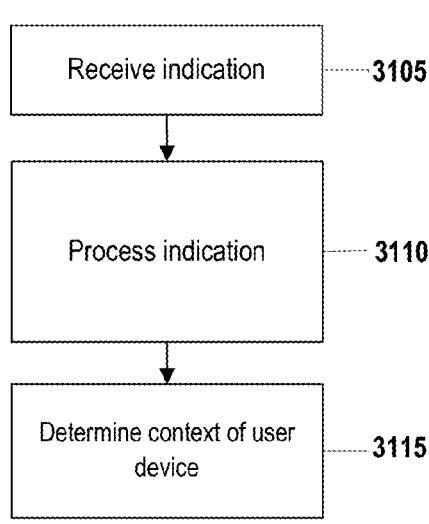
FIG. 31 is a flow diagram showing a routine that illustrates aspects of one or more methods, such as those described in relation to one or more embodiments described herein.

FIG. 31 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 3105 one or more indications can be received. In certain implementations, each of the one or more indications can correspond to a perception of one or more access points, such as in relation to a user device. At 3110, the one or more indications can be processed, such as in order to determine a variability with respect to the one or more indications. In certain implementations, the variability can include a quantity of distinct access points perceived during a chronological period. At 3115, a context of the user device can be determined, such as based on the variability.

Figure 32:
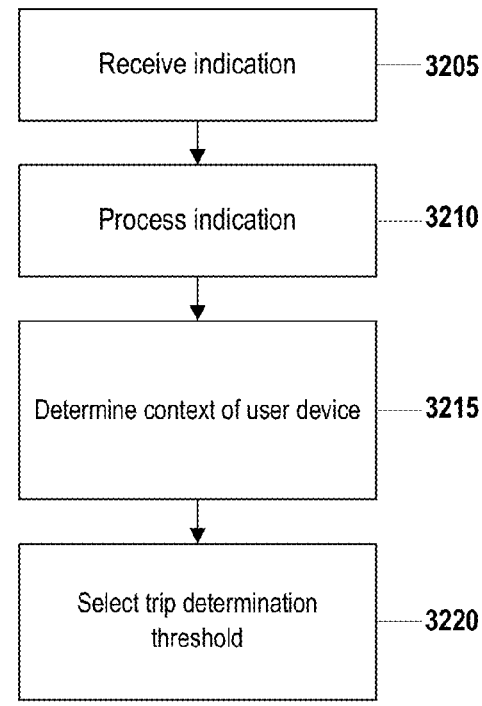
FIG. 32 is a flow diagram showing a routine that illustrates aspects of one or more methods, such as those described in relation to one or more embodiments described herein.

FIG. 32 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 3205 one or more indications can be received. In certain implementations, each of the one or more indications can correspond to a perception of one or more access points, such as in relation to a user device. At 3210, the one or more indications can be processed, such as in order to determine a quantity of access points perceptible to the user device. At 3215, a context of the user device can be determined, such as based on the quantity. In certain implementations, the context can include (a) an urban location or (b) a rural location. At 3220, a trip determination threshold can be selected, such as with respect to the user device. In certain implementations, the trip determination threshold can be selected based on the context.

Figure 44:
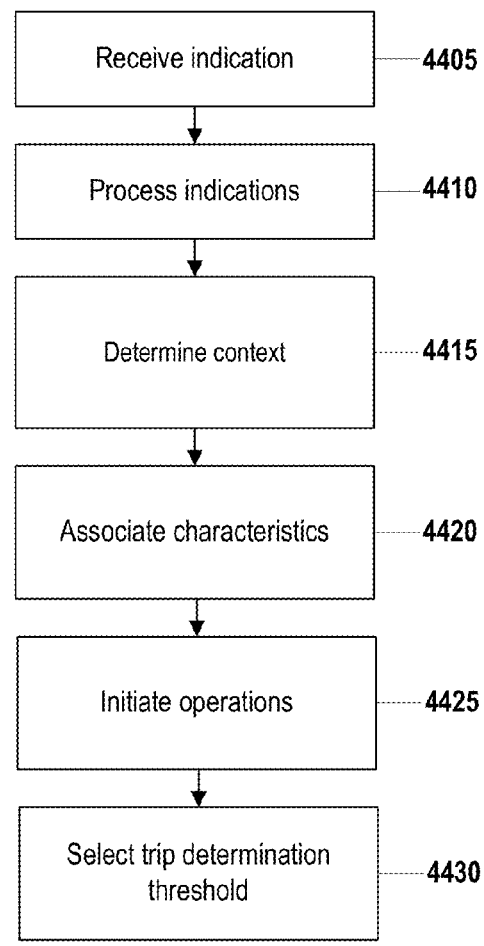
FIG. 44 is a flow diagram showing a routine that illustrates aspects of one or more methods, such as those described in relation to one or more embodiments described herein.

FIG. 44 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 4405 one or more indications can be received, each of the one or more indications corresponding to a perception of one or more access points in relation to a user device. At 4410, the one or more indications can be processed, such as to determine one or more characteristics of at least one of the one or more access points. At 4415, a context of the user device can be determined, such as based on the one or more characteristics. At 4420, one or more characteristics can be associated with one or more operational contexts. At 4425, one or more operations can be initiated, such as based on a determination of at least one of the one or more characteristics in relation to a user device. In certain implementations, the one or more operations can be initiated in relation to the user device based on at least one of the one or more operational contexts. At 4430, a trip determination threshold can be selected with respect to the user device, such as based on a context.

Figure 45:
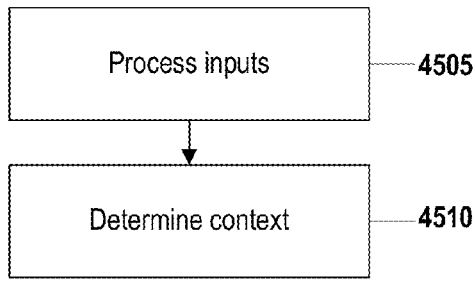
FIG. 45 is a flow diagram showing a routine that illustrates aspects of one or more methods, such as those described in relation to one or more embodiments described herein.

FIG. 45 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 4505 one or more inputs associated with a user device can be processed, such as to determine one or more mobility characteristics of the user device. At 4510, a context of the user device can be determined, such as based on a determination that the one or more mobility characteristics comprise mobile operation and do not comprise operation consistent with walking.

Figure 46:
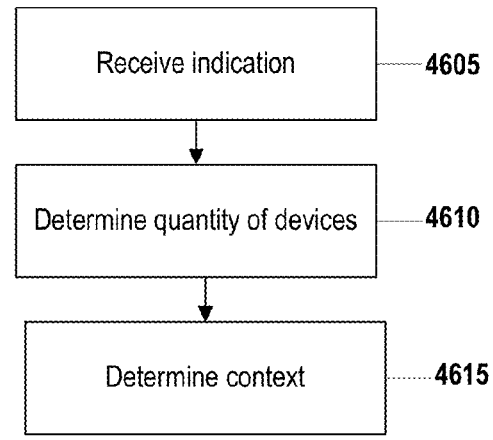
FIG. 46 is a flow diagram showing a routine that illustrates aspects of one or more methods, such as those described in relation to one or more embodiments described herein.

FIG. 46 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 4605 an indication can be received, corresponding to a perception of a nomadic access point in relation to a user device. At 4610, a quantity of devices with respect to which the nomadic access point is perceptible can be determined. At 4615, a context of the user device can be determining, such as based on the quantity.

By way of illustration, various techniques described herein can pertain to determinations as to whether or not a device is present/operational 'within a vehicle' (e.g., a moving vehicle) and/or 'within a trip' (e.g., a trip within a moving vehicle) (it should be noted that such terms can be used interchangeably). In doing so, various aspects of the power consumed/expended by a device (such as in order to make one or more of the referenced determinations) can be reduced. Moreover, one or more of the referenced techniques can also be implemented to determine or otherwise detect other contexts while consuming/expending relatively less power, e.g., determining the in-vehicle role of a user of a particular device, whether or not a device is present within a class or on school grounds, what mode/class of transportation/vehicle the device is present within (e.g., car, train, bus, bicycle, walking, etc.), whether or not the user is a vulnerable road user, and more.

In one implementation, information related to one or more aspects of the battery and/or the power consumption of a device (e.g., whether the device is connected to power, the voltage across the battery of the device, the charge level and/or the battery temperature level of the battery of the device) and/or changes thereto over time (e.g., variability), can be used to determine whether the device is in a vehicle.

For example, being that device batteries are likely to charge relatively less quickly when connected to power within a vehicle than such batteries charge when plugged into a wall outlet (in light of the generally lower amperage of car chargers as compared to wall chargers), a determination that the charge level of a battery that is connected to power is increasing relatively slowly can indicated an increased likelihood that the device is present within a vehicle.

Moreover, in certain implementations the referenced technique(s) can also incorporate aspects relating to the power being consumed by the device (e.g., in order to operate). For example, with respect to a device that is connected to a power source and whose battery level is increasing relatively slowly and is not consuming/expending significant amounts of power (that might otherwise account for such a relatively slow battery level increase, such as applications running, screen state, GPS, Bluetooth, WiFi etc., sensors sampled), it can be determined that such a device is relatively likely to be present within a vehicle (rather than being connected to a wall outlet). In yet further implementations, such technique(s) can further incorporate various comparisons and/or machine learning techniques with respect to characteristics pertaining to the battery of a device (e.g., in relation to the performance/operation of the specific battery and/or the specific device and/or across a population of identical and/or similar/comparable model batteries and/or devices over time).

In certain implementations a variability in the rate at which a battery charges can be used to determine a context in which a device is operating (e.g., within a vehicle). Such determinations can be made based on the variability in the rate at which the battery of a device charges, as a device that is connected to a car charger is relatively more likely to display a relatively more variable battery charge rate than a device connected to a wall outlet.

In another implementation, one or more aspects of a context within which a device is present/operating can be determined based on the voltage across a battery of the device and/or changes thereto. Such determinations can be made, for example, based on the fact that the voltage across a battery of a device that is connected to a car charger is likely to exhibit relatively more variability than that of a device connected to a wall outlet. In another example, various determinations can be performed in order to identify/distinguish between various types of power charge sources such as solar battery chargers and fixed wall chargers, based on the variability of the power from such sources (e.g., a power source providing a relatively smaller current, a relatively more variable current, and/or a current having a relatively more variable voltage, can be determined to be relatively more likely to be present within a vehicle, and vice versa) that they are able to provide to the device battery.

In another implementation, various determinations pertaining to the context within which a device is present/operating (e.g., within a vehicle) can be achieved based on the temperature of a battery of the device. Moreover, and changes in such temperature(s) can be used to determine one or more contexts of the device (e.g., whether the device is within a vehicle). Such determination(s) can be made, for example, in light of the fact that the temperature of a device that is connected to a car charger is likely to exhibit different characteristics (e.g., more extreme temperatures) than those exhibited by/observed in relation to a device connected to a wall outlet.

Moreover, in certain implementations one or more determinations pertaining to a hands-free state of a device (e.g., where the device is positioned/held within a vehicle) can be made based on one or more aspects of the power connection status of the device (i.e.,). For example, it can be appreciated that a device that is connected to a power source is relatively more likely to be operated by a driver than by a passenger (in light of the fact that, for example, a vehicle is relatively more likely to have one or more a power connections that are compatible with a device operated by a driver, and the locations such power sources, such as a cradle/dock having a power connection, is relatively more likely to be positioned in closer proximity to a driver than a passenger, etc.).

In certain implementations, when a device is connected to a power source and its context (e.g., within a vehicle vs. outside of a vehicle, within school grounds vs. outside of school grounds, etc.) has been identified and/or can be determined, one or more further determinations can be made with respect to the ongoing state/status of such a device. For example, it can be determined that such a device is relatively likely to remain within or otherwise maintain the same/comparable context at least until the device is no longer connected to a power source. Accordingly, in certain implementations, having determined that a device is connected to a power source, one or more instance(s) (e.g., a "short burst") of additional determination techniques (e.g., contextual determinations, such as those described herein), such as those that may entail higher or additional power consumption, can be initiated or otherwise employed. In doing so, a determination of the context within which a device is present/operating can be achieved initially (i.e., upon connecting the device to a power source) such that, having identified/determined such a context, various aspects of the power consumption of the device can be reduced (e.g., over the medium and long terms). For example, having determined that a particular device is connected to a power source, one or more sensors of the device (e.g., GPS, WiFi radio, cellular radio, Bluetooth radio, accelerometer, gyroscope, etc.) can be turned on/activated, such as for a period of time, in order to obtain/receive one or more inputs based upon which it can be determined whether the device is (or is not) present/operating within a vehicle. Based on a determination that the device is not present/operating within a vehicle, it can be further determined that the device is subsequently not present/operating within a vehicle as long as and/or at least until such time as the device is determined to no longer be connected to a power source (and/or connected to the power source with respect to which the device was initially connected). Based on a determination that the device is present/operating within a vehicle, it can be further determined that such a state/status is likely continue, and thus that that the device is to continue to be present/operating within the vehicle, at least until such time as is the device is determined to no longer be connected to a power source (and/or connected to the power source with respect to which the device was initially connected).

It can be appreciated that one or more of the techniques described herein operate based on the assumption that power sources (with respect to which the various determinations are computed) are non-nomadic (i.e., that such power sources/supplies are fixed in a particular location). Accordingly, while in certain situations nomadic power sources/supplies can also implemented (e.g., external batteries, portable power sources, etc.), the use of such nomadic power sources can be determined/detected and/or otherwise accounted for in a number of ways. For example, the usage of such nomadic power sources can be determined based on the level of current or voltage identified at the device/batter (and/or changes thereto), and/or via the magnetometer of the device (and/or changes thereto), and/or based on one or more movement patterns that can be identified as being consistent with the use of a heavier device, as can be determined based on one or more inputs originating from various motion sensors of the device (e.g., accelerometer, gyroscope). Additionally, such nomadic power sources are relatively less common and/or can entail various barriers to user adoption (e.g., cost, size, weight, being cumbersome, etc.). Moreover, one or more of the referenced determinations can be accumulated/maintained over time, such as with respect to a particular device, a user/user account associated with a device, etc. As such, a device and/or a user/user account that has been determined (such as on an ongoing basis) to utilize a nomadic power supply, the referenced techniques (which, for example, determine a context of a device based upon a power connection state/status of the device) can be utilized relatively more selectively and/or not at all with respect to such devices.

In certain implementations, based on a determination that a device is connected to a power source, a scan of WiFi access points that are perceptible to the device can be initiated or otherwise performed, such as at one or more intervals. In doing so, the number/quantity of and/or identities (e.g., service set identifiers or 'SSIDs') associated with WiFi access points that are subsequently perceptible at the device can be compared to an initial/previous number/quantity of and/or identities associated with WiFi access points perceptible at the device. In doing so, a determination can be made with respect to whether or not (and/or when) the device is moving, such as is described in greater detail herein. For example, in a scenario where access points A, B and C are perceptible at a device, and at a subsequent time only access points D, E and F are visible, it can be determined that it is relatively likely that the device has moved (on account of the changing identities of the access points perceptible at the device).

Moreover, scenarios can arise whereby, at one time/interval there were no (or relatively fewer) access points perceptible, and at a later interval there are one (or relatively few new/additional) access points visible. It can be appreciated that, in such scenarios, determinations pertaining to whether the device has moved may be relatively less accurate (in light of the fact that a single newly perceived access point may have just been turned on despite the fact that the device remains stationary). Accordingly, in certain implementations one or more timestamp(s) contained/embedded within the access point beacon can be used to determine an uptime of the access point. Based on a determination that the uptime of the access point is relatively low, it can be further determined that the access point is likely to have been turned on relatively recently and the referenced change(s) with respect to the perception of various access point(s) under such circumstances may thus not provide accurate determinations with respect to the movement of the device. However, based on a determination that the uptime of the access point is relatively high, the referenced change(s) with respect to the perception of various access point(s) can provide relatively accurate determinations with respect to movement of the device, as described herein.

In certain implementations, the context within which a device is present/operating (e.g., within a car vs. at an office vs. at home) can be determined in relation to various aspects of the power connectivity/connection associated with the device, by using one or more machine learning techniques (as are known to those of ordinary skill in the art) to identify, such as over time, one or more patterns, properties, and/or characteristics associated with various power sources/chargers that the device connects to and/or associating such patterns, properties, and/or characteristics with one or more contexts. That is, it can be appreciated that many users can utilize different power sources/chargers in different locations (e.g., a USB charger at work, a cigarette lighter charger in the car and a wall charger at home). Such power sources can have different electrical properties (current, voltage, etc.) that can be perceived at/in relation to the device (e.g., USB charger in the office may charge the battery of a particular device at 240 mAh, thereby charging the battery at a rate of 0.2%/minute, while a car charger may charge the battery at 600 mAh, thereby charging the battery at a rate of 0.5%/minute, and an AC wall charger at home may charge the battery at 1200 mAh, thereby charging the battery at a rate of at 1%/minute. Accordingly, for example, based on one (or more determinations) that the battery of the device is being charged at a rate of 0.5%/minute concurrent with or otherwise chronologically proximate to a time with respect to which such a device can also be determined to be present/operating within a vehicle (such as a moving vehicle), it can be further determined, with respect to the connection of such a device to a power source and charging of the battery of the device at a rate of 0.5%/min, that such characteristics/aspects indicate that it is relatively likely that the device is present/operating within a vehicle.

In certain implementations, one or more connectivity state(s) of the device can be used to determine whether or not the device is present/operating within a vehicle. For example, based on a determination that the device is connected to a WiFi access point, the performance of various power consuming operations (that might otherwise be performed by/in relation the device, such as using the GPS of the device to determine whether the device is moving) can be avoided and/or limited (such as by performing such operations less frequently). Moreover, the device can continue to operate in such a fashion (i.e., avoiding/limiting the use of such operations) until the referenced WiFi connection is terminated (and/or shortly thereafter). It can be appreciated that, in light of the fact that relatively few vehicles have WiFi access points, an ongoing connection to a WiFi access point can indicate that the device is relatively unlikely to be in a vehicle. Moreover, in certain implementations, based on a determination that a device is/is not connected to a Wifi AP, it can be determined that such a device is not/is present within a vehicle (such as a moving vehicle). Moreover, in certain implementations, one or more operations can be initiated, such as with respect to the device (e.g., employing, modifying, removing various restrictions that are employed with respect to the operation of the device).

Moreover, in certain implementations one or more of the technologies described herein can incorporate one or more machine learning techniques, such as with respect to the WiFi access points that are perceptible to a particular device. In doing so, one or more determinations can be made, such as with respect to whether (a) an access point is static/stationary (e.g., within a home, office, etc.), as can be determined, for example, based on one or more perceptions of such WiFi access points by the device concurrent with and/or in chronological proximity to one or more determinations that indicate that the device is unlikely to be moving, or (b) an access point is dynamic/mobile (e.g., within or on a car, train, bus, etc.) based on one or more perceptions of such WiFi access points by the device concurrent with and/or in chronological proximity to one or more determinations that indicate that the device is likely to be moving. The referenced determinations can be made, for example, by measuring the one or more aspects of the motion(s) that can be perceived by/in relation to the device (based on one or more inputs that can originate, for example, from information/sources such as GPS, cellular IDs, cellular RSSI, WiFi Ids, Wifi RSSI, accelerometer, gyroscope, etc.) concurrent with and/or in relatively close proximity to one or more determinations that the device is connected to (or is otherwise able to perceive or "hear" without necessarily being connected to) a WiFi access point (or through the use of a third-party database of Wifi access points, such as Skyhook, based upon which and/or in relation to which such determinations can be made).

Moreover, the context within/in relation to which a device is present/operating (e.g., whether a trip, such as in a vehicle, has commenced, whether the device is within a moving vehicle, whether the device is with a user walking, the vehicle class of a vehicle, etc.) can be determined based on various determinations/identifications. For example, in certain implementations, based on (a) a determination that a device is connected to a power source, and (b) a determination that one or more wireless (WiFi), Bluetooth, cellular, etc., signals (such as those originating from a WiFi access point) and/or one or more inputs originating at one or more sensors (e.g., accelerometer, gyroscope, magnetometer, proximity, pressure, light, camera, microphone, etc.), are changing (e.g., changing above a certain threshold/degree of change) (e.g., different WiFi access point BSSIDs are determined to be coming into/out of view, cell tower signal strengths are determined to be changing more than a certain amount, etc.), it can be determined that the device is likely to be within a moving vehicle. Moreover, it can be determined that the device is relatively less likely to be in certain types of moving vehicles (e.g., bicycle, elevator) because devices are relatively less likely to be connected to power in such situations. In addition, upon determining that a device is connected to a power source, one or more of the various determination techniques described herein (such as those pertaining to aspects of the power connectivity and/or power consumption of a device) can be employed. In doing so, such determinations with respect to the context of the device can be utilized to conserve power (e.g., by deactivating, utilizing relatively less frequently and/or in a different way, and/or not utilizing at all, one or more sensors, functions, and/or operations of the device, such as those that consume power, based on the determined context of the device). Such functionality can be advantageous even when a device is connected to a power source (e.g., an AC outlet) because a user may only have a limited amount of time to charge his/her device and utilizing relatively less power can enable the battery to charge more quickly.

Additionally, in certain implementations (including in scenarios where a device may or may not be connected to power), based on (a) a determination that one or more wireless (WiFi), Bluetooth, cellular, etc., signals (such as those originating from a WiFi access point) are changing (e.g., changing above a certain threshold/degree of change) (e.g., different SSIDs are determined to be coming into/out of view, signal strengths are determined to be changing more than a certain amount, etc.), and (b) a determination that the device is not moving in a manner consistent with one or more activity types and/or vehicle classes (e.g. the device is determined to be moving in a manner consistent with a user walking, a user bicycling, a user riding an elevator, etc.) and/or in the absence of a determination that the device is moving in a manner consistent with such one or more activity types and/or vehicle classes (as can be determined, for example, in the case of user walking, using various pedometric determination techniques, as are known to those of ordinary skill in the art, or in the case of a user in an elevator, for example, using a pressure sensor on the device to determine a relatively significant change in pressure over a relatively short time and/or distance), it can be determined that the device is likely to be present in conjunction with certain activity types and/or within certain vehicles classes types. In making such determinations based on the referenced factors (e.g., changes pertaining to WiFi access points), a determination that a device is, for example, present within a moving vehicle, can be made even without the use of the device's GPS (which can otherwise entail considerable battery discharge).

It should be noted that the utilization of techniques that enable the determination of the activity being performed and/or the vehicle class being used by eliminating (or otherwise determining a relatively low likelihood of) certain types of activities or vehicles (i.e., via a 'process of elimination') can, in certain scenarios, enable relatively more effective and/or efficient determination as to which activity is being performed and/or vehicle class is being used than afforded through the use of 'positive' or affirmative activity or vehicle class identification/determination techniques. As in the above example, it can be relatively easier/efficient, more accurate, require less power, and/or faster to determine that it is relatively likely that a device is in a moving vehicle by determining that the device is not present with a user walking, than by affirmatively determining that the device is relatively likely to be present within a moving vehicle (e.g., based on a determination that its spectral frequency is within a certain range, etc., as described herein). For example, based on a determination a device is connected to a power source, it can be further determined (even without having to use any additional battery power) that the device is relatively unlikely to be with a user who is walking or cycling. For example, determining that the device is not present with a user who is walking can be achieved by sampling an accelerometer and/or gyroscope for signs/indications/patterns of walking, which can be done at a relatively lower sampling rate (thereby consuming less battery power) than otherwise required to determine that the device is present within a moving vehicle.

In certain implementations, based on a determination that a user/device has moved more than a certain distance (e.g., more than a distance that could otherwise be attributed to GPS 'noise,' even if not moving), such as within a certain period of time, and further based on a determination that the device has not been operating in a manner that can be determined to be sufficiently consistent to walking (such as within the referenced period), the user/device can be determined to be present within a moving vehicle.

It should be noted that the various techniques described herein (including the referenced 'negative' or 'reverse' determinations that are based on one or more determinations of context(s) that a device is not present with respect to) can be employed in order to make any number of determinations, including but not limited to: activity determination(s), vehicle movement determination(s), and/or vehicle class determination(s). In doing so, such determinations can be achieved even in scenarios/situations where determination-related 'blind spots' might otherwise be present, such as in scenarios where GPS signals are not available or otherwise reliable (e.g., in tunnels, underground garages, cities with tall buildings, indoors, inclement weather, etc.).

It should also be noted that the various techniques described herein can also enable the identification/determination of vehicles moving at practically any speed (in contrast to otherwise waiting for the vehicle to reach a speed at which it can be determined that an unaided human cannot reasonably travel in order to affirmatively determine that a device is present within a moving vehicle). In employing such techniques, it can be determined that a device is present within a moving vehicle even in a scenario where the vehicle is moving at a relatively slow speed.

Additionally, upon identifying/determining that a device is present within a moving vehicle, it can be further determined that such a device is no longer present within a moving vehicle upon identifying/determining that the device is present in conjunction with 'walking.' (It should be noted that the terms 'walking,' 'user walking,' etc., as used herein are intended to encompass any and/or all forms of unaided human movement, such as walking, running skipping, etc.)

Accordingly, it can be appreciated that employing one or more of the referenced techniques can enable determination(s) of one or more activities, operations, presence of a device within a moving vehicle, vehicle class(es), etc., without the use of GPS. In addition, in various implementations, the GPS of a device can, for example, be utilized only when other signals are not sufficiently strong, clear, accurate, etc., and/or to confirm the accuracy of such other determinations.

It should be further noted that, in certain implementations, one or more determinations can be made with respect to vehicle class based on the perception/identification of one or more RF devices (e.g., WiFi APs, BT devices, etc.) that are in proximity of/present within the vehicle. In order to do so, for example, the identity (e.g., BSSID, SSID, MAC address, etc.) of the RF device can be used to determine a likelihood of a particular vehicle class (with respect to which the device is present). In doing so, it can be detected/determined that the device is present within a moving vehicle (such as in the manner described herein). An identity of one or more related/comparable/similar RF devices can be identified/determined, such as based on/in relation to a database that can maintain identities of various RF devices and their respective associated vehicle classes (as determined, for example, based on inputs originating at one or more sensors of various devices, such as in the manner described herein). Moreover, one or more determinations (e.g., of a vehicle class) can be made based on similar, related, and/or comparable (even if not identical) RF device identity information, such as that stored/maintained in such a database. For example, in a scenario where a first BSSID of a WiFi AP is close/similar/comparable/related to another BSSID of another WiFi AP that is identified/has been determined to be in a public bus, the first BSSID can be determined to be likely to be operating in relation to a bus, too (in light of the fact that bus corporations tend to purchase in bulk and are relatively likely to receive successively/closely numbered devices). For example, if a data value of an RF device, like a WiFi AP's SSID, is an SSID identified/determined to be used in a public train (e.g., "AmtrakConnect"), then it can be determined, with respect to another RF device having the same SSID or a similar/comparable SSID (e.g., "Amtrak-Connect2") that such a device with the same/comparable SSID is also on a public train. It should be noted that potential errors in such determinations that may arise can be corrected by using one or more techniques (such as those described herein) to validate the determined vehicle class in relation to such RF devices. Additionally, the RF devices operating in relation to vehicles in certain vehicles classes (e.g., buses, trains) are relatively likely to be perceived by multiple mobile devices simultaneously and over time than, for example, in a car. As such, one or more determinations as to the class of a vehicle can be made based on the relative quantity of devices that perceive such an RF device simultaneously and/or over time. Thus, the greater the number of devices determined to simultaneously and/or over time perceive a particular RF device, the relatively more likely it is that such devices are present within certain types of "mass" vehicle classes (e.g., train, bus, etc.). Moreover, such RF device(s) can be associated with a particular vehicle class on that basis, and/or using one or more techniques such as those described herein.

The accuracy of such determinations can be further improved over time. For example, observing the same and/or similar changes with regard to certain access points—such as during a trip—multiple times, can further confirm that subsequent comparable observations can also be determined to be occurring during a trip. It should also be noted that the accuracy of the referenced determinations can be further improved based on a determination that the referenced signals (e.g., those originating from WiFi access points, etc.) originate from a nomadic and/or non-nomadic source, as determined, for example, using one or more of the techniques described/referenced herein. Moreover, in scenarios where the various wireless, etc., signals are not available (or cannot otherwise be relied upon), the GPS can be utilized, alone or in conjunction with other signals and/or sensors), to determine whether the device is present within a moving vehicle, etc. It should also be noted that one or more additional determinations can be made (e.g., upon determining that a device is within a moving vehicle), such as with regard to the type of vehicle that the device is in (e.g., car, boat, train, bus, etc.), such as in the manner described herein.

In addition, in certain implementations one or more determinations can be made with respect to the characterization and/or classification of various WiFi access points (such as stationary/static/fixed/non-nomadic or mobile/dynamic/nomadic). Such determinations can be made, for example, based on (a) information accumulated/stored by/in relation to a device (such as over time), (b) information accumulated by/in relation to multiple devices (i.e., 'crowd-sourced') (such as over time), (c) based on information contained/identified within various WiFi broadcasts (reflecting, for example, the manufacturer, model, etc., of an access point), as can be identified, for example, based on one or more comparisons with one or more databases (as can be stored on the device and/or remotely) that contain data pertaining to which manufacturers, models, etc. are likely to be utilized in stationary/static/fixed/non-nomadic or mobile/dynamic/nomadic contexts, and/or (d) in conjunction with third party services.

In another implementation, one or more of the contextual determinations described herein can be further configured to operate based on/in relation to a premise/default/assumption that a device is not present/operating within a vehicle based on a determination that such a device is connected to an access point that can be determined to be non-nomadic access point (i.e., an access point that can be determined to have a relatively fixed location and/or whose location is not determined to change relatively regularly). Examples of such a non-nomadic/stationary access point can include a WiFi access point in an office network (in contrast to an in-vehicle WiFi access point or a mobile device that can serve as a WiFi access point, a such devices can be determined to be mobile).

It should be noted that, in certain implementations, the manner in which a particular access point, such as a WiFi access point, can be determined to be non-nomadic/stationary can be achieved in a number of ways. For example, in certain implementations the nomadicity (that is, the nomadic/non-nomadic state/status) of an access point can be determined based on/in relation to a database (local or remote) that can maintain information pertaining to various access points, and/or that contains respective classifications of such access points, such as in relation to the nomadic/stationary and/or non-nomadic/mobile characteristics/properties of such access points (e.g., BSSIDs). Such a database can be built/compiled, for example, based on the results of various nomadic/non-nomadic determinations that can be performed with respect to various access points, such as is described herein (with respect to individual devices and/or accumulated across devices, such as via 'crowd-sourcing,' and/or utilizing a third party database of WiFi access points, such as Skyhook, that can provide the referenced nomadic/non-nomadic information/determinations, or, based on a determination that, by virtue of the method with respect to which information pertaining to such WiFi access points was collected/gathered, that the referenced WiFi access point records/entries pertain to non-nomadic access points.

Moreover, in certain implementations the nomadicity of a an access point can be determined by querying/looking up the referenced access point within a database (local or remote) that maintains associations of the context within which the device is present/operating with an identifier of the WiFi access point (e.g., a BSSID) that is the device is/was connected to. Such a database can be generated based on the results of one or more determinations that pertain to the context within which a device is present/operating in relation to the access point to which the device is connected, as described herein (both with respect to individual devices and/or accumulated across devices, such as via 'crowd-sourcing,' and/or may be a third party database of access points that provides such information. For example, based on a determination that on multiple instances a device was connected to a particular WiFi access point and was also determined not to be present/operating within a vehicle, then upon subsequently determining that the device is again connected to the same WiFi access point, it can be determined that the device is again relatively likely t not to be present/operating within a vehicle.

Additionally, in certain implementations, one or more of the referenced determinations can also incorporate and/or otherwise consider aspects pertaining to BSSID, Beacon, and/or WPS transmissions. For example, based on one or more of such items the identity of the manufacturer of the WiFi access point to which the device is connected can be identified. By way of illustration, a BSSID of an access point can be used to identify the manufacturer. And, having identified the manufacturer, such an identity can be used to further increase the accuracy of the referenced determination(s). For example, in a scenario where the BSSID of the WiFi access point to which a device is connected is that of a manufacturer that makes mobile phones, it can be determined that there is a relatively greater likelihood that such an access point is nomadic. Moreover, based on such a determination the context of such a device can be further analyzed/checked (i.e., rather than solely relying on the connection of the device to the referenced access point in order to determine the context of the device). For example, a WiFi access point having a BSSID prefix of 40:A6:D9 is assigned to WiFi access points made by Apple and can thus be determined to be relatively likely to be an iPhone 4.

It should be noted that a database can also be utilized in cases/scenarios where a manufacturer produces both nomadic and non-nomadic devices, in light of the fact that such devices often have multiple prefixes and different prefixes can pertain to different devices. Moreover, with respect to a given BSSID prefix, the value of the BSSID suffix (i.e., the last 6 characters of the 12-character BSSID and which are generally assigned contiguously to similar/comparable devices), can be compared to such a database in order to further determine the nomadicity of such an access point.

Moreover, in certain implementations additional information (e.g., device type, model name, model number, etc.) pertaining to an access point can be obtained, such as from WPS (WiFi Protected Set-Up) information of the access point, and such information can be used with respect to determining the context and/or nomadicity of the access point. For example, with respect to manufacturer the produces both nomadic and non-nomadic WiFi access point under the same BSSID prefix, the model number of model name of the device (e.g. "Automotive WiFi Hot Spot" or "Enterprise AP with 1 GB bandwidth") can be used in order to identify/determine whether the as access point is nomadic or non-nomadic and/or otherwise determine the context within which the device is present/operating.

Additionally, in certain implementations the nomadicity of an access point can be determined based on whether the device can be determined to be moving at the time it is also determined to be connected to the access point (such movement can be determined, for example, based on one or more inputs/sources such as GPS, cellular IDs, cellular RSSI, WiFi IDs, Wifi RSSI, accelerometer, gyroscope, etc., such as are described herein). In doing so, an access point can be characterized/classified as being nomadic based on a determination that the connected device was moving concurrent with and/or in relatively close chronological proximity to being connected to the referenced access point, while being characterized/classified as non-nomadic based on a determination that the device was not moving concurrent with and/or in close chronological proximity to being connected to the referenced access point. Moreover, as described herein, the context of the device (e.g., being mobile or stationary while connected to the access point) can be recorded in relation to the access point.

In other implementations, in addition to determining that a device is not present/operating within a vehicle based on a determination that the device is connected to an access point determined to be non-nomadic, a device can be positively/affirmatively determined to be present/operating within a vehicle based on a determination that the device is connected to an access point determined to be nomadic.

Moreover, with respect to access points having relatively higher power transmissions (and therefore cover larger geographic ranges), it can be appreciated that the connection of a device to such access point(s) can be relatively less indicative of the fact that the connected device is not present/operating within a vehicle (as opposed to access points having a relatively shorter transmission range). In such case(s)/scenario(s), one or more techniques (such as the RSSI technique) described herein can be utilized in order to make a determination regarding the nomadicity of the access point.

In certain implementations, one or more of the access points that are perceptible to the device (e.g., other than an access point that the device is connected to), such as while scanning with the WiFi radio of the device, can be analyzed to determine the context of the device. Moreover, in certain implementations the access point to which the device is connected (if it is so connected) can be classified as nomadic/non-nomadic and saved (locally and/or remotely) for future use (such as by this device and/or with other devices), such as using one or more techniques, such as those described herein. For example, in certain implementations an access point perceived by a device can be characterized/classified as nomadic/non-nomadic based on a query/identification of a database containing a record of such an access point (and/or a comparable access point based upon which such determination can be made) and/or by making such determination dynamically, such as based on information received/derived from the BSSIDs (e.g., manufacturer, model) and/or WPS information (e.g., model) of an access point. Thus, if a device can perceive one or more access points that are known or have been determined to be non-nomadic access points (such as over some period of time, in order to account for nomadic access points that may be perceptible to a moving device for relatively short periods of time), such a device can be further determined to be stationary/not in motion. Moreover, if the device can perceive one or more access points determined to be nomadic (such as over some defined period of time), such a device can be determined to be in motion.

By way of further example, in certain implementations one or more contexts associated with one or more of the access points that are perceptible to a device can be used to determine, with a certain degree of likelihood, the current context of the device. For example, in a scenario where, upon perceiving a particular access point (such as an access point located in the vehicle of another user, such as when such a user parks in a company parking lot), it can be determined that the device is not present/operating within a vehicle, upon subsequently perceiving the same access point, it can be further determined that the device is, again, not present/operating within a vehicle.

By way of yet further example, in certain implementations one or more other access points (e.g., those access points other than the one that the device is connected to) that are perceptible to the device can be analyzed, such as across successive/intermittent scans of the WiFi radio of the device, such as even in scenarios where the nomadic/non-nomadic characterization/classification of such access points may not yet be determined. Based on a determination that one or more (e.g., the collection of) perceived access points across multiple/successive scans is substantially similar (and there are a relatively sufficient quantity of access points that are perceptible in such scans), then it can be further determined that the device is not moving. However, based on a determination that the collection of such perceived access points across multiple/successive scans is relatively dissimilar, it can be determined that the device is moving. Moreover, the accuracy of determinations achieved using such technique(s) can be increased/improved by analyzing the RSSIs of the perceived access points in the collection (as opposed to looking at the presence or lack thereof of each access point across multiple/successive scans. For example, in a scenario where multiple/successive scans are relatively close in time to one another and/or the device is moving relatively slowly, multiple/successive scans of perceptible access points using the WiFi radio of the device may demonstrate a substantially similar collection of access points, but if some of the referenced RSSI values have changed substantially, it can nevertheless be determined that the device is likely in motion.

In certain implementations, the speed at which a device is moving can be determined/estimated based on a determination of the distance between (a) the location of the device at the time that the WiFi radio of the device is used to perform a first access point scan (e.g., as determined from the known/determined locations of one or more of the BSSIDs, such as from a $3^{rd}$ party database such as Skyhook, and further using error minimization techniques to calculate the location of the device, such as based on the respective locations of each of the access points that are perceptible to the device with or without using the RSSIs of such access points as described herein, and (b) the location of the device at the time that the WiFi radio of the device is used to perform another access point scan, relative to the amount of time that elapsed between the two scans. It should be noted that such a technique can be implemented with more than two access point scans as well.

Moreover, in certain implementations the speed at which a device is moving can still be determined/estimated even without location information regarding (non-nomadic) WiFi access points. Such determination(s) can be achieved, for example, based on changes in the RSSI of the WiFi access points across multiple/successive scans. For example, an access point whose RSSI on a device changes from −30 dB to −90 dB over the course of a relatively short period of time (e.g., 1 second) can be determined to be relatively likely to be present/operating within a vehicle because, given the transmission range of WiFi access points, it is relatively unlikely that the device would be capable of moving at such a rate of speed without being present within a vehicle. However, with respect to an access point whose RSSI on a device changes from −30 dB to −31 dB over the course of a comparable time period can be determined to be unlikely to be present within a moving vehicle because, given the transmission range of (most) WiFi access points, a moving vehicle is relatively likely to experience a relatively larger change in the strength of the signal received than 1 dB, even over a relatively short period of time.

Moreover, in certain implementations, one or more techniques similar to those described herein with respect to access points such as WiFi access points can be employed with respect to determining a context within which a device is present/operating based on the Bluetooth (BT) connectivity state/status of such a device. For example, based on a determination that the device is connected to a nomadic BT device (e.g., a hands-free car loudspeaker), it can be determined that the device is present/operating within a vehicle. Moreover, based on a determination that the device is connected to a non-nomadic BT device (e.g., a desktop computer), it can be determined that the device is not present/operating within a vehicle. As described herein with respect to access points, a BT device (to which a device is connected) can be characterized/classified as nomadic/non-nomadic in a number of ways. For example, in certain implementations the nomadicity of a BT device can be determined based on/in relation to a database (local or remote) that can maintain information pertaining to various BT devices, and/or that contains respective classifications and/or characterizations of the nomadic/non-nomadic properties of various BT devices (BSSIDs). Such database can be built/compiled, for example, based on the results of one or more of the nomadic/non-nomadic determinations described herein, both with respect to individual devices and/or accumulated across devices ('crowd-sourcing') and/or may be a third party database of BT devices that provides such nomadic/non-nomadic information.

Moreover, in certain implementations the nomadicity of a BT device can be determined by querying/looking up the referenced BT device within a database (local or remote) that maintains associations of the context within which the device is operating in relation to an identifier of the BT device (BSSIDs) that is the device was/is connected to. Such database can be generated/built based on the results of one or more determinations that pertain to the context within which a device is present/operating in relation to the BT device to which the device is connected, as described herein (both with respect to individual devices and/or accumulated across devices, e.g., via 'crowd-sourcing,' and/or may be a third party database of BT devices that provides such information. For example, based on a determination that on multiple instances a device was connected to a particular BT device and it was also determined not to be present/operating within a vehicle, then upon subsequently determining that the device is again connected to the same BT device, it can be determined that the device is again relatively likely not to be present/operating within a vehicle.

Additionally, in certain implementations, one or more of the referenced determinations can also incorporate and/or otherwise consider aspects pertaining to BSSIDs. For example, the identity of the manufacturer of the BT device to which the device is connected can be identified, such as is described herein. For example, the BSSID of a BT device can be used to identify its manufacturer. And, having identified the manufacturer, such an identity can be used to further increase the accuracy of the referenced determination(s). For example, in a scenario where the BSSID of the BT device to which the device is connected is determined to be that of a manufacturer that produces hands-free car loudspeakers, it can be determined that there is a relatively greater likelihood that the BT device is nomadic, whereas based on a determination that the BSSID of the BT device to which the device is connected is that of a manufacturer that produces desktop computers, it can be determined that there is a relatively greater likelihood that the BT device is non-nomadic.

It should be noted that a database can also be utilized in case(s)/scenario(s) where a manufacturer produces both nomadic and non-nomadic devices, in light of the fact that such devices often have multiple prefixes and different prefixes relate to different devices. Moreover, with respect to a given BSSID prefix, the value of the BSSID suffix (i.e., the last 6 characters of the 12-character BSSID and which are generally assigned contiguously to similar/comparable devices), can be compared to such a database in order to determine the nomadicity of such a BT device.

Moreover, in certain implementations one or more of the referenced determinations can also incorporate and/or otherwise consider aspects pertaining to beacon transmission(s) pertaining to various BT devices, such as by querying/looking up the device class(es) (major and minor) and/or services class(es) of a particular BT device. For example, if a device (e.g., a mobile device such as a smartphone) is connected to a hands-free BT device (having a BT major class of 'Audio Video' and a BT minor class of 'Hands-Free'), it can be determined that the device (that is, the mobile device) is relatively likely to be present/operating within a vehicle. Based on such a determination, one or more power consuming operations (that may have otherwise been performed, such as in order to determine the context of the device, e.g., using the GPS to determine if the device is moving) need not be performed (or can be performed relatively less often) until the BT connection is determined to have been terminated (and/or relatively shortly thereafter). Alternatively, based on a determination that a device is connected via BT to a desktop computer (having a BT major class of 'Computer' and a BT minor class of 'Desktop'), the device can be determined to be relatively unlikely to be present/operating within a vehicle. Based on such a determination, one or more power consuming operations (that may have otherwise be performed, such as in order to determine the context of the device, e.g., by using the GPS to determine if the device is moving) need not be performed (or can be performed relatively less often) until the BT connection is determined to have been terminated (and/or relatively shortly thereafter).

Moreover, one or more of the referenced determinations can be made based on a determination that a device was moving at the time it is connected to the BT device (as determined, for example, based on GPS, Cell IDs, Cell RSSI, WiFi IDs, Wifi RSSI, accelerometer, gyroscope, etc., as described herein), and a characterization/classification of the BT device to which the device is connected as nomadic based on a determination that the device was moving while it was connected to the BT device (and non-nomadic if the device was determined not to be moving while it was connected to the BT device), and/or by recording or associating the determined context of the device with the BT device.

In another implementation, the BT device(s) that are perceptible to a device (such as a mobile device such as a smartphone) when scanning with its BT radio (other than the BT device that the device is connected to), can be used to determine the context of within which the device is present/operating (it should be understood that the referenced scans for BT devices can be made for discoverable and/or paired BT devices). Moreover, in certain implementations the BT device to which a device is connected (if it is so connected) can be characterized/classified as nomadic/non-nomadic, and such characterization/classification can be saved (locally or remotely) for future use (such as by the referenced device and/or by other devices). It should be understood that such determinations can be made in a number of ways. For example, in certain implementations the nomadicity of a device (such as a mobile device such as a smartphone) can be determined based on/in relation to the nomadic/non-nomadic characterization(s)/classification(s) of the BT devices it perceives (such as by identifying records/information corresponding to such BT devices within a database) and/or making such determinations dynamically based on one or more determinations with respect to one or more combinations of information corresponding to the manufacturers, major and minor classes and services of such BT devices. In doing so, based on a determination that a device perceives, for a relatively/sufficiently long period of time (e.g., in order to filter out/account for non-nomadic devices that a moving device may perceive for relatively short periods of time) one or more BT devices that have been determined to be nomadic, the referenced device can be determined to be in motion, whereas if the device perceives, for a sufficiently/relatively long period of time, one or more BT devices that have been determined to be non-nomadic, the device can be determined not to be in motion.

Moreover, in certain implementations the nomadicity of a device can be determined based on/in relation to how one or more of the BT devices that are perceptible to the device has/have been previously associated, such as with a particular context. In doing so, one or more determinations can be made with respect to the present context of the device. For example, based on one or more instances with respect to which a device perceives a particular BT device (e.g., the BT earpiece of another user) and also determines that the device is not present/operating within a vehicle, upon a subsequent perception by the device of the same BT device, it can be further determined that the device is (again) not present/operating within a vehicle (i.e., even without making such a determination affirmatively).

Moreover, in certain implementations the nomadicity of a device can be determined based on/in relation to an analysis of the collection of other BT devices (i.e., those BT Devices other than the one that the device is connected to) that the device perceives/"hears," such as across successive scans of its BT radio, even if the nomadic/non-nomadic classification of such BT devices is not yet known. If the collection of BT devices across successive scans is determined to be substantially similar (and there are sufficiently many BT devices that are perceptible in such scans), then the device can be determined not to be moving. If, however, the collection of BT devices across successive scans is determined to be substantially dissimilar, then the device can be determined to be moving.

The accuracy of such a technique can be increased/improved based on an analysis of the RSSIs of the BT devices in the collection (e.g., rather than solely/primarily considering the Boolean existence/non-existence of each BT device in successive scans). For example, in a scenario where multiple/successive scans are sufficiently close in time and/or the device is moving relatively slowly, multiple/successive scans of BT devices using the device's BT radio may be determined to demonstrate a substantially similar collection of BT devices, however if some of the RSSI values can be determined to have changed substantially, the device can be determined to be likely to be in motion (i.e., relative to the BT devices).

In another implementation, the speed at which the device is moving can be determined/estimated by determining the distance between (a) the location of the device at the time that its BT radio is used to perform a first BT device scan (e.g., as determined based on the known locations of each of the (presumably non-nomadic) BSSIDs, such as from a third-party database, and using an error minimization technique to calculate the location of the device based on the respective locations of each of the BT devices perceived/"heard" with or without using the RSSIs of such devices, and (b) the location of the device at the time that its BT radio is used to perform a second or subsequent BT device scan, relative to the amount of time that elapsed between the two scans. It should be noted that this technique can be implemented with more than two BT device scans as well.

Moreover, even without location information regarding (non-nomadic) BT devices, the speed at which the device is moving can still be determined/estimated, such as based on the changes identified in the RSSI of the BT devices in multiple/successive scans. For example, a BT Device whose RSSI perceived on a device changes from −30 dB to −90 dB over the course of a short period of time (e.g., 100 milliseconds) can be determined to be likely to be in a vehicle because, given the transmission range of BT Devices, a human is generally un able to move the distance required to change the signal so much in such a short period of time, whereas a BT device whose RSSI on a device is determined to have changed from −30 dB to −31 dB over the course of the same time is relatively unlikely to be in a moving vehicle because, again, given the transmission range of (most) BT devices, a moving vehicle is likely to experience a much larger change in the strength of the signal received than 1 dB, even over a short period of time.

It can be appreciated that most, if not virtually all cell towers are non-nomadic. However, given that their transmission range is generally greater than that of WiFi access points, the fact that a device is connected to a cellular tower may provide relatively less specific context information than a device being connected to a WiFi access point. Nonetheless, information regarding the cell tower to which a device is connected can still be utilized to provide valuable information regarding the context of the device.

For example, if a device is determined to be connected to a cell tower that has been previously associated with a particular context, it can be determined, with a certain degree of likelihood, that the device is present within such context again. For example, it can be determined that a particular device will tend to be connected to a certain cell tower when the device is in the user's home and, generally, a different cell tower when the device is in the user's place of work. Accordingly, if a device is connected to either of these cell towers its context can be determined not to be within a vehicle and thus, if a device is presently connected to either one of them, it can be determined that the device is not present within a vehicle.

The accuracy of this technique can be improved/enhanced by 'learning' (such as via machine learning techniques as are known to those of ordinary skill in the art) the RSSIs of cell towers for different contexts of the device (e.g., not within a vehicle, within a vehicle, etc.), so that, for example, determinations such as (for example): if a device is determined to be connected to Cell Tower 12345 in LAC 123 at an RSSI of between −90 DB and −80 DB, the device can be determined to be likely not to be in a vehicle, can be achieved.

In another implementation, the cell towers that can be perceived/"heard" by the device when scanning with its cellular radio (other than the one that the device is connected to) can be used to determine the context of the device. For example, based on a determination that a device can perceive/hear one or more cell towers that have been previously associated with a particular context, it can be determined, with at least a certain degree of likelihood, that the device is present in such context again. For example, it can be determined that a particular device will tend to be connected to a certain cell tower when the device is present in the user's home and, generally, a different cell tower when the device is present in the user's place of work. Accordingly, based on a determination that a device is connected to either of these cell towers, the context of the device can be determined not to be within a vehicle, and thus, based on a determination that a device is presently connected to either one of them, it can be determined that the device is not present within a vehicle.

Moreover, in certain implementations a context of the device can be determined based on an analysis of the collection/set of other cell towers (i.e., those cell towers other than the one that the device is connected to) that are perceptible to the device, such as across multiple/successive scans of its cellular radio. Based on a determination that the collection/set of cell towers that are perceptible to the device across multiple/successive scans is substantially similar (and there are sufficiently many cell towers that appear in such scans), then the device can be determined not to be moving. If, however, the collection/set of cell towers that that are perceptible to the device across multiple/successive scans is substantially dissimilar, the device can be determined to be moving.

The accuracy/resolution of such a technique can be improved/increased, for example, based on an analysis of the RSSIs of the cell towers in the set/collection (rather than only looking at the Boolean existence/non-existence of each cell tower in multiple/successive scans). For example, based on a determination that the successive scans are sufficiently close in time and/or the device is moving slowly, successive scans of cell towers (such as using the device's cellular radio) may show a substantially similar collection of cell towers, but if some of the RSSI values have changed substantially the device can be determined to be likely to be in motion.

In another implementation, the speed at which the device is moving can be determined/estimated by determining the distance between (a) the location of the device at the time that its cellular radio is used to perform a first cell tower scan (e.g., as determined from the known/identified/determined locations of each of the cell tower IDs, such as from a third party database, e.g., Skyhook, and using an error minimization technique to calculate the location of the device based on the respective locations of each of the cell towers perceived with or without using the RSSIs of such cell towers), and (b) the location of the device at the time that its cellular radio is used to perform a second cell tower scan, relative to the amount of time that elapsed between the two scans. It should be noted that such a technique can be implemented with more than two cell tower scans as well.

Even without location information regarding cell towers, the speed at which the device is moving can still be determined/estimated, such as based on the changes in the RSSI of the cell towers in successive scans. For example, a cell tower whose RSSI on a device changes from −30 dB to −90 dB over the course of a short period of time (e.g., 1 second) can be determined to be relatively likely to be present within a vehicle because, given the transmission range of cell towers, a human is not able to move the distance required to change the signal so much in such a short period of time, whereas a cell tower whose RSSI on a device changes from −30 dB to −31 dB over the course of the same time is relatively unlikely to be present within a moving vehicle because, given the transmission range of (most) cell towers, a device present within a moving vehicle is likely to perceive a relatively much larger change in the strength of the signal received than 1 dB, even over a relatively short period of time.

It should be noted that accuracy of the referenced in-vehicle/not-in-vehicle determination(s) can be further improved when performed in conjunction with other connectivity/"network visibility" information/determinations (e.g., in relation to BT devices, cellular IDs, cellular RSSIs, etc.) and/or from other sensors as described herein.

In another implementation, the conditions pursuant to which a device can be determined to be present within a moving vehicle can be dynamically determined, such as based on the device's environment, such as can be measured/determined by its sensors. For example, if many different WiFi access points (e.g., having different BSSIDs), many cell tower IDs (CIDs), and/or many Bluetooth devices are perceptible to a device, and/or if a GPS so indicates, it can be determined that the device is relatively likely to be present in an urban area, whereas if relatively few (or none) of the referenced wireless signals are perceptible, and/or if a GPS reading so indicates, it can be determined that the device is likely to be in a rural area, and, because vehicles generally move slower in urban areas than they do in rural areas, a threshold speed (or other conditions) at which a trip can be determined to have started (as described herein) can be set/adjusted to be relatively lower in such an urban setting as compared to a rural setting, thereby enabling more accurately determinations in relation to contexts where/when devices are present within vehicles.

Not only can it be determined that, if a device is connected to a non-nomadic AP (e.g., for more than a relatively short time), it can be determined not to be moving, but further determinations can also be performed. In doing so, for example, based on a determination that a device is connected to a nomadic AP it can be further determined that it is relatively more likely the device is moving than if it were (a) connected to a non-nomadic AP, (b) connected to an AP of unknown nomadicity; and/or (c) not connected to an AP. In certain implementations, such determinations can be premised based on an assumption/default that if a device is determined to be connected to a nomadic AP, it can be determined to be is moving. Moreover, in certain implementations, power/resources can be invested to determine, by way of one or more other sensors (e.g., GPS, accelerometer, gyroscope, cellular radio, etc.) whether or not the device is moving.

Moreover, in certain implementations, a device determined not to be in substantially the same location (e.g., as determined by GPS, WiFi APs, cell tower IDs, Bluetooth devices, IP address) (i) at or about the time it connected to an AP as it is determined to be (ii) at or about the time that the device disconnected from the same AP, can be determined to be connected to a nomadic AP. Moreover, in certain implementations, irrespective of whether or not a device is determined to be at substantially the same location (i) at the time it connected to an AP as it was (ii) at the time that it disconnected from the same AP, the nomadicity of such an AP can be determined, for example, via GPS, such as by comparing (i) the GPS coordinates of the referenced device's location at or about the time that the device connected to the WiFi AP with (ii) the GPS coordinates of the device's location at or about the time of the device's disconnection from the same WiFi AP. By way of further example, the nomadicity of such an AP can be determined, for example via WiFi, such as by comparing (i) one or more of the WiFi APs perceptible at the device at or about the time of the device's connection to one of the WiFi APs with (ii) one or more of the WiFi APs perceptible at the device at or about the time of the device's disconnection from the same WiFi AP. By way of further example, the nomadicity of such an AP can be determined, for example via Cell Tower ID, such as by comparing (i) the cell tower to which the device is connected (or more or more of the visible cell towers) at or about the time of the device's connection to the WiFi AP with (ii) the connected cell tower (or one or more sets of the perceptible cell towers) at or about the time of the device's disconnection from the same WiFi AP. By way of further example, the nomadicity of such an AP can be determined, for example via Bluetooth, such as by comparing (i) one or more of perceptible Bluetooth devices at or about the time of the device's connection to the WiFi AP with (ii) one or more of the visible Bluetooth devices at or about the time of the device's disconnection from the same WiFi AP. By way of further example, the nomadicity of such an AP can be determined, for example via IP address, such as by comparing (i) the IP address of the device shortly before the time of the device's connection to the WiFi AP with (ii) the IP address of the device shortly after/about the time of the device's disconnection from the same WiFi AP.

In addition to, or instead of, the previously described technique(s) (which encompass techniques for determining nomadic WiFi APs), a WiFi AP can be determined to be non-nomadic based on a determination that the location of the connected device at the time it was connected to the AP is substantially the same as its location at the time that it disconnected from the same AP.

In addition, the longer (shorter) the period of time between the connection and the disconnection (or the length of time that the device remains connected without disconnecting), such as in the above referenced scenarios, the greater the likelihood that the AP that the device was connected to was non-nomadic (nomadic). For example, a device determined to be continuously connected to an AP for 10 hours can be determined, on average, to be relatively more likely to be connected to a non-nomadic AP than a device determined to be connected to an AP for only 10 seconds.

It should be noted that the notion/concept/aspect of a 'substantially same' location (as referenced herein) can be determined, for example, relative to the transmission range of an AP. For example, it can be appreciated that certain APs can have a relatively wide transmission range (e.g., a WiMax AP), and in such a case it is possible that, even though the location at the time of connection and the location at the time of disconnection may be determined to be relatively far apart, the AP is actually non-nomadic. As such, in one implementation, the techniques described herein can be further configured to account for the AP's transmission range(s), as can be identified/determined, for example, from/based on the BSSID, manufacturer, etc., of the AP, and/or as can be determined from repetitive crowd-sourced connection/disconnection locations, such as using one or more of the techniques described herein. Using such techniques, WiFi APs can be determined to be nomadic or non-nomadic using "crowd-sourcing" techniques. For example, message(s) can be sent from user devices to a server indicating (a) time, (b) conditions (pertaining to GPS, WiFi, cellular, Bluetooth, IP addresses, etc.) at or near the time of connection to the WiFi AP, and (c) conditions at or near the time of disconnection from the WiFi AP. It should be noted that, in certain implementations, devices can also maintain and update nomadic/non-nomadic AP information locally.

It should be noted that similar/related techniques can be employed in order to determine whether other transmitters (e.g., Bluetooth devices, cellular stations, etc., and others currently existing or to be introduced in the future) are nomadic or non-nomadic.

In certain implementations, the state of the device's display screen, keyboard and/or the presence of a device user (as determined, for example, based on an absence/removal of a key-guard/lock on the interface of the device, proximity sensed, etc.) can be used to determine whether and/or how intensively (e.g., based on sampling rate, duty cycle, how much power can be consumed, etc.) device resources should be used to determine the context of the device (e.g., to determine if the device is present within a moving vehicle, determine the in-vehicle role of its user, etc.), and/or to provide other functionality, with or without taking into account the device's battery level, rate of battery level depletion, etc.

For example, if the device display screen is determined to be off (and/or applications with which the user can interact or receive information from even when the device screen is off (e.g., an already connected call) can be determined not to be running or are restricting the application from providing such functionality), the power consumption of the device can be reduced (in light of the fact that the device, in its current state, cannot serve as a distraction to a driver) by reducing or eliminating some or all of its energy intensive operations (e.g., GPS calls) such as those used to make context determinations (e.g., in-trip determinations, in-vehicle role determinations), as described herein. For example, upon determining that the screen is off, the GPS can be queried once every 5 seconds (or not at all), while when the screen is on, the GPS can be queried once per second.

In one implementation, the device can be configured to maintain itself in a low power consumption state in which much of, or substantially all of, the device's context information gathering can be suspended for as long as the screen is off. Such techniques can be advantageous in scenarios where the context of the device can be promptly determined when the screen is turned on (or a user is present). For example, one manner in which this can be done is by turning the GPS on upon determining that the screen is turned on. The latency associated with such a technique can be reduced by not turning the GPS radio fully off when the screen turns off, or by maintaining/"remembering" certain information that can that reduce the TTFF (time to first fix) of the GPS radio when it is next turned on, such as is known to those of ordinary skill in the art.

By way of further example, successive scans of available/perceptible networks/devices (WiFi, BT, Cell, etc.) can be performed (e.g. periodically) and the results maintained/recorded. Upon determining that the screen is turned on, the scan results just prior to and just after the device screen is turned on can be processed/used to determine whether or not the device is in motion (and can also be processed/used to determine/estimate the speed at which the device is moving). Moreover, the accuracy of the referenced technique can be improved by monitoring (e.g., with a relatively low power consumption, such as at a low duty cycle) and thereby determining in advance which of the various techniques are likely to be useful/effective/accurate, in light of the determined context of the device. For example, the device can test/determined, at various intervals while the screen is determined to be off, whether the described Wifi scan technique is likely to be applicable/accurate within the area in which the device is present (e.g., rural vs. urban). If it is determined that the referenced Wifi scan technique is not likely to be effective/available, it can be determined that another technique (e.g., one entailing higher energy expenditure) may be required in order to accurately determine the context of the device (and can be employed, for example, when the screen is turned on), or it may choose to suspend the use of determinations based on screen state altogether, e.g., until WiFi scans can provide relevant/accurate information again.

In another implementation, a determination that a device is connected to a power source can further indicate the hands-free state and/or in-vehicle location of the device. For example, in a scenario where a passenger is present in a car, a device determined to be connected to a power source can be determined to (a) be relatively more likely to be operated by a driver than by a passenger (because a vehicle is more likely to have a power connection that is compatible with respect to device operated by a driver than a device operated by a passenger, and (b) is relatively more likely to be positioned in close proximity to a driver than a passenger (in light of the near-driver location of some power sources, e.g., a device cradle/dock having a power connection).

In another implementation, based on a determination that a device is continuously (or substantially continuously) connected to a power source since before (or sufficiently soon after) it was last disconnected from a WiFi connection/AP (nomadic or non-nomadic), the device can be determined to be in the same location/context (e.g., within a vehicle, not within a vehicle, etc.) in which it was in when it was last connected to Wifi. In certain implementations, the accuracy of such techniques can be improved so that the device's current location and/or context can be determined based on the location and/or context determined at the time that the last WiFi access point disconnected, based upon whether the WiFi access point is nomadic or non-nomadic. For example, in a scenario where the last WiFi access point to which the device was connected was determined to be a non-nomadic access point, the location of the device and its context (e.g., barring other factors/information) can be determined to be unchanged, whereas upon determining that the last WiFi access point to which the device was connected was a nomadic access point, then, (barring other factors/information), its context (e.g., within vehicle) can be determined to be unchanged, while its location cannot. In certain implementations, the accuracy of this technique can be further improved by providing for/requiring that the device has be determined to be continuously (or substantially continuously) connected to a power source at least a certain amount of time before it was last disconnected from a WiFi connection (in doing so, a use case where a user left his home and got into his car in the driveway while still within range of her home WiFi and connected the device to a power source in the car before losing connection with the home Wifi can be addressed).

In another implementation, if a device is determined to be connected to a power source during the time that it has been determined to be in a trip, then, for as long as the device remains connected to such power source (or an alternative power source, provided, for example, that the device is not unplugged from power for more than a certain period of time, e.g., the time it might take someone to switch between a vehicle power source and an office or home power source), it can be determined that the device is highly likely to still be within a trip. In so determining, many of the power expensive/intensive operations that may otherwise be utilized by the device to determine the context of the device can be curtailed/suspended (e.g., checking GPS to see if the device is still present within a trip).

To the extent that the characteristics of the power source can be determined pursuant to the techniques described herein (or elsewhere), the determination as to whether the device is still connected to power in a vehicle can be made relatively more easily/efficiently.

In addition, when a device is determined to be connected to power, and it is nonetheless determined that it should periodically re-detect whether the device is in a trip or not, the efficiency of such re-detection can also be improved (and can consume less power) because differentiation between moving in a vehicle and certain other states (e.g., walking) which are highly unlikely when the device is connected to power, may no longer be necessary.

In another implementation, upon determining that a device is present within a trip and connected to a power source, it can be advantageous to determine that a trip has ended so that, upon determining that a trip has ended, the device can be used by a user (i.e., without restriction) without having to disconnect the device from the power source (e.g., in a scenario where the vehicle is parked in a parking lot at the end of a trip with the device still being connected to power, and the user may want to send a text). This can be achieved, for example, by sampling one or more of a number of sensors and/or inputs (e.g., GPS, accelerometer, WiFi BSSIDs and/or RSSI, Cell Tower IDs and/or RSSI, BT BSSID and/or RSSIs) to determine if the device is in motion. In certain implementations, such sensors/inputs can be sampled at sampling rates relatively lower than would be used if the power connection was not available and/or used to make contextual determinations (thereby reducing power consumption). Further, the sensors/inputs can also be sampled at duty cycles relatively lower than those that would be used if the power connection was not available and/or used to make contextual determinations, thereby reducing power consumption.

It should be noted that the techniques described herein with respect to reducing power consumption are still applicable in scenarios in which the device is connected to a power source because, for example, if a device battery is not near full and the time the device is present within a vehicle is the only time a user has to charge the device, then being able to give the battery the best charge possible (i.e., by reducing power consuming activities) can be advantageous.

Once the device is determined to no longer be connected to a power source for a sufficiently long period of time, the techniques described herein can be employed to determine if the device is still within a trip or not.

In additional implementations, the techniques described herein can account for whether the device is connected to a powers source, the device's current battery level and/or rate of battery level depletion, etc., in selecting which contextual determination techniques to use and/or how to use them (e.g., in relation to sampling rate, duty cycle, etc.). For example, upon determining that a device battery is fully or mostly charged, sensors can be sampled more liberally, whereas upon determining that the device battery is low, sensors can be sampled on a more limited basis/more frugally. For example, when a device is determined to be connected to a power source, its GPS can be sampled more frequently, whereas upon determining that the device is not connected to a power source, its GPS can be sampled relatively less frequently (or not at all). Such techniques can also be employed/extended to other sensor(s), e.g., accelerometer, WiFi scans, Cell tower scans etc.

In certain cases, it may be advantageous to use some combination of the techniques described herein to improve the context determination accuracy and/or the associated power consumption.

Many of the context determinations described herein that employ techniques to use information in or related to network signals (e.g., WiFi access points, BT Device and cell towers) can be improved with better/more accurate information as to the magnitude of the power transmission of such signals. For example, for the power transmission level at which a WiFi access point, a BT device or a cell tower emitted a signal can be used to determine/estimate speed more accurately. Based on the fact that, for example, the RSSI of a BT device that transmits at 2.5 mw (Class 2) has changed from −90 dB to −80 DB in 1 sec., it can be determined that the device is moving more slowly (relative to the BT device) than if the BT device transmits at 100 mw (Class 1).

In certain implementations, a device can allow simultaneous connection to one or more networks of the same and/or different technologies. The techniques described herein can be adapted to such settings (e.g., various voting techniques) using methods known to those skilled in the art.

In any/all of the techniques described herein, it may be advantageous to incorporate a "healing" mechanism whereby periodically checks can be performed to determine/confirm that erroneous determinations have not been made (and/or that the device is operating in an incorrect state). For example, even when a device is connected to a power source continuously since a sufficiently long time before the last time it was last disconnected to WiFi, the device can be periodically checked (e.g., at a lower sampling rate/duty cycle than it might otherwise be checked at) to further determine that it is not in a trip.

One or more of the techniques described herein can be implemented in an API that can be used by other applications running on/in relation to the device to provide such applications with accurate context information in a manner that is power efficient for the device. For example, a navigation application that wants to prevent a driver from the distraction of inputting a destination while driving but wants to permit a passenger to do so, can query such an API as to whether the device is (a) present within a trip and/or (b) is being operated by a driver or a passenger. By way of further example, using such an API, a navigation application (e.g., Waze) can be configured to turn itself on or off automatically (with or without giving the user a chance to override), based on whether the device is determined to be within a trip or not (and the device can expend relatively little power to so determine). In another example, a telephony application (native or otherwise, e.g., Viber, Skype, etc.) and/or a texting application (native or otherwise, e.g., WhatsApp) running on the device can determine whether or not to allow incoming and/or outgoing calls based upon the in-trip and driver/passenger information/determination(s), as can be provided by the referenced API.

In certain implementations, one or more aspects of the techniques/technologies described herein can be configured in relation to a determination of a likelihood that a user associated with a device is going to be in a trip. It should be understood that such a likelihood can, for example be determined/estimated based on one or more inputs, factors, data elements, etc. (e.g., time, location, calendar information, user history, user or supervisor preference for tradeoff between latency, accuracy and power, etc.), such as those that may pertain to all users in a given population, pertain only to a segment of such users (e.g., sex, demographic, location), and/or or pertain to a particular individual user (e.g., calendar information, historical user behavior, etc.). For example, based one or more determinations (such as those corresponding to a particular context, as computed, for example, based on one or more on the referenced inputs, factors, data elements, etc.) relatively more resources (e.g., battery power, processing power, sensors, etc.) can be employed, activated, and/or otherwise dedicated towards one or more determinations pertaining to whether a user is/was performing a certain activity (e.g., present/traveling within a moving vehicle) during or near rush hour (as determined based on data pertinent to an entire population), during or near the time children are driving/being driven/traveling to school within a certain neighborhood (as determined based on data pertinent to a particular population segment) and/or before a meeting scheduled within the user's calendar (as determined based on data pertinent to the individual user)—in order to determine/identify such activity more accurately (by utilizing the additional resources referenced above) and/or with less latency, with respect to one or more of the referenced context(s). Moreover, a comparable configuration can also be employed to enable the usage/expenditure of relatively fewer resources in other context(s) to determine whether the same user was performing such an activity at a time when (s)he can be determined to be relatively less likely to do so, e.g., in a moving vehicle in the middle of the night.

It should also be noted that, as noted above in detail with respect to FIG. 5, in certain arrangements, the processor 110 executing one or more of software modules 130, including, preferably, determination module 170, can transform an operation state of mobile device 105 based in whole or in part on the one or more determination factor(s), such as the probability computed at step 630. This operation can be further appreciated when employed in conjunction with a determination of an in-vehicle role of a user of mobile device 105, such as that depicted in FIGS. 2A-C and described in detail above. For example, in certain arrangements, upon determining (preferably to a certain minimum probability) that a mobile device 105 is under the control of a driver of a vehicle (such as by processing the inputs from accelerometer 145A and gyroscope 145B of mobile device 105 against those of other mobile devices 160 within the same vehicle, thereby identifying the driver of the vehicle, as described in detail herein), it can then be further determined whether mobile device 105, which has been determined to be under the control of a driver, is being operated in a handheld state (generally prohibited in most places) or in a non-handheld state (generally permitted). Accordingly, in such an arrangement (where mobile device 105 has been determined to be under the control of a driver and is being used in a handheld state), a transformation (substantially similar to that described in detail above with respect to step 240) can be employed In such a scenario, processor 110 can coordinate various transformations and/or adjustments to the operation(s) of mobile device 105, as described in detail above with respect to step 240. As also noted above, in certain arrangements various of the referenced transformations can be employed only when either one or both of the probabilities pertaining to the user role of the user of mobile device 105 is a driver and/or the handheld state of mobile device 105 is handheld meet and/or exceed a certain minimum threshold.

Moreover, in certain implementations, a mobile device 105 that is positioned in a cradle or dock (whether a 'dumb' cradle that simply holds a device or a 'smart' cradle that provides power and/or other connectivity to a device) that has not already been authenticated to be operated by a user that is a passenger (such as in the manner described in detail herein) can be configured to employ a particular restriction and/or set of restrictions (such as those described in detail herein) thereto, such restriction/set of restrictions preferably being different than restrictions that are employed at a device that has also not been authenticated as being operated by a passenger but is not in a cradle. Being that positioning a device in a cradle entails some degree of additional safety in relation to operation of the device on the part of the driver (being that the driver is not holding the device in his/her hand), in addition to the fact that in certain jurisdictions it is permitted to operate mobile devices in certain manners when positioned in a cradle, it can be appreciated that in certain implementations, it can be preferable to implement restrictions that account for these factors. For example, in such a scenario a cradled device can be employed with a restriction that still allows the user to make and/or to receive calls in geographic locations (e.g., a particular state or country) that allow the use of hands-free devices for calling, whereas a comparable non-cradled device can be restricted from even making such calls. It can be further appreciated that in certain implementations, such restriction(s) (and/or any of the other restrictions referenced herein) can be employed, for example, on/at the mobile device, on the SIM card, and/or by the cellular carrier (that is, in relation to the mobile device).

In another implementation, the manner in which a device is being held/oriented (e.g., placed in a dock/cradle, handheld, etc.) can be determined based on a spectral analysis of the frequencies perceived/observed by the accelerometer and/or gyroscope of a device, such as in a manner known to those of ordinary skill in the art. For example, the spectral pattern perceived by the sensors of a handheld device (i.e., a device being held in the hand of a user) is likely to be identifiably different from that perceived with respect to a device that is placed in a dock/cradle, in that a handheld device will often perceive higher values (e.g., in a range of 3-7 hz).

In another implementation, the manner in which a device is being held/oriented (e.g., placed in a dock/cradle, handheld, etc.) can be determined based on the orientation of the device (for example, as can be measured based on inputs originating at the accelerometer, magnetometer, and/or GPS of the device, such as in the manner described herein), in conjunction with a spectral analysis of the observed/perceived frequencies (such as of the accelerometer and/or gyroscope), as described herein.

It should also be noted that the referenced processing/determining of an orientation of a device based on inputs originating from the accelerometer of the device can encounter noise/interference when such determinations occur within a running or ignited vehicle (i.e., a vehicle having a running engine), as, for example, a running vehicle can impart various forces that are perceptible to the device and/or the sensors of the device and which can cause an accelerometer-measured/determined orientation to change, despite the fact that the actual orientation of the device may not change. For example, a device that is cradled/docked or otherwise held in an 'upright' orientation will generally demonstrate no acceleration on its X and Z axes, while demonstrating an acceleration of 1 g on its Y axis, and the angle of the device, as determined from the accelerometers of the device, is 90 degrees. Accordingly, in a scenario where the vehicle accelerates at 1 g, and the device is oriented such that such accelerations are imparted on the Z-axis of the device, then the acceleration perceived on the Y and Z axes are each 1 g and the pitch angle of the device (as determined based on the trigonometric relationship between the acceleration of its axis) is 45 degrees—whereas the actual pitch angle of the device is 90 degrees.

Accordingly, in certain implementations, one or more inputs originating at one or more sensors of a device can be used to filter out the noise introduced by vehicle acceleration events (as opposed to device-specific acceleration events). In doing so, the accuracy of the various determinations with respect to the orientation of the device can be increased/improved. For example, one or more acceleration events/instances can be detected/identified, such as using one or more other sensors, such as GPS, onboard car sensors, radio (e.g. Doppler, RSSI, cellular towers, WiFi, etc.), server-side techniques (e.g., OAO, TDOA), etc., which can be used to process the data originating from the accelerometer and/or gyroscope of the device in an improved/more accurate manner. By way of illustration, In the referenced example, the GPS sensor of the device can measure/identify a change in speed of the vehicle that can be consistent with the referenced 1 g forward acceleration, and it can be determined that the 1 g acceleration observed with respect to the Z-axis of the accelerometer was present due to the acceleration of the vehicle and not from a change in the actual orientation of the device, and, as such, it can be further determined that the actual pitch angle of the device remains 90 degrees (and not 45 degrees).

It should also be appreciated that in certain implementations, one or more restrictions can be employed at/in relation to a mobile device, based on a geographical determination, as referenced above. That is, in light of differences in laws regulating mobile device usage by drivers in difference jurisdictions, one or more restrictions can be selectively employed at a mobile device based on a determination of the location of the device (e.g., based on inputs received from the GPS). Thus, in a scenario where State A prohibits texting while driving, while State B prohibits texting while driving and talking while driving, the appropriate corresponding restriction (effectively preventing/precluding the mobile device from performing the prohibited operation) can be employed based on the location of the mobile device (as determined by the GPS, cell towers and/or wifi transceivers seen/detected, as is known to those of ordinary skill in the art).

In certain implementations, a device can be determined to be positioned in a cradle or dock based on the level of movement of the device. For example, a device that is held in a cradle will tend to move less than a device that is not held fixed in a cradle—as can be determined based on an analysis of inputs originating at the accelerometer and/or gyroscope of the device, and, for example, the tightness (e.g., standard deviation) of the distribution of accelerometer readings or changes thereto, such as in a manner described herein and known to those of ordinary skill in the art.

Figure 9A:
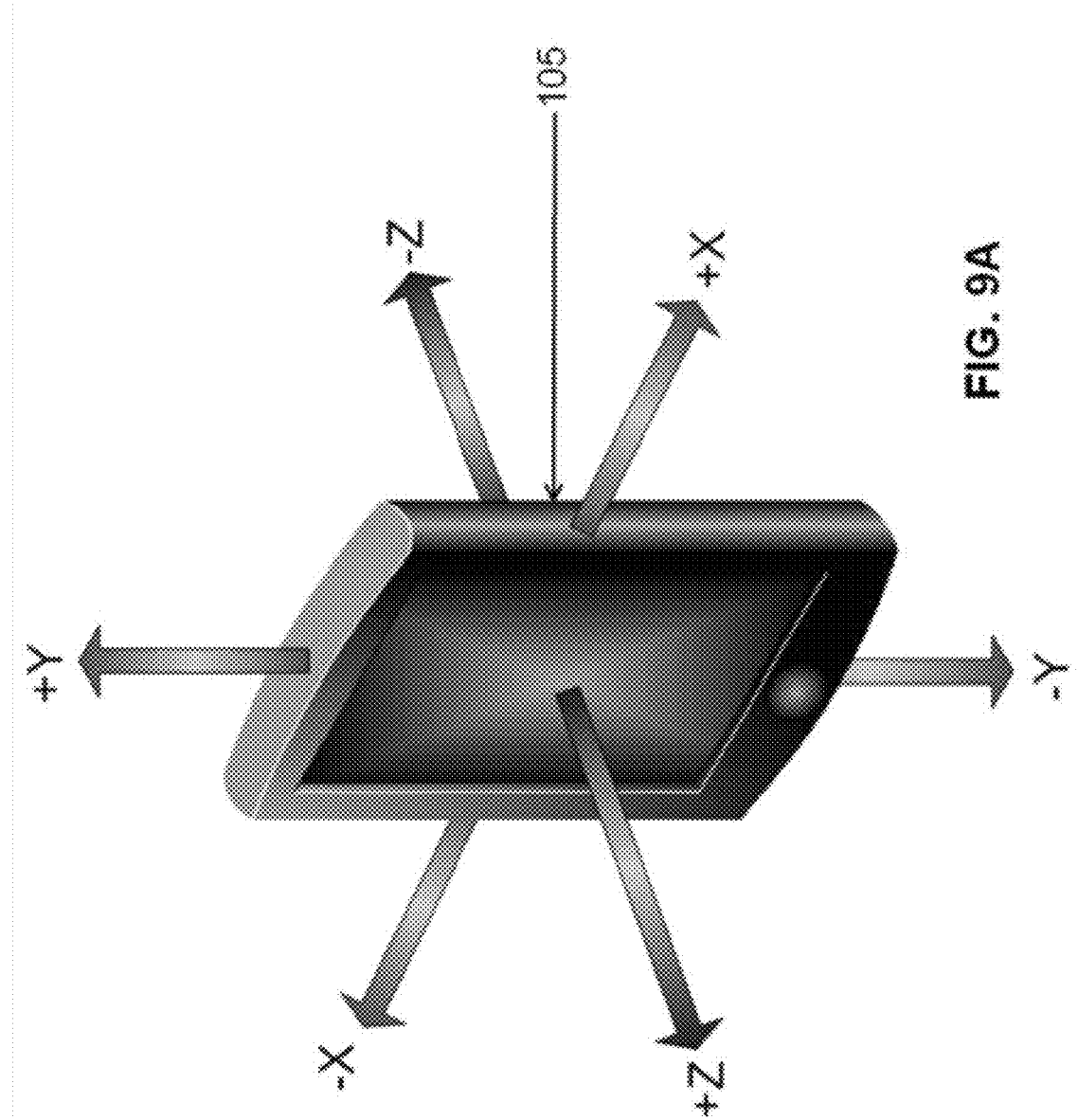
FIG. 9A is a diagram depicting an exemplary relative coordinate system of a mobile device.

In other implementations, the orientation of the device can be used to determine if a device is in a cradle or not. For example, a device that is in a cradle will have a fixed and known orientation (e.g., generally the y-axis accelerometer, as shown in FIG. 9A) will pick-up a large component of gravity and/or the X-axis accelerometer will pick up a large component of gravity, as can be appreciated by those of ordinary skill in the art.

In certain implementations, the presence/existence of connections to the device ('smart' cradles supply power and/or connectivity to the device) can be used to determine if a device is in a cradle or not.

In yet other implementations, the orientation of a device relative to the vehicle in which it is present can be used to determine if the device is in a cradle or not. If such orientation is fixed over some time period, then it can be determined that the device is fixed (e.g., is positioned in a cradle/dock). If such orientation is not fixed (e.g., the device is actually hand-held), then it can be determined that the device is not in a cradle. For example, the orientation of the device relative to the vehicle can be determined at any point in time using (a) the device's GPS bearing, which measures the direction of movement of the device with respect to the Earth (denoted G), regardless of the orientation of the device within the vehicle; and (b) the device's magnetometer/compass, which measures the orientation of the device with respect to the Earth's magnetic field (denoted M), which depends on the orientation of the device in the vehicle and the bearing of the vehicle. For a device whose orientation with respect to the vehicle is fixed (e.g., a device in a cradle), a constant rotation matrix, R, can be found/computed, such that G*R=M, such as in a manner known to those of ordinary skill in the art. However, for a device whose orientation with respect to the vehicle is not fixed (e.g., a hand-held device), such rotation matrix is not constant.

It should also be understood that the identification of a device as being in a cradle/dock, as referred to herein, can be configured/expanded to any device whose position relative to the vehicle's is static and/or any device that is not hand-held.

Various of the referenced implementations and functionalities relating to the cradle/dock status of the mobile device are described in greater detail below, specifically with respect to FIG. 24.

Figure 7:
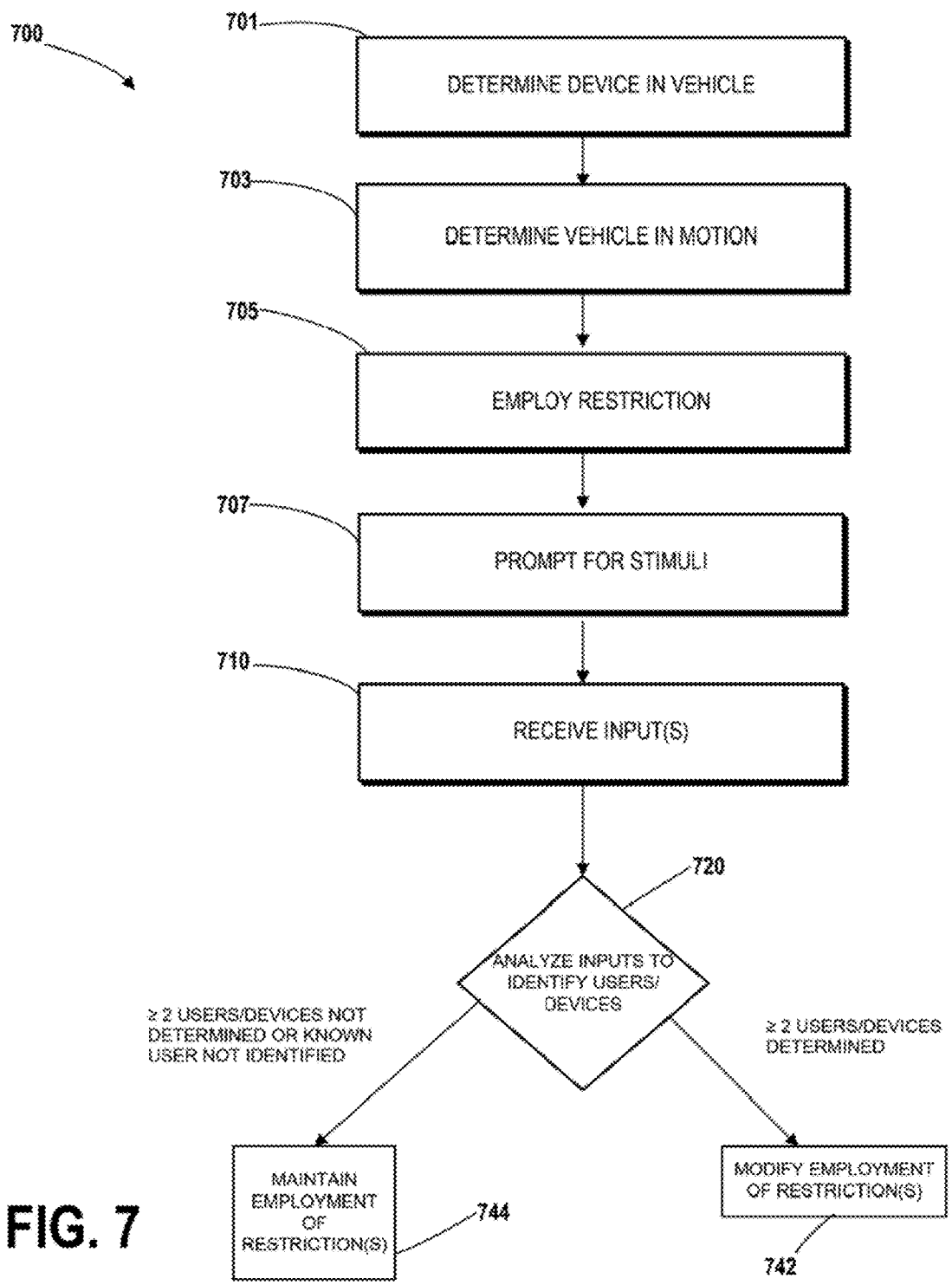
FIG. 7 is a flow diagram showing a routine that illustrates a broad aspect of a method of restricting operation of a mobile device in accordance with at least one embodiment disclosed herein.

Turning now to FIG. 7, a flow diagram is described showing a routine 700 that illustrates a broad aspect of a method restricting operation of a mobile device 105 in accordance with at least one embodiment disclosed herein. As will be described in greater detail below, various of the steps and operations that make up routine 700 share substantial similarities to those described above in connection with FIGS. 2A-C, 3, 4, 5, and 6. It should be noted at the outset that while the following description of routing 700 will be directed primarily to operations occurring at mobile device 105, such description is exemplary and intended for the sake of clarity and consistency. However, it should be understood that any and/or all of the steps in routine 700 can be similarly employed at another device/machine, such as at central machine 168, such as in the manner described in detail above with respect to FIG. 4. Furthermore, the same principle should be understood and appreciated with respect to any and all of the various steps, operations, and/or functions described throughout the present disclosure. That is, while any one of the particular steps, operations, and/or functions are described herein as being performed at and/or upon a particular machine or device (such as mobile device 105, mobile device 160, and/or central machine 168), such description should be understood as being exemplary and/or illustrative and not limiting. Accordingly, it can be appreciated that any and all steps, operations, and/or functions described herein with regard to a particular device and/or machine (such as mobile device 105) should be similarly understood to be similarly capably of employment at another device and/or machine (such as central machine 168), substantially in the manner described herein, without departing from the scope of the present disclosure.

At step 701, processor 110 executing one or more of software modules 130, including, preferably, restriction module 171 determines whether mobile device 105 is present with a vehicle, such as through one or more of the various determination methods described in detail herein.

Upon determining the mobile device 105 is within a vehicle (such as a car, a truck, a van, a motorcycle and a jeep.), at step 703, processor 110 executing one or more of software modules 130, including, preferably, restriction module 171 determines whether the vehicle is in motion, such as through one or more of the various determination methods described in detail herein.

At step 705 where processor 110 executing one or more of software modules 130, including, preferably, restriction module 171, employs a first restriction at mobile device 105 and/or in relation to mobile device 105. As will be described in greater detail herein, the first restriction is preferably one or more instructions that dictate at least one operation state of the mobile device. Examples of such restrictions include but are not limited to: instructions that disable a particular feature or functionality of a mobile device 105 (such as the ability to type text), instructions that disable multiple features or functionalities of a mobile device 105 (such as the ability to launch certain applications and the ability to receive text messages), and instructions that functionally "lock" mobile device 105 by effectively disabling many or all of the functionalities of the device. It should be understood that in many arrangements, the referenced first restriction is preferably a default restriction. That is, in such arrangements the first restriction is employed by default, such as upon powering on and/or activating mobile device 105. It should be appreciated that in certain arrangements such restriction can be employed in relation to mobile device 105, such as by a central machine 168, such as in the manner disclosed in detail herein, for example with respect to FIG. 4. By way of illustration, the referenced restriction can be imposed by a communications provided (which preferably operates central machine 168) to prevent transmission of one or more communications (e.g., SMS messages) to a mobile device 105, until an identification/determination is made, such as identifying that two or more users are in a vehicle, such as in the manner disclosed in detail herein.

It should be understood that in various arrangements, including many of those described herein, the various restrictions employed at mobile device 105 are directed towards configuring mobile device 105 in such a manner that operation of and/or interaction with the device is difficult, inconvenient, and/or impossible (that is, it can be said that operation of mobile device 105 is impeded) for a user who is also simultaneously operating a vehicle. At the same time, such restrictions are also preferably configured to create minimal, if any, difficulty and/or inconvenience when operated by and/or interacted with by a user who is not simultaneously operating a vehicle. In other words, it can be said that such restrictions preferably impede operation of the mobile device by a user who is a driver more so than they impede operation of the mobile device by a user who is a passenger. As such, it should be further understood that in certain arrangements it can be preferably for mobile device 105 to initially determine that the device is present within a vehicle (such as through one or more of the various determination methods described in detail herein) prior to employing such a first restriction. Accordingly, it can be further appreciated that the various steps and operations described herein with reference to FIGS. 7-8 can be further implemented, in certain arrangements, in conjunction with one or more of the various other methods and systems described in detail herein, such as those described with reference to FIGS. 2A-6. Furthermore, it should be recognized that any one or more of the various steps, operations, routines, functions, and/or figures disclosed herein can preferably employed in conjunction within any one or more of the various steps, operations, routines, functions, and/or figures disclosed herein. Thus, for example, the various restrictions described in conjunction with FIG. 7 can be employed in conjunction with the various determination operations described above. By way of example, one or more of the referenced restrictions can be employed before the occurrence of and/or in response to one or more of the determinations described in detail herein.

It should be understood that in various arrangements, at least one of the one or more restrictions that dictate the at least one operating state of mobile device 105 are determined based on inputs originating at least one of the various sensors 145, etc., as described in greater detail herein.

At step 707, mobile device 105 preferably prompts one or more users to initiate and/or provide one or more stimuli that can be received as inputs at mobile device 105. By way of example, mobile device 105 can prompt each of the one or more users in a vehicle to repeat a particular word or series of words projected by mobile device 105. It should be understood that in certain arrangements such a prompt can request for the words to be repeated sequentially while in other arrangements such a prompt can request for the words to be repeated simultaneously, while in yet other arrangements the timing of the repetition is of no consequence. It should be appreciated that such prompting can request practically any stimulus that can be received and/or analyzed as an input in the manner described herein.

At step 710, processor 110 executing one or more of software modules 130, including, preferably, restriction module 171 receives at least a first input and a second input (e.g., the referenced stimuli), in the manner disclosed in detail herein. As has already been described in detail herein, each of the first input and the second input preferably originate at one or more of sensors 145, software modules 130, user interface 172, operating system 176, and/or communication interface 150, though it should be understood that the first input and the second input need not originate from the same source.

It should be understood that, as referred to herein, such inputs are referred to as originating at one or more of sensors 145, software modules 130, user interface 172, operating system 176, and/or communication interface 150 in the sense that such inputs are initially perceived—from the perspective of mobile device 105—at such components. However, it should be recognized, as will be appreciated in connection with the following examples, that in many arrangements and scenarios such inputs (and/or the stimuli and/or phenomena that trigger them) can ultimately originate at sources other than at various components of mobile device 105. Accordingly, it should be appreciated that within the context of the discussion of the subject matter encompassed by FIG. 7, various inputs are referred to as originating at a particular component in the sense that they originate from such a component with respect to mobile device 105. However, it is acknowledge that such inputs can, in turn, have ultimate origins beyond mobile device 105 itself, such as from the voice of a particular user and/or from an external system or device, as illustrated below.

For example, a first input corresponding to the audio tones of the voice of a first user can be received at microphone 145D, and a second input corresponding to the audio tones of the voice of a second user can also be received at microphone 145D. It should also be understood that in certain arrangements, one or more of the various inputs can be received at and/or originate from a source external to mobile device 105, such as vehicle data system 164 and or another mobile device 160. By way of example, vehicle data system 164 can provide an input to mobile device 105 (preferably received via communication interface 150) indicating the weight measured on one or more seats of a vehicle, and/or the usage of seat belts at one or more seats of a vehicle, etc—which can in turn, indicate that more than one user is within a vehicle. By way of further example, a detection of mobile device 160 within a vehicle (using one or more of the methods described herein) can also indicate that more than one user is within a vehicle.

At this juncture, it should be noted that while the first input and the second input have been described herein as being discrete inputs, such description is merely exemplary and for the sake of clarity and illustration. Accordingly, while in certain arrangements the first input and the second input are separate inputs in the conventional sense—that is, inputs that originate at two independent sources, in other arrangements the first input and the second input are actually aspects found within a single input. For example, a single audio input (such as an audio recording) that contains two distinct voices (such as the voices of a first user and a second user) can be processed (in the manner described herein) to identify such distinct voices within the single audio input, which are understood to be a first input and a second input within the context of the present disclosure.

Then, at step 720, processor 110 executing one or more of software modules 130, including, preferably, restriction module 171, analyzes the first input and the second input. In doing so, the presence of at least one of two or more users and/or two or more mobile devices can be determined, such as a determination of the presence of a first user and the presence of a second user, such as in the manner described in detail herein. By way of illustration, continuing with the example referenced above at step 710, the first and second inputs (that is, the audio tones of the voices of the first user and the second user) can be analyzed to identify an audio signature for each of the respective inputs, in a manner known to those of ordinary skill in the art, and such audio signatures can then be compared to determine if they are substantially similar and/or identical (indicating that both inputs likely originate from the same source, i.e., the same user) or substantially dissimilar (indicating that each of the inputs likely originate from different users). Thus, upon identifying that first input (here, the voice of the first user) is substantially distinct from the second input (here, the voice of the second user), it can be concluded at minimum that the device 105 is in the presence of (if not in close proximity to) a first user and a second user. Additional illustrations of such inputs to determine the presence of at least one of two or more users and/or two or more mobile devices are presented below at EXAMPLE 4.

Upon determining that mobile device 105 is in the presence of at least one of (a) two or more users and/or (b) two or more mobile devices, such as by determining the presence of at least a first user and a second user, at step 742 processor 110 executing one or more of software modules 130, including, preferably, restriction module 171 modifies an employment of at least one restriction such as the first restriction. That is, being that a determination (at step 720) that the device is in the presence of at least two users necessarily indicates that at least one of such users is not a driver of a vehicle, this conclusion can preferably trigger and/or initiate the modification of the first restriction. In certain arrangements, such modification can include the employment of a second restriction, strengthening of the first restriction, and/or the easing of the first restriction. In one arrangement, such a second restriction can include one or more instructions that dictate one or more operational states of the mobile device 105 with respect to one or more of the various sensors 145 of the device. That is, as noted above, such a restriction can configure mobile device 105 to operate in a manner that is relatively difficult/inconvenient for a driver while being relatively unobtrusive for a passenger. Put differently, it can be said that such restrictions impeded operation of mobile device 105 by a user who is a driver more so than the same restrictions impede operation of a mobile device 105 by a user who is a passenger. Examples of such restrictions include but are not limited to: requiring that the device only operate in 'landscape' mode (which generally requires two hands for efficient interaction/navigation—a demand that is relatively simple for a passenger to comply with but relatively difficult for a driver, who needs at least one hand to steer the vehicle, to comply with), requiring that the device operate only at certain orientations (as detected by one or more of sensors 145, such as gyroscope 145B, accelerometer 145A, GPS 145C, and magnetometer 145E) such as a completely upright orientation which is relatively simple for a passenger to comply with but which is inconvenient for a driver who will not find such an orientation as comfortable while driving and who will generally wish to hold the device at alternate orientations in order to obscure the device from the view of law enforcement officials), and that the device not operate in a manner/pattern that is consistent with that of a driver (such as the various in-vehicle role determinations described in detail herein). It should be noted that although such restrictions are generally effective, on average, in impeding operation of a device by a driver more so than a passenger, it is recognized that certain individual drivers may not find such restrictions particularly inconvenient, while other passengers may find them highly inconvenient. Nevertheless, on average, such restrictions impede the operation of mobile device 105 by drivers more so that they impede such operation of mobile device by passengers.

In the event that the presence of at least one of (a) two or more users and/or (b) two or more mobile devices, such as the presence of a first user and a second user, are not determined and/or one or more users not in the set of users known to be users of the mobile device, is not determined (at step 720), at step 744 processor 110 executing one or more of software modules 130, including, preferably, restriction module 171 maintains the employment of the first restriction.

In certain implementations, upon detecting/determining that a device is present/operating within a moving vehicle, one or more input methods associated with such a device (e.g., keyboard, voice commands, gesture inputs, etc.) can be modified or changed, such as to different input method(s) that selectively restrict one or more aspects of the functionality the device. For example, based on a detection/determination that a device is present/operating within a moving vehicle, an on-screen keyboard can be replaced (or altered) such that the keyboard can only receive a single input/character during a defined time period (e.g., every 15 seconds). Alternatively, such input method(s) can be selectively altered or replaced in relation to instances during which one or more particular application(s), such as those identified as being distracting (e.g., texting, e-mailing, web browsing, social networking, etc.), are executing at the device.

In another implementation, a determination can be made as to when the device is present/operating within a moving vehicle and, based on such a determination, the device can initiate an operation mode that can selectively restrict one or more functionalities of the device ("Driver Mode"), such as in the manner described herein.

Figure 42:
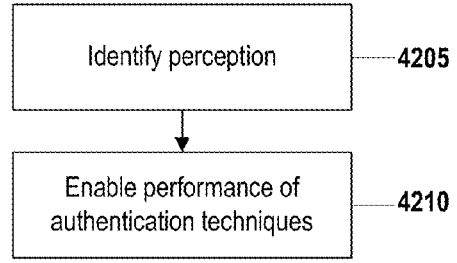
FIG. 42 is a flow diagram showing a routine that illustrates aspects of one or more methods, such as those described in relation to one or more embodiments described herein.

FIG. 42 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 4205 a perception of one or more signals can be identified, such as in relation to a first device. In certain implementations, the one or more signals can originate at one or more other devices. At 4210, a performance of one or more authentication techniques can be enabled, such as in relation to the first device. In certain implementations, a performance of one or more authentication techniques can be enabled based on an identification of the one or more signals in relation to the first device.

When one device is in 'Driver Mode,' one or more other devices (such as those executing a comparable application capable of selectively restriction a device) can project or otherwise emit or provide a signal or notification (which, in various implementations, may be audible, inaudible, via Bluetooth, etc.) (referred to herein as a "Special Signal"). In certain implementations, such "Special Signals" can be configured such that they are perceptible only by other devices present within the same vehicle (as can be achieved by providing such signals at a relatively law power of transmission, such that, in most cases, the signals are unlikely to be perceptible to devices outside of the vehicle). Moreover, such signal(s) can be provided on a continuous and/or periodic basis (whether static, e.g., once every 15 seconds, or dynamic periodicity, e.g., at randomized intervals, at randomized frequencies, and/or in conjunction with randomized content generated by a remote server (such as in order to prevent tampering,).

Having initiated 'Driver Mode' with respect to a device (and/or otherwise restricted such a device) the referenced device can be configured (such as via the referenced 'Driver Mode') to enable an adjustment of such a state, such as changing/transitioning the device to another operational state such as a passenger mode ("Passenger Mode") based on a determination (and, in certain implementations, for as long as) that the device is capable of perceiving a 'Special Signal' emitted by driver device (e.g., a device determined to be operated by a driver, presumably originating from a device within the same vehicle).

In another implementation, a device operating in 'Driver Mode' can be transitioned to another state, such as to 'Passenger Mode' by successfully performing one or more passenger authentication technique(s), such as those described herein.

It can be appreciated that, in light of the fact that most vehicles have only one occupant in them, and such occupant is, by definition, the driver, devices being operated by such solo drivers can be configured to initiate 'Driver Mode' (and remain in such a state) because no 'Special Signal' is perceptible to such devices.

Moreover, in certain implementations, having initiated a 'Passenger Mode' with respect to a device (such as in the manner described herein), such a device can be configured to cease to emit/project the referenced 'Special Signals.'

In certain implementations, information identifying the device that was passenger authenticated (e.g., a device ID such as IMEI), a SIM ID such as IMSI, UUID, telephone number, etc.) and/or the device that enabled such authentication can be collected, time-stamped, GPS-stamped, saved and/or analyzed. In addition, information pertaining to when a passenger device ceased to receive a Special Signal and, therefore, left Passenger Mode (e.g., corresponding to a trip stopping, the driver and passenger separating, the driver turned off his/her device, etc.) can also be stored.

In another implementation, one or more aspects of the referenced information collected over time can be analyzed. In doing so, instances in which one device is used to enable another device to operate in 'passenger mode,' and the device that enabled such operation is then observed to operate in a relatively limited manner (e.g., with respect to calls, texts, data sent/received, contact present or changes thereto, applications run, etc.) outside of emitting a Special Signal, can be identified. Identifying such instances can be advantageous in order to identify drivers who may procure one or more additional devices to "sacrifice" as driver devices so that a second device can be authenticated as a passenger device (such as in the manner described herein) and used freely while driving.

In another implementation, a driver having a device that does not have the software/application capable of configuring the device to project/emit the referenced 'Special Signal' may have the option to (a) download or otherwise obtain a 'lite' version of the software that enables projection/emitting of such a Special Signal (thereby enabling passengers within the vehicle to transition their devices into Passenger Mode, such as in the manner described herein), (b) go to a website that plays a Special Signal, and/or (c) receive a Special Signal over a voice connection (e.g., by calling a phone number that plays a Special Signal).

Moreover, in certain implementations device users can stop the emission of a Special Signal from their devices. In so doing, a passenger can prevent a driver from using his/her device in Passenger Mode (or attempting to).

In public transportation settings/scenarios, the referenced Special Signal can be emitted by and/or amplified by hardware within the vehicle. Alternatively, other devices that perceive a Special Signal can also relay (or "repeat") such Special Signal, thereby increasing its effective range of transmission.

In another implementation, a passenger device can be prompted to request for a driver device to emit a Special Signal, rather than have all devices within a vehicle emitting a Special Signal until they transition into Passenger Mode.

Figure 8:
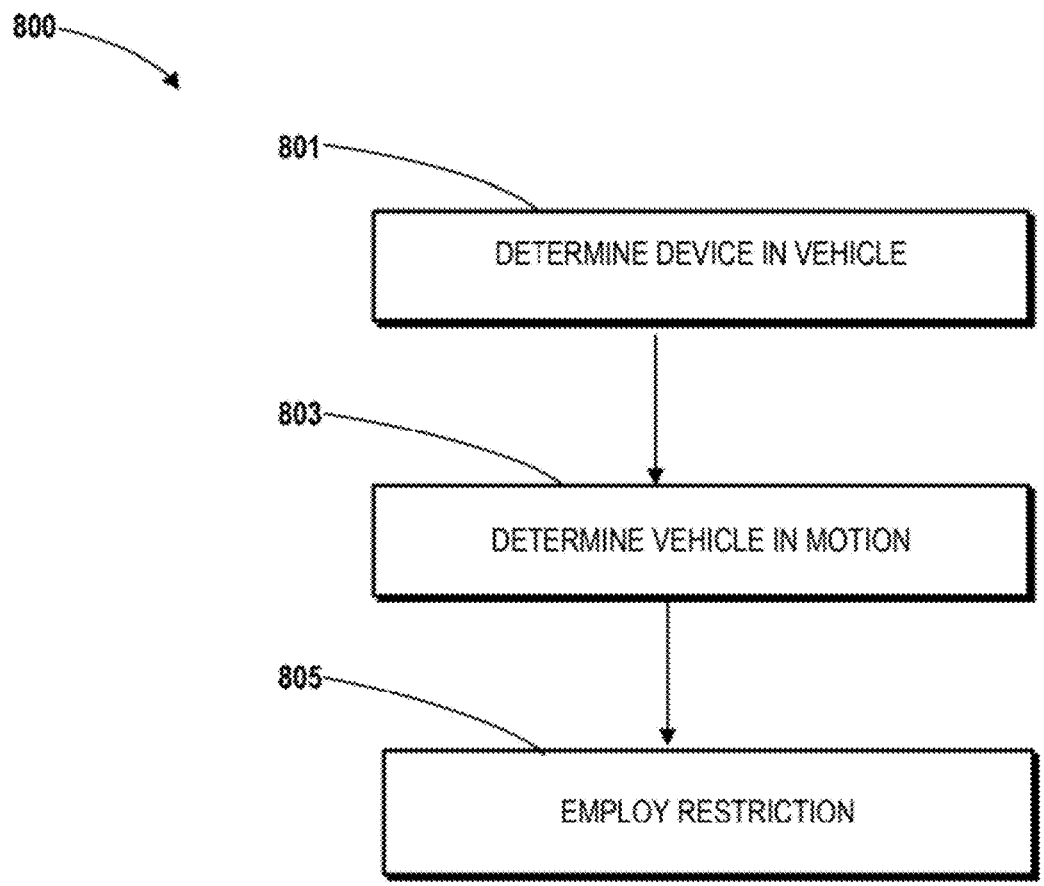
FIG. 8 is a flow diagram showing a routine that illustrates a broad aspect of another method of restricting operation of a mobile device in accordance with at least one embodiment disclosed herein.

Turning now to FIG. 8, a flow diagram is described showing a routine 800 that illustrates a broad aspect of a method restricting operation of a mobile device 105 in accordance with at least one embodiment disclosed herein. As will be described in greater detail below, various of the steps and operations that make up routine 800 share substantial similarities to those described in detail herein.

At step 801, processor 110 executing one or more of software modules 130, including, preferably, restriction module 171 determines whether mobile device 105 is present with a vehicle, such as through one or more of the various determination methods described in detail herein.

Upon determining that mobile device 105 is within a vehicle (such as a car, a truck, a van, a motorcycle and a jeep.), at step 803, processor 110 executing one or more of software modules 130, including, preferably, restriction module 171 determines whether the vehicle is in motion, such as through one or more of the various determination methods described in detail herein.

At step 805, processor 110 executing one or more of software modules 130, including, preferably, restriction module 171, employs one or more restrictions at mobile device 105 and/or in relation to mobile device 105, substantially in the manner described above with respect to step 705. It should be understood that such restriction(s) are preferably configured to impede operation of mobile device 105 by a user that is a driver more so than the restriction(s) impede operation of mobile device 105 by a user that is a passenger, as described in detail herein. Examples of scenarios where the operations of routine 800 can be implemented include teenage drivers (wherein a parent/guardian wishes to employ such restrictions, which make it difficult to operate a mobile device 105 while driver, at all times) and/or phones that are fixed in vehicles, such as car phones (wherein it is always desirable to implement such restrictions). It should be appreciated that in certain arrangements such restriction can be employed in relation to mobile device 105, such as by a central machine 168, such as in the manner disclosed in detail herein, for example with respect to FIG. 4. By way of illustration, the referenced restriction can be imposed by a communications provided (which preferably operates central machine 168) to prevent transmission of one or more communications (e.g., SMS messages) to a mobile device 105, until an identification/determination is made, such as identifying that two or more users are in a vehicle, such as in the manner disclosed in detail herein.

It should be further understood that in certain arrangements, such restriction can be further configured to impede operation of the mobile device, and/or be more likely to be applied to a mobile device used by a driver than to a mobile device used by a passenger. By way of example, consider a scenario where a particular restriction is employed such that if the 'shake' perceived at mobile device 105 exceeds a certain threshold level, SMS messages cannot be sent from the device. It can be appreciated that employment of such a restriction does not impede drivers more than passengers (being that, once employed, it will impede a driver and a passenger equally), however such a restriction is more likely, on average, to be employed for drivers than for passengers (being that drivers, on average, shake their devices more than passengers). Further such examples are provided at EXAMPLE 4.

It should be further understood that, as described in detail above, such restriction(s) can be configured to be applied to a mobile device as used by a first user more so than such restrictions are applied to a mobile device used by a second user. By way of example, such restrictions can be configured to impede a user who uses the mobile device in an unauthorized operation state more so than a user who uses the mobile device in an authorized operation state. By way of illustration, one such example, which is preferably directed to preventing students from using their mobile devices while they are in a classroom setting, can impose a restriction such that the mobile device is only operable and/or functional if the device is held upright and/or at a certain altitude (as can be determined based on one or more of sensors 145, as described in detail herein). In doing so, students will effectively have to hold their mobile devices upright and in a certain conspicuous orientation, such that it will be very difficult for such students to operate their mobile devices inconspicuously during a class, such as underneath a desk. Accordingly, it can be appreciated that such a restriction impedes users (here, students) who use their mobile devices in an unauthorized operation state (that is, for example, during class), which such a restriction does not impede users who use their mobile devices in an authorized operation state (that is, when not in class) to the same degree. It should be further understood that the referenced examples and illustrations are merely exemplary, and that many other such restrictions within the scope of the present disclosure are similarly possible.

Additionally, a device that is located in a vehicle can be used to determine whether the vehicle's engine is on or off. One manner in which this is useful, is when considering that a vehicle that has recently stopped moving, but whose engine is still on, may likely continue its present trip (e.g., stopped at a red light), whereas a vehicle that has recently stopped moving and whose engine is off has likely finished its present trip. Differentiating between these two states in useful, among other reasons, in order to know when usage restrictions on a driver's device should be lifted, such as in the manner described herein.

In one implementation, the device's accelerometer and/or gyroscope and/or magnetometer can be used to determine whether the engine is running or not. For example, the accelerometer and/or gyroscope and/or magnetometer show larger movements and/or movement at different frequencies, when the engine is running as opposed to not running.

In another implementation, the device's microphone(s) is used to determine whether the engine is running or not. For example, the microphones will show signals at different frequencies, including harmonics of the base frequency which can be more easily detected by the microphones used on popular devices, when the engine is running than if the engine is not running.

In yet another implementation, the event of starting or stopping the ignition can be captured by the accelerometer, gyroscope and/or microphone. For example, the magnitude of the acceleration at the time the ignition is started or stopped is considerably larger than the previous and subsequent accelerations in a stationary vehicle.

In yet another implementation that may be particularly useful for electric vehicles, the event of starting or stopping the ignition may be captured by the magnetometer because the magnetic field created by an electric car will change when the car is turned on or off.

It can be appreciated that in certain situations it may be useful (a) to restrict driver devices in vehicles that are temporarily stopped, for example at a stop light (i.e., not moving, but that have been moving recently and whose engines are still on and/or whose ignition hasn't been turned off); but (b) to not restrict device's in vehicles that were just turned on, for example, still in their parking spot (i.e., not moving, and were not moving recently, but whose engines has been started recently).

Additionally, it can be useful to measure the accelerometer reading and/or magnetometer readings across the 3-axes using an orientation-invariant, for example, using the RMS of the accelerations on each of the 3 axes or other techniques known to those of ordinary skill in the art of signal processing and time-series analysis.

Additionally, it should be appreciated that various time parameters can be associated with many of the above methods so as to effectively differentiate between events or states that are recent and ones that are not.

Figure 12:
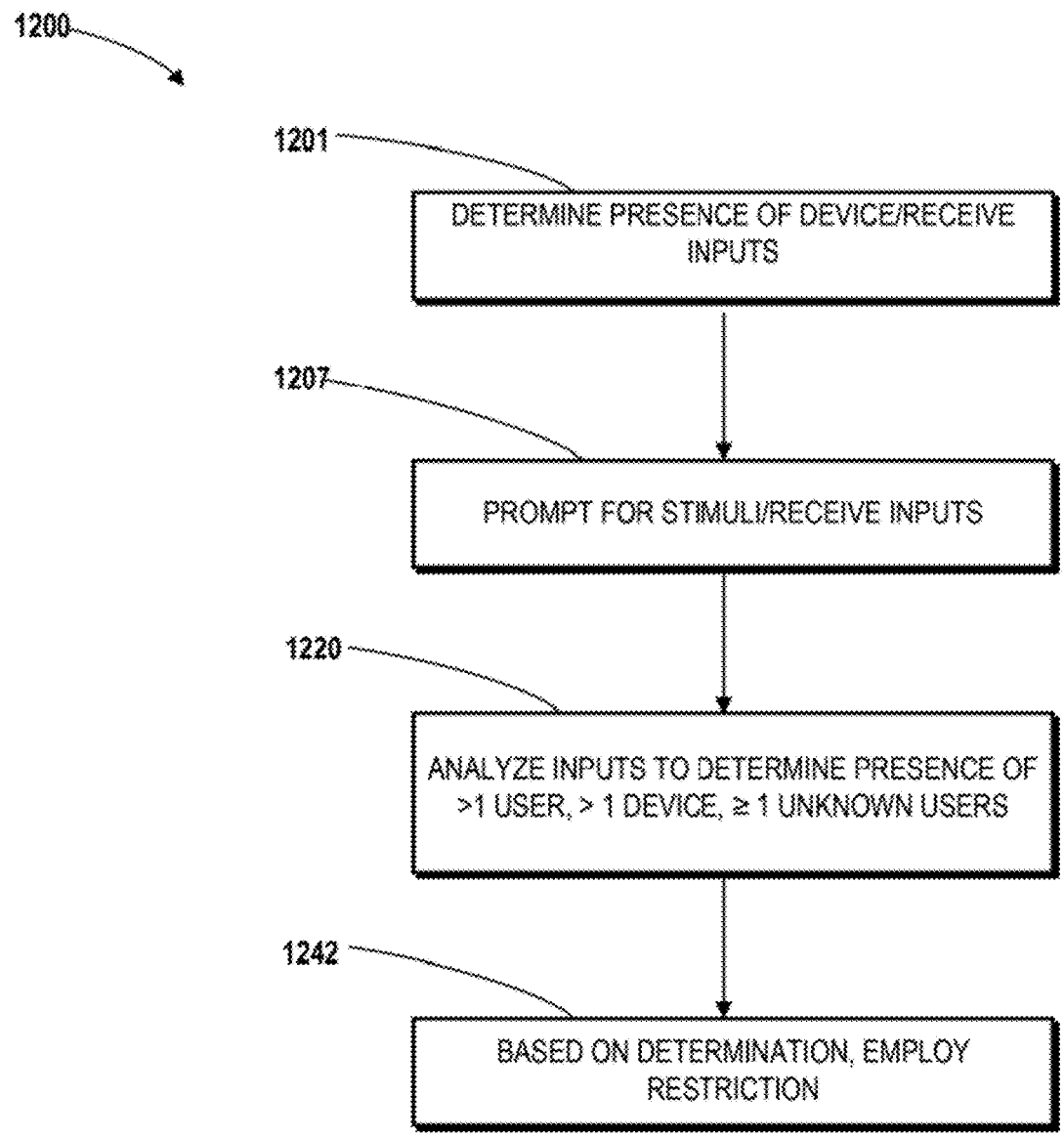
FIG. 12 is a flow diagram showing a routine that illustrates a broad aspect of another method of restricting operation of a mobile device in accordance with at least one embodiment disclosed herein.

Turning now to FIG. 12, a flow diagram is described showing a routine 1200 that illustrates a broad aspect of a method for restricting operation of a mobile device 105 in accordance with at least one embodiment disclosed herein. As will be described in greater detail below, various of the steps and operations that make up routine 1200 share substantial similarities to those described in detail herein.

At step 1201, processor 110 executing one or more of software modules 130, including, preferably, restriction module 171 determines whether a first mobile device 105 is present within a vehicle, and/or receives one or more first inputs from at least one of a vehicle data system 164 and/or at least one of a second mobile device 160, the one or more first inputs pertaining to a presence of the first mobile device 105 within a vehicle, such as through one or more of the various determination methods described in detail herein.

Then, at step 1207, mobile device 105 preferably prompts one or more users to initiate and/or provide one or more stimuli that can be received as inputs at mobile device 105 and/or receives one or more second inputs in response to the prompting, and/or receives one or more third inputs from vehicle data system 164, and/or receives one or more fourth inputs from at least one of the second mobile device 160, all in the manner described in detail herein.

At step 1220, processor 110 executing one or more of software modules 130, including, preferably, restriction module 171, analyzes at least one of the first inputs, the second inputs, the third inputs, and the fourth inputs to determine a presence of at least one of more than one user, more than one mobile device 105, 160, and/or one or more users not in the set of users known to be users of the first mobile device, substantially in the manner described in detail herein.

At step 1242, processor 110 executing one or more of software modules 130, including, preferably, restriction module 171 employs one or more restrictions at a mobile device 105, substantially in the manner described in detail herein.

Figure 13:
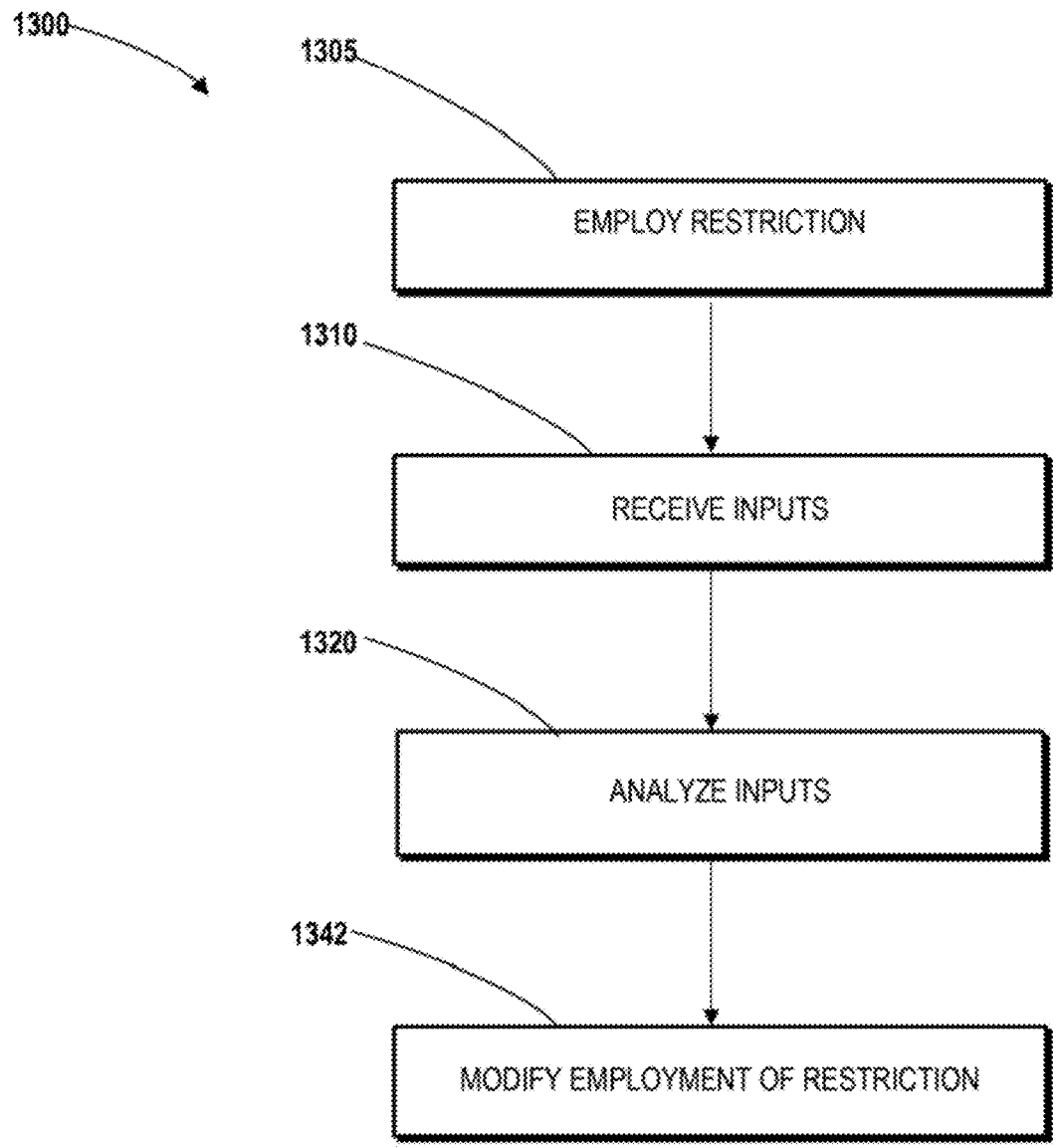
FIG. 13 is a flow diagram showing a routine that illustrates a broad aspect of another method of restricting operation of a mobile device in accordance with at least one embodiment disclosed herein.

Turning now to FIG. 13, a flow diagram is described showing a routine 1300 that illustrates a broad aspect of a method for restricting operation of a mobile device 105 in accordance with at least one embodiment disclosed herein. As will be described in greater detail below, various of the steps and operations that make up routine 1300 share substantial similarities to those described in detail herein.

At step 1305, processor 110 executing one or more of software modules 130, including, preferably, restriction module 171, employs one or more restrictions at mobile device 105, substantially in the manner described above with respect to step 705.

In certain implementations, such a restriction can be employed whereby the device can prompt/require the user is to authenticate that s/he is a passenger in a vehicle (such as a moving vehicle) by performing an action or a set of actions such as a CAPTCHA, a game, a puzzle, lock screen etc., as described in detail herein. It can be appreciated that such authentication can be configured to require sufficient concentration/attention such that the authentication can be difficult to perform by a driver of a moving vehicle, who must concentrate on driving. This authentication can be further strengthened by requiring that (a) in order to complete the action the user must use both hands (for example, by requiring multitouch input, as described in detail herein and illustrated with respect to FIG. 15A), and/or (b) configuring the restriction to require the user to tilt his/her head and/or eyes down or up or right or left (for example, by requiring that the device be held flat, placed in the user's lap or on the seat between the user's legs, in the manners described herein) thereby preventing the user from being able to see the road ahead while performing the authentication, and/or by requiring that the user look directly in to the device, as described in detail herein.

At step 1310, processor 110 executing one or more of software modules 130, including, preferably, restriction module 171 receives one or more inputs, preferably from at least one of the mobile device 105, a vehicle data system 164, and/or one or more other mobile devices 160, substantially in the manner described above with respect to step 710. By way of further illustration, in certain implementations, such inputs correspond to one or more inputs provided by the user to the device in response to an authentication prompt (it should be understood that the term "authentication prompt" as used herein is intended to encompass one or more prompts, instructions, and/or directions that inform a user in some manner as to the manner in which inputs should be provided to a device, and/or that otherwise provide information to the user relating to the authentication of such a device).

At step 1320, processor 110 executing one or more of software modules 130, including, preferably, restriction module 171, analyzes at least one of the inputs. It should be understood that in certain implementations, such analysis can be performed in order to determine a presence of one or more users that are not known users of the first mobile device 105, substantially in the manner described in detail herein. In other implementations, such analysis can be performed in order to determine whether and/or to what degree one or more inputs (such as those received at step 1310) successfully and/or unsuccessfully authenticated a mobile device 105, as is also described in detail herein.

At step 1342, processor 110 executing one or more of software modules 130, including, preferably, restriction module 171, modifies an employment of one or more restrictions at a mobile device 105, substantially in the manner described in detail herein.

Figure 14:
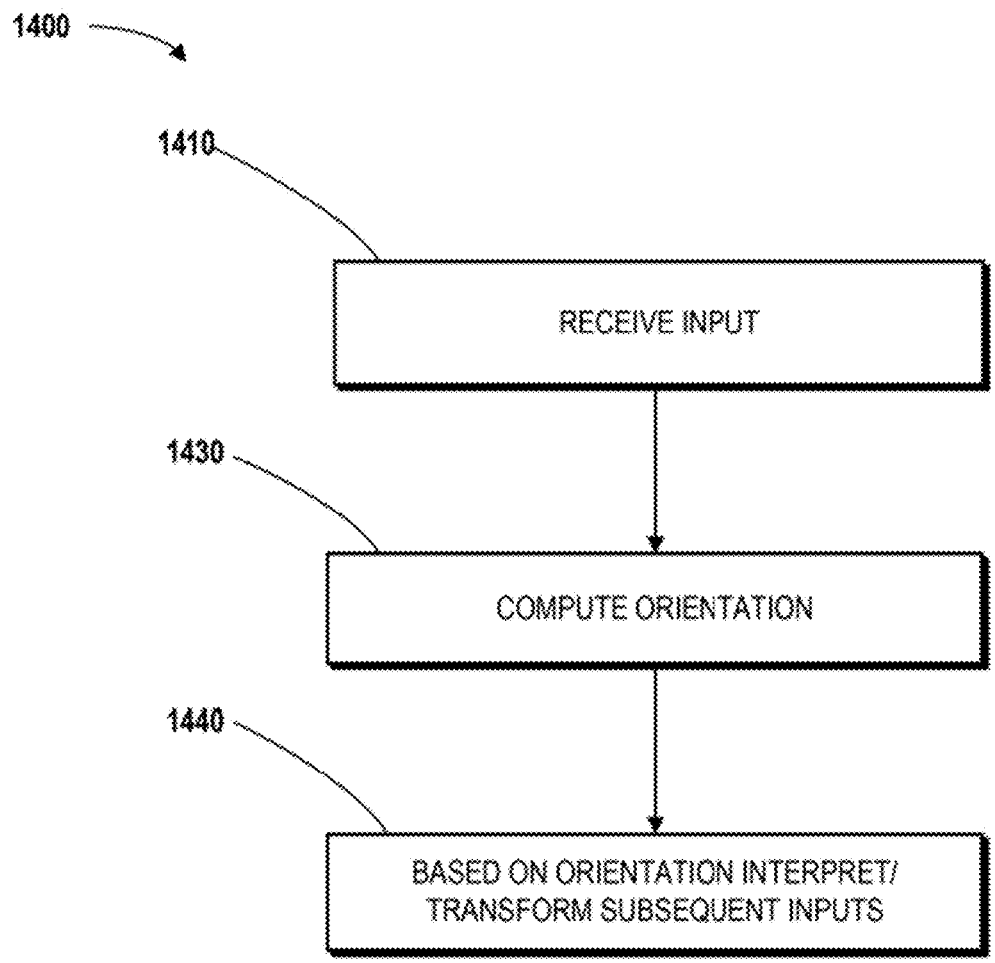
FIG. 14 is a flow diagram showing a routine that illustrates a broad aspect of a method for orienting a coordinate system of a mobile device in accordance with at least one embodiment disclosed herein.

Turning now to FIG. 14, a flow diagram is described showing a routine 1400 that illustrates a broad aspect of a method for orienting a coordinate system of a mobile device 105 in accordance with at least one embodiment disclosed herein. As will be described in greater detail below, various of the steps and operations that make up routine 1400 can share substantial similarities to those described in detail herein. It should be understood that the various steps of routine 1400 will be appreciated with reference to EXAMPLE 3 below and FIGS. 9-11B, and their accompanying descriptions.

At step 1410, processor 110 executing one or more of software modules 130, including, preferably, determination module 170 receives one or more inputs, preferably from at least one of (i) at least one of the user interface, the operating system, the accelerometer, the gyroscope, the GPS receiver, the microphone, the magnetometer, the camera, the light sensor, the temperature sensor, the altitude sensor, the pressure sensor, the proximity sensor, the NFC device, the compass, and the communications interface of the mobile device 105 and (ii) a vehicle data system 164, substantially in the manner described in detail herein.

At step 1430, processor 110 executing one or more of software modules 130, including, preferably, determination module 170 computes, based on the one or more inputs, an orientation of the mobile device 105 relative to a coordinate system of a vehicle, such as a vehicle within which mobile device 105 is traveling.

At step 1440 based on the orientation, processor 110 executing one or more of software modules 130, including, preferably, determination module 170 interprets one or more subsequent inputs of the mobile device 105 in relation to the coordinate system of the vehicle and/or transforms the one or more subsequent inputs originating at the first device into values that are comparable with the coordinate system of the vehicle. See, for example, FIGS. 11A-B and EXAMPLE 3, below.

It should be understood that mobile device 105 is preferably communicatively coordinated with the vehicle data system, that vehicle data system is preferably configured (e.g., installed) with the vehicle (e.g., within the vehicle such as a car) and/or that mobile device is positioned within the vehicle, as described in detail herein.

By way of illustration, consider that based on the x, y and z accelerometers, the exact orientation of the device 105 can be determined relative to the ground (e.g, based on the gravitational force shown on the three accelerometers 145A, as is known to those of skill in the art based on such disciplines as trigonometry). When the device is within a moving car with additional forces, the inputs can be averaged over time and/or inputs from the gyroscope 145B can further assist this computation.

The orientation of the mobile device 105 can be detected relative to the car, for example, by using the angle between the device's magnetic north (e.g, from the 3-axis compass sensor) and the vehicle's GPS heading (as can be shown on the mobile device).

Accordingly, it can be appreciated that in the case of a moving car there are also additional forces (other than gravity). These forces can be accounted for, for example, through averaging over time and/or by using the mobile device's gyroscope 145B, as described herein and using methods known to those of ordinary skill in the art.

In the case that there are movements at the mobile device 105 that are unrelated to the car (say the user moved the device), these can be accounted for through time averaging and/or using the gyroscope 145B and or filtering out these higher frequency events, as described herein and using methods known to those of ordinary skill in the art.

By way of further illustration, consider that in a mobile device on a flat table, the Z-accelerometer shows gravity and the X-accelerometer and Y-accelerometer show 0.

If the mobile device is rolled or pitched (so that one side or one corner of the device remains in contact with the table), the value read by the z-accelerometer goes down (some of the gravity that it felt in stage one is handed over to the other accelerometers) and the X-accelerometer (for roll) and Y-accelerometer (for pitch) go up. The total sum of squares of the 3-accelerometers is always gravity. So we know the exact orientation of the device with regard to the ground.

To orient/align the device 105 with the coordinates of a car, the device's 105 north (detected, e.g., via its compass sensor) can be compared with the vehicle's GPS (such as from vehicle data system 164) heading (as read on the device). For example, (if the device screen is facing up, i.e., the device is not upside down) and its compass sensor shows that magnetic north is due north and the GPS heading sensor shows the vehicle is travelling due west, then the device is rotated 90 degrees to the right with regard to the car. Accordingly, the exact orientation of the device with respect to the coordinates of the car, as disclosed herein and described in greater detail at EXAMPLE 3 and with regard to FIGS. 9-11B.

By way of further illustration, in the case of a 2.5 g lateral acceleration detected at the mobile device 105, that could be because the mobile device 105 was in a very tight turn (right or left) or because there was very strong forward acceleration or deceleration—or some combination thereof. We cannot know what the car did (if anything) to cause this 2.5 g acceleration until we understand the orientation of the device 105 within the car and can transform the 2.5 g lateral acceleration felt on the phone into the acceleration in the vehicle's coordinate system, which is achieved through implementation of routine 1400.

Figure 11A:
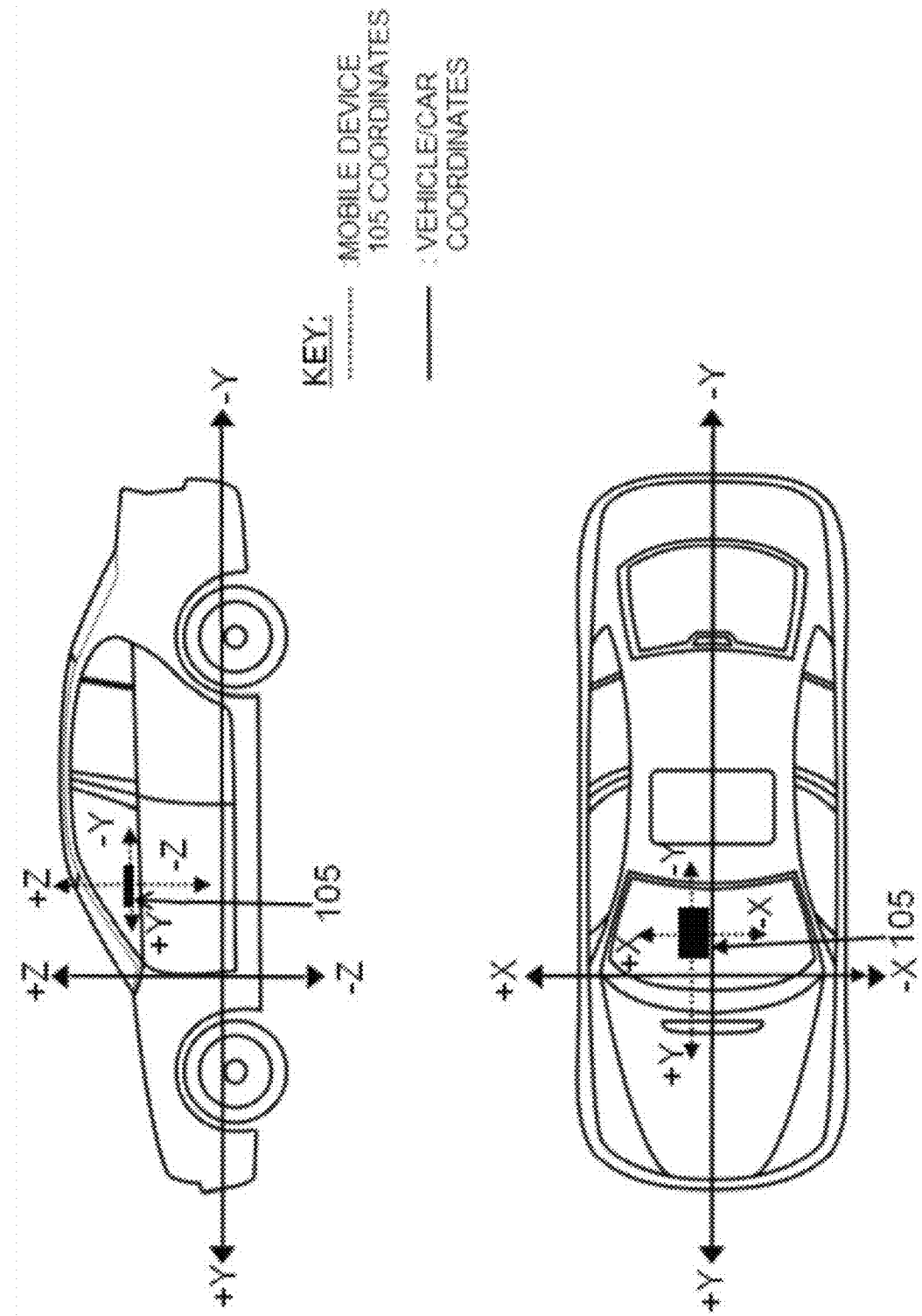
FIGS. 11A-B are diagrams depicting a mobile device and its respective exemplary coordinate system in various orientations in relation to a car and its exemplary respective coordinate system.

It should be noted that, for the purpose of the simplicity of the description and without any loss of generality, in one or more of the examples below, it will be assumed that the various mobile device(s) 105, 160 is (are) aligned with the vehicle within which they are traveling, such as shown in FIG. 11A. That is, the coordinate system of a particular mobile device 105, 160 should be understood to be coincident with the vehicle's coordinate system, as depicted in FIG. 11A and described in greater detail in EXAMPLE 3. It should be further recognized that in practice, such as in various arrangements, such as that shown in FIG. 11B, mobile device 105, 160 is rotated with respect to the coordinate system of the vehicle in up to three dimensions. In order to correctly analyze the various inputs originating at sensors 145 of mobile device 145 within the context of the coordinate system of the vehicle, the rotation of the particular mobile device 105, 160 relative to the vehicle is preferably computed and the inputs originating at sensors 145 of the particular mobile device 105, 160 are preferably transformed into values for the coordinate system of the vehicle. This may be achieved in various ways, examples of which are provided below.

It should also be noted the several of the examples provided herein are presented from an event-centric perspective for the purpose of clarity. That is, various of the inputs originating at sensors 145 of mobile device 105, 160 have been described as corresponding to various real-world events such as turns, bumps, and/or stops. Accordingly, it should be appreciated that such event-centric descriptions are provided herein for the purposes of illustration and clarity, and are not intended in any way to be understood as limiting the scope of the present disclosure. Additionally, is should be appreciated that the various determinations described herein can also be performed from a sensor-centric perspective, wherein the various inputs originating at sensors 145 are considered, irrespective of a particular real-world event to which they correspond. It should be understood that the various approaches described herein can be employed in both even-centric and sensor-centric perspectives.

It should be understood that the following examples encompass further arrangements and embodiments of the systems and methods disclosed herein.

Example 1

There are a number of inputs that can be utilized in various arrangements in order to identify one or more user determination characteristics, such as the location of a mobile device 105 and/or if a mobile device 105 is being operated by the driver or by the passenger of a car/truck/bus, such as:

As also noted above, various arrangements preferably incorporate identification of one or more of the user determination characteristics referenced above and herein. In certain arrangements, each user determination characteristic (e.g. error proportion, correlation of typing speed to acceleration etc.) can be considered as a point in a K-dimensional space. Classification algorithms based on supervised learning, as are well known to those of ordinary skill in the art, can then be applied to the resulting K-dimensional signature(s) to determine the probability that the in-vehicle role of the user of mobile device 105 is a driver or a passenger.

Text Reading/Screen Viewing—User determination characteristic(s) can be identified based on patterns in the reading of text messages (or any other such text item such as an email or webpage, or any other such viewing of items on a display screen, such as during the playing of a video game) on a mobile device 105, thereby serving to distinguish between a driver and a passenger. For example, drivers tend to change the orientation of and/or move (e.g. rotate in his/her palm) mobile device 105 more frequently when attempting to read a message of a given length (in order to periodically glance back at the road), whereas a passenger will read such a message in a comparatively more constant state. This is especially true during road maneuvers that require more driver concentration, such as turns and accelerations. This phenomenon can be observed as a high degree of correlation between vehicle accelerations and/or gyroscopic rotations as detected by accelerometer 145A and gyroscope 145B, respectively, of mobile device 105 and the changes in orientation of the mobile device 160 (unrelated to movements in the vehicle) as measured by one or more of accelerometer 145A, gyroscope 145B, GPS 145C and magnetometer 145E and, in particular, the presence or absence of a (non-vehicle related) mobile device movements just prior to vehicle movements. Preferably, once this correlation reaches or exceeds a certain threshold, the in-vehicle role of the user of mobile device 105 can be determined to be a driver and/or once this correlation reaches or exceeds another certain threshold, the in-vehicle role of the user of mobile device 105 can be determined to be a passenger.

Driver-Specific Movements—Various movements and/or forces can be detected by one or more of sensors 145 of mobile device 105 that can be determined to be unique to a driver. In the alternative, a lack of perception of such unique forces, such as "signature" forces at a mobile device 105 can indicate that the user of such a device is not a driver and is thus a passenger. When in contact with a device 105 (such as when holding it), a driver influences the movement of a mobile device 105 through driver-related actions that include pressing and releasing the gas/brake/clutch pedals and by moving his/her foot from one pedal to another over the course of driving. For example, prior to a period of strong and prolonged acceleration perceived by accelerometer 145A of mobile device 105 (which is typically due to acceleration, braking, and/or wheel rotation), there is a smaller, different acceleration and/or angular movement perceived slightly (in the 100's of milliseconds) in advance, such as at one or more of sensors 145, that originates at the driver's body maneuver (such as the pressing of a gas pedal) that initiates the acceleration of the vehicle. A driver also causes a mobile device 105 to move by rotating the steering wheel. Thus, in a case where a mobile device 105 is in contact with a driver turning a steering wheel, various of sensors 145, such as accelerometers 145A and/or gyroscope 145B of mobile device 105 can detect certain accelerations and rotations. Based on a retrospective analysis of such inputs—for instance, analyzing inputs corresponding to acceleration of a car with inputs perceived immediately prior—it can be determined whether the user operating such a mobile device 105 is a driver or a passenger. If such unique/signature forces are perceived in close proximity (generally, immediately before) acceleration, etc., it can be determined that the user is a driver. Conversely, if such inputs are not detected immediately prior to acceleration, it can be determined that the user is a passenger (provided that the user is in physical contact or communication with mobile device 105).

By way of further illustration, prior to a period of strong and prolonged lateral acceleration and/or gyroscopic yaw perceived by accelerometer 145A and gyroscope 145B of mobile device 105 due to turning, there is a smaller, different acceleration and/or angular movement perceived slightly (in the 100's of milliseconds) in advance that originates at the driver's body maneuver that initiates the turning of the steering wheel and that is unlikely to be that of a passenger.

This approach can be also applied to other driver movements (e.g., looking in the mirrors, turning on the directional signal), wherein the driver's movements will be detected on mobile device 105 that is in contact with the driver slightly before another signal is detected (e.g., accelerometer 145A or gyroscope 145B for looking in mirrors, microphone 145D for turning on directional), on mobile device 105, whereas these serial relationships will not be present if mobile device 105 is being operated by a passenger.

In certain implementations, a device determined to be located within a vehicle can process various inputs, such as in order to characterize/determine the nature of a particular movement of the vehicle. For example, various inputs can be processed in order to differentiate between a vehicle that has recently stopped moving and is likely to continue its present trip (e.g., stopped at a red light or stopped in traffic) from a vehicle that has recently stopped moving and is relatively likely to have finished its present trip. In doing so, it can be determined when usage/operational restrictions (such as those described herein) employed with respect to a device determined to be operated by a driver of a vehicle should be lifted or otherwise modified/eased (e.g., upon determining that the vehicle is relatively likely to have finished its present trip, as opposed to only coming to a temporary stop), such as in the manner described herein.

Figure 35:
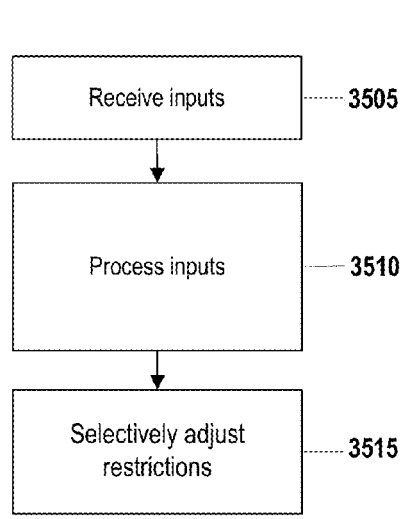
FIG. 35 is a flow diagram showing a routine that illustrates aspects of one or more methods, such as those described in relation to one or more embodiments described herein.

FIG. 35 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 3505 one or more inputs can be received, such as in relation to a user device. At 3510, at least one of the one or more inputs can be processed. In certain implementations, at least one of the one or more inputs can be processed in order to determine one or more mobility characteristics of the device. Moreover, in certain implementations one of the one or more inputs can be processed based on a determination of a mobility stoppage, such as in relation to the user device. In certain implementations, one or more inputs that are chronologically proximate to the mobility stoppage can be processed, such as in order to determine one or more mobility characteristics of the device. Moreover, in certain implementations the one or more mobility characteristics can include at least one of (a) a permanent stop or (b) a temporary stop. Moreover, in certain implementations, at least one of the one or more inputs can be processed in relation to one or more data items, such as in order to determine one or more mobility characteristics of the device. In certain implementations, the one or more data items can include at least one of: map data, traffic signal data, or traffic condition data. At 3515, one or more restrictions can be selectively adjusted, such as in relation to the user device. In certain implementations, one or more restrictions can be selectively adjusted based on the one or more mobility characteristics.

Figure 36:
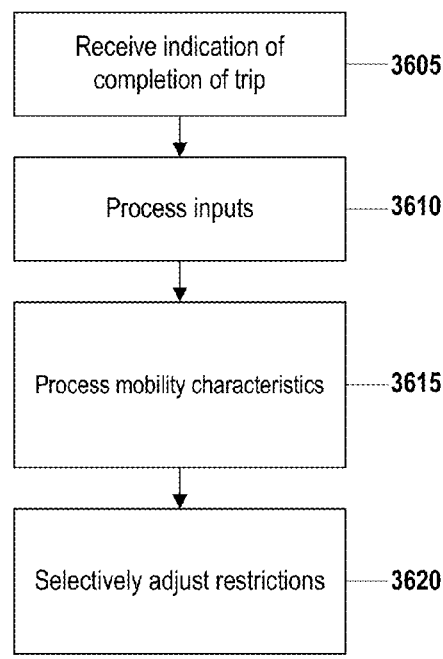
FIG. 36 is a flow diagram showing a routine that illustrates aspects of one or more methods, such as those described in relation to one or more embodiments described herein.

FIG. 36 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 3605 an indication of a completion of a trip can be received, such as in relation to a user device. At 3610, one or more inputs can be processed, such as in order to determine one or more mobility characteristics of the user device. In certain implementations, such one or more inputs can be processed based on the indication. At 3615, the one or more mobility characteristics can be processed, such as in order to determine a veracity of the indication. In certain implementations, the one or more mobility characteristics can be processed in relation to the indication. At 3620, one or more restrictions can be selectively adjusted, such as in relation to the user device. In certain implementations, one or more restrictions can be selectively adjusted based on the veracity. In certain implementations, one or more restrictions can be maintained, irrespective of a subsequent indication of a completion of a trip.

In one implementation, one or more inputs that correspond to the behavior or operation of a vehicle prior to its stop, such as those originating at the accelerometer, GPS, magnetometer, and/or gyroscope of the device can be processed, for example, in order to determine whether the vehicle traveled in reverse one or more times just before it stopped (indicating parallel parking), and/or whether the vehicle performed a turn in the period of time just preceding its stop (indicating entry into a parking lot or a driveway).

In another implementation, the frequency and/or length of stops (as determined based on a processing of one or more of the inputs referenced herein) made in the time prior to the current stop can be used to differentiate between these two states (i.e., between a temporary and a permanent stop). A vehicle determined to have made stops (of various lengths) in the recent past and/or in close proximity to the location of the current stop and/or is on a travel route determined to be consistent with the previous stops, can be determined to be relatively more likely to be stuck in traffic than a vehicle that has not.

In another implementation one or more inputs originating at a device's location sensitive sensor/radio (e.g., the GPS of the device) can be processed to determine (a) whether the vehicle is near a traffic light, (b) whether the acceleration/deceleration of the vehicle (i.e., stopping and going) correlates with the changes in the traffic lights (e.g., their green-yellow-red pattern) on the route that the vehicle is determined to be traveling, and/or (c) whether the vehicle is on a road that currently has heavy traffic that could be the cause of the stops observed, as can be aided by data originating at one or more traffic density services (e.g., Waze, DeCell, etc.).

It should also be noted that the methods contained above may consist of the device also using information from vehicle data system 164 (e.g., OBDII), e.g., the speed of the vehicle and/or the gear in which the vehicle is engaged.

It can be appreciated that, in certain scenarios, one or more 'trade-off(s)' or compromise(s) may need to be made with respect to how to process determinations pertaining to temporary stops/slow-downs in movement in order to determine when a device is in a moving vehicle and thereby selectively restricting functionality of the device on that basis (i.e., should the trip be determined to be over, in which case the selective restriction should be removed, or is the vehicle stopped, such as at a red light, in which case perhaps the selective restrictions should not be lifted). It can be further appreciated that implementing a 'timeout' period (e.g., determining that a trip is over after a determination that a device has not moved for X minutes) can entail certain shortcomings. For example, drivers who have ended their trip and want to use their devices prior to the end of X minutes will be frustrated with such a restriction and drivers who are still within their trip, and who are stopped/moving slowly for more than X minutes (e.g., heavy traffic, long light) may nevertheless be able to use their devices which is dangerous/illegal.

Accordingly, in certain implementations an "honor system" can be employed, whereby drivers can self-declare their trips to have ended by providing/inputting such a declaration/indication to the device (e.g., via touch, voice, visual (e.g., gesture), shake etc. input), based upon which one or more restrictions can be modified, eased, or otherwise removed from the device without having to wait until a determination is made that the device is static/slow for a certain period of time.

If, however, a determination that the device is present within a trip is made within a certain period of time after the referenced self-declaration of a trip end is received, the user of such as device and/or the device itself can be given/ascribed a "strike." Upon accumulating more than a certain number of strikes, the referenced self-declaration mechanism/technique can be disabled or otherwise cease to work (or will be made to work less effectively), such as with respect to the particular user and/or the particular device. Moreover, in certain implementations the referenced "strikes" may subsequently be canceled or otherwise "evaporate" based on to different events (e.g., the passage of a certain amount of time, such as each strike expiring one week after it is created, the travelling of a certain distance—each strike expires 10 driving hours after it was created), etc.

In another implementation, a driver who has completed a trip can self-declare a trip to be over (such as in the manner described above), and such a self-declaration can cause an immediate (or shortly thereafter) determination to be triggered by acquiring sensor information and/or other information to determine, as soon as possible, whether or not the trip has ended (i.e., sooner than would otherwise be determined using various other techniques). Such a feature can be advantageous, for example, in settings where, in an attempt to save power, the various data acquired to determine whether or not a trip has ended are acquired with latency (e.g., with delay, in duty cycles) and/or at less than the fastest sampling rates possible. Accordingly, by acquiring one or more of the referenced data items relatively more quickly (such as upon receiving an indication, such as from a user, that the trip has concluded) one or more of the determinations that can be made in order to lift/remove the referenced selective restriction(s) can be initiated relatively faster/sooner. Stated differently, such technique(s) can enable ongoing power-saving techniques to be applied more readily while reducing the degradation to the user experience.

In another implementation, a similar technique can be used to allow a user to cause the device to immediately (or relatively more quickly that it would ordinarily have) re-check or re-query whether or not it is in a trip. Such a technique can be advantageous, for example, in situations in which the device was determined to be present within a trip when, in actuality, it was not (false positive) and/or in situations in which the device was determined not to be present within a trip when, in actuality, it was (false negatives).

Moreover, upon determining that a device is present within a trip, it can be advantageous to apply different (or asymmetric) methods to determine whether or not the trip has ended, such as based upon whether the device is being operated by a driver or a passenger. For example, the trip detection techniques (such as those described herein) employed with respect to devices determined to be operated by passengers can be eased relative to devices determined to be operated by drivers. For example, power can be saved by lowering the rate at which one or more sensors (e.g. GPS, accelerometer, cellular, Wifi, BT radios, etc.) on a device determined to be operated by a passenger are sampled in order to determine whether a trip has ended. It can be appreciated that adding a latency aspect to the detection of a trip end is not generally painful to passengers who have so authenticated because their devices do not have selective restrictions employed (or are relatively less restricted than devices determined to be operated by drivers).

In another approach, the mobile device of a driver will, on average, display larger movements than that of a passenger measurable by sensors 145 of mobile device 105 due to the fact that the driver is likely to be holding the mobile device 105 in only one hand, whereas a passenger is more likely to be using both hands to hold a mobile device 105, or is capable of increased focus even when using only one hand to operate mobile device 105. This can preferably be done by taking the Fourier transform of a 3D acceleration function and integrating it (squared, i.e. L2-norms) over N disjoint frequency intervals, as is well known to those of ordinary skill in the art. The resulting 3N numbers are preferably a "signature". The signature corresponding to a driver can be distinguished from that of a passenger using a classification algorithm, such as SVM, which has preferably been trained on sufficiently large pre-classified signature bank, as is also known to those of ordinary skill in the art.

GPS—GPS 145C of mobile device 105 can be used, preferably, in certain arrangements, in conjunction with other sensors, to identify the in-vehicle position of mobile device 105. In certain arrangements this is achieved in part based on knowledge of the lane boundaries of the road on which the vehicle is driving (based on map data or computation/observation), together with a determination of mobile device's 105 location, using GPS 145C, to be on the right or left side of such lane. If mobile device 105 is in the left part of its current lane, then it can be determined to be on the left side of the vehicle within which it is traveling, while if it is in the right part of its current lane, then it is on the right side of the vehicle. Such in-lane location calculations can further be averaged over time to increase the accuracy of the location of the mobile device 105 within its then current lane and, as a result, the accuracy of the determination of the location of mobile device 105 inside the vehicle.

It should be understood that the term "turn" as used herein can refer to a turn or any angle and/or curvature and/or any change in lateral acceleration and/or gyroscopic yaw, no matter how large or small and the comparisons described above can be applied discretely or continuously. It should also be appreciated that such inputs can be perceived at practically any time and/or interval, even those that do not necessarily correspond to "turns" as conventionally understood, and such inputs should be understood to be within the meaning of the term "turns" as used herein.

It should be understood that the term "bump" as used herein can refer to a change of any size in the upward acceleration, irrespective of positive or negative change and irrespective of how large or small and the comparisons and filtering described above can be applied discretely or continuously at regular or irregular sampling rates.

Magnetic Field—A vehicle's metallic and electrical parts influence the magnetic field in the vicinity of and inside such vehicle. A 3-axis magnetometer 145E of mobile device 105 can be used to detect these influences by measuring such magnetic field(s) at various times before and during a vehicle's operation (e.g., a car that has not yet been started will have a different magnetic signature than one in which the electric systems are operating) and by comparing them with known magnetic signatures of different in-vehicle locations in order to determine the in-vehicle location of mobile device 105. Such signatures can be universal and/or can depend on additional parameters such as vehicle model, vehicle location, etc.

For example, the major metallic component in most vehicles is the motor and in most vehicles (e.g., cars, buses), and it is normally situated in the front part of the vehicle, near the center. The magnetic field sensed by magnetometer 145E of mobile device 105 can be compared with the magnetic field that is otherwise present absent the magnetic disturbances—thereby indicating the direction of the motor. The lateral component of that direction is preferably the opposite of the left-right in-car location of mobile device 105.

User Baseline vs. Population Baseline—As described in detail above, such as with respect to step 224, in the identification of many of the user determination characteristics described above, the values and signatures measured on and/or computed with and/or in relation to mobile device 105 are compared to baseline values (which are preferably stored in one or more databases 174, 162) in order to determine if mobile device 105 is that of a driver or a passenger. In certain arrangements, such baseline values can be independent of the user (e.g., the standard deviation of the time between keystrokes for all people in the country using a particular model phone), while in other arrangements such values can be user dependent (e.g., this mobile device 105 (or this user of this mobile device 105, if such is available) usually texts at 100 characters per minute, currently he is texting at the rate of 10 characters per minute—thus the person holding it is likely driving).

Example 2

As noted above, such as at steps 222 and 223, considering multiple inputs can increase the accuracy of one or more of the determinations described herein, such as the determination of an in-vehicle role of a user of a mobile device 105, 160. This advantage is further illustrated above at steps 225 and 226, wherein inputs from multiple devices are considered in order to compute such determinations. Further illustrations of such inputs/determinations include, but are not limited to:

In-Vehicle Location—In the United States and in most other countries in the world, drivers are the left-front most occupant in a vehicle, relative to the front end of the vehicle. By identifying whether a particular mobile device 105, 160 is or is not the left-front most device within a vehicle, a determination can be made that such device 105, 160 is or is not being operated by the driver.

It should be understood that the referenced in-vehicle identification/determination is preferably achieved in conjunction with communication between mobile device 105 and one or more of mobile devices 160, whether through direct communication or through network 166. It should also be appreciated that in certain arrangements such identification(s)/determination(s) can be performed in a server-side configuration, while in other arrangements such identification(s)/determination(s) can be performed in a client-side configuration. In one such server-side configuration, one or more software modules 130 are preferably executing at the various mobile devices 105, 160. One or more of the modules configure the each of the respective devices 105, 160 to transmit its absolute location coordinates (such as those provided by GPS 145C and/or an inertial navigation system (INS) and/or its relative location (e.g., 3 meters from WiFi device #1234) to central machine 168. Central machine 168 can then process the various locations coordinates and/or relative locations received from the various devices 105, 160 in order to determine which of the various devices 105, 160 are sufficiently close to one another, over a period of time (e.g., 1 minute, 1 hour, etc.), based on which it can be determined that such devices 105, 160 are present within the same vehicle. In a client-side configuration, the mobile devices 105, 160 communicate between one another (such as through communication interface 150), exchanging absolute location and/or relative location and determining which other devices 105, 160 are in within the same vehicle, substantially in the manner described above with regard to the server-side configuration. By way of further example, in certain arrangements one of devices 105, 160 can emit a tone and/or signal (such as an audio tone), and only those devices 105, 160 that perceive the emitted tone are determined to be within close proximity of the device that emitted the tone.

In both server-side and client-side configurations, upon determining which mobile devices 105, 160 are within a particular vehicle, sensor data (that is, data originating at one or more of sensors 145, such as location coordinates from GPS 145C, or lateral accelerations during a turn) from the various devices 105, 160 can be compared with one another to determine a relative in-vehicle location of one or more of the devices 105, 160. Such relative location can be subsequently filtered to generate a real-time driver-passenger determination, providing increasing accuracy in driver/passenger identification.

Driver-Anticipatory Movements—The driver of a vehicle is generally better able to anticipate the movements of the vehicle he/she is driving as compared to the passengers because the driver is the initiator of many of the movements that the vehicle undergoes, and can thus anticipate the forces that are created as a result of the vehicle's movement. Such predictive actions can be detected by one or more of sensors 145 of mobile devices 105, 160 (e.g., accelerometer 145A and/or gyroscope 145B), and can be further processed to identify whether a particular mobile device 105, 160 is being used by a driver or a passenger. A driver instinctively tenses and/or flexes certain of his/her muscles to adjust for the vehicle movements that are about to occur on average, more adroitly (less sudden with less corrective body movement) and more quickly than a passenger does. By way of illustration, a driver anticipates and compensates for the forces experienced during a turn quicker and more accurately than a passenger in the vehicle does. Similarly, a driver anticipates and compensates for the forces experienced during sharp deceleration (braking) more quickly and more accurately than a passenger. A driver also anticipates and compensates for the forces of a lane change more quickly and more accurately than a passenger. By way of further illustration, the driver can be thought of as a dampening system which performs better than a corresponding "passenger" system, due to the driver's higher degree of consciousness, awareness, and/or anticipation. In one arrangement, one or more of the listed effects/phenomena can be detected/identified by processing one or more inputs from one or more sensors 145, such as by measuring the change in acceleration (i.e. the L2 norm of the derivative of the acceleration) over the relevant time window. In this case the acceleration is preferably further band-pass filtered to focus only on frequencies relevant to this determination, and to further exclude other driver-acceleration effects (e.g., hand-shaking, etc.) as discussed herein.

Magnetic Field: A vehicle's metallic and electrical parts influence the magnetic field in the vicinity of and inside such vehicle. Inputs originating at a 3-axis magnetometer 145E of a mobile device 105, 160 can be used to detect and determine these influences by processing such inputs to determine a magnetic field at various times before and during such vehicle's operation (e.g., a car that has not yet been started will have a different magnetic signature than one in which the electric systems are operating) and by comparing them with known magnetic signatures of different in-vehicle locations in order to determine the in-vehicle location of such device 105, 160. The presence of two or more devices within a single vehicle can influence each other's magnetic readings in a way that can be determined based on their comparison. It should be understood that in certain arrangements, such signatures are universal while in other arrangements they depend on additional parameters such as vehicle model, vehicle location, etc. In addition, comparing the magnetometer 145E inputs from more than one mobile device 105, 160 located within the same vehicle can enable a more accurate determination of the in-vehicle location of one or more of such devices.

Example 3

As noted above, the processing of the various inputs discussed herein is preferably enhanced by incorporating various additional processing operations which serve to further enhance the accuracy of the determinations that are made. Examples of such further processing operations include, but are not limited to:

Clock synchronization—As noted above, in arrangements where inputs originating from multiple devices 105, 160 are processed together (such as several of those referenced above in EXAMPLE 2), it is preferable that simultaneous timing measurements originating at the respective devices 105, 160 are compared as well. In one arrangement, this can be effectively achieved by synchronizing the internal clocks of the respective devices 105, 160. By way of illustration, a relative displacement can be estimated, and this estimate can be used to process all relevant inputs such that they are synchronized to the same clock.

Examples of such synchronization methods include: (A) processing time inputs from GPS 145C to compute a mean time displacement between GPS clock and each the clock of each device 105, 160. The difference between those displacements can be determined to be the displacement between the devices. (B) Configuring one of the devices 105, 160 to emit a sound and receiving the sound at a second device (such as at microphone 145D), and further noting the time the respective events occurred at each device (that is, the time of the emitting of the sound and the time of the receipt of the sound) and then repeating same process in reverse. The noted times can then be subtracted from one another, reflecting the time that it takes to the sound to travel, and such values will cancel themselves out, leaving twice the relevant time displacement remaining.

Orientation Detection—In discussing the processing of various inputs, such as those of accelerometer 145A and other sensors 145, it is preferably that various inputs be identified and/or separated into elements such as "forward acceleration", "lateral acceleration" and such. These terms are relative to the car's coordinate system (e.g. "forward" is the direction of car's movement) while the raw inputs from the various sensors 145 are relative to the coordinate system of a mobile device 105, 160 (it should be understood that while the present example is described with respect to a car, substantially similar approaches can be applied to other vehicles as well). In order to transition (rotate) such inputs, the relative orientation of the mobile device 105, 160 within the coordinate system of the car is preferably established. The following figures depict the various relative coordinates of mobile device 105, 160, of a car, and of a mobile device 105, 160 within a car:

FIG. 9A depicts the relative coordinate system of mobile device 105, as is known to those of ordinary skill in the art and referenced herein.

Figure 9B:
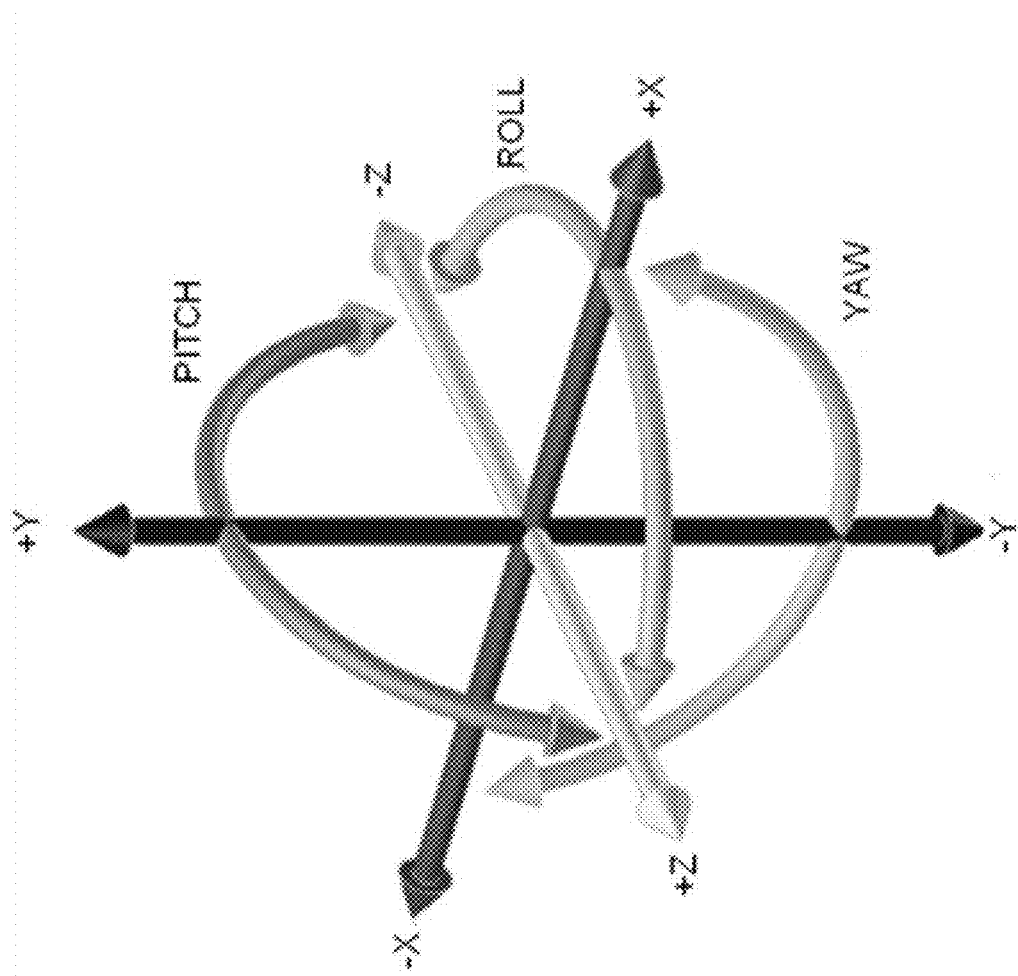
FIG. 9B is a diagram depicting exemplary relative accelerations and gyroscopic rotations of a mobile device.

FIG. 9B depicts the relative accelerations and gyroscopic rotations of a mobile device, as is known to those of ordinary skill in the art and referenced herein. It should be understood that although mobile device 105 is not shown in FIG. 9B for the sake of clarity, the various relative acceleration and rotations shown in this figure are relative to a mobile device in the same position as that shown in FIG. 9A.

Figure 9C:
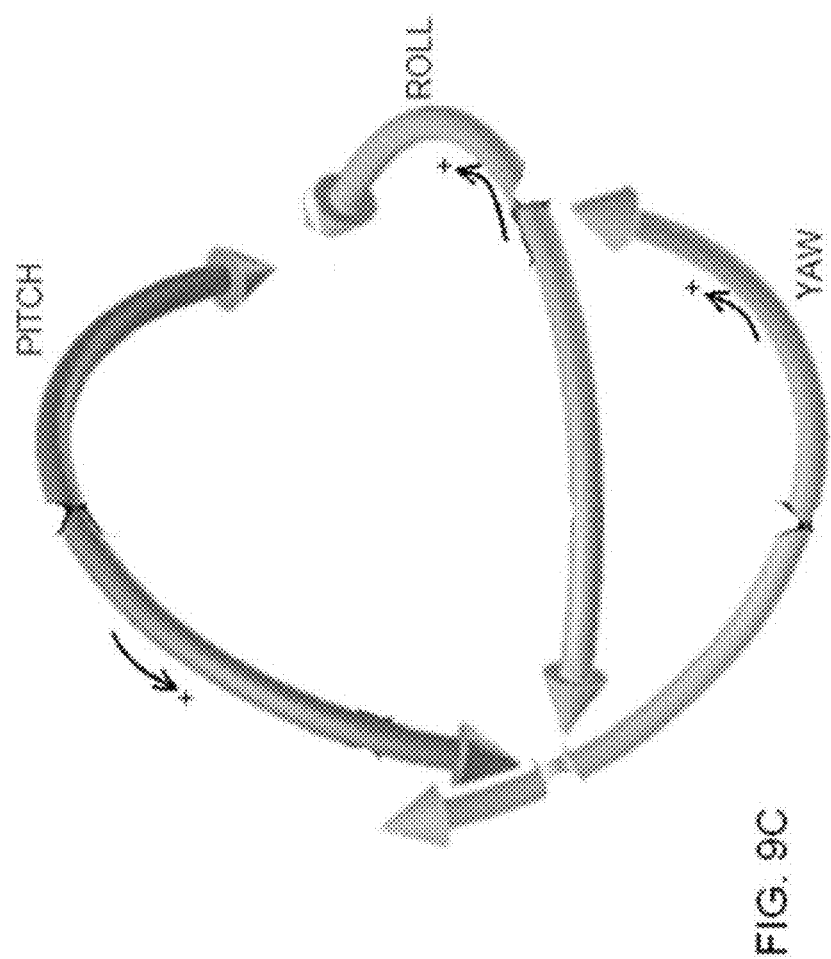
FIG. 9C is a diagram depicting an exemplary gyroscopic sign convention, as used herein.

FIG. 9C depicts the gyroscopic sign convention used herein, as is known to those of ordinary skill in the art and reference herein.

FIG. 10 depicts the coordinate system used in relation to a vehicle (such as at vehicle data system 164) as is known to those of ordinary skill in the art and reference herein.

Figure 11B:
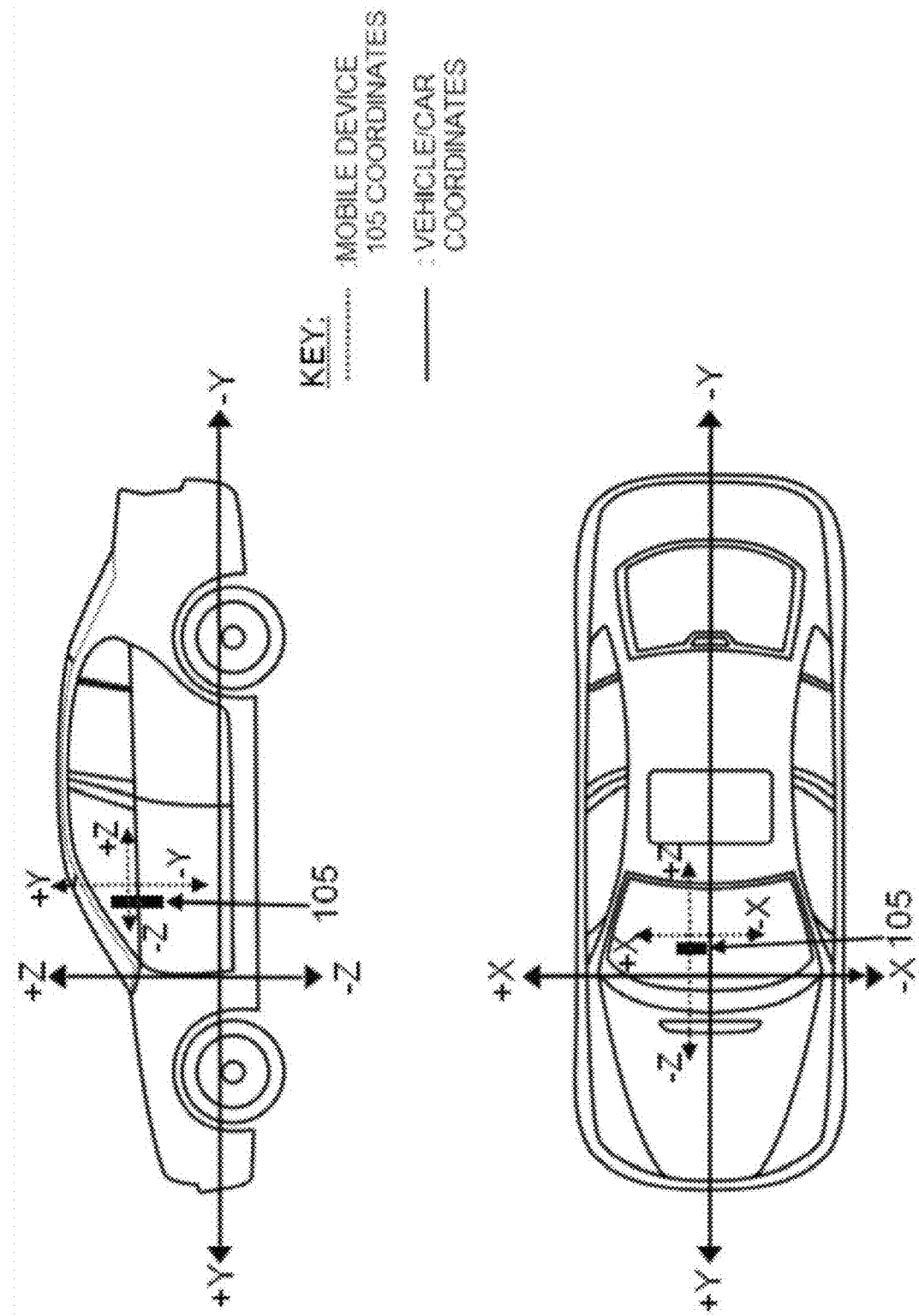

FIGS. 11A-B depict mobile device 105 and its respective coordinate system in relation to a car and its respective coordinate system. For example, as will be described in greater detail below, in certain arrangements the respective coordinate systems can be transitioned, such that it is recognized, for example, that the +Z coordinate of the car corresponds to the +Y coordinate of the mobile device 105, and the +Y coordinate of the can corresponds to the −Z coordinate of the mobile device 105, as can be appreciated with reference to FIG. 11B.

Establishing the orientation of a mobile device 105, 160 within the coordinate system of a car can be accomplished in a number of ways. By way of illustration, in a 'static' approach, wherein it is assumed that the relative orientation of device 105, 160 is constant (e.g., if the device is attached to a cradle or is in the pocket of unmoving passenger), the mean acceleration vector can be determined and be identified as the "down" axis. The "forward" axis can be determined by comparing/processing inputs from GPS 145C that correspond to direction angles with inputs from magnetometer 145E that reflect 'north.' The third axis can be computed based on the first two determined axes using vector multiplication as is known to those of ordinary skill in the art. By way of further example, inputs from the accelerometer 145A, the magnetometer 145E and the GPS 145C (e.g., heading data) can be averaged, substantially in the manner described above.

In a dynamic arrangement, inputs originating at accelerometer 145A, gyroscope 145B and/or other sensors 145 can be processed to identify real-time changes in the orientation of a device 105, 160. In addition, acceleration/magnetic/GPS figures can be generated, preferably using "sensor fusion" algorithms, as is known to those of ordinary skill in the art. In doing so, the above-referenced "static" approach can be utilized to dynamically determine the relative orientation of the device 105, 160.

It should be noted that the gyroscopic sign convention adopted herein is preferably such that if an observer positioned on the positive part of the axis of rotation sees the rotation as counterclockwise, it is deemed to be positive.

Low-Pass filtering—The values derived and/or computed from the various inputs originating at the various sensors 145 of mobile device 105, 160 can be frequently compromised by the vibration(s) present in car's environment (originating at the car's engine, road bumps, imperfect wheels, wind blowing through the windows, or even car audio sounds). Such vibrations can inject "noise" into the inputs originating at the various sensors 145, and can adversely affect the precision of the processing of the various algorithms disclosed here, both in terms of efficiency and final accuracy.

There are various ways that this problem can be addressed. In one arrangement, one or more of devices 105, 160 within the vehicle are attached to a dampening device. In certain arrangements such a dampening device can include one or more weight(s) that can be attached to the mobile device 105, 160 to effectively increase its mass and thus make it more vibration resistant. Additionally, dampening materials (e.g. sorbothane pads) can be attached to a device 105, 160 to prevent high frequency vibrations from passing to the mobile device 105, 160. In any event, the inputs can be preferably processed with a bounded pass filter. On such example is an FIR with 128 taps with Hamming windows.

Sensor Fusion—As has already been noted and illustrated above, various determinations can be made by processing inputs from several sensors 145 together (e.g. forward velocity inputs originating at both the accelerometer 145A and GPS 145C).

Example 4

The following scenarios illustrate additional examples of the analyzing of a first and second input and identifying the presence of a first user and a second user (such as at step 720, above):

Using one or more biometric authentication methods (as are known to those of ordinary skill in the art) to identify the presence of a first user and a second user. Such biometric authentication methods include, but are not limited to, voice recognition, fingerprint recognition, face recognition, DNA identification, and retina identification.

The following are further examples of restrictions that can be employed at a mobile device 105, such as in the manner described in detail above with reference to FIG. 7. Various of these examples impede operation of mobile device 105 by a driver more so than they impede operation of the device by a passenger:

(a) If talking, the device is restricted to being held on the left side (right side for U.K.) of the head/face of the user and with an upright orientation, so that driver usage cannot be hidden from external observers.

(b) If texting, mailing, browsing etc., mobile device 105 is restricted to operating when having straight orientation (no yaw) (adjustment can be necessary, in certain arrangements, for a vertical/horizontal keyboard) and at least close to upright orientation (cannot be on knee or low down so that driver cannot "hide" the device use from external observers).

(c) The device interface will only function horizontally (more difficult for driver to use).

(d) The device 105 is restricted to operating in one or more ways only when camera 145F perceives a frequently moving background (e.g., be held high, not hidden low in the driver's lap or blocked by the steering wheel).

(e) The device 105 is restricted to operating in one or more ways that can be determined to correspond to operation by a passenger (and/or correspond to operation by a passenger of a particular device), such as the various determinations described in detail herein. By way of example, if no correlation (or, alternatively, no negative correlation) is identified between various typing tendencies and the speed, acceleration, and/or maneuvering of a traveling vehicle, and/or a certain typing accuracy threshold it met and/or maintained over a period of time, it can be concluded that the user is likely a passenger.

(f) The device 105 is restricted to operating only when it can be determined based on one or more inputs that the device is under the control of a passenger and/or under the control of a passenger using this particular device, such as the various determinations described in detail herein. By way of example, if relatively little "shake" is perceived at mobile device 105 over a period of time, it can be determined that the device is under the control of a passenger, as a passenger has the ability to control "shake" by using both hands to steady the device—an option not always available to drivers who generally need their second hand to steer the vehicle.

It should also be understood that the various restrictions referenced herein can also be dependent upon the presence and/or absence of certain of the determinations disclosed herein. Thus, for example, various restrictions can be employed only when a device cannot be definitively determined to be in the rear or on the right side of a vehicle (thus suggesting that a driver can potentially be operating the device).

Example 5

In determining vehicle class or type, in certain arrangements a determination is made as to whether one or more mobile devices 105, 160 is/are present and/or in use in a vehicle. If such a determination is affirmatively made, a further determination can then be made regarding the general type or class of the vehicle (e.g., motorcycle, car, bus, train, boat, plane, etc.). This determination can then be used to further determine if there are restrictions on the mobile device usage on the part of a driver or the passenger in the vehicle. For example, if it is determined through a signature analysis (that is, an analysis of various patterns in various inputs) of an accelerometer 145A and/or gyroscope 145B and/or GPS 145C of mobile devices 105 and/or 160 that there is a high-likelihood that a particular mobile device 105, 160 is located on a train, then that the mobile device 105, 160 can remain fully operational without any operation state restrictions (assuming that no restrictions apply to anyone on the train including the conductor). If however, it is determined that a mobile device 105, 160 is being used within a car, restrictions can be applied (e.g., no phone use at all or just no texting), particularly if it is determined that the user of the mobile device 105, 160 is the driver of the car, and not a passenger.

As described in detail above, the type or class of vehicle in which a mobile device 105, 160 is located can preferably be identified and/or determined by using one or more of sensors 145 of mobile device 105. In certain arrangements, this identification/determination can be improved by using the onboard sensors of other mobile devices 160 and/or the onboard sensors (e.g., vehicle data system 164) of the vehicle in which mobile device 105 is traveling. As noted above, being that different vehicles operate in perceptibly different ways (which, in turn, reflect different patterns that are perceptible to one or more of sensors 145), the signature of one or more of sensors 145 of mobile device 105 (and/or other mobile devices 160) present and/or used in relation to each of the following vehicles is identifiable within a certain degree of accuracy:

It should be understood that in certain implementations, a device can be authenticated (e.g., determined to be likely to be operated by a user who is a passenger) if it can be determined that the user of the device is able to perform one or more actions (such as providing certain inputs) and/or demonstrate/provide evidence of certain situations (such as providing photographic/videographic documentation of such situations) that a user who is simultaneously driving a vehicle would not be reasonably capable of doing. As described in detail herein, examples of such methods of authentication include: if, while having determined that the vehicle (within which the mobile device is present) is in motion, the user of the device can be determined to be capable of (a) performing an action in a different part of the vehicle (such as in an area of the vehicle where the driver could not reasonably sit and/or reach); (b) holding his/her look/gaze (i.e., maintain focus of his/her eyes) in a direction (such as towards the mobile device) that is not towards the road ahead, for a defined/sufficiently long period of time; (c) using/interacting with the device with two hands for a sufficiently long period of time/performing one or more tactile gestures that require substantially simultaneous use of both hands of the user (it should be noted that the terms "tactile gesture" and "tactile gestures" as used herein are intended to encompass inputs and/or interactions that are provided by a user in a tactile manner, such as through physical interaction with one or more media, elements, and/or components with one or more fingers or hands of a user, examples of which including pressing buttons, and performing gestures such as taps, swipes, and/or other such interactions with a touchscreen or touchpad); (d) configuring the device to record a visual capture (e.g., take a picture or video) within which one or more indicators (that is, elements or aspects that can be perceived within the visual capture) that would be difficult/impossible for a driver to capture, are present (examples of such indicators include: (i) the presence of a passenger's seatbelt, as described herein, (ii) the presence of a steering wheel with two hands on it, as described herein, (iii) the presence of the eyes/face/smile etc. of the user, as captured from below, above, and/or from the side (it can be appreciated that in scenarios where there is little or no external light other than the interior overhead lighting of the vehicle, such as at night, it can be preferable to take a picture from above and/or from the side, such that the overhead interior lighting within the vehicle does not interfere considerably with the visual capture) wherein the steering wheel of the vehicle is not present in the visual capture, and/or (iv) the presence of the feet of the user in a position that is difficult/impossible for a driver to achieve, etc.), etc.

As described herein, in certain implementations, the device user can be prompted to provide one or more inputs in order to authenticate that s/he is a passenger. Examples of such authentication methods/approaches include performing an action or a set of actions, such as providing one or more alphanumeric inputs in response to a CAPTCHA prompt (as is known to those of ordinary skill in the art), providing one or more inputs during the course of interacting with a game, providing one or more inputs in attempting to solve a puzzle, a lock screen, etc. It can be appreciated that such authentication approaches/methods can be configured to require a significant degree of concentration (and/or prolonged concentration) on the part of the user, such that such authentication approaches/methods are too difficult to be successfully performed (and/or consistently successfully performed) by a driver of a moving vehicle (who, presumably, must concentrate on the road ahead). Such authentication approaches/methods can be further improved by configuring them to require that (a) the authentication can only be successfully completed (e.g., authenticating the user of the device as the passenger) when the user uses both hands simultaneously (as described in detail herein); and/or (b) the authentication can only be successfully completed when the required inputs are provided such that the user cannot simultaneously see the road ahead while performing the authentication (such as by making the user tilt his/her head and/or eyes down or up or right or left, e.g., by requiring that the device be held flat and/or placed in the user's lap or on the seat between the user's legs, as described herein, and/or by requiring that the user look directly in to the device in the manners described herein).

In another implementation, in order to provide the necessary inputs in order to authenticate the mobile device (e.g., to authenticate a user of the device as a passenger in a vehicle), various restrictions can configure the mobile device to require that the device be placed or held flat (such that the z-accelerometer of the device indicates the approximate value of gravity, e.g., when the device is positioned in the user's lap or on the seat between the user's legs,), and user tilts his/her head so that the camera(s) of the device can detect the eyes, gaze, face, and/or smile etc. of a person (not necessarily limited to a particular person), preferably for a certain minimum period of time (controlling, in certain implementations, for blinking and similar effects). It can be appreciated that such authentications can be achieved using a forward-facing camera (e.g., a camera on the side of the device that the screen is on in contemporary devices, such as the iPhone 4S produced by Apple of Cupertino, Calif., USA, and as is depicted in FIG. 15F, wherein $145F_1$ corresponds to a forward-facing camera and $145F_2$ corresponds to a rear-facing camera) and/or a rear-facing camera (e. g., a camera on the side of the device that the screen is not on in contemporary devices such as the iPhone 4s produced by Apple of Cupertino, Calif., USA).

Figure 15:
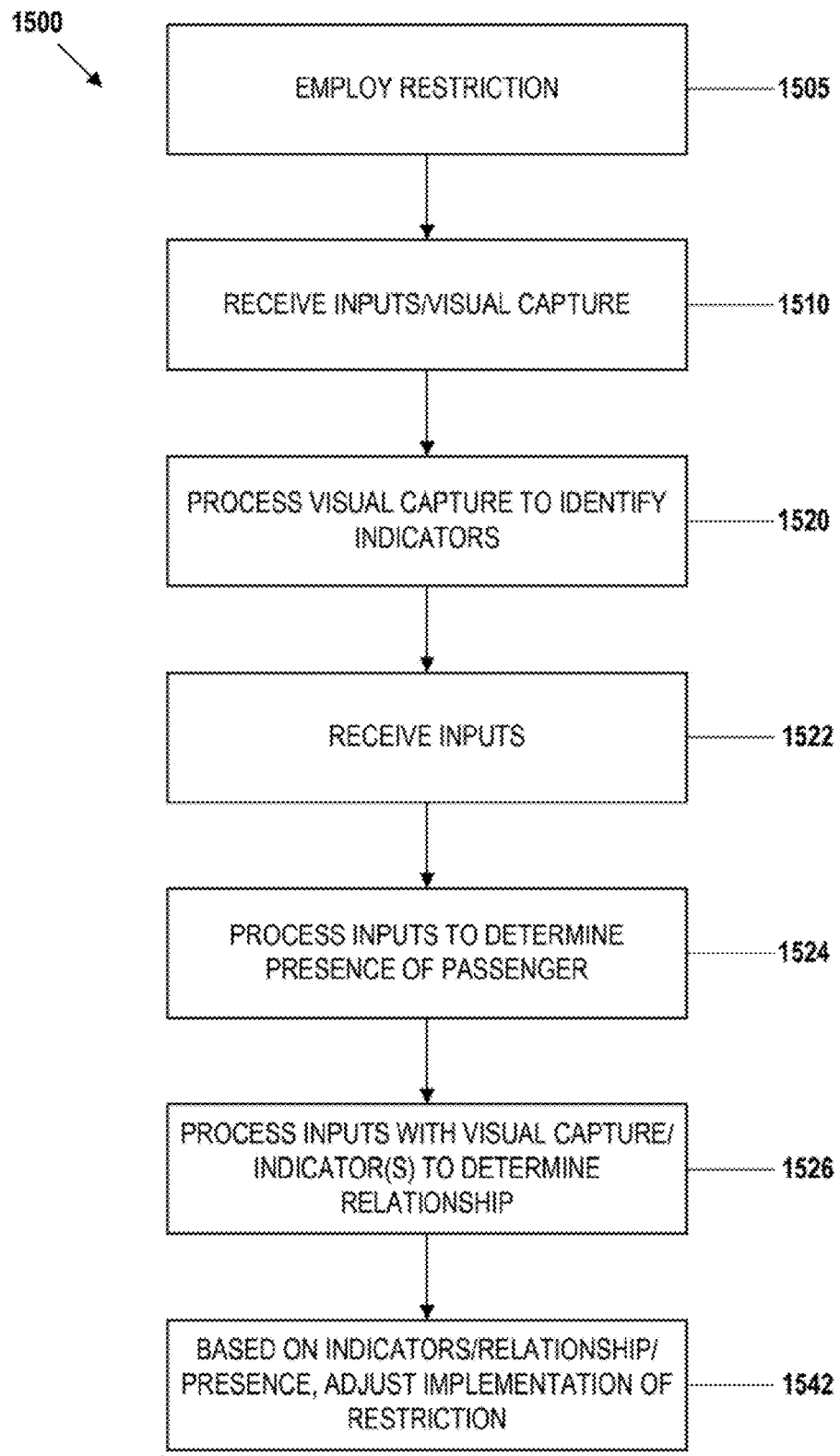
FIG. 15 is a flow diagram is described showing a routine that illustrates a broad aspect of a method for selectively restricting an operation of a mobile device in accordance with at least one embodiment disclosed herein.

It should be understood that in certain implementations, the authentication methods/approaches described herein can be configured to authenticate a user of a mobile device as a passenger upon determining the presence of the eyes/gaze/face/smile of the user, such as from within a visual capture, only when such a visual capture can be determined to have been recorded while the mobile device was positioned in a manner/orientation that precludes/prevents the user from simultaneously seeing/focusing on the road ahead. (It can be appreciated that a driver operating the mobile device would generally only be capable of positioning the device in a manner/orientation whereby the device is able to capture his/her eyes/gaze/face/smile etc. while the user is also able to see some portion of the road ahead.) This can be determined by (i) searching, such as with image processing techniques known to those of ordinary skill in the art, for the eyes/gaze/face/smile etc. of the user within a field of view that is smaller than the camera's field of view; and/or (ii) by requiring the angle of incidence between the user's eyes/gaze/face/smile etc. and the device be as close to (or as far from) 90 degrees (indicating that the user is directly facing the device) as desired, such as in the manner depicted in FIG. 15G; and/or (iii) requiring that the ratio of horizontal pixels to vertical pixels of the user's eyes/gaze/face/smile etc. is consistent with the ratio present when a user looks directly into the device (and/or that the number of horizontal pixels and/or vertical pixels of the user's eyes/gaze/face/smile etc. is consistent with the number present when a user looks directly into the device), as is known to those of ordinary skill in the art.

Moreover, in certain implementations, the authentication methods/approaches described herein can be configured to authenticate a user of a mobile device as a passenger only if the user holds the device within a certain range of distance from her eyes/gaze/face/smile etc. In doing so, it will be difficult, if not impossible, for a driver to fraudulently authenticate him/herself as a passenger by attempting to authenticate the device by holding the device close to his/her head such that the resulting visual capture recorded by the device does not contain any part of the steering wheel (as described herein). The distance can be determined, for example, based on the number of pixels in the eyes/gaze/face/smile etc., relative to the resolution of the camera and/or relative to the angle of incidence and/or using other distance measurement techniques known to those of ordinary skill in the art.

Figure 15A:
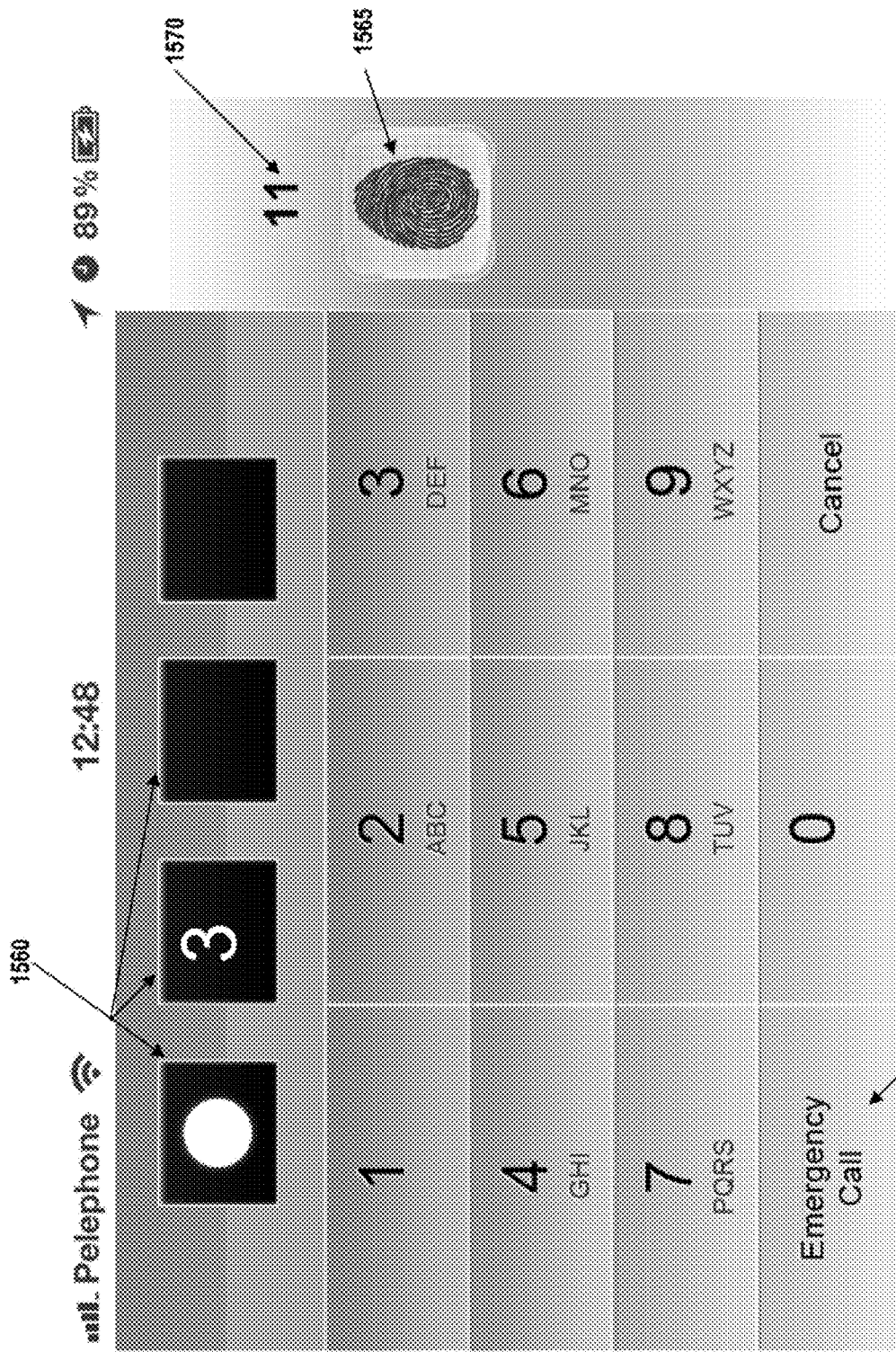
FIG. 15A is an exemplary lock screen, in accordance with at least one embodiment disclosed herein.
Figure 15C:
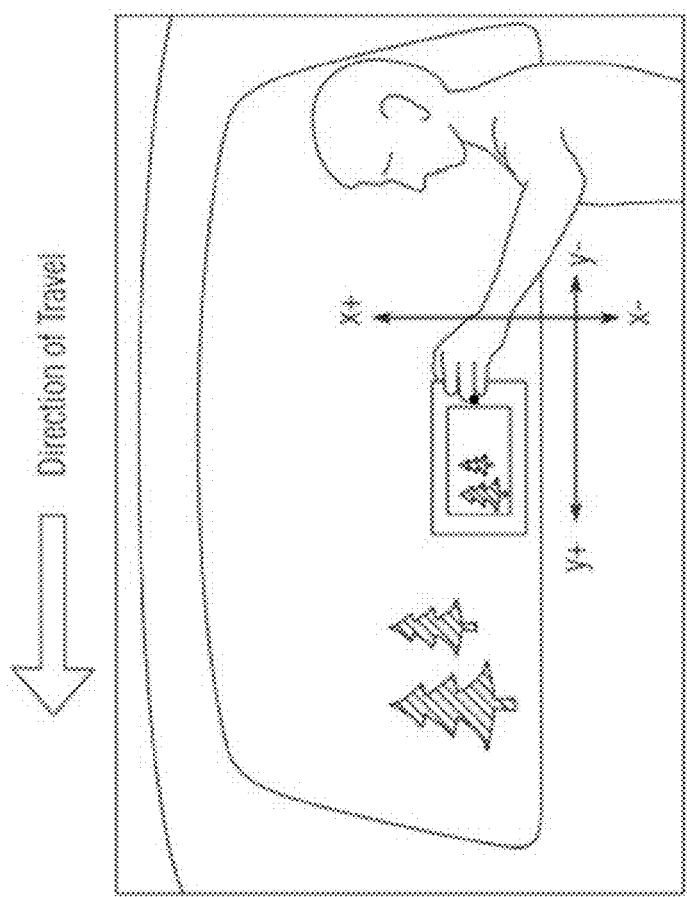
FIG. 15C depicts the "required orientation" of a mobile device, in accordance with at least one embodiment disclosed herein.

In certain implementations, the authentication methods/approaches described herein can be configured to authenticate a user of a mobile device as a passenger upon determination that the user performed (and/or is capable of performing) one or more actions/provided one or more inputs that can be determined to require(s) the use of one or two hands (e.g., swipe gestures at a touchscreen, including one or more times) such as in an implementation utilizing a forward-facing camera is used, and/or requiring a user to press a touchscreen with one or more fingers and/or touch one or more buttons on the device, irrespective of whether the camera is rear-facing or forward-facing), such as is described with reference to FIG. 15A.

It should also be noted that in certain implementations, when performing the referenced authentication, it can be useful to configure the device such that the user is required to (a) hold the device at a certain orientation, e.g., in landscape orientation, thereby making it more difficult for a driver trying to falsely authenticate/unlock the device (which would otherwise allow the driver to perform certain actions), and/or (b) to encourage the user to hold the device in such orientation by having the device's screen display in landscape mode (that is, displaying the user interface in landscape mode, as described in detail herein), regardless of whether the device is actually held in a landscape orientation. It can be appreciated that such a configuration is relatively less of a burden on a passenger, as described in detail herein.

As referenced herein, in certain implementations, the authentication methods/approaches described herein can be configured to authenticate a user of a mobile device as a passenger only if no part of a steering wheel is present in a visual capture, such as a visual capture of a portion of the user.

It should also be noted that in certain implementations, during the authentication process, the mobile device can be configured to providing audio and/or vibrational/tactile feedback to the user (such as in the case of a forward-facing or rear-facing cameras, whereby the user can be directed/instructed as to how to tilt/orient the device/camera in order to achieve the requisite angle required by the particular authentication method, as described in detail herein) and/or visual feedback (such as in the case of a rear-facing cameras and/or a forward facing camera) during the authentication process. In doing so, the user can be provided with guidance/feedback, as needed, in order to enable the user to achieve the requisite input (such as a particular visual capture) in order to authenticate the device, as described herein. FIGS. 15D and 15E depict various examples of visual feedback that can be provided to a user during authentication.

Figure 15B:
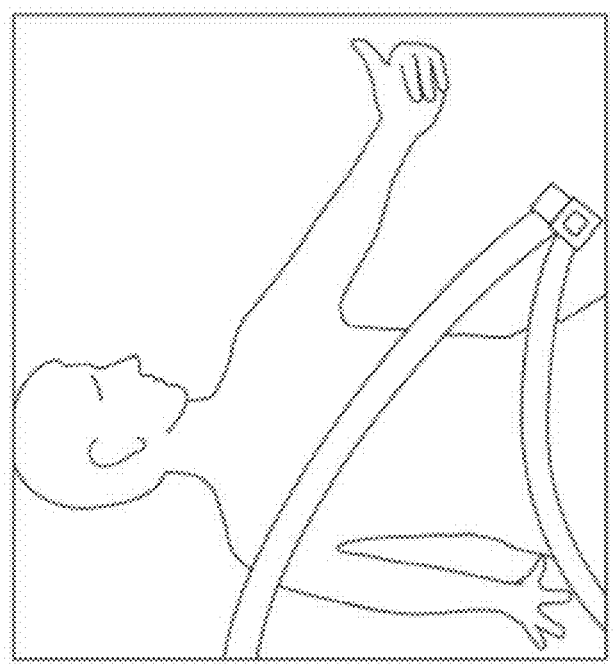
FIG. 15B is an exemplary visual capture that can be processed to identify a presence of a fastened seatbelt, in accordance with at least one embodiment disclosed herein.
Figure 15D:
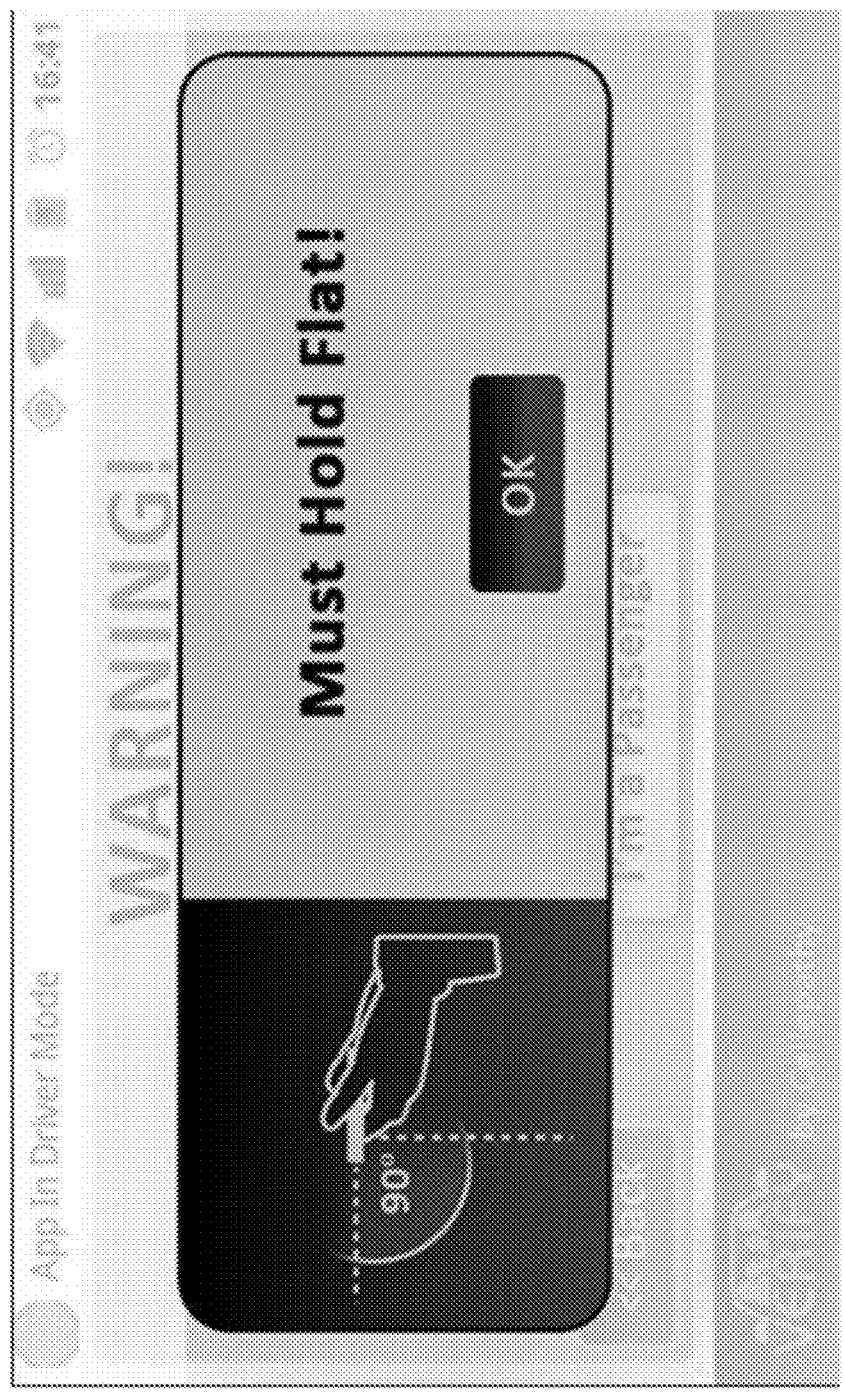
FIG. 15D depicts an exemplary screenshot showing visual feedback that can be provided to a user during authentication in accordance with at least one embodiment disclosed herein.
Figure 15E:
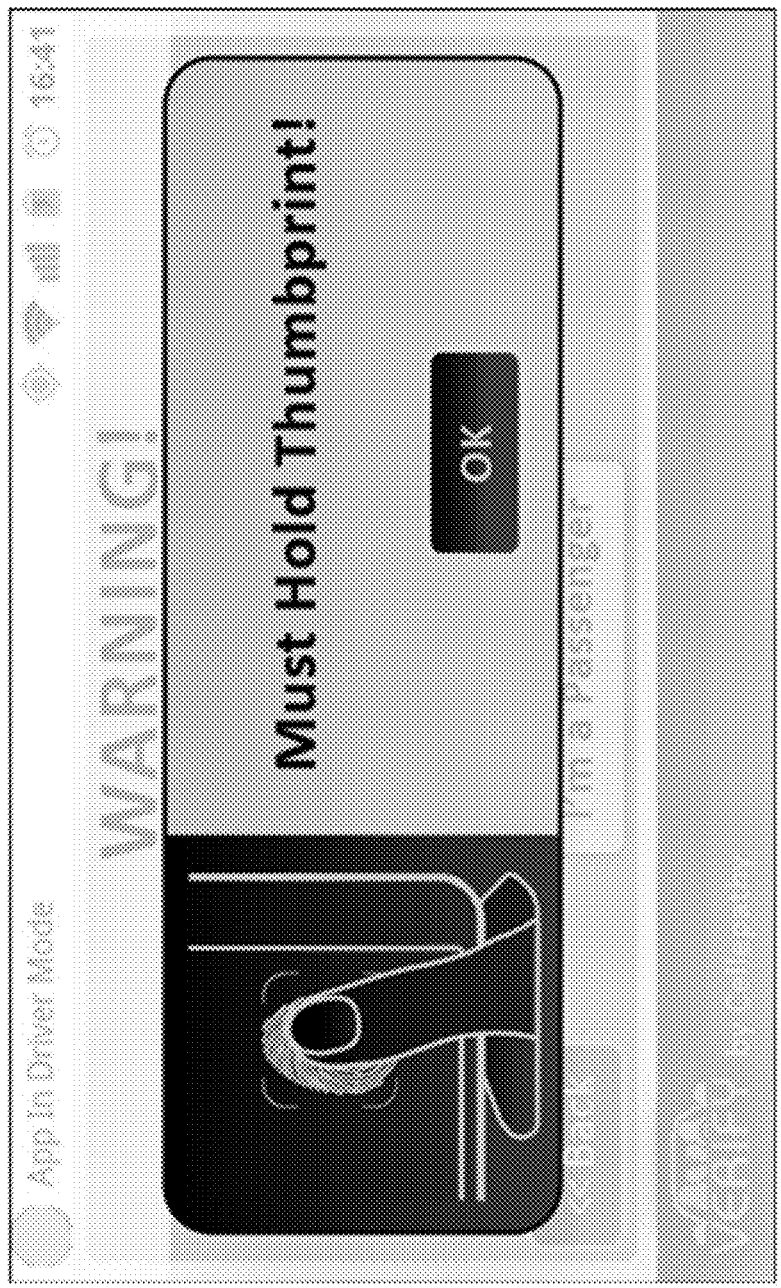
FIG. 15E depicts an exemplary screenshot showing visual feedback that can be provided to a user during authentication in accordance with at least one embodiment disclosed herein.
Figure 15G:
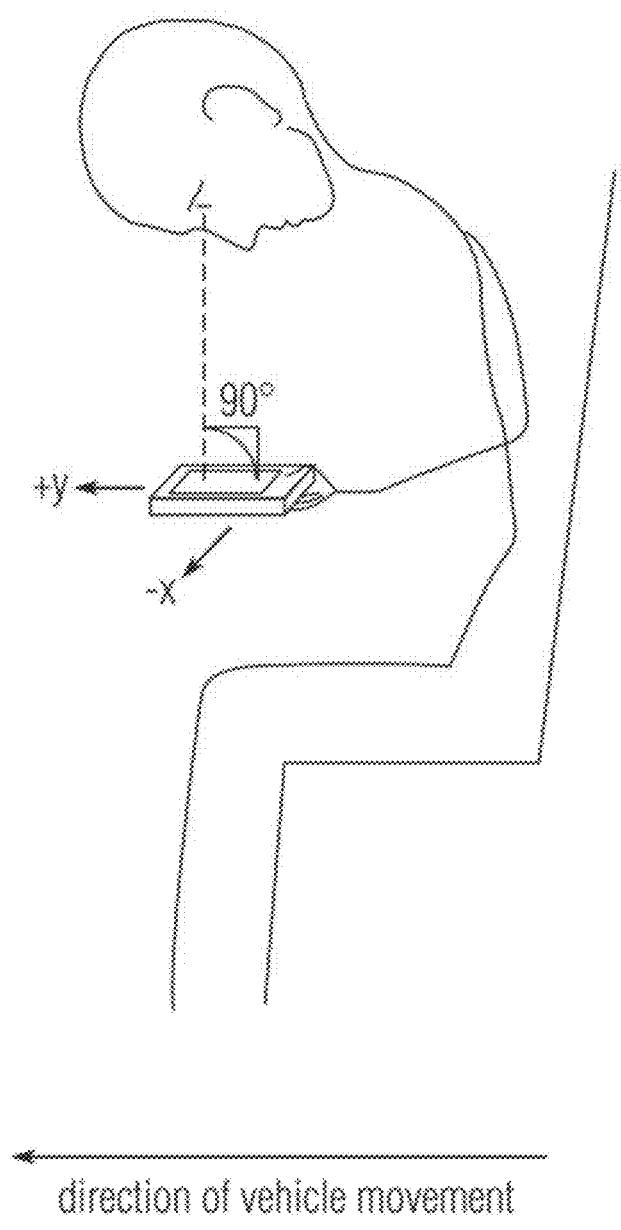
FIG. 15G is an illustration depicting a 90 degree angle of incidence between the user's eyes/gaze/face/smile etc. and a mobile device, in accordance with at least one embodiment disclosed herein.
Figure 15H:
FIGS. 15H-T depict exemplary aspects of an authentication sequence in accordance with at least one embodiment disclosed herein.
Figure 15I:
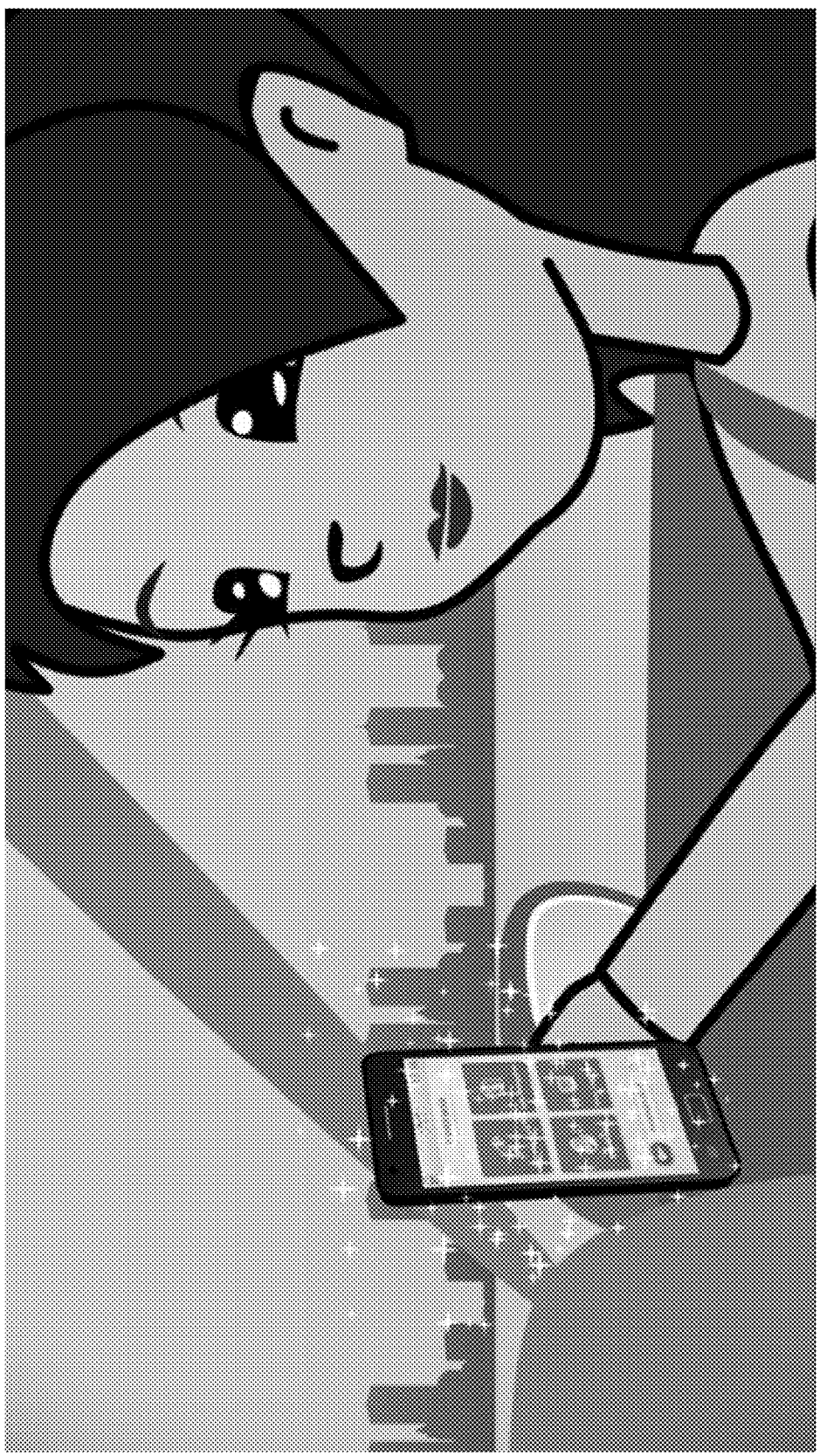
Figure 15J:
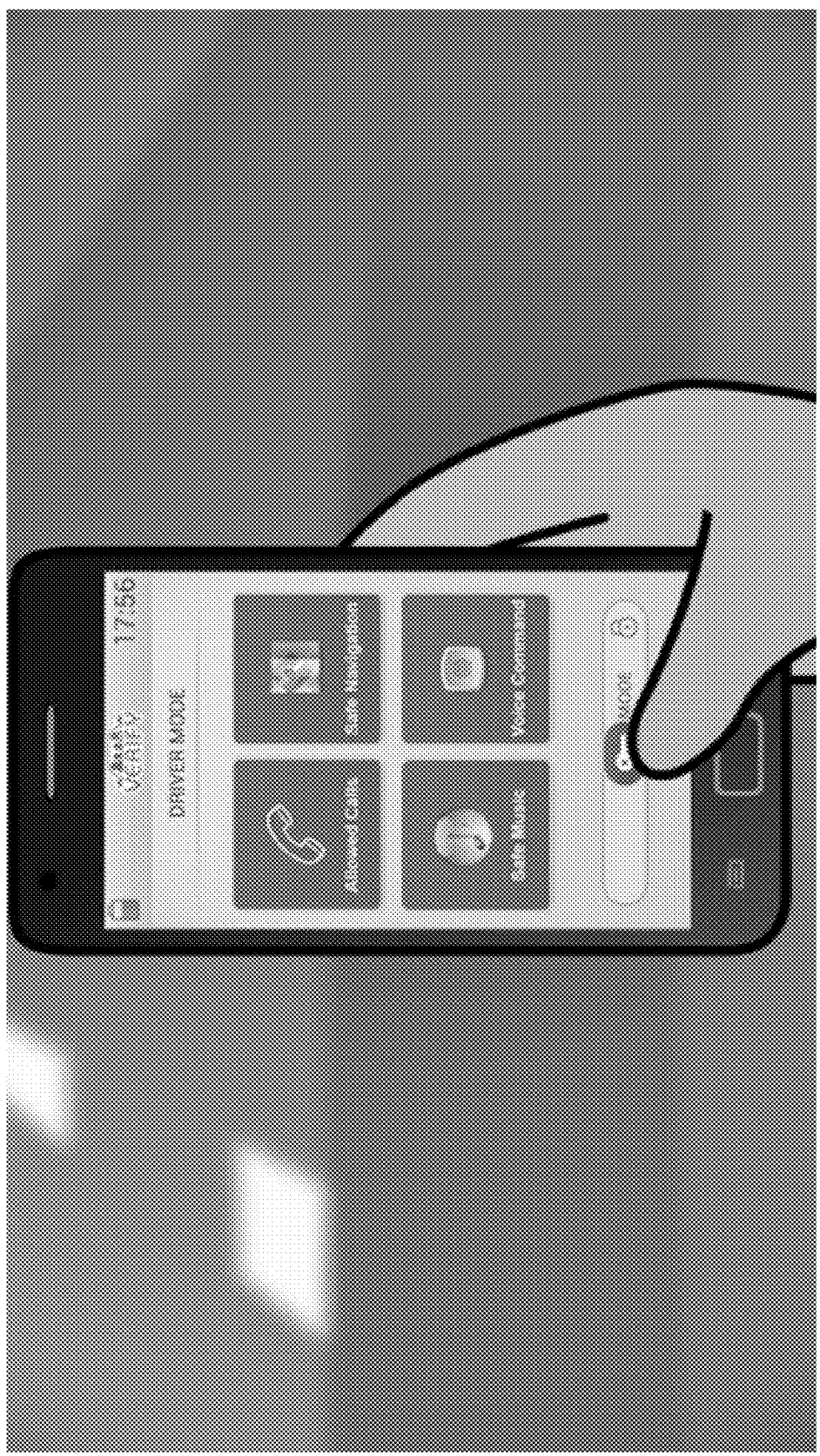
Figure 15K:
Figure 15L:
Figure 15M:
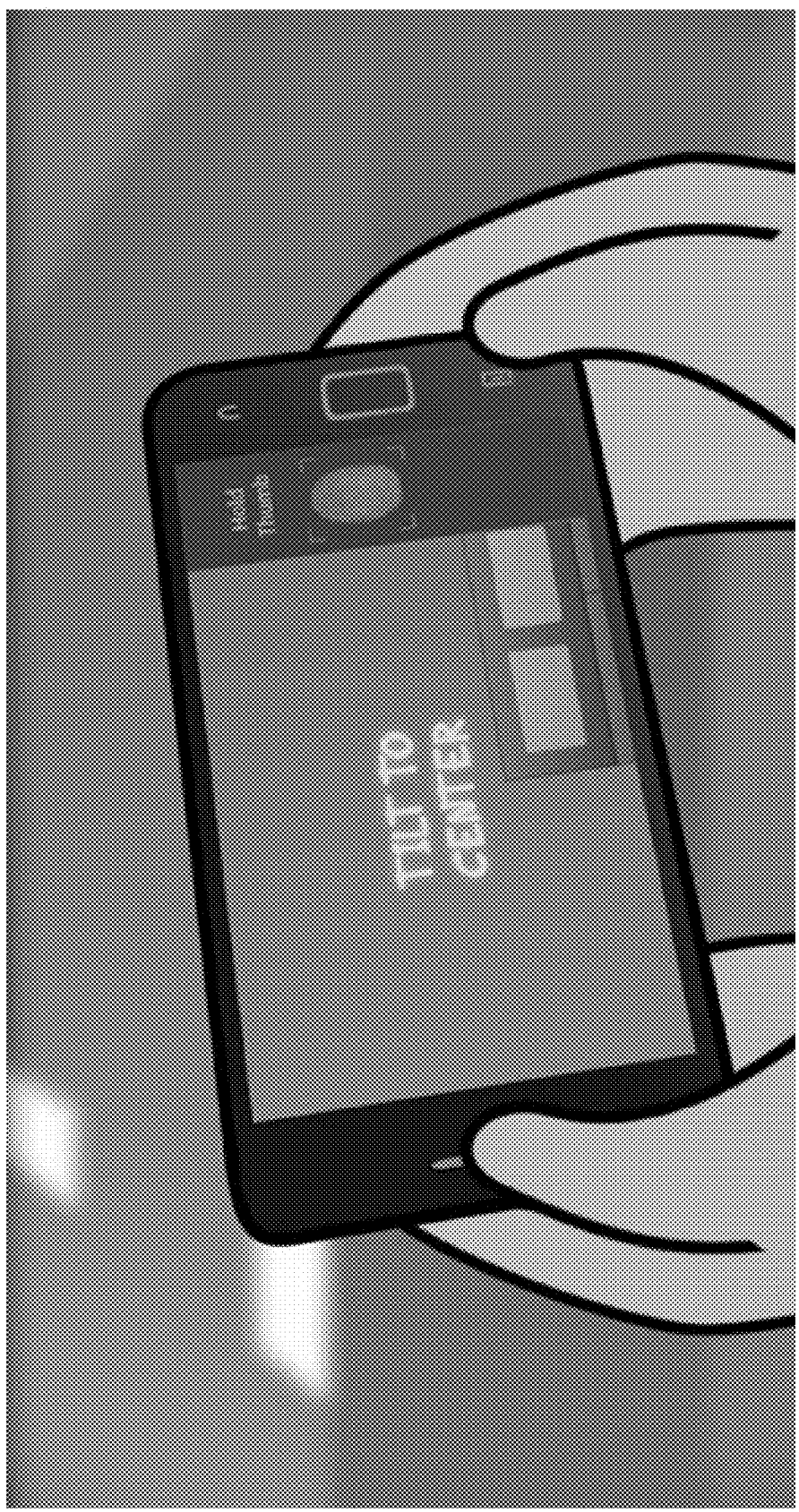
Figure 15N:
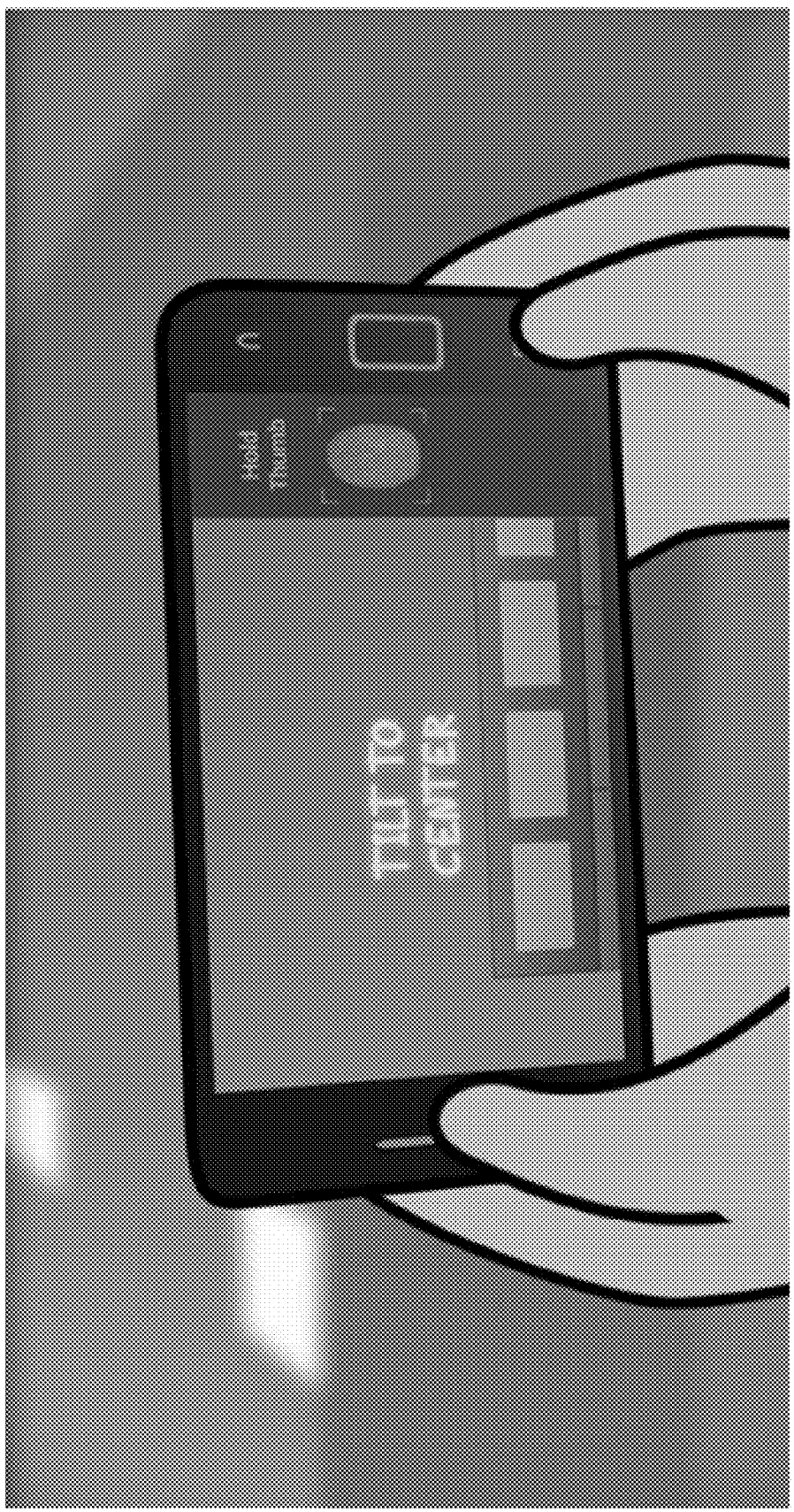
Figure 15O:
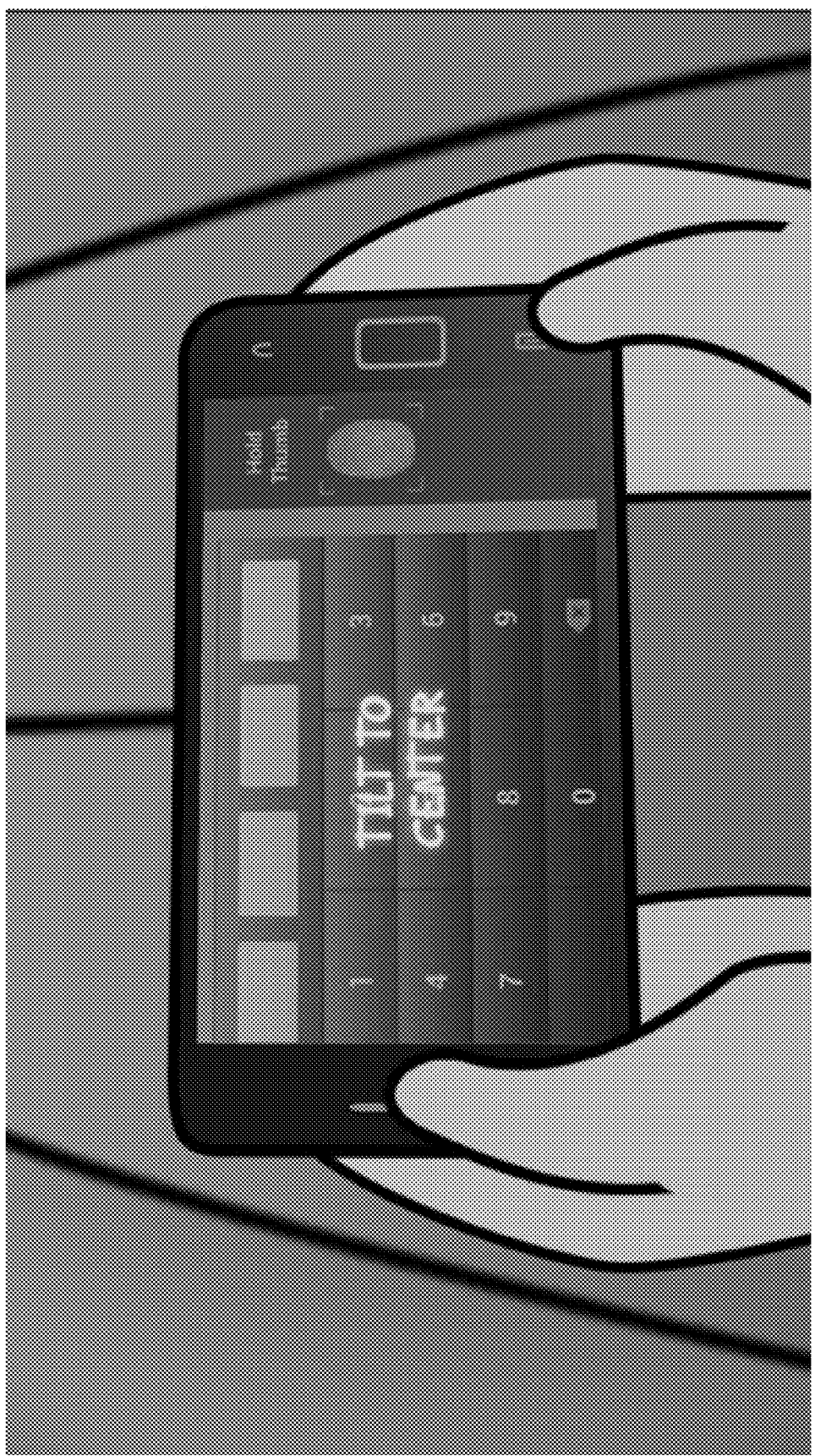
Figure 15P:
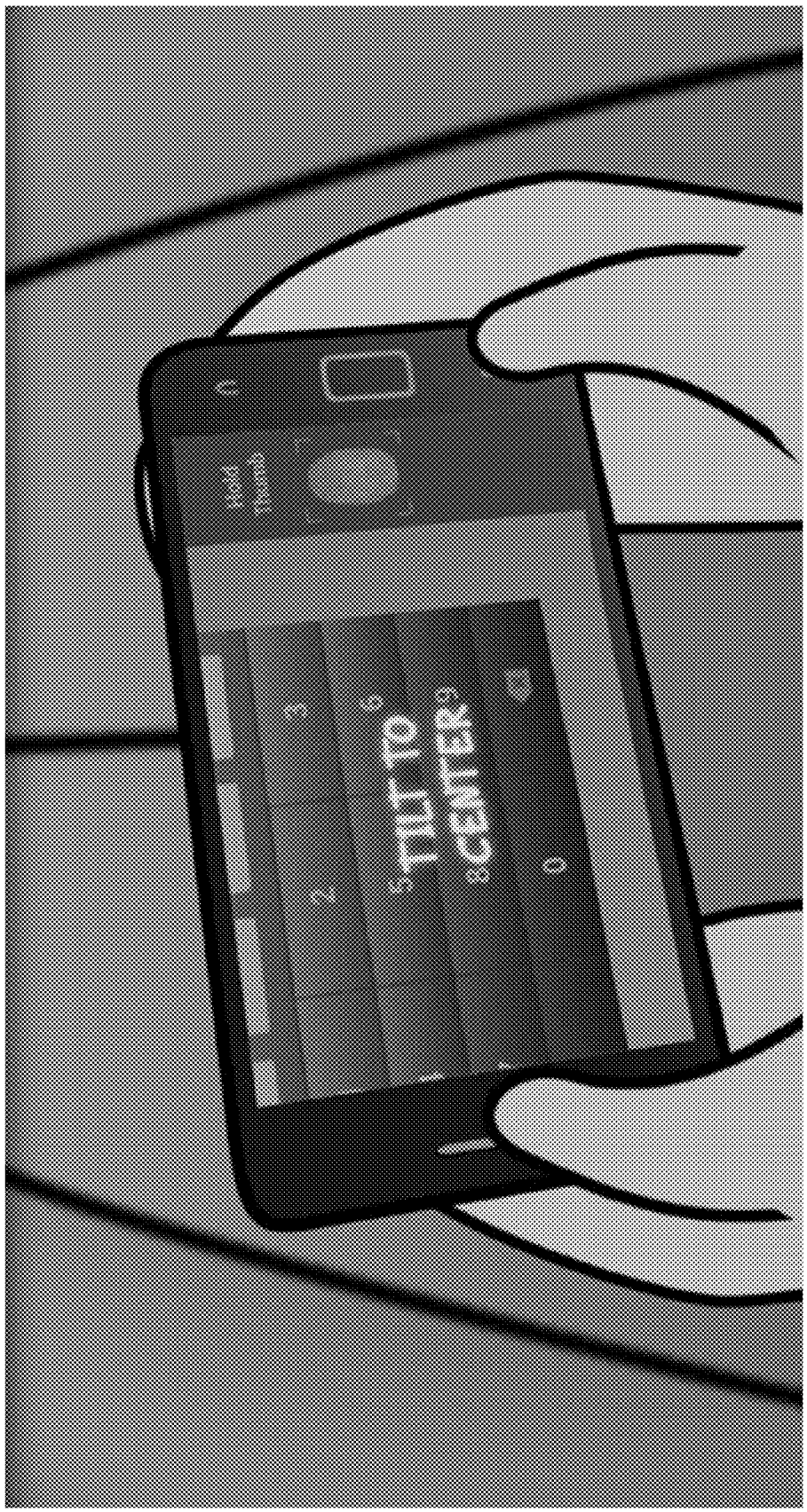
Figure 15Q:
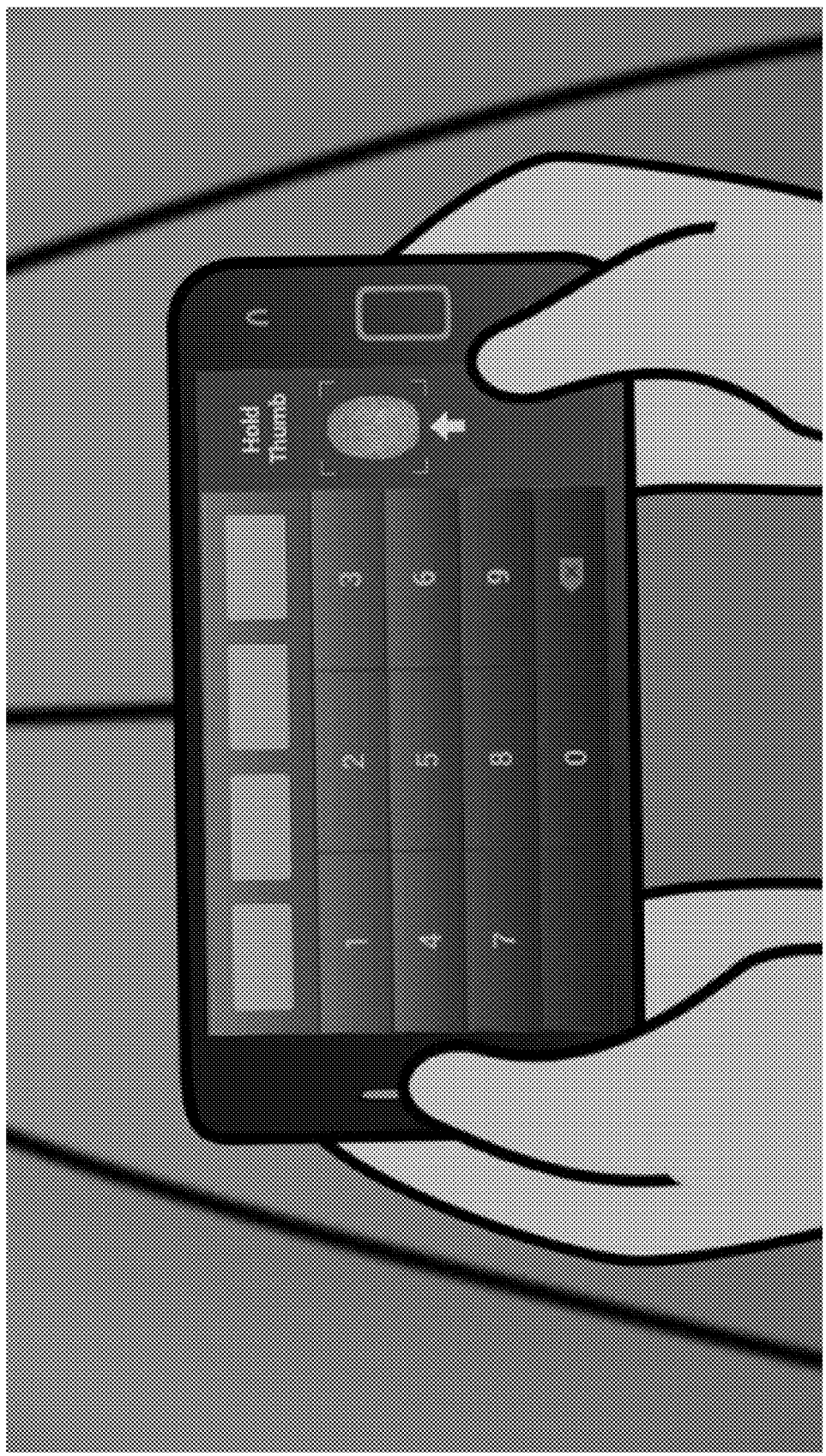
Figure 15R:
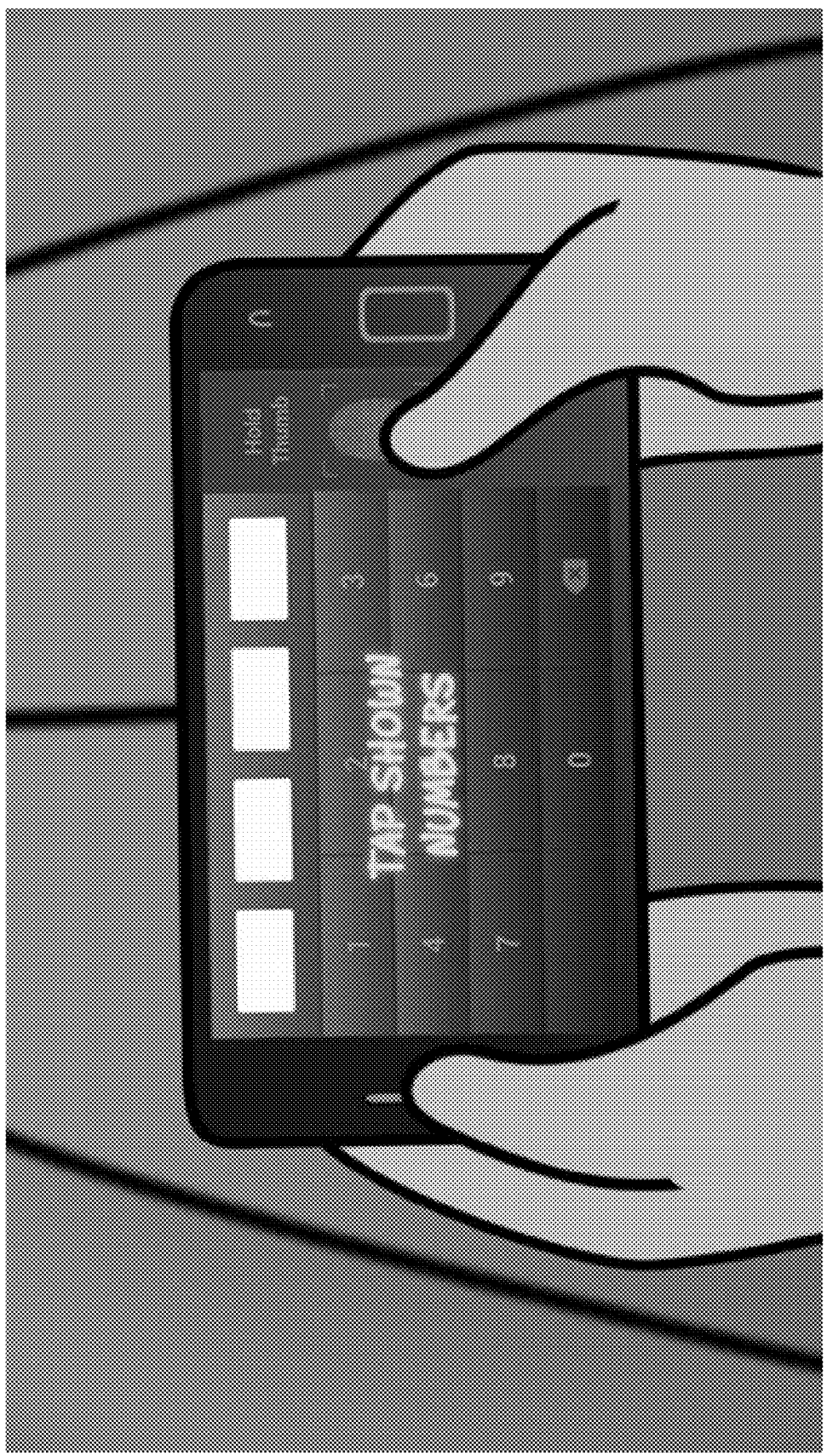
Figure 15S:
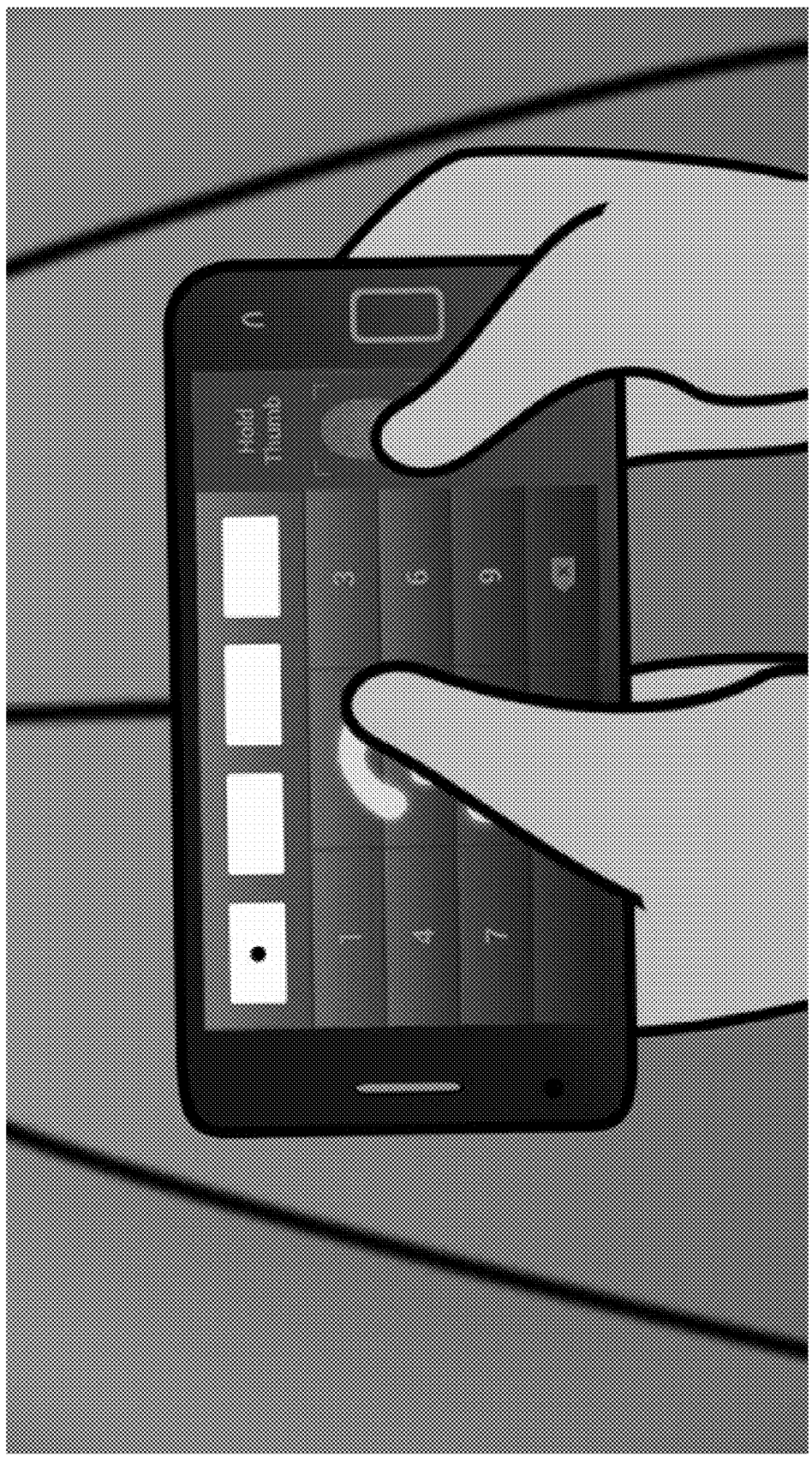
Figure 15T:
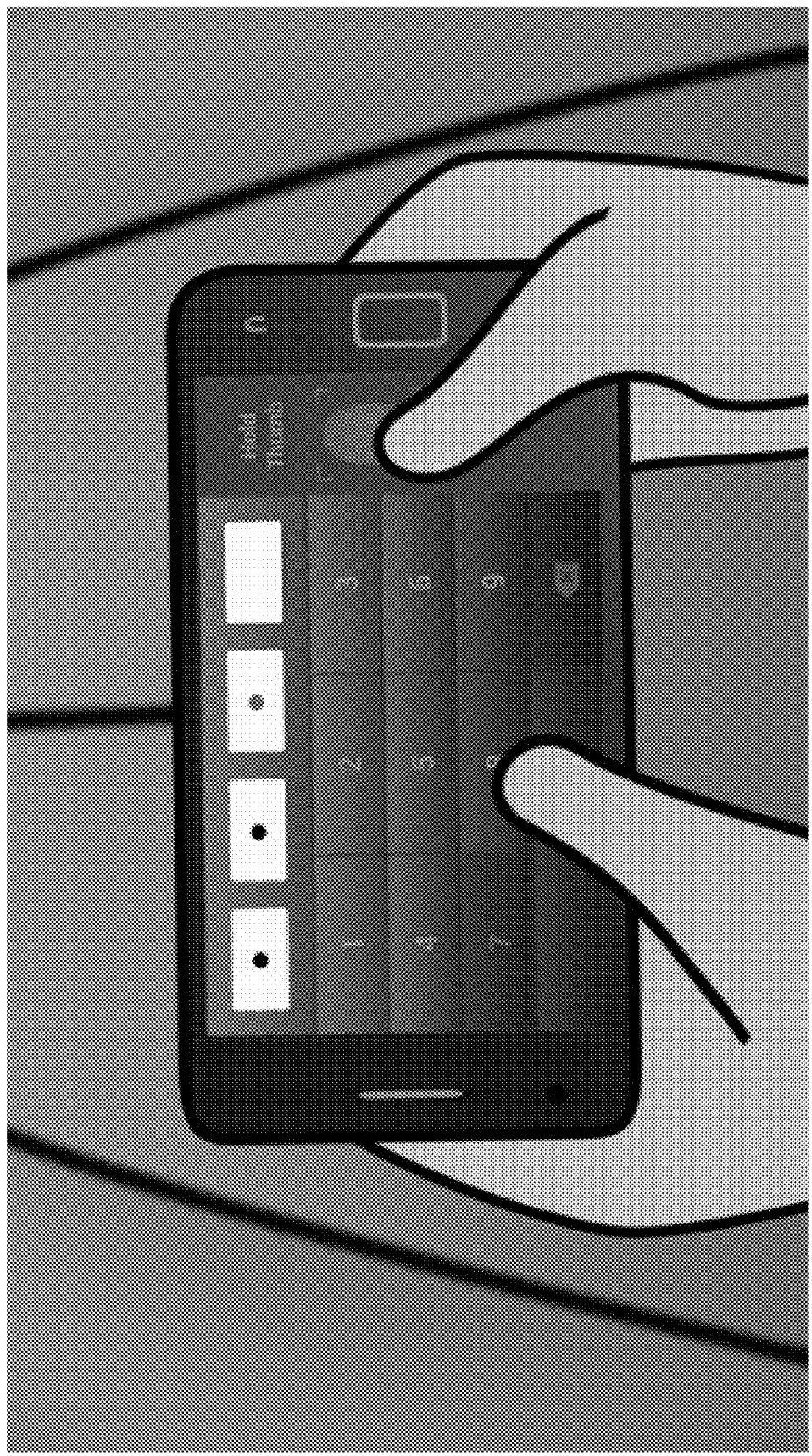

By way of yet further example, in certain implementations, upon determining that a device is in motion (or otherwise determining that a trip has begun) (such as in any number of ways described herein, and as depicted in FIGS. 15H and 15I), a user can be prompted or otherwise presented with an interface that can enable the user to initiate an authentication process, such as by interaction with a 'slide to unlock' interface on a touchscreen, as shown in FIG. 15J. Upon successfully completing the 'slide to unlock' gesture, another interface can be provided which incorporates/implements any number of variable input techniques. For example, a keypad (or keyboard, etc.) can be provided whose position with respect to the touchscreen of the device can change based on one or more inputs. By way of illustration, FIGS. 15K-15P depict how the position of a keypad on a touchscreen can change based on and/or in relation to the angle/orientation of the device (as determined, for example, based on the accelerometer and/or gyroscope of the device). As shown in FIGS. 15K-15P, the interface can be configured such that the keypad is centered within the touchscreen when the device is held in a 'flat' orientation (as shown in FIG. 15Q and described herein), while being positioned elsewhere on the screen (for example, in a manner that precludes a user from utilizing the entire keypad for input) when the device is held in other orientations (as shown in FIGS. 15K-P). As shown in FIG. 15Q, upon orienting the device in a 'flat' orientation (and thus centering the keypad), the user can be prompted to hold their thumb (or another finger) in a specific region of the touchscreen, such as in the manner described herein. Upon determining that the user is doing so (that is, maintaining his/her thumb/finger on the specified region), the user can be presented with a sequence of several numbers which are to be input into the keypad in order to authenticate the user to the device as a passenger, as shown in FIGS. 15R-T. Upon successfully inputting the presented sequence, the user can be authenticated as a passenger and various aspects/functions of the device can be activated/unrestricted, as described herein. It should be understood that, in certain implementations, the sequence can allow for some degree of user error (e.g., mistyping of the presented numeric sequence into the keypad), while also preventing a user from authenticating in the event that the quantity of errors exceeds a defined threshold (as described herein). It should be understood that the described authentication sequence is exemplary and that any number of modifications or adjustments or omissions to the sequence can be implemented and are within the scope of the present disclosure. For example, instead of a keypad the user may be presented with a keyboard and a sequence of letters to input.

Moreover, in certain implementations, in lieu of requiring a substantially 'flat' orientation (as shown, for example, in FIG. 15Q and described herein), the referenced technique(s) can be employed in relation to an orientation whereby the device is oriented, for example, such that the Y axis of the device (as shown in FIGS. 9A-9B and described in detail herein) is substantially aligned with the direction that the vehicle is traveling in, and the X-axis (as shown in FIGS. 9A-9B) is aligned with the up/down of the vehicle (as shown, for example, in FIG. 15C) or vice versa, i.e., with the Y-axis is up/down and the X-axis is collinear with the direction in which the vehicle is travelling. It can be appreciated that in order to achieve such an orientation, a user of the device will need to orient the device such that the user is facing towards the middle of the vehicle, or towards the side windows of the vehicle—but not towards the windshield (i.e., the front) of the vehicle (thus preventing attempts by drivers to circumvent such techniques by authenticating while diving). That such an orientation is consistent with the direction in which the vehicle is traveling can be confirmed, for example, based on a correlation of the GPS heading and the magnetometer/compass directional reading, as described herein. Moreover, that such orientation is consistent with the X-axis up/down can be confirmed based on one or more inputs from the device's accelerometer, such as in the manner described herein. It should also be noted that while in certain implementations the referenced techniques can be employed relatively consistently with respect to the various users (i.e., the same or a comparable orientation can be required of a user irrespective of whether he/she can be determined to be a driver or a passenger), in other implementations such an orientation can be selected based on a determination as to whether a particular user is likely to be a driver or a passenger (or a determination as to whether such a user is positioned on the right side or left side of the vehicle) as determined, for example, as described herein. In such implementations, for example, the user can be directed to orient the device in a particular way (e.g., such that the user must face towards the center of the vehicle in order to continue the referenced authentication process). It should also be noted that the referenced orientations are also exemplary and that any other such orientation can be similarly implemented.

In another implementation, the referenced technique(s) can be employed in relation to a substantially 'flat' device orientation (as determined, for example, as described herein) and an orientation in which the Y-axis (or X-axis) of the device is oriented substantially up/down and the X-axis (or Y-axis) is substantially collinear with the direction in which the vehicle is traveling.

Figure 47:
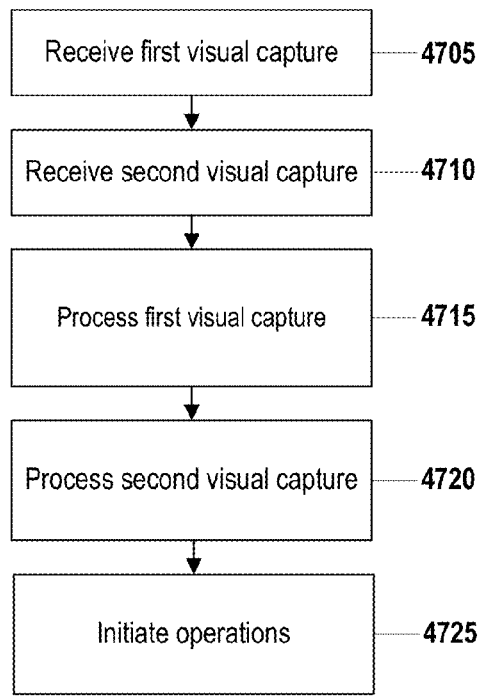
FIG. 47 is a flow diagram showing a routine that illustrates aspects of one or more methods, such as those described in relation to one or more embodiments described herein.

FIG. 47 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 4705 a first visual capture can be received, such as from a first camera of a user device. At 4710, a second visual capture can be received, such as from a second camera of the user device. In certain implementations, the second visual capture can be received substantially concurrent with receipt of the first visual capture. At 4715, the first visual capture can be processed, such as to identify a presence of a face within the first visual capture. At 4720, the second visual capture can be processed, such as to identify a presence of a face within the second visual capture. At 4725, one or more operations can be initiated, such as with respect to the user device. In certain implementations, the one or more operations can be initiated based on (a) an identification of a face within the first visual capture and/or (b) an identification of a face within the second visual capture. In certain implementations, one or more restrictions employed with respect to the user device can be modified. In certain implementations, a user of the user device can be identified as a passenger.

It should be noted that the techniques described herein can be employed in relation to and/or in conjunction with one or more passenger authentication task(s) (including but not limited to numeric input-related tasks and video capture-based tasks, such as those described herein), including in scenarios where various other elements/aspects/components (such as those described herein in relation to various passenger authentication tasks such as landscape orientation, thumb/multi-finger tasks etc.) are included/incorporated.

In another implementation, an authentication task can be employed such that the authenticator (e.g., a passenger) can be prompted to use a camera of the device (such as a rear-facing camera) to take a visual capture that can be processed to identify the inclusion of the profile (or another angle shot) of another vehicle occupant's face/head (for example, in lieu of a straight-on shot of the authenticator's face as described herein). In addition, the authenticator can be required to hold the device such that the screen is substantially parallel to vehicle's side window(s) and/or in an orientation where the device's touchscreen is facing the passenger's window. It can be appreciated that in such an orientation a driver is relatively unlikely to be able to take such a picture. And, even in a scenario where the driver were so capable, one or more inputs originating at the device (corresponding to, for example, accelerometer movement, the centering of the visual capture, etc.) can be processed to determine that such input(s) indicate that a driver is likely to be attempting such an authentication task (and the authentication attempt can thus be denied). In addition, in certain implementations the referenced authentication task can also incorporate one or more of the other elements described herein (e.g., landscape orientation, thumb/multi-finger tasks, number input tasks, etc.), thereby further reducing the likelihood that the referenced task(s) can be performed by a driver, while also avoiding substantially increasing the difficulty for a passenger to perform them.

In yet another implementation, an authentication task can be employed such that the authenticating user (e.g., a passenger) can be prompted to use the device's front-facing and rear-facing camera simultaneously (or in sufficiently close chronological proximity to one another and/or interleaved) to take two visual captures, each of which can be processed to identify a presence of a human face/head (e.g., a driver and a passenger) therein. In addition, the authenticating user can be prompted to hold/orient the device such that the screen of the device is substantially parallel to the vehicle's side windows and is also positioned in an orientation where the device's screen is facing the passenger's window. In such a scenario, a driver is relatively unlikely to be able to take such pictures. And, even in a scenario where the driver were so capable, the one or more inputs originating at the device (corresponding to, for example, accelerometer movement, the centering of the visual capture, etc.) can be processed to determine that such input(s) indicate that a driver is likely to be attempting such an authentication task (and the authentication attempt can thus be denied). In addition, in certain implementations the authenticating user can also be prompted to perform one or more of the other tasks, elements, etc. described herein (e.g., landscape orientation, thumb/multi-finger use, numeric input tasks, etc.), thereby further reducing the likelihood that the referenced task(s) can be performed by a driver, while also avoiding substantially increasing the difficulty for a passenger to perform them.

In yet another implementation, the authentication task can be employed such that the authenticating user (e.g., a passenger), can be prompted to use the device's front-facing and rear-facing camera simultaneously (or in sufficiently close chronological proximity to one another and/or interleaved) to take visual captures, each of which can be processed to identify a presence of a human face/head (e.g., a driver and a passenger) therein, whereby the front-facing camera (e.g., the user's camera) provides a video capture that includes a substantially straight-on face/head shot. In addition, the authenticating user can be prompted to hold/maintain the position/orientation of the device such that that the screen of the device is substantially parallel to vehicle's side windows and is also positioned in an orientation where the device's screen is facing the passenger's window. In such a scenario, a driver is relatively unlikely to be able to take such pictures. And, even in a scenario where a driver were so capable, the one or more inputs originating at the device (corresponding to, for example, accelerometer movement, the centering of the visual capture, etc.) can be processed to determine that such input(s) indicate that a driver is likely to be attempting such authentication task (and the authentication attempt can thus be denied). In addition, in certain implementations the authenticating user can also be prompted to perform one or more of the other tasks, elements, etc. described herein (e.g., landscape orientation, thumb/multi-finger use, numeric input tasks, etc.), further reducing the likelihood that the referenced task(s) can be performed by a driver, while also avoiding substantially increasing the difficulty for a passenger to perform them.

It should be noted that in scenarios that incorporate video capture, similar imaging methods, and/or techniques can also be employed in conjunction with one or more cameras that are in communication with, but not (necessarily) physically connected to the device (e.g., wearable cameras). It should be further noted that the techniques described herein can be modified and/or adjusted accordingly to account for such modifications to the techniques described herein.

It should also be noted that, in certain implementations, various aspects of the interface(s) depicted in FIGS. 15H-T can be configured to operate (e.g., be presented on a touchscreen) specifically/only in landscape mode/orientation. It can be appreciated that such an orientation can be more difficult for users who are drivers to interact with, while being relatively easier for users who are passengers to interact with.

Moreover, in certain implementations one or more time limits can be imposed on any/all of the elements/operations/steps in the referenced authentication sequence(s). Additionally, in certain implementations, any number of elements, operations, steps, or aspects of the referenced sequence(s) can be configured to determine that a user is likely to be a driver or a passenger at varying/intermittent stages of the sequence. For example, a sequence can be configured to terminate upon a determination that the device is not being held with at least a certain degree of stability (as can be determined as described herein, such as based on inputs from an accelerometer and/or gyroscope). By way of further example, a sequence can be configured to terminate upon a determination that the sequence (or any number of the steps/aspects of the sequence) is not completed within a defined timeframe.

It should also be noted that in certain implementations a user of a mobile device can be authenticated as being a passenger even if the vehicle within which the device is present is not moving, e.g., by recording a visual capture within which the driver's hand and the steering wheel can be determined to be present, as described in detail herein.

Turning now to FIG. 15, a flow diagram is described showing a routine 1500 that illustrates a broad aspect of a method for selectively restricting operation of a mobile device 105 in accordance with at least one embodiment disclosed herein. It should be understood that in certain implementations, such selective restriction of a mobile device can be employed in order to restrict operation of the device by a user who is a driver of a vehicle, while not restricting operation of the device (or, restricting operation of the device relatively less) by a user who is a passenger of a vehicle. Accordingly, it should be appreciated that various of the determinations and identifications described herein are directed towards one or more factors and/or aspects that are indicative in various ways of whether the user of the particular device is a drive or a passenger of the vehicle.

Additionally, it should be further understood that the referenced method is preferably implemented in situations, scenarios, and/or settings where mobile device 105 is present within a vehicle, such as a moving vehicle. Various methods for determining a presence of the device within a vehicle and/or a moving vehicle are described in detail herein.

At step 1505, processor 110 executing one or more of software modules 130, including, preferably, restriction module 171, employs one or more restrictions at mobile device 105 and/or in relation to mobile device 105, substantially in the manner described above with respect to step 705. It should be understood that in certain arrangements, such restriction(s) are preferably configured, on average, to impede operation of mobile device 105 by a user that is a driver more so than the restriction(s) impede operation of mobile device 105 by a user that is a passenger, as described in detail herein. It should also be understood that a single restriction can be understood and/or configured to be a combination and/or composite of multiple restrictions. It should also be understood that in certain implementations the methods described herein can be applied to a device that is already restricted, such as a device that is configured, by default, to operate, in a restricted state.

At step 1510, processor 110 executing one or more of software modules 130, including, preferably, restriction module 171 receives one or more inputs, such as one or more visual captures originating at mobile device 105 and/or mobile devices 160 (e.g., from camera 145F), such as an image, a series of images, and/or a video, substantially in the manner described above with respect to step 710.

Then, at step 1520, processor 110 executing one or more of software modules 130, including, preferably, restriction module 171, processes at least one of the visual captures (such as those received at step 1510) to identify one or more indicators within the visual capture. It should be understood that the terms "indicator" and/or "indicators" as used in context of the referenced visual capture(s) are intended to encompass one or more items, elements, and/or aspects that can be distinguished, determined, and or identified within a visual capture, as is known to those of ordinary skill in the art. That is, it can be appreciated that in processing the one or more visual capture(s), the visual captures (e.g., images and/or videos) can be analyzed using one or more image processing techniques, as are known to those of ordinary skill in the art. In doing so, one or more indicators can be identified within the visual capture, and such indicators can preferably be further utilized to determine if/how one or more restrictions are to be adjusted at/in relation to the mobile device 105, as will be described in greater detail below.

The following are exemplary and non-limiting illustrations of various visual captures that can be received, and indicators that can be identified within the respective visual capture:

In one implementation, a visual capture can include an image of at least a portion of a face of a user, and such a visual capture can be processed to identify one or more indicators that reflect a steady gaze of the user. It can be appreciated that while a vehicle is in motion, a passenger in a vehicle is more likely to be able to maintain an ongoing steady gaze into a camera of a mobile device than a driver who will necessarily divert his/her gaze in order to see the road while driving.

In another implementation, a visual capture can include an image of at least a portion of a face of a user, and such a visual capture can be processed to identify an absence of a steering wheel in the visual capture. It can be appreciated that a visual capture that contains the presence of a steering wheel together with at least a portion of a face of a user indicates that it is likely that the user is in close proximity to the steering wheel, and is thus more likely to be a driver of the vehicle. Thus, in visual captures where the steering wheel has been determined to be absent, it can be determine that the user of the device which captured such a visual capture is likely to be a passenger.

In another implementation, a visual capture can include an image of one or more feet of a user, and such a visual capture can be processed to identify a position of the one or more feet. That is, it can be appreciated that a visual capture of the feet of a driver is likely to include one or more pedals (e.g., gas, brake, and/or clutch), and/or the positioning of the feet of the driver, either on or around such pedals. Conversely, the absence of such pedals and/or the foot positioning that they entails, indicates that the user of the device which captured the image capture is likely to be a passenger.

In another implementation, a visual capture can include an image of at least a portion of a body of a user, and such a visual capture can be processed to identify a presence of a fastened seatbelt in a passenger orientation, as depicted in FIG. 15B and as will be described in greater detail below with respect to step 1720.

In another implementation, a visual capture can include an image of an interior of a vehicle, and such a visual capture can be processed to identify at least two hands and a steering wheel, as will be described in greater detail below with respect to step 1542.

By way of further illustration in another implementation, a video capture that reflects the scenery outside of a vehicle can be processed, such as using image/video analysis, to determine the orientation of the mobile device. In order to do so, indicators such as the position of the sky and/or horizon can be identified within the in the visual capture, such as using image processing methods and approaches known to those of ordinary skill in the art. It can be appreciated that various aspects of the visual capture will necessarily change based on the orientation of device 105 and/or the relative location of the device within the vehicle. It can thus be appreciated that in doing so, the orientation of mobile device 105 and/or the relative location of the device within a vehicle can be determined, as will be described in greater detail below.

At step 1522, processor 110 executing one or more of software modules 130, including, preferably, restriction module 171 receives one or more inputs, preferably from at least one of the sensors 145 of mobile device 105, a vehicle data system 164, and/or one or more other mobile devices 160, substantially in the manner described above with respect to step 710. It should also be understood that various inputs can be received from multiple sources (e.g., various sensors, devices, etc.). For example, inputs from accelerometer 145A and/or gyroscope 145B can be received, such inputs corresponding to an orientation of mobile device 105. By way of further example, one or more input(s) from one or more tactile sensor(s) 145N, such as the simultaneous depressing of one or more buttons, and/or the simultaneous tactile interaction of multiple points and/or locations on a touchscreen display.

At step 1524, processor 110 executing one or more of software modules 130, including, preferably, restriction module 171 processes the one or more inputs, such as those received at step 1522, to determine a presence of a passenger within a vehicle. By way of example, inputs can be received from vehicle data system 164, such as those originating at various sensors deployed within a vehicle, such as weight/ heat sensors that are positioned within one or more seats, and/or sensors that can detect whether one or more seatbelts are/are not fastened. Such inputs can be processed in order to determine a presence of, and/or the likelihood of the presence of, one or more passengers within a vehicle.

Figure 19:
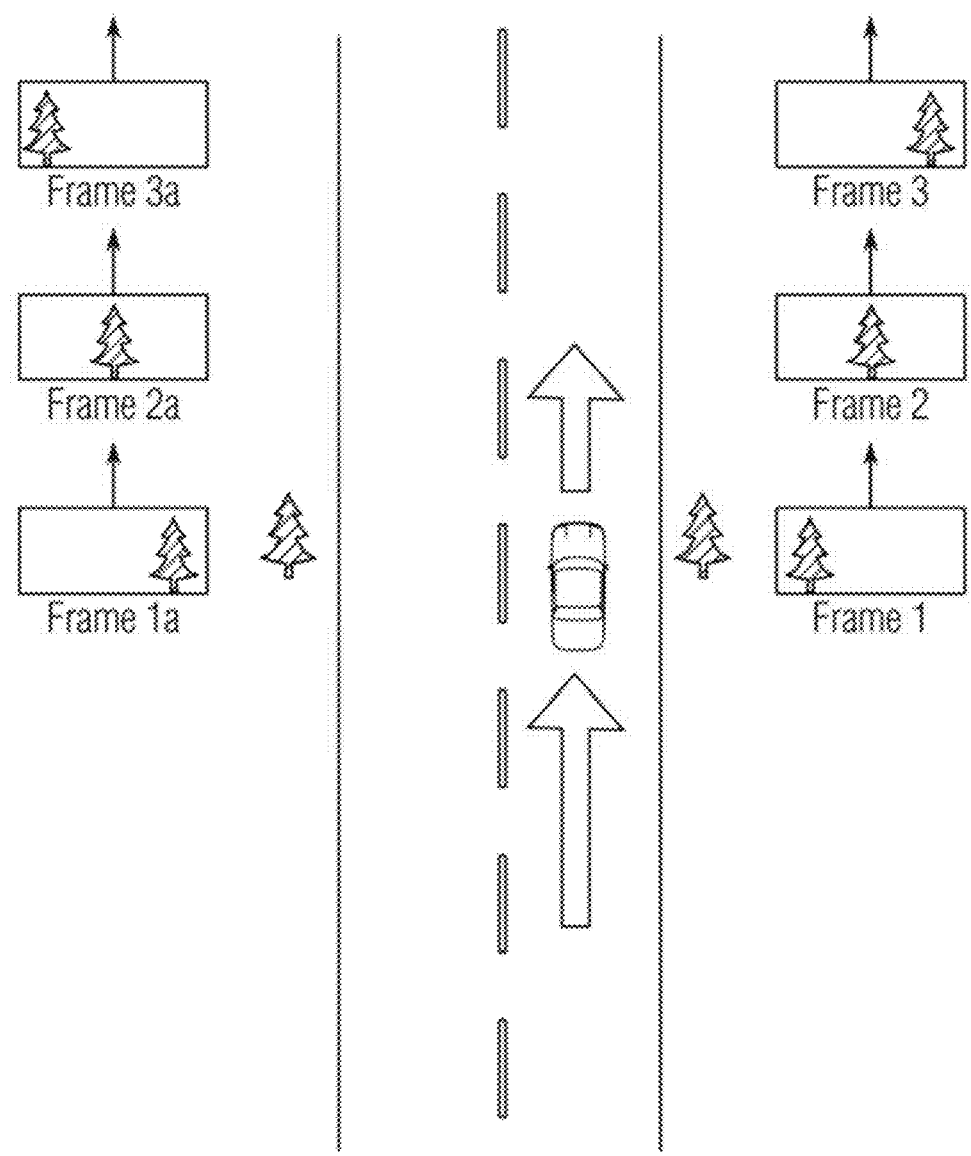
FIG. 19 depicts an exemplary determination of orientation of a device based on visual capture(s) in accordance with at least one embodiment disclosed herein.

At step 1526, processor 110 executing one or more of software modules 130, including, preferably, restriction module 171 processes the one or more inputs with the visual capture and/or the indicators to determine a relationship between the inputs and the visual capture and/or the indicators. That is, it can be appreciated that the processing of inputs from one or more of sensors 145 (and/or from other sources) together with the visual capture/indicators can further enhance the accuracy of determinations made and/or actions taken, such as the determination of the orientation and/or location of device 105, as referenced above. For example, inputs from accelerometer 145A and/or gyroscope 145B can be processed together with the referenced visual capture/indicators in order to determine an orientation of the device 105 and/or a relative location of the device with increased accuracy. That is, it can be appreciated that if the visual capture/indicators reflect scenery outside the vehicle, such visual capture/indicators can be processed to determine the direction in which the mobile device 105 is traveling. For instance, if a stationary item (and/or an item moving at a speed slower than the vehicle within which the user is traveling) identified in the visual capture moves from left to right over the course of the visual capture (such as the progression from Frame 1 to Frame 3 as depicted in FIG. 19), it can be determined that such a visual capture was taken with the mobile device 105 being oriented such that the visual capture is taken from the right side of the vehicle. Accordingly, it can be reasonably concluded that the user capturing such a visual capture is not the driver of the vehicle (who would be seated on the left side of the vehicle). Similarly, a stationary item identified in the visual capture moves from right to left over the course of the visual capture (such as the progression from Frame 1a to Frame 3a as depicted in FIG. 19), it can be determined that such a visual capture was taken with the mobile device 105 being oriented such that the visual capture is taken from the left side of the vehicle, and thus it cannot be determined with certainty that the user is not the driver of the vehicle. It can be said that such determinations reflect a relationship between the inputs and the visual capture/indicators.

By way of further illustration, in one implementation, a relationship can be determined wherein preferably while the vehicle is in motion, the user presses the device against the vehicle's right-side window with the device oriented so that the Y axis of the device (as shown in FIGS. 9A-9B and described in detail herein) is pointed in the forward direction that the car is traveling in, the device is oriented so that the positive part of the X-axis (as shown in FIGS. 9A-9B) is facing up and the rear-facing camera of the device is facing out (together referred to as the "required orientation", as shown in FIG. 15C)—something that in most circumstances only a passenger can do (it can also be appreciated that the "required orientation" can be configured to account for cameras in other positions on the mobile device, such as a camera on the front face of the device—wherein it can be appreciated that the negative side of the X-axis is to be facing up). Indicators can be identified, such as by processing the one or more visual captures originating from the camera of the device to determine if the movement of pixels or blocks of pixels or features of interest in one or more successive visual captures are consistent with the device being on the right window (e.g., if pixels in successive frame are moving from left-to-right as opposed to right-to-left if the device were on the left window), as are known to those of ordinary skill in the art. The referenced visual capture and/or indicators can be processed with the one or more inputs to determine a relationship therebetween.

At this juncture, it can be appreciated that while implementations such as those where the processing of a visual capture/indicators to identify the direction in which stationary objects (and/or objects moving at a speed slower than the vehicle within which the user is traveling) move over the course of several frames (that is, left to right or right to left) can enable a determination with a certain degree of certainty as to whether the visual capture was taken from the right side of a moving vehicle (indicating that the visual capture was taken by a passenger) or the left side of a moving vehicle (indicating that the visual capture was not necessarily taken by a passenger), in certain situations further validation can be advantageous. This is because, in certain scenarios, a driver, though seated on the left side of the moving vehicle, can still take a visual capture that shows stationary objects moving from left to right. Accordingly, it can be appreciated that analyzing additional inputs and/or factors can be advantageous in order to further determine that a driver is not actually skewing the determinations referenced above.

By way of example, in certain implementations, one or more inputs (e.g., inputs originating at an accelerometer, gyroscope, magnetometer, camera, etc.) can also be processed (such as in the manner described in detail herein) in order to determine a stability of mobile device 105. It should be understood that any number of inputs and/or combinations of inputs can be processed in order to determine the stability of device 105. It can be appreciated that the degree of stability of device 105 can be indicative of whether a user of the mobile device is a driver or a passenger in that in a scenario where a driver points device 105 towards the right-hand window of the vehicle, it is likely that the mobile device 105 is supported only by the hand of the driver within the interior of the vehicle (it should also be recognized that given the fact that the driver must remain on the extreme left-hand side of the vehicle in order to operate the vehicle whose controls are situated on that side, it is exceedingly difficult, if not impossible, for the driver to effectively operate the vehicle while also reaching across the width of the car to the right-hand window). Given this positioning, a mobile device 105 operated by a driver of a vehicle is generally subject to considerable instability, especially when the vehicle is moving. A passenger, conversely, who can be seated on the right side of the vehicle, generally has the ability to hold and/or position his/her mobile device 105 against the window, wall panel, and/or door of the vehicle. Doing so provides an additional measure of stability which is generally unattainable by a driver, as discussed above. As such, it can be appreciated that by determining the stability of mobile device 105, and additionally, by identifying a relationship between the one or more inputs and the visual capture/indicators, the systems and methods disclosed herein can better identify and/or account for operation of the device by drivers and/or passengers.

As noted in the example above, any number of inputs (both individually as wells as when processed in combination) can be analyzed in order to determine the stability of mobile device 105. By way of further illustration, the visual capture/indicators themselves can be analyzed/processed in order to identify the degree of "shake" present, in a manner known to those of ordinary skill in the art. That is, it can be appreciated that multiple indicators can be identified from a single visual capture. For example, it can be appreciated that if an amount or degree of "shake" can be detected in a visual capture (in addition to other indicators that can be identified in the same visual capture, such as those described in detail above). In determining such an amount/degree of shake, it can be further determined that mobile device 105 is likely positioned in an unstable manner (such as by being held in a manner other than by being positioned against a window of the vehicle), and thus has a significant likelihood of being operated by a driver of the vehicle. Various other inputs, such as inputs from the gyroscope 145B and/or the accelerometer 145A can also be processed/analyzed to determine the stability of the mobile device 105.

By way of further illustration, in certain implementations, in addition to identifying one or more indicators within a visual capture, as describe in detail above, determinations (such as those that can be computed based on the indicators, such as that the user of the device is a driver or passenger of the vehicle) can be further confirmed/verified by processing the visual capture(s)/indicator(s) with one or more other inputs in order to determine a relationship between them. For example, it can be appreciated that a determination that the mobile device is pressed against the window (as opposed to held by the user just looking out of the window), in the required orientation, can be computed based on inputs originating at the accelerometer and/or gyroscope and/or other sensors. In doing so, any number of determinations can be computed, in part in order to confirm that the device is being held in a manner consistent with being pressed against a window. For example, (i) if it can be determined that the device moves/shakes relatively less than it would if it were held in a hand that is not supported by a window and/or door; (ii) if the device vibrates consistently with being held against a window; and/or (iii) if the visual capture(s) of the mobile device do not contain pixel blocks indicative of the device not being against window (e.g., near-fixed pixels on the borders of the visual capture showing the door or the roof or the window frame of the vehicle, etc.) in the preferred/required orientation that is consistent with a user pointing the rear-facing camera of the device out the window of a vehicle (wherein the camera sees light, the camera sees moving pixels, and/or the inward facing light sensor shows an amount of light consistent with pointing inward in the required orientation, as is known to those of ordinary skill in the art).

In certain implementations, the device being pressed against the right-side window of the vehicle in the required orientation (as described above) can be verified by processing one or more inputs, such as those originating at the accelerometer, by tracking the movement of the device immediately prior to its being pressed against a window. If, before determining/validating that the device is pressed against a window in the required orientation, and/or after accounting for changes in the orientation of the device during such period of movement, the device moved to the right relative to the direction in which the vehicle is heading, then it can be determined that the device has moved to the right-side window. This determination can preferably be computed based on inputs originating at the accelerometer, the gyroscope, the GPS and/or the magnetometer, as is known to those of ordinary skill in the art. It should be understood that such approaches can operate independently and/or in conjunction with one or more of the various implementations and approaches described in detail herein.

In other implementations, the user can be required to perform one or more simultaneous tactile interactions with the device. One or more inputs can be processed in order to determine the number of instances of simultaneous tactile interaction. As referenced above, examples of such tactile interactions include the depressing of one or more buttons, and/or the simultaneous tactile interaction of multiple points and/or locations on a touchscreen display (commonly known as "multitouch"), as is known to those of ordinary skill in the art. It can be appreciated that in certain circumstances, in order to provide two (or more) such simultaneous tactile interactions, a single user must use both of his/her hands. In other implementations, in order to provide six (or more) such simultaneous tactile interactions, a single user must use both of his/her hands (assuming that a single hand is capable of at most five simultaneous tactile interactions).

By way of further illustration, FIG. 15A depicts an exemplary lock screen, in accordance with at least one embodiment disclosed herein. It should be understood that while FIG. 15A is exemplary, it illustrates various aspects of the various approaches described in detail herein. For example, area 1560 depicts various blocks where numbers are presented to the user (such as at random). The user is prompted to input each respective number (e.g., '3') as the number is presented. In randomizing the numbers presented, the user is effectively required to be attentive to the numbers being presented (as opposed to repeatedly inputting the same user-defined lock code). Area 1565 (depicting an image of a fingerprint) corresponds to an area within which the user must maintain constant contact throughout the authentication/unlock process with at least one finger (as described in detail herein). In doing so, the user effectively must dedicate one hand to such constant contact, thereby necessitating that the other unlock procedures (e.g., the inputting of the numbers, as referenced above) be performed with the other hand of the user—thus effectively requiring the user of both of the hands of a user (and thereby creating a situation whereby such a procedure is difficult, if not impossible, for a driver of a vehicle to achieve, especially while driving). Moreover, a timer 1570 is employed, requiring that the user perform the required authentication within a specified time period (as described in detail herein). Moreover, an 'Emergency Call' button 1575 enables the user to initiate emergency communications even without authenticating/unlocking the device, as is also described herein.

As referenced above, in certain implementations, various of the referenced approaches can be employed in combination and/or in parallel. Such arrangements entail the processing of multiple inputs, and/or determining one or more characteristics associated with the operation state of mobile device 105, including but not limited to: an orientation of mobile device 105, the relative location of mobile device 105 within the vehicle, a relative movement of mobile device 105, a stability of mobile device 105, and/or a number of simultaneous tactile interactions with mobile device 105. More particularly, it can be appreciated that the implementation of multiple approaches can further increase the accuracy of the collective determinations above that of a single determination, and ultimately ensuring that operation of mobile device 105 by a driver of the vehicle is prevented and/or restricted, while operation by a passenger is permitted. Moreover, such inputs and/or determinations can be processed with other such determinations, visual captures, and or indicators, in order to identify relationships therebetween.

Figure 20:
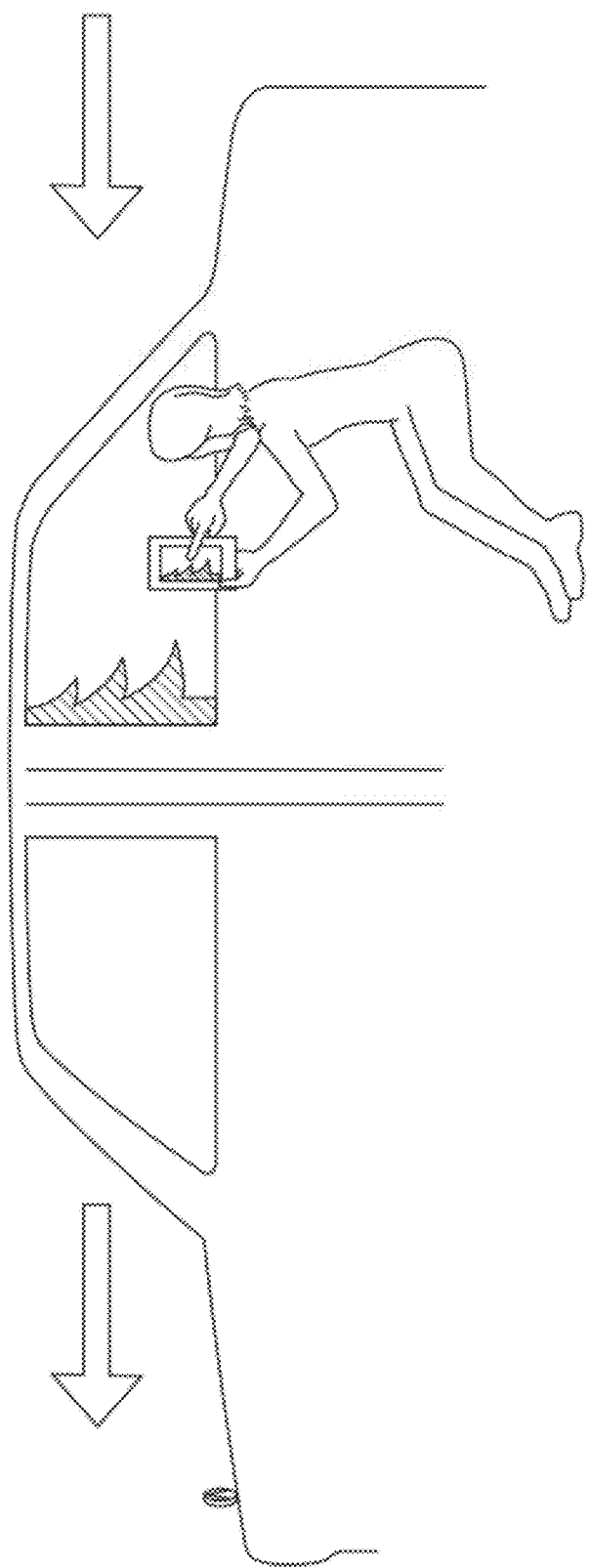
FIG. 20 depicts the orientation and/or location of mobile device in order to provide the requisite stability described herein, in accordance with at least one embodiment disclosed herein.

For example, a visual capture can be processed to identify one or more indicators, and/or to determine the orientation of mobile device 105 and/or the relative location of the device 105 within a vehicle (using the various image analysis techniques described in detail above). The visual capture/indicators and/or other inputs can be processed to determine the stability of device 105, as described in detail above (thus further ensuring that the device is not being operated by a driver), while also determining a number of instances of simultaneous tactile interaction, as also described above. In particular, given that mobile device 105 will generally need to be supported against a vehicle's window in order to achieve both a) the proper orientation to obtain a suitable visual capture that confirms the orientation and/or location of mobile device 105, and b) the requisite stability (provided by lodging and/or supporting mobile device 105 against the window, wall panel, and/or door of the vehicle), it can be appreciated that achieving even this degree of orientation/stability requires substantial ongoing control of at least one of a user's hands, as depicted in FIG. 20. Accordingly, it can be appreciated that a user must generally use most, if not all of, the fingers from one of their two hands to orient the device in such a way for any period of time. Thus, it can be further appreciated that practically any simultaneous tactile interactions with device 105 would be exceedingly difficult for a driver of the vehicle who also needs at least one hand to steer. As such, requiring further interaction with device 105 (e.g., a multi-finger swipe motion in order to unlock or otherwise unrestrict the device), in combination with the above referenced determination(s), can further confirm that such a device is being operated only by a passenger.

In certain implementations, a device can be verified to be operated by a passenger by requiring the user to physically interact with the device (e.g., perform a multi-touch or swipe) while the user is pressing the device against a window of the vehicle in the required orientation in a manner that is likely to require the use of a second hand. It can be appreciated that a driver of a moving vehicle cannot easily (if at all) press a device against the window in the required orientation, hold it stably and interact with it. Let alone on the window on the opposite side of the vehicle (s)he is driving.

Then, at step 1542, processor 110 executing one or more of software modules 130, including, preferably, restriction module 171, adjusts an implementation of one or more restrictions at/in relation to mobile device 105. It should be understood that in various scenarios, adjusting an implementation of a restriction can entail employing one or more restrictions, modifying an implementation of one or more previously employed restrictions, and/or removing one or more previously employed restrictions. It should be further understood that the adjusting, employing of, modifying of, and/or removing of one or more restrictions at/in relation to mobile device 105 is/are preferably effected based on one or more of the visual captures, indicators, relationship(s), and presences, and/or determinations referenced above. For example, based on the identification of one or more indicators (e.g., identifying the presence/absence of a steering wheel in a visual capture, such as a visual capture of the face of the user while the device is held in a horizontal orientation), one or more restrictions can be employed (e.g., if a steering wheel is present in the visual capture, indicating that the user is likely a driver) and/or removed (e.g., if no steering wheel is present, indicating that the user is likely to be a passenger). By way of further illustration, based on a determination that device 105 is on the left (driver's) side of the vehicle, a restriction can be employed whereby the mobile device is no longer receptive to user inputs. By way of further example, based on a determination that device 105 is facing out the right-hand window of the vehicle and is relatively stable, one or more previously employed restrictions of mobile device 105 can be removed.

At this juncture, it should be understood that in various implementations, the accuracy and/or efficacy of certain of the referenced inputs that are received and/or processed can be compromised when the vehicle within which the mobile device is present is engaged in a turn (as determined, for example, based on inputs originating at accelerometer 145A, gyroscope 145B, or the magnetometer 145E and/or compass 145M, and as described in greater detail herein). This is in part due to the various forces that are present in a turning vehicle that are perceptible by various sensors such as an accelerometer (e.g., through the centripetal force shown on its z-accelerometer) and/or gyroscope, which are not present when the vehicle is traveling substantially straight. Thus, in certain implementations, the various systems and methods described herein can be configured such that various operations, such as the receipt and/or processing of various inputs is precluded (and/or the results of any processing or determination that incorporated such results is discounted, discarded, and/or ignored) when it can be determined that the referenced vehicle is engaged in a turn, such as in a manner described in detail herein.

It should be noted that in certain implementations it can be useful to loosen one or more restrictions (e.g., have them appear intermittently—either at random, at some fixed rate or dynamically according to certain events) after the device user (who has already passenger authenticated) has and/or continues to interact with the device in a manner that further suggests that the user is the passenger by, for example, (a) using the keyboard at a good speed; (b) using the keyboard with low and/or consistent inter-key time variations; (c) using the keyboard with a low level of typographical mistakes; (d) exhibiting device movement that is consistent with that of a passenger.

Moreover, in certain of the implementations described herein, as long as a vehicle occupant does not successfully authenticate as a passenger (and, optionally, even if the user does), it can be useful to allow the user to operate and/or interact with the device via voice (e.g., voice-to-text, voice-to-command, text-to-voice). This feature can optionally be limited to devices that are in a cradle and/or are being used in a hands-free manner.

Figure 16:
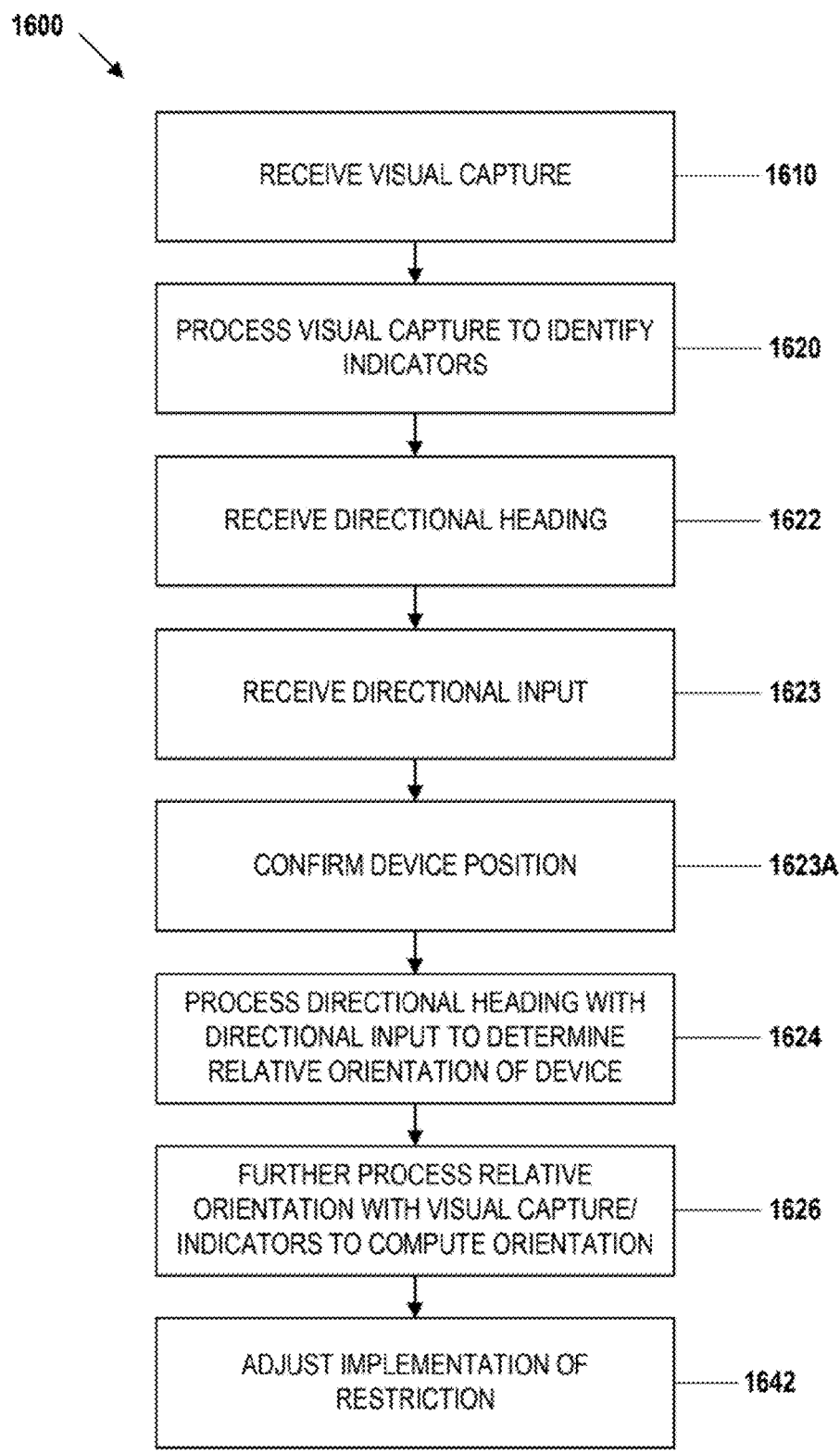
FIG. 16 is a flow diagram showing a routine that illustrates a broad aspect of a method for selectively restricting operation of a mobile device in accordance with at least one embodiment disclosed herein.

Turning now to FIG. 16, a flow diagram is described showing a routine 1600 that illustrates a broad aspect of a method for selectively restricting operation of a mobile device 105 in accordance with at least one embodiment disclosed herein.

At step 1610, processor 110 executing one or more of software modules 130, including, preferably, restriction module 171 receives one or more visual captures, substantially in the manner described above with respect to step 1510.

Then, at step 1620, processor 110 executing one or more of software modules 130, including, preferably, restriction module 171, processes at least one of the visual captures (such as those received at step 1510) to identify one or more indicators within the visual capture, substantially in the manner described above with respect to step 1620.

At step 1622, processor 110 executing one or more of software modules 130, including, preferably, restriction module 171 receives one or more inputs, such as a directional heading of mobile device 105 originating at from GPS receiver 145C, substantially in the manner described above with respect to step 710.

At step 1623, processor 110 executing one or more of software modules 130, including, preferably, restriction module 171 receives one or more inputs, such as a directional input 105 originating at from magnetometer 145E and/or compass 145M, substantially in the manner described above with respect to step 710.

At step 1623A, processor 110 executing one or more of software modules 130, including, preferably, restriction module 171, computes one or more determinations, such as determinations reflecting orientation/position of mobile device 105. By way of example, an input from the accelerometer can be received, preferably reflecting the X-axis position, and such input can be processed to confirm that the device is being held in the required position with respect to the X-axis, such as in the manner described herein. Moreover, in certain implementations various of the methods described herein can be employed which determine the degree of stability and/or the amount of "shake" present at the mobile device, based on which it can be determined whether the device is oriented against a door/window of a vehicle, such as in the manner described above with respect to FIG. 15.

Then, at step 1624, processor 110 executing one or more of software modules 130, including, preferably, restriction module 171, processes the received inputs, including the directional heading and the directional input, and such input can be processed to confirm that the device is being held in the required orientation with respect to its Y-axis. That is, it can be appreciated that the directional heading originating at the GPS can be correlated with the directional input(s) from the magnetometer/compass in order determine the orientation of the Y-axis of mobile device 105, as is known to those of ordinary skill in the art.

At step 1626, processor 110 executing one or more of software modules 130, including, preferably, restriction module 171 further processes the relative orientation of a mobile device, such as of a device held in the required orientation with respect to its x-axis (such as that determined at step 1623A), with at least one of the visual capture (such as that received at step 1610) and the one or more indicators (such as those identified at step 1620) to determine the device's relative orientation. It should be understood that in certain implementations, in doing so, it can be confirmed that the device is being held in the proper Y-axis orientation, i.e., if the device's positive Y-axis is pointed in the direction of the vehicle. It certain implementations, it may be useful to compare the device's Y-axis orientation as determined in step 1624 with the device's Y-axis orientation determined in this step. Such would be particularly useful in correcting a situation where the device was incorrectly placed on the left window of the vehicle in the required X-axis orientation and with the rear facing camera point out (i.e., to the left side), but which rear facing camera was incorrectly identified from the visual capture to be pointing to the right because a vehicle that was moving faster than the vehicle in which the device is present was seen in the visual capture. It should be further understood that in certain implementations the required orientation of the rear-facing camera of the device facing out against the window can be confirmed, and/or can be confirmed/determined to not be held facing out of the window based upon evidence in the visual capture originating at the device (e.g., by determining whether or that one or more interior components of the vehicle, e.g., the window pane, door, etc., are present in the visual capture) and can be confirmed to be facing out against the right window based upon the direction of movement of objects as is described in detail herein. It should also be understood that various additional confirmation approaches can be employed, such as various multi-touch and/or $2^{nd}$ camera methods, such as those described in detail herein. It can be further appreciated that computing such a correlation enables the further determination of the relative location of device 105 within the vehicle. In determining the orientation of device 105, such as a mobile device held in the required orientation referenced above (as determined based on the GPS and compass headings), the perspective of the visual capture can be further appreciated, thereby enabling the determination of where the user is/is not seated within the vehicle, and thus to what degree of likelihood the user is/is not the driver and/or passenger of the vehicle.

The required orientation consists of three parts: (1) X-axis, (2) Y-axis, (3) pressed against (right) window, (forward-facing camera pointing out).

Accordingly, it should be understood that the operations described with respect to steps 1623A-1626 pertain to various aspects of the "required orientation" as described herein. It should be understood that the "required orientation" preferably consists of/incorporates three parts/aspects/determinations: (1) X-axis, (2) Y-axis, and (3) that the device is pressed against the window of a vehicle, preferably with the rear-facing camera of the device facing out.

Accordingly, it should be understood that inputs originating at the X-axis accelerometer can be processed to confirm that the device is being held in the required X-axis orientation, i.e., landscape orientation, as described herein. Moreover, inputs originating at the camera (i.e., visual captures) can be processed, wherein generally stationary/slower moving objects should move from left to right, and/or GPS heading can be processed against the magnetometer direction to confirm the required Y-axis orientation, i.e., positive Y-axis in direction of vehicle's movement. It can be appreciated that doing so also establishes that the camera (i.e., the rear facing camera) is pointing to the right. Moreover, the degree of "shake" perceived/determined at the device (as it can be appreciated that a device shakes relatively less when held against a window than when held by hand) and/or aspects determined based on the visual capture (being that a device held against window will not show interior components of vehicle) can be processed to confirm that the device is pressed against window. Based on the combined processing of these elements, it can be determined that the device is oriented at the right-hand side window of the vehicle, as described herein.

By way of further illustrations, it should be understood that one or more of the above referenced implementations (e.g., the visual capture processing, the stability determination, etc.) can be further enhanced (or, alternatively, the present implementation can be employed independently, without connection to any other of the implementations described herein) by verifying that the device is pressed against the right window in the required orientation by using the GPS sensor and the magnetometer and/or compass to verify that the orientation of the mobile device is consistent with being pressed against the right window of a vehicle in the correct orientation (as described in detail above). For example, it can be appreciated that in a scenario where a device is pressed against the left-hand side window of a vehicle window in an attempt to fraudulently authenticate the device in the manner described herein, such a device would still provide a GPS heading that is discernibly different than a device comparably positioned against the right-hand window of the vehicle Accordingly, even in a scenario where other of the above-referenced implementations do not accurately determine the identity of the use of the device (as a driver or passenger), the present approach can provide an accurate determination/authentication of the identity of the user of the device as a driver or passenger.

Then, at step 1642, processor 110 executing one or more of software modules 130, including, preferably, restriction module 171, adjusts an implementation of one or more restrictions at/in relation to mobile device 105 (that is, employs one or more restrictions, modifies an implementation of one or more previously employed restrictions, and/or removes one or more previously employed restrictions) based on the correlation, substantially in the manner described in detail above with respect to step 1542.

Figures 17, 17A:
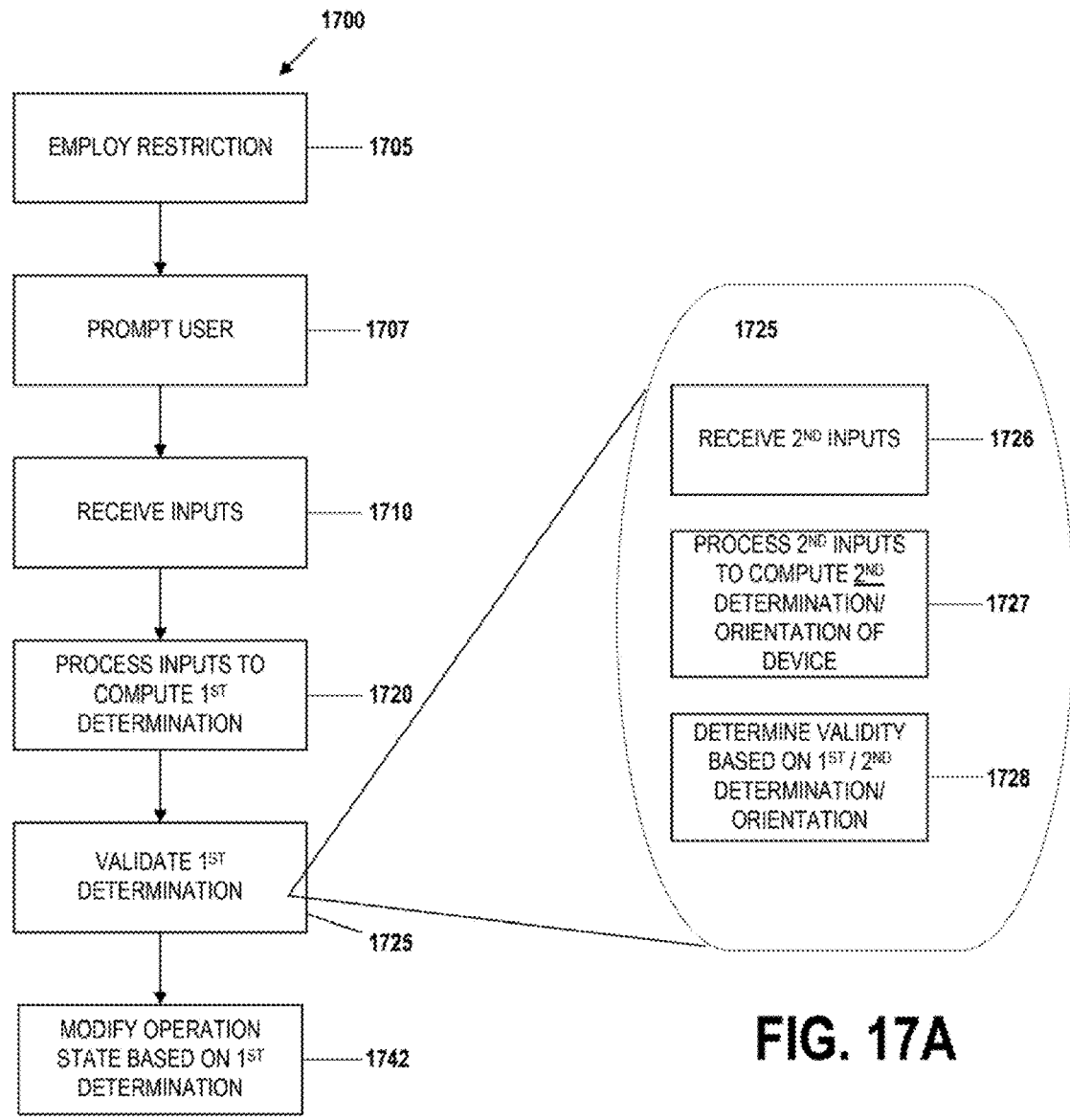
FIG. 17 is a flow diagram showing a routine that illustrates a broad aspect of a method for authenticating an in vehicle role of a user of a mobile device and/or modifying a restriction of a mobile device in accordance with at least one embodiment disclosed herein.
FIG. 17A is a flow diagram showing particular aspects of the validation step of FIG. 17, in accordance with at least one embodiment disclosed herein.

Turning now to FIG. 17, a flow diagram is described showing a routine 1700 that illustrates a broad aspect of a method for authenticating an in vehicle role of a user of a mobile device and/or modifying a restriction of a mobile device 105 in accordance with at least one embodiment disclosed herein.

It can be appreciated that in order for a user to utilize the functionality of the integrated camera 145F of mobile device 105, such a user must grasp and/or come into contact with mobile device 105 with at least one hand. As such, it can be further appreciated that a visual capture taken by camera 145F that depicts two hands of a driver can be determined to be likely to have been taken by a user other than the driver of a vehicle, as will be described in greater detail below.

At step 1705, processor 110 executing one or more of software modules 130, including, preferably, restriction module 171, employs one or more restrictions at mobile device 105 and/or in relation to mobile device 105, substantially in the manner described above with respect to step 1505. By way of illustration, in certain implementations such restrictions can configure the mobile device 105 to operate only in landscape mode (that is, depicting the content/user interface shown on the display of the mobile device be depicted only in a landscape, i.e., lengthwise fashion) and/or in landscape orientation (that is, requiring that the X-axis of the mobile device must detect gravity, as is known to those of ordinary skill in the art—e.g., when held lengthwise—an orientation that generally requires two hands to effectively navigate and/or provide inputs to), as is known to those of ordinary skill in the art. By way of further illustration, in certain implementations such restrictions can configure mobile device 105 to receive various inputs only when the mobile device is oriented at a defined orientation and/or within a defined range of orientations (as can be determined using the accelerometer and/or gyroscope of the device). It should also be noted that in certain implementations, the various restrictions employed at/in relation to the mobile device 105 do not preclude partial and/or full operation of the device using voice commands, as is known to those of ordinary skill in the art. Moreover, in certain implementations, the restrictions do not preclude operation of the device for emergency purposes, such as to call or text '911'; as is also known to those of ordinary skill in the art.

It should be noted that in scenarios where a device is oriented nearly flat (as if it were on a table) it can be difficult to determine whether the device is being held in portrait or landscape orientation, i.e., whether the Y-axis of the device is pointed towards/away from the user (i.e., portrait orientation) or whether it is perpendicular to the user (i.e., landscape orientation) because the X and Y accelerometers, which are generally used to determine such, have zero readings in this orientation.

The portrait vs. landscape orientation of such devices can nonetheless be determined in cases where the device is held/oriented in such "flat on a table" or nearly "flat on a table" positions based on observations as to how the values associated with the accelerometer and/or gyroscopes of a device change over time and how the "flatness" of the device fluctuates over time (as users generally cannot hold the device perfectly still). For example, a device that is determined to be nearly flat and in portrait orientation (i.e., with its Y-axis pointed at the user) will tend to have greater pitch than roll, whereas were the same device positioned in landscape orientation (i.e., with its X-axis pointed at the user), it would tend to have greater roll than pitch. As such, devices that are held flat and that exhibit greater pitch than roll can be determined to be in portrait orientation and, based on such a determination, can be configured such that the user interface presented on their screens is also in portrait mode, whereas devices that exhibit greater roll than pitch can be determined to be in landscape orientation and, based on such a determination, can be configured such that the user interface presented on their screens is also in landscape mode, for example.

At step 1707, processor 110 executing one or more of software modules 130, including, preferably, restriction module 171, prompts a user of the mobile device 105 to initiate and/or provide one or more first inputs at mobile device 105, substantially in the manner described above with respect to step 707. At this juncture, it should be noted that in certain implementations, such prompting includes the presentation, display and/or projection of prompts to the user in an obfuscated and/or obscured manner. That is, such prompts are preferably presented, displayed, and/or projected in one or more ways that require increased concentration and/or attention in order for a user to properly observe and comprehend/appreciate the prompting. Such obscuring/obfuscating of the various prompts/prompting serves to convey the information contained in the prompting (e.g., a word or string that the user must type) in such a way that is relatively more difficult for a driver to appreciate/understand (given that the driver is likely to be distracted by and/or concentrating on various ongoing driving-related tasks) than for a passenger to appreciate/understand (given that the passenger is less likely to be so distracted/concentrated).

By way of illustration, in certain implementations, such as those in which at least some portion of the referenced prompting is conveyed to the user visually (e.g., through the screen of the device), it can be useful to have some or all of such information presented, displayed, and/or projected in a manner that makes it more difficult for someone that is less able to pay close attention to the existence and/or content of such visual information that is required to successfully complete the required action(s), thereby increasing the difficulty for a user who is driving to successfully complete the requested stimulus/input. For example, such visual information can appear for only a short period of time and/or a non-constant time interval (including intervals of time that contain random components) so that a driver of a moving vehicle, who is relatively less able to focus on such visual information, is more likely to miss and/or not see it and/or not process such prompting information (or at least not comprehend/understand it as quickly as a passenger would, on average); thereby further preventing a driver of a device from successfully unlocking such a device (and/or fraudulently authenticating such a device as if the user were a passenger). Moreover, in other implementations, such prompting information can be displayed in a different manner (e.g., in a different location, orientation, color, font and/or shape), consistently and/or periodically. In doing so, it can be appreciated that the ongoing changing of the manner or manners in which such prompts are presented, displayed, and/or projected introduces greater unpredictability for the user viewing/expecting the prompting, thereby increasing the difficulty to the driver in anticipating/appreciating the prompting, as described.

At step 1710, processor 110 executing one or more of software modules 130, including, preferably, restriction module 171 receives at least a first input. Such inputs can include, but are not limited to: alphanumeric inputs provided in response to a prompt (such as a CAPTCHA prompt, as is known to those of ordinary skill in the art), inputs provided during the course of an interactive game, inputs provided in a lock screen, inputs provided during the course of an interactive puzzle, one or more tactile gestures (such as one or more swipe gestures) provided at a tactile sensor such as a touchscreen of the mobile device 105, one or more visual capture(s) and/or one or more inputs from one or more of an accelerometer a gyroscope, a GPS receiver, a microphone, a magnetometer, a camera, a light sensor, a temperature sensor, an altitude sensor, a pressure sensor, a proximity sensor, a near-field communication (NFC) device, a compass, user interface, device buttons, a communications interface, and a vehicle data system.

Then, at step 1720, processor 110 executing one or more of software modules 130, including, preferably, restriction module 171, processes the one or more first inputs (such as those received at step 1710) to compute a first determination, the first determination reflecting at least one in-vehicle role indicator which relates to the in-vehicle role of the user of the device as being either a driver or a passenger. This determination, reflecting an in-vehicle role of the user as a driver/passenger, preferably reflects an indication, such as one present in a particular interaction with the mobile device 105, that the user of mobile device 105 is/is not reflecting behavior that conforms with that which can be determined to be associated with drivers and/or passengers. As will be illustrated in greater detail below, it should be understood that certain in-vehicle role indicators can enable determinations regarding the role of a first user based on inputs such as visual captures that reflect aspects of another user (for example, if a first user takes a picture of a second user who is driving a car, it can be determined, based on an identification of the second user as a driver, that the first user is not a driver, and thus is a passenger), while other in-vehicle role indicators can enable determinations based on inputs such as visual captures that reflect aspects of the user him/herself.

By way of example, in one arrangement a visual capture (e.g., a digital image or video) can be processed, such as by using image recognition techniques known to those of ordinary skill in the art, to identify, within the visual capture, two hands grasping a steering wheel. It can be appreciated that a user grasping the steering wheel of a vehicle can be determined to be likely to be the driver of the vehicle. However, based on the identification of two hands on the steering wheel, it can be further determined that only a passenger in the vehicle is likely to be capable of capturing such a picture using mobile device 105. (It should be understood that in certain implementations, further advanced image processing techniques can be employed, whereby the two hands identified on the steering wheel can be analyzed to determine that the two hands are substantially similar, and thus are likely to belong to the driver—as opposed to the driver placing one hand on the wheel, and the passenger placing another or the angle of the visual capture can be processed/analyzed to determine that the device is not likely to have been in a cradle or to require that the second camera of the device, if available, also record a visual capture which can be processed to make sure there are no signs therein indicating that the driver performed the visual capture, such as in the manner described herein.) Thus, it can be appreciated that in such implementations, while the visual capture itself depicts the hands of a driver, based on such a visual capture one or more determinations can be computed regarding the likelihood that the identity of the user that captured the picture (that is, the user of the mobile device 105) is a passenger.

By way of further example, in another implementation a visual capture can be received and processed, such as by using image recognition techniques known to those of ordinary skill in the art, to identify, within the visual capture, the positioning and/or orientation of a seat belt in relation to a user. For instance, if the visual capture depicts a seatbelt as stretching from the right shoulder of a user to the left thigh of a user, it can be reasonably determined that the pictured user is a passenger and not a driver.

By way of further example, in certain embodiments, an in-vehicle role of a user can be determined if, the user can configure the device to capture a visual capture that can be processed to identify one or more indicators which, implicitly or explicitly indicate that there is a passenger in the car. (It should be understood that such visual capture(s) are preferably captured while the vehicle is in motion, as described in detail above). For example, as referenced above, if the user is able to take a visual capture of two hands on the steering wheel, the user of such device can be determined to be a passenger (as a driver generally cannot both take a visual capture with the device and hold the steering wheel with two hands). By way of further example, if the user of the device takes a visual capture within which a seatbelt going from the right shoulder of the user to left thigh of the user can be identified, the user of such a device can be determined to be a passenger (being that a visual capture that a driver would take of him/herself is likely to show a seatbelt going in the opposite direction).

At this juncture, it should be noted that in certain implementations, various other inputs, including but not limited to visual capture(s), can be received and/or processed in order to determine an in-vehicle role of a user of mobile device 105. For example, mobile device 105 can be positioned (such as in a dock) such that visual capture(s) received by/at the mobile device relate to a user's gaze (captured using a front-facing and/or rear-facing camera of the mobile device, depending on the orientation of the device, as can be appreciated by those of ordinary skill in the art). That is, the visual capture can be analyzed/processed using image processing techniques known to those of ordinary skill in the art, to identify the movements of a user's eyes, preferably while the vehicle is in motion (as can be determined based on various inputs, such as the accelerometer 145A). By way of illustration, if analysis of the visual capture reveals that the gaze of the eyes of the user of the device constantly and quickly returns to the direction of the windshield, it can be determined that the user is likely the driver (as such a pattern would be typical of a driver who needs to maintain ongoing view of the road while driving).

By way of further illustration, in certain implementations, an in-vehicle role of a user of a mobile device can be determined to be a passenger if, while the vehicle is in motion, the user is able to configure the device to take a visual capture based upon which it can be identified (such as through image processing techniques as referenced herein) that the user is able to look (i.e., focus his head and/or gaze/vision) in a manner that only a passenger can and/or a driver cannot. For example, if it can be determined, such as through the referenced image processing analysis of the visual capture, that the user of the device is capable of maintaining a substantially consistent/continuous look/gaze in the direction of the device for a defined period or certain periods of time, the in-vehicle role of such a user can be determined to be a passenger.

At step 1725, processor 110 executing one or more of software modules 130, including, preferably, restriction module 171, validates one or more determinations, such as the determinations computed at step 1720. That is, as referenced herein, it can be appreciated that under certain circumstances and/or scenarios, any number of determination approaches can be susceptible to error and/or fraud. As such, it can be advantageous to further validate such determinations, thereby increasing the respective accuracy of each determination. The particulars of such validations will be described with reference to FIG. 17A.

Turning now to FIG. 17A, at step 1726, processor 110 executing one or more of software modules 130, including, preferably, restriction module 171, receives one or more second inputs, substantially in the manner described in detail above with respect to step 1710. In certain implementations, such second inputs are preferably different inputs from those received at step 1710 (by virtue of the second inputs originating from a different sensor and/or source, or by virtue of the second inputs being a separate input instance from the first input). By way of example, such second inputs can be received from the accelerometer and/or the gyroscope of mobile device 105.

At step 1727, processor 110 executing one or more of software modules 130, including, preferably, restriction module 171, processes the second inputs (such as those received at step 1726) to compute a second determination, substantially in the manner described in detail above with respect to step 1720. In certain implementations (even those where the second input originates from the same source as the first input) the second determination is preferably independent of the first determination, such as the determination computed at step 1720. By way of illustration, the second determination (computed based upon inputs received from the gyroscope and/or accelerometer of the device) can reflect an orientation of the device, such as an orientation of the device with respect to the ground/earth. By way of further illustration, the second determination (computed based upon inputs received from the gyroscope, accelerometer, and/or GPS/magnetometer of the device) can reflect an orientation of the device, such as an orientation of the device with respect to the vehicle within which the device is present, as described herein. By way of further illustration, the second determination (computed based upon inputs received from the gyroscope and/or accelerometer of the device) can reflect a pattern or trend that reflects the manner in which the vehicle within which the device is present is moving (e.g., reflecting acceleration, deceleration, stability, etc.). By way of further illustration, in an implementation where it can be determined that the focus of the user's gaze towards the windshield (as identified based on the processing of a visual capture, as described herein) tends to increase during periods of acceleration, fast speed, and/or other movements, this correlation can indicate that the user is a driver (as a driver is likely to pay additional attention to the road as such driving events occur). (It should be noted that mobile devices 105 having dual cameras—that is, cameras on both their anterior and posterior sides, as are well known to those of ordinary skill in the art, are well suited for the referenced determinations, as they enable visual captures of both a user's gaze as well as the scenery outside the vehicle's windshield.)

Figure 17B:
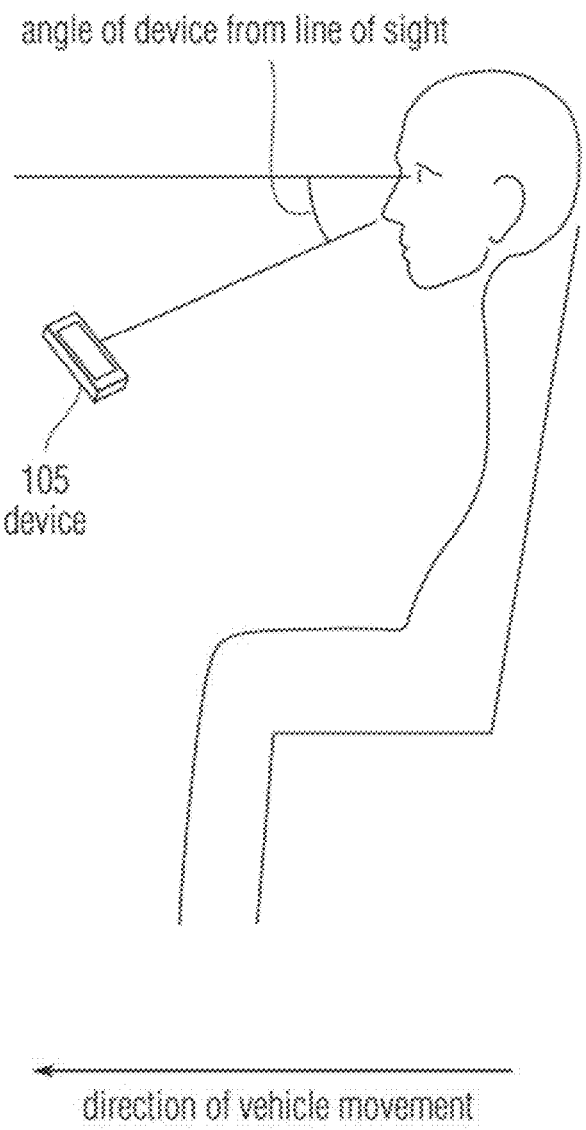
FIG. 17B is an illustration depicting an orientation of a mobile device in relation to a typical line of sight of the driver in a moving car, in accordance with at least one embodiment disclosed herein.

At step 1728, processor 110 executing one or more of software modules 130, including, preferably, restriction module 171, determines a validity of at least one of the first determination and/or the second determination. In certain implementations, the validity is determined by comparing the determinations and/or identifying correlations, relationships, patterns, correspondences, and/or discrepancies between them. By way of further illustration, in certain implementations, if it can be determined, such as through the referenced image processing analysis of the visual capture, that the user of the device is capable of maintaining a substantially consistent/continuous look/gaze in the direction of the device for a defined period or certain periods of time, while the device is held in a certain manner, such as at a particular orientation (as can be determined, for example, using the accelerometer/gyroscope of the mobile device 105), the in-vehicle role of such a user can be determined to be a passenger. It can be appreciated that by requiring that the user maintain his/her look/gaze towards the mobile device while the device is positioned at a particular orientation, such as an orientation and/or a range of orientations that entails the device being positioned substantially horizontally, a user can effectively be prevented from simultaneously looking at the device and also looking at the road ahead. For example, in a scenario where the angle of the device (as can be measured/determined, for example, using inputs originating from the accelerometer and/or gyroscope of the device) is oriented more than a defined threshold amount/number of degrees (e.g., 10, 20, or 30 degrees) (upward/downward/rightward/leftward or some combination thereof) from the typical line of sight of the driver in a moving car, such as is depicted, for example, in FIG. 17B, the in-vehicle role of a user who is capable of maintaining a substantially consistent look/gaze toward the mobile device (as determined through an analysis of the visual capture, as described above) while the device maintains such an orientation can be determined to be a passenger (since it is highly unlikely that a driver of a moving vehicle is capable of maintaining such a gaze towards the mobile device while the mobile device is so oriented, while also effectively driving a moving vehicle). It should be understood that the referenced examples are merely exemplary, and that numerous other implementations are also contemplated, utilizing other inputs, as can be appreciated by those of ordinary skill in the art.

At this juncture, it should be noted that in certain implementations, the various visual capture(s) referenced herein can be processed against one or more databases, such as databases that maintain images/photographs, and such processing can be further utilized in determining the in-vehicle role of a user of a mobile device. For example, it can be appreciated that many regulatory agencies (such as a department of motor vehicles) maintain databases of images of all licensed drivers within a particular jurisdiction. Moreover, it can be appreciated that certain mobile device users, such as children, the visually impaired, and/or the elderly, can frequently travel in vehicles despite the fact that these individuals do not drive, by virtue of the fact that they are not licensed to drive. Thus, in certain implementations, the visual capture of the face of a user can be processed against such a database that maintains photographs of licensed drivers. Using image recognition techniques known to those of ordinary skill in the art, if one (or more) photographs from the licensed driver database are identified as substantially similar to the image capture of the face of the user of the mobile device, it can be determined that the user is more likely to be a driver (by virtue of the fact that such a user is known to at least possibly be a licensed driver, and thus can have a propensity to drive). Conversely, if no photographs from such a database are identified as being substantially similar y to the image capture of the face of the user of the mobile device, it can be determined that the user is more likely to be a passenger (by virtue of the fact that such a user may not even possess a license to drive).

By way of further illustration, the above referenced approach (identifying an in-vehicle role of a user based on the degree to which the user can focus his/her look or gaze) can be further implemented in conjunction with one or more of the other approaches described herein. For example, in a scenario where mobile device 105 is equipped with two cameras (e.g., a forward-facing camera which faces the user when operating the phone, and a rear-facing camera which faces away from the user like most traditional cameras), by processing visual captures from a first camera facing the user and visual captures from a second camera facing away from the user (and preferably outside a vehicle window). Based on the processing of such visual captures, a determination that the device is on the right-side of the vehicle can be computed (as described in detail above), and/or a determination that the user is able to maintain a prolonged gaze towards the device can be computed (as also described in detail above). In such a scenario, it can be further determined that the in-vehicle role of such a user of the device is not a driver, and one or more restrictions of the device can be adjusted accordingly.

Then, at step 1742, processor 110 executing one or more of software modules 130, including, preferably, restriction module 171, adjusts an implementation of one or more restrictions at/in relation to mobile device 105 (that is, employs one or more restrictions, modifies an implementation of one or more previously employed restrictions, and/or removes one or more previously employed restrictions) based on the determination and/or the validation, substantially in the manner described in detail above with respect to step 1642.

Figure 21:
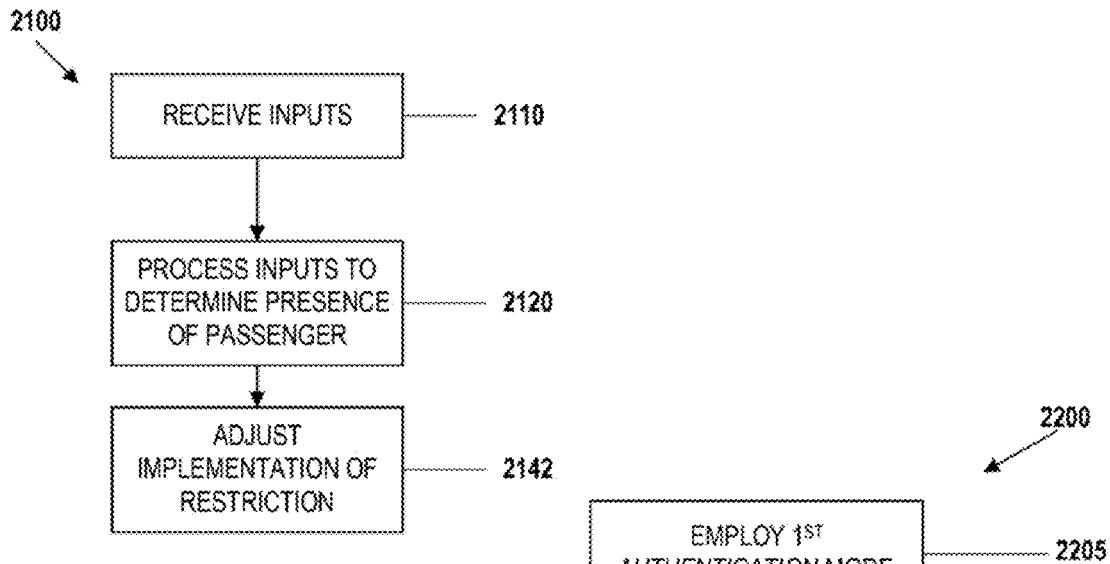
FIG. 21 is a flow diagram showing a routine that illustrates a broad aspect of a method for selectively restricting a mobile device, in accordance with at least one embodiment disclosed herein.

Turning now to FIG. 21, a flow diagram is described showing a routine 2100 that illustrates a broad aspect of a method for selectively restricting a mobile device 105 in accordance with at least one embodiment disclosed herein. It should be understood that in certain implementations, including any and all of the implementations and approaches described herein, it can be advantageous to initially determine (e.g., by and/or based on inputs originating at vehicle data system 164) that there is a passenger present in the vehicle. It can be appreciated that if the presence of a passenger within a vehicle cannot be initially determined, it can be more efficient to preclude any/all of the various methods and approaches described herein, such as those which serve to identify the in-vehicle role of the particular user, and thus simply employ one or more restrictions based upon a determination that the user is likely to be the driver. Moreover, in certain implementations, it can be advantageous to initially determine (e.g., based on inputs originating at the mobile device 105 and/or external sources such as vehicle data system 164) that the vehicle within which the mobile device 105 is present is in motion (being that certain restrictions may be preferable/appropriate/necessary only when the vehicle is in motion).

At step 2110, processor 110 executing one or more of software modules 130, including, preferably, restriction module 171 receives one or more inputs, substantially in the manner described in detail above with respect to step 1710. For example, inputs originating at various sensors within a vehicle (e.g., seatbelt sensors, weight/movement/heat sensors at a passenger seat, etc.) can indicate and/or be processed to determine that a passenger is present within the vehicle. Put differently, one or more sensors or sources (e.g., vehicle data system 164) can provide inputs and/or other such information that indicate and/or can be processed to determine that a vehicle is moving and/or that there are occupants in the vehicle other than a driver. In certain implementations, if no such inputs/notifications, etc. are received, and thus the presence of a passenger in the vehicle cannot be confirmed), any or all of the various methods described in detail herein will effectively be precluded, as referenced above, such as by not adjusting any restriction/unlocking the device.

At step 2120, processor 110 executing one or more of software modules 130, including, preferably, restriction module 171, process the inputs (such as those received at step 2110) in order to determine a presence of a passenger within the vehicle. That is, as referenced above, in certain implementations (which, as noted, can be employed independently or in conjunction with one or more of the various other implementations and approaches described herein) one or more inputs originating at a vehicle data system (e.g., OBDii or other in-car computer systems such as seatbelt sensors, weight/movement/heat sensors in a passenger seat, etc.) can be processed to determining that there are one or more passenger occupants in the vehicle (and/or a degree of likelihood of such) and/or that more than one occupant is present in the vehicle (and/or a degree of likelihood of such).

Then, at step 2142, processor 110 executing one or more of software modules 130, including, preferably, restriction module adjusts an implementation of one or more restrictions at/in relation to mobile device 105 (that is, employs one or more restrictions, modifies an implementation of one or more previously employed restrictions, and/or removes one or more previously employed restrictions) based on the determination. That is, it can be appreciated that if the presence of at least one passenger within the vehicle cannot be determined, the various methods and authentication approaches described herein can be precluded/prohibited from commencing and/or made to fail regardless of the result of the other components, accounting for the fact that it is unlikely that a passenger is actually present in the vehicle, and thus the user of the device within the vehicle is likely to be the driver.

It should also be noted that in certain implementations, various of the methods and approaches described herein, such as various approaches for determining an in-vehicle role of a user, can operate based on a default assumption/setting reflecting that the in-vehicle role of the user of the device is a driver, until proven otherwise (through one or more of the various methods described herein). In certain implementations such a default setting can optionally allow the device user unrestricted access until such time as such user wants to perform certain interactions that require passenger authentication.

It should also be understood that the references provided above to holding/maintaining the mobile device at a particular orientation (such as substantially horizontal) are non-limiting, and in certain implementations various other restrictions, methods, approaches, etc. can be employed without requiring such orientation constraint.

It should also be noted that many of the implementations described herein can be implemented alone and/or in different combinations.

It should also be noted that in certain implementations, any of the passenger authentication methods/approaches described herein can be configured to require that certain components/aspects of the authentication methods/approaches be performed at certain times within the process and/or within certain amounts of time and/or for certain amounts of time (e.g., the user must begin a swipe gesture within 1 second of the phone being placed in the required orientation and must be complete the gesture within 0.8 seconds thereafter during which time, for example, the user must place a finger in a certain location of the device for at least 1 second).

It should also be noted that the calculations, computations, and/or processing operations that are required in such authentication processes can be performed at the device itself and/or can be performed at a remote device (such as at central machine 168)—or in some combination thereof, in a manner known to those of ordinary skill in the art.

It should also be noted that in certain implementations, the authentication approaches/methods described herein are configured to prevent/preclude requiring a passenger to re-authenticate his/her device when a vehicle temporarily stops or slows down (e.g., reduces its speed below a certain threshold), during the course of a journey. This can be done, for example, by requiring that a the user of the device re-authenticate only if the vehicle within which the device is present can be determined to have stopped and/or maintained a slow speed (e.g., as can be determined based on inputs originating at the GPS, accelerometer, gyroscope, vehicle data system, antennas, radio frequencies/signals, such as those originating at one or more radio towers, such as those utilized in implementing cellular communication networks, as is known to those of ordinary skill in the art, and/or other sensors), for more than a certain amount of time. In other implementations, the referenced requirement for re-authentication can be correlated with a determination that the engine of the vehicle within which the device is present is still operating (e.g., based on a determination computed by processing one or more of inputs originating at the accelerometer, gyroscope, magnetometer and/or microphone, as described herein).

Figure 22:
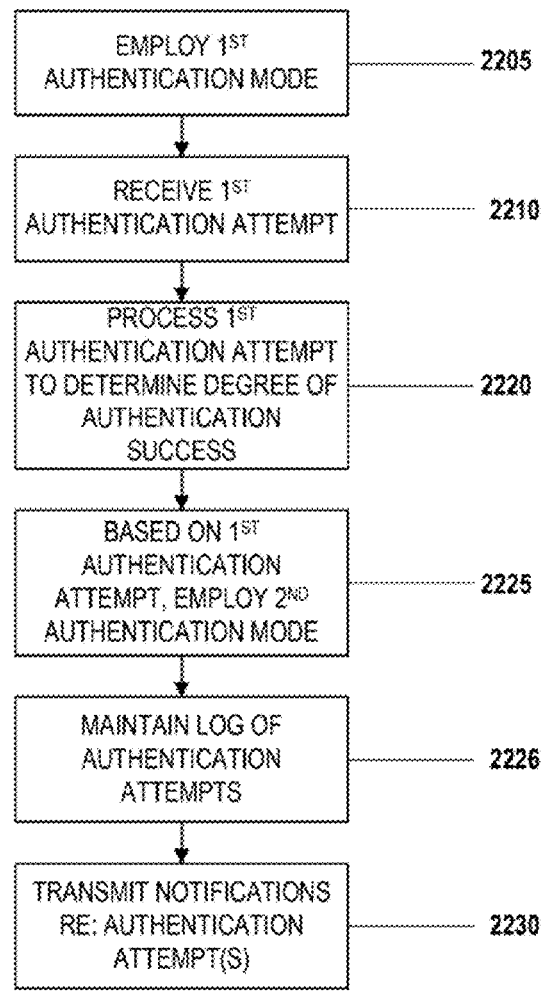
FIG. 22 is a flow diagram showing a routine that illustrates a broad aspect of a method for eliciting an authentication at a mobile device, in accordance with at least one embodiment disclosed herein.

Turning now to FIG. 22, a flow diagram is described showing a routine 2200 that illustrates a broad aspect of a method for eliciting an authentication at a mobile device 105 in accordance with at least one embodiment disclosed herein. It should be understood that in certain implementations, such mobile device preferably has one or more authentication modes, such as a first authentication mode and a second authentication mode. Moreover, in certain implementations, such a mobile device preferably has a single authentication mode having a range of settings/parameters that can be adjusted, as described in detail herein.

At step 2205, processor 110 executing one or more of software modules 130, including, preferably, restriction module 171, employs one a first authentication mode at/in relation to mobile device 105. By way of example, a first authentication mode can include a lock screen or mode (such as those referenced above at step 1710) wherein a user is prompted/required to provide alphanumeric input(s) in completion of a CAPTCHA exercise, complete an interactive puzzle, etc.

At step 2210, processor 110 executing one or more of software modules 130, including, preferably, restriction module 171, receives a first authentication attempt. For example, such a first authentication attempt can include an input provided by the user in attempting to authenticate/unlock the device, such as alphanumeric input(s) (in the case of a CAPTCHA prompt), an input attempting to perform an interactive puzzle, etc.

At step 2220, processor 110 executing one or more of software modules 130, including, preferably, restriction module 171, processes the first authentication attempt to determine a degree of authentication success. For example, in the case of a CAPTCHA prompt, the first authentication attempt (that is, the alphanumeric characters input by the user) can be processed to determine the degree to which the input was successful in performing the task required to authenticate the device (such as the percentage of characters in the CAPTCHA prompt that were properly input by the user).

At step 2225, processor 110 executing one or more of software modules 130, including, preferably, restriction module 171, employs a second authentication mode based on the first authentication attempt. That is, it can be appreciated that in a scenario where the first authentication attempt did not successfully authenticate the device and/or where the first authentication attempt did not meet a certain degree of authentication success (e.g., inputting at least 70% of the characters in the CAPTCHA prompt correctly), a second authentication mode can be employed. In certain implementations, such a second authentication mode preferably entails an authentication mode that is more restrictive and/or more difficult to authenticate than the first authentication mode. For example, the second authentication mode can require a certain delay (e.g., 30 seconds) before another authentication attempt can be received at the mobile device. By way of further example, a second CAPTCHA prompt can be presented requiring the user to input more letters than the first CAPTCHA prompt, and/or to input such letters more accurately, in order to authenticate/unlock the device.

At step 2226, processor 110 executing one or more of software modules 130, including, preferably, restriction module 171, maintains a log of authentication attempts. At step 2230, processor 110 executing one or more of software modules 130, including, preferably, restriction module 171, transmits one or more notifications regarding one or more authentication attempts, such as to a third party. It can be appreciated that in doing so, such authentication attempts can be monitored, and users who consistently fail to authenticate their devices can be identified as potentially attempting to authenticate their devices while driving.

By way of further illustration, it can be appreciated that in certain implementations, such as those described above, it can be advantageous to make passenger authentication attempts, which come after failures to authenticate, increasingly/progressively difficult. In certain implementations, this can be achieved by requiring that a certain amount/duration of time elapse before a device, whose authentication has failed, can elicit and/or receive a re-authentication attempt. Such time can also be configured to increase progressively after each authentication failure. Moreover, in certain implementations, such authentication failures can be reported one or more third parties. Moreover, in certain implementations, such authentication failures can entail one or more dynamic changes/adjustments to the parameters of the various techniques required to successfully authenticate (e.g., the device must be more stable on successive attempts in order to authenticate).

It should also be noted that in certain implementations the details of the passenger authentication can be reported/transmitted to one or more third parties, and corresponding logs can be established/maintained for them.

Figure 23:
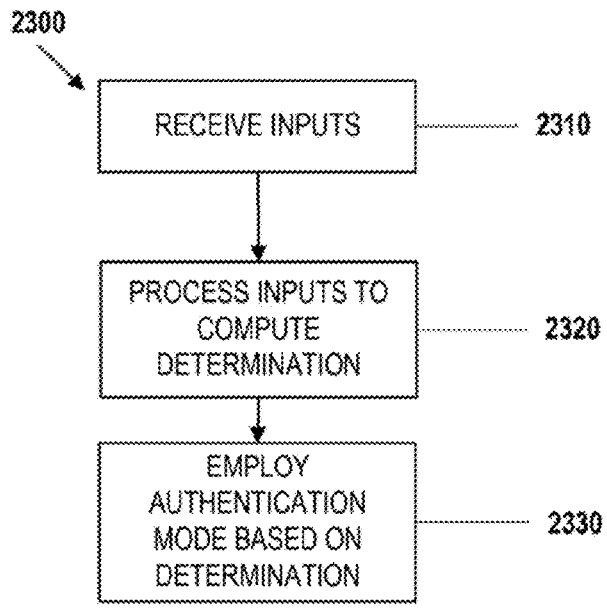
FIG. 23 is a flow diagram showing a routine that illustrates a broad aspect of a method for eliciting an authentication at a mobile device, in accordance with at least one embodiment disclosed herein.

Turning now to FIG. 23, a flow diagram is described showing a routine 2300 that illustrates a broad aspect of a method for eliciting an authentication at a mobile device 105 in accordance with at least one embodiment disclosed herein. It should be understood that in certain implementations, such mobile device preferably has one or more authentication modes, such as a first authentication mode and a second authentication mode. Moreover, in certain implementations, such a mobile device preferably has a single authentication mode having a range of settings/parameters that can be adjusted, as described in detail herein.

At step 2310, processor 110 executing one or more of software modules 130, including, preferably, restriction module 171, receives one or more inputs, substantially in the manner describe in detail above with respect to step 1710. Examples of such inputs include, but are not limited to, inputs relating to speed, location, road type, time of day, weather conditions, traffic conditions, (as received, perceived and/or determined based on one or more inputs of the sensors of a particular device, information and/or data received from one or more external sensors and/or devices, such as, for example, external data streams, RSS feeds, and/or databases, such as those accessible over a GPRS data connection, and/or computations and/or determinations that are computed based on one or more of such inputs, information, data, etc.).

At step 2320, processor 110 executing one or more of software modules 130, including, preferably, restriction module 171, processes the input(s) to compute one or more determinations. Preferably the determinations reflect a degree to which a user, such as a user in a moving vehicle, is likely to be capable of multitasking and/or is distracted and/or is potentially distracted or distractible. For example, it can be determined that a user of a device present within a vehicle moving at a high rate of speed is likely to be more distracted (such as in scenario where such a user is the driver, on account of the increased concentration that the driver must dedicate to driving at a higher speed) and/or subject to the increasing force(s) (such as in a scenario where such a user is a passenger, especially while the vehicle is moving laterally), more so than a user in a vehicle moving at a relatively lower rate of speed.

At step 2330, processor 110 executing one or more of software modules 130, including, preferably, restriction module 171, employs an authentication mode at the mobile device based on the determination. It should be understood that in certain implementations such an authentication mode can include multiple parameters, settings, and or configurations, while in other implementations such an authentication mode can be selected from among multiple distinct authentication modes, such as a first authentication mode and a second authentication mode. For example, as referenced above, it can be appreciated that a driver present in a vehicle moving at a relatively high rate of speed is likely to be potentially more distracted, and thus relatively less able than a driver present in a vehicle moving at a relatively low rate of speed to provide even a relatively simple authentication (while, at the same time, a passenger in such a vehicle can be similarly limited, on account of the forces imposed on the user while riding in such a fast moving vehicle). It can be similarly appreciated that a user traveling within a vehicle moving at a relatively slower rate of speed is likely to be more capable of multitasking, even while driving, than a comparable user traveling within a vehicle moving at a relatively faster rate of speed, and thus can be determined to be relatively less distracted than such a comparable user traveling in a vehicle moving at a relatively faster rate of speed. As such, in certain implementations, one of the various authentication modes and/or settings thereto can be employed/selected based on a determination that reflects the likelihood that the user is/is not distracted/able to multitask. Thus, by way of illustration, in certain implementations, when the vehicle is moving at a relatively slower rate of speed, an authentication mode/setting requiring relatively more concentration/attention can be employed (such as a CAPTCHA prompt requiring six letters to be correctly/accurately input in order to authenticate/unlock the device), and when the vehicle is moving at a relatively faster rate of speed, an authentication mode/setting requiring relatively less concentration/attention can be employed (such as a CAPTCHA prompt requiring only four letters to be correctly/accurately input in order to authenticate/unlock the device) can be employed.

By way of further illustration, it should be noted that any and all of the implementations, methods, and approaches described herein, including those enumerated above, can also be employed in a manner whereby the difficulty of the task presented to and/or required of a user in order to authenticate the in-vehicle role of a user as a passenger (including the time needed for a user to perform an action in order to so authenticate his/her identity as a driver or passenger, and/or the time limit within which the user is required to so authenticate), can be determined and/or adjusted dynamically based upon any number of factors. By way of example, factors such as speed, location, road type, time of day, weather conditions, traffic conditions, (as perceived and/or determined based on one or more inputs of the sensors of a particular device, information and/or data received from one or more external sensors and/or devices, such as, for example, external data streams, RSS feeds, and/or databases, such as those accessible over a GPRS data connection, and/or computations and/or determinations that are computed based on one or more of such inputs, information, data, etc., such as in the manner described in detail herein) can be considered and/or processed in order to determine and/or adjust one or more operational parameters of a particular authentication task/mode or tasks/modes, as described above. For example, in a scenario where the vehicle within which the user is traveling is moving at a relatively slow speed, the user can be required to complete an authentication task within a relatively shorter time limit (as compared to when the vehicle is moving at a relatively faster speed), thereby accounting for the fact that when traveling at a slower speed, a driver may be able to divert his/her attention from driving for a relatively longer time interval (as compared to when driving faster). As such, the time limit within which the authentication task must be completed can be reduced at lower speeds. (Similarly, it can be appreciated that when traveling at faster speeds, a passenger may require additional time to complete an authentication task, accounting for the additional forces attendant with travel at higher speeds.) By way of further illustration, in certain implementations the duration of time during which a particular authentication task must be performed can also be adjusted dynamically based on any number of factors, such as those referenced above. For example, when a vehicle is traveling at a relatively slower speed, a user can be required to hold his/her gaze into a camera of a mobile device for a relatively longer period of time than such authentication may require when traveling at relatively faster speeds. Being that at slower speeds a driver may be able to divert his/her attention from driving for relatively longer periods of time (as referenced above), the authentication task/mode can be adjusted (such as by requiring that the task be performed continuously for a longer period of time) in order to account for this discrepancy/difference. It should also be noted that in certain implementations, the particular authentication task required of a user (e.g., a swipe unlock gesture, a puzzle, etc.) can be changed or substituted depending on the various factors referenced above. Thus, for example, at one speed a swipe unlock gesture can be required in order to authenticate the user as a passenger, while at another speed a puzzle must be completed in order to complete such authentication.

Moreover, in certain implementations one or more of the authentication tasks/modes referenced herein can be stopped prematurely and/or continued indefinitely depending upon inputs received from one or more sensors that correspond to behavior of a user. For example, if, at some point prior to the end of such a task, the device is determined to be likely to be operated by a driver (e.g., the device or aspects thereof are moving in a certain manner that can be determined to resemble that of a driver, such as (a) a relatively significant amount of 'shaking' as can be measured/determined based on inputs originating at the accelerometer and/or gyroscope of the device and/or (b) the manner in which the user input is provided can be determined to more closely resemble that of a driver, such as based on relatively inexact key presses, time to press keys, etc.), (a) the task can automatically be ended prematurely in failure, (b) the task can be scored/registered as failed, even despite the fact that the user may have completed the actual task successfully (and vice versa), and/or (c) the task length/time/difficulty is dynamically changed (i.e., the time in which the user must complete the task can be lengthened or shortened, the difficulty of the task can be increased or decreased, etc.), such as in the manner described herein.

In certain implementations, the authentication task can include elements that may require a response to be provided by the user (e.g., numbers that are presented on the display screen of the device for a fixed or dynamic/random period of time), whereby (a) the element location on the device screen contains or otherwise incorporates a random or varying component/aspect (e.g., elements are placed in different locations on the device display screen on different passenger authentication attempts), (b) the element sizes contain or otherwise incorporate a random or varying component/aspect, (c) the element orientations contain or otherwise incorporate a random or varying component/aspect (e.g., they can rotate around an axis, reflect through an axis, etc.), (d) the time between the presentation of elements contains or otherwise incorporates a random or varying component/aspect, and/or (e) the time during which the element remains on device's display screen contains or otherwise incorporates a random or varying component/aspect. It should also be understood that, in certain implementations, the referenced task elements can be arranged in a static manner (e.g., element 1 is placed at location A, in orientation B for as long as it appears) or can be arranged in a dynamic manner (e.g., element 1 is placed on the device display screen at location A and in orientation B, but moves from location A to some other location (along any path, even a non-continuous one) and/or changes its on-screen orientation from orientation B to some other orientation (e.g., in any way, even if not necessarily continuous), such as for as long as it appears.

In certain implementations, the difficulty of any of the authentication tasks described herein can be adjusted (e.g., up or down), such as based upon the age of the user of the device (as can be determined, for example, based on the adeptness of the user at completing such tasks). It can be appreciated that in many scenarios relatively younger users will be more adept than older users. In addition, users who actively engage in activities that are similar to such task (e.g., game playing, etc.), will be able to perform the task faster and with fewer errors than those who do not.

As such, for example, the younger and/or more adept a user can be determined to be, the harder the passenger authentication task that can be presented to such user. For example, (a) the time to complete the task will be shorter for a younger and/or more adept user than for an older and/or less adept user, and/or (b) the substance of the task to be performed by a young and/or adept user can be more difficult than that for an older and/or less adept user.

The age and/or adeptness of the device user may be (a) identified (e.g., having been provided by a parent, an employer, etc.), (b) discovered (e.g., from auto-fill settings, social network information), (c) determined/estimated (e.g., based on the applications (e.g. games), installed on the device, the number of texts sent on average per unit of time, the type of e-mail accounts on the device (e.g., work/corporate vs. not work), the existence of any connections that might suggest corporate citizenship (e.g., Exchange/APN/VPN), the hours of activity, the speed of typing, the maturity of the prose used in messages, or any other such indicators of the age/adeptness of a user of the device) and/or (d) learned (e.g., adjusted dynamically based upon the adeptness displayed in relation to the device, such as in previous passenger authentication task attempts).

Additionally, in certain implementations, an authentication task can require that at least one hand of the user be constantly engaged with the device for substantially the entire task. For example, the user can be prompted to place a finger on a certain part of the screen (which part of the screen may not be the same from trial to trial) or a certain button which the user is required to hold throughout the task (or else the task may end in failure), such as in the manner described herein in relation to FIG. 15A. Alternatively, the user can be required to perform a gesture with one hand, and to maintain the gesture throughout the task in a manner that is perceptible by the device (e.g., by a camera).

In yet other embodiments, different tasks can be assigned to each of a user's hands. For example, one hand can be required to perform a fixed task (e.g., maintaining contact with a particular area of the device, such as the screen, as described above), while the second hand is required to perform a non-fixed task (e.g., typing).

It should also be noted that, in certain implementations, it can be advantageous to allow passengers to be authenticated by $3^{rd}$ parties, despite previous failed, inconclusive, incomplete, or non-existent authentication attempts, such as the results of one or more of the above referenced methods. For example, if mobile device 105 is damaged or malfunctions (e.g., due to a broken sensor, environmental disturbances such as weather conditions affecting the performance of the GPS, etc.) thereby precluding various of the authentication methods/approaches (such as those described herein) from being employed effectively, a third party such as an employer or a parent can remotely provide such authentication, such as in a manner known to those of ordinary skill in the art.

It should also be noted that various of the methods described herein are described with reference to a road system where the cars travel on the right-side of the road and where drivers are seated on the left-side of the vehicle. However, it should be understood that the methods described herein are not so limited, and can be similarly employed/transferred to other road systems (such as that of the United Kingdom).

Figure 24:
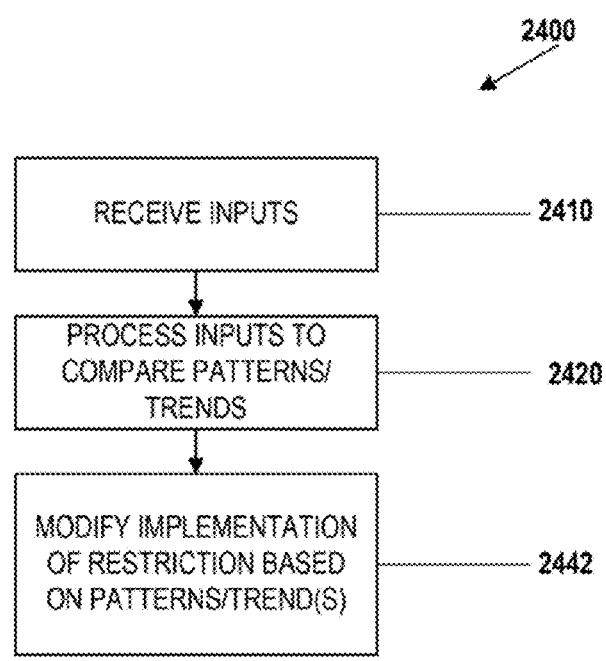
FIG. 24 is a flow diagram showing a routine that illustrates a broad aspect of a method for selectively modifying a restriction employed at a mobile device, in accordance with at least one embodiment disclosed herein.

Turning now to FIG. 24, a flow diagram is described showing a routine 2400 that illustrates a broad aspect of a method for selectively modifying a restriction employed at a mobile device 105 in accordance with at least one embodiment disclosed herein.

At step 2410, processor 110 executing one or more of software modules 130, including, preferably, restriction module 171, receives one or more inputs, substantially in the manner describe in detail above with respect to step 1710. For example, such inputs can originate at the accelerometer and/or gyroscope of the mobile device 105, and reflect the movement/motion that the device perceives.

At step 2420, processor 110 executing one or more of software modules 130, including, preferably, restriction module 171, processes the input(s) to compute one or more trends/patterns. By way of example, inputs, such as those received at step 2410, can be processed to determine one or more patterns, such as those that correspond to driving and/or walking (e.g., by comparing the various inputs to operation signatures that correspond to such activities, as is known to those of ordinary skill in the art). In doing so, one or more trends/patterns can be computed, such as a trend/pattern that reflects that the user of the device is now walking. By way of further illustration, a trend/pattern can be computed reflecting the docking status of a mobile device, such as in the manner described in detail herein.

At step 2442, processor 110 executing one or more of software modules 130, including, preferably, restriction module 171, adjusts an implementation of one or more restrictions at/in relation to mobile device 105 (that is, employs one or more restrictions, modifies an implementation of one or more previously employed restrictions, and/or removes one or more previously employed restrictions) based on the one or more trends/patterns. For example, in certain implementations, despite having previously determined that the user of mobile device 105 is a driver of a vehicle (and thus employing one or more restrictions on such a device), upon computing one or more trends/patterns that indicate that the user of the device is now walking (and thus is no longer driving a vehicle), such previously imposed restrictions can be adjusted, eased, removed, etc. By way of further illustration, based on a determination of the docking status of a device, as described in detail herein, one or more restrictions appropriate for a docked device (e.g., a restriction that prohibits voice calls to be made/conducted) can be modified/eased/lifted.

By way of further illustration, in certain implementations, after a device is placed in driver mode (e.g., the user of the device been authenticated as a driver and/or the device and/or restriction are configured such that the device operates by default in driver mode, until the user can prove otherwise by way of one or more authentications, such as through the methods described herein) a further determination can be made with regard to whether the device remains or is no longer in a moving vehicle. In doing so, some or all of various restrictions referenced herein, e.g., operation of a mobile device in a 'driver mode,' can be suspended and/or canceled, thus returning the device to its default, un-restricted operation. In various implementations, such a determination can be computed (for example, using inputs originating at one or more of the GPS, the accelerometer, the gyroscope, and/or the RF transceiver/antenna to know which cell towers the device is in communication) based on (a) whether the vehicle has not moved above a certain speed for more than a certain period of time; and/or (b) whether the vehicle has not moved above a certain speed for more than a certain portion over a period of time (the 'timeout period'). Additionally, in certain implementations, a user who was previously identified as a driver can be enabled to authenticate that he/she is no longer the driver of a moving vehicle in order not to have to wait the full timeout period before regaining full control over the device. In certain implementations, this can be achieved, for example, (a) by holding the device so that the camera of the device can capture (and recognize, such as with face recognitions methods, as are known to those of ordinary skill in the art) the presence of a face (or eyes or gaze etc.) and by then rotating 360 (or more or fewer) degrees, as measured by device's sensors (e.g., magnetometer, gyroscope, accelerometer, etc.), during which time the camera perceives the face (or eyes or gaze etc.); (b) by touching the device in a manner that can be detected (e.g., touching the screen, holding a button, etc.) and by then rotating 360 (or more or fewer) degrees, while the user maintains his/her touch or hold on the device; (c) by moving the device (e.g., up, down, sideways) a distance greater than the distance that a driver in a moving vehicle is able to as measured by the device's sensors (e.g., accelerometer, gyroscope, etc.); and/or (d) by taking a visual capture from close range of a license plate (such a visual capture can be processed to identify an indication of a degree of close proximity of a license plate. It can be appreciated that a driver of a moving vehicle is likely to be incapable of capturing a visual capture within close proximity of a license plate).

It can be appreciated that the referenced techniques are preferably actions or tasks that are difficult, if not impossible, for a user to perform while he/she is still the driver of a vehicle.

Figure 18:
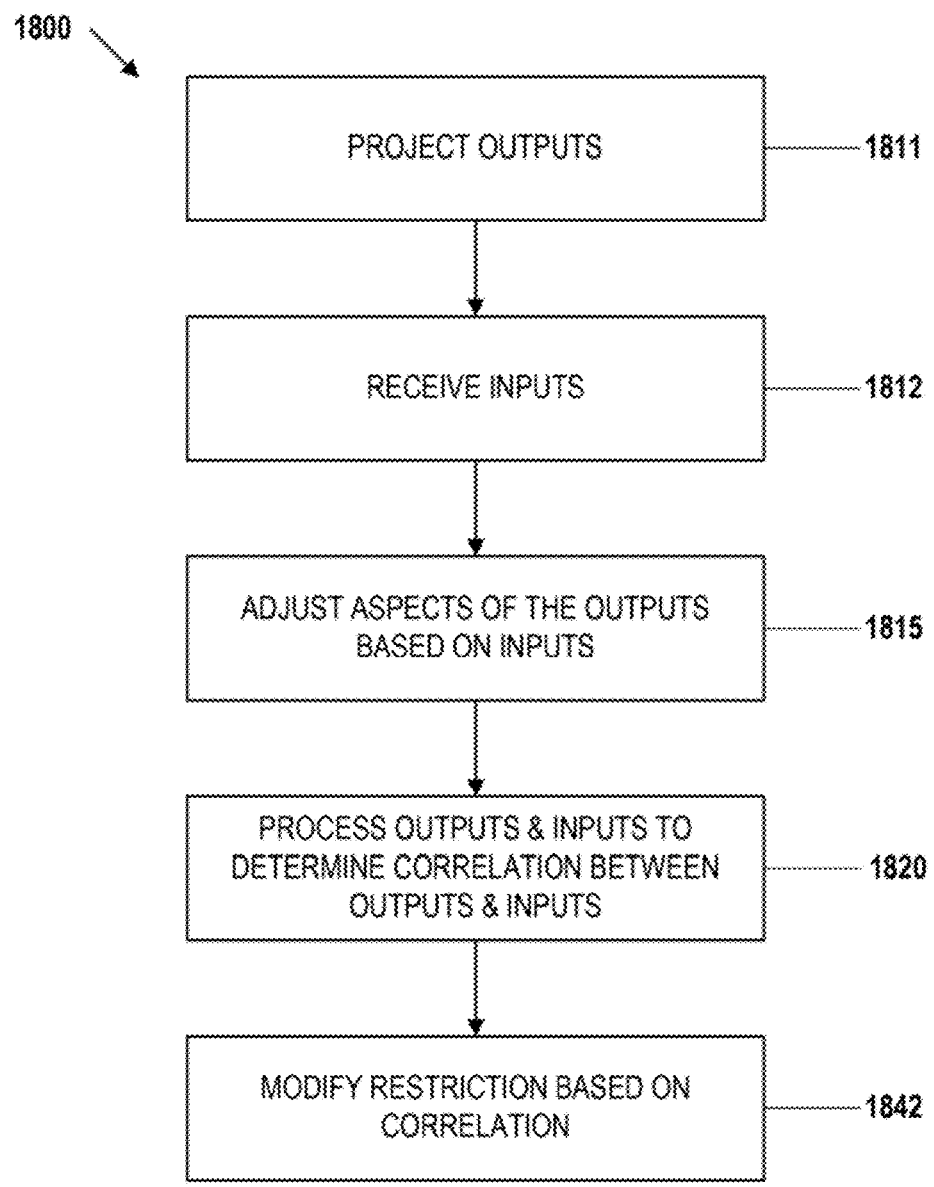
FIG. 18 is a flow diagram is described showing a routine that illustrates a broad aspect of a method for selectively restricting an operation of and/or selectively modifying a restriction employed at mobile device, in accordance with at least one embodiment disclosed herein.

Turning now to FIG. 18, a flow diagram is described showing a routine 1800 that illustrates a broad aspect of a method for selectively restricting an operation of and/or selectively modifying a restriction employed at mobile device 105, such as within a geographic area and/or a date/time window, in accordance with at least one embodiment disclosed herein. As will be described in detail herein, it can be appreciated that under certain circumstances (e.g., within defined spaces and/or times) it can be advantageous to control and/or influence the operation of one or more mobile devices 105, 160 in various ways, such as by configuring such devices to operate in a highly conspicuous/overt fashion. For example, considering the distracting nature of mobile device usage during class (particularly when used in an inconspicuous fashion), it can be advantageous for a school to require that its students only operate mobile devices 105, 160 during school days/time and/or on school locations/grounds and/or in certain location within school grounds (e.g., classrooms) in a manner that is highly conspicuous, thereby effectively precluding the inconspicuous usage of such devices 105, 160 in settings where their use is undesirable.

At step 1811, processor 110 executing one or more of software modules 130, including, preferably, restriction module 171 generates one or more output(s), such as an audio output (such as a beep or chirp) that is projected through speaker 146 of mobile device 105. It should be understood that such outputs can be configured/adjusted in any number of ways (e.g., in frequency, duration, and/or volume), both with respect to their substance (e.g., chirps, beeps, tones, etc.) and the periodic interval within which they are projected (static and/or dynamic). In any event, it should be understood that such outputs are preferably projected at volumes and for durations such that inconspicuous operation of mobile device 105, 160 is effectively precluded (e.g., in a classroom setting) on their account. Moreover, in certain arrangements it can be preferable that such outputs are not so loud and/or so frequent so as to significantly annoy the user and/or those around them while using mobile device 105, 160 in a permitted setting. At this juncture, it should also be noted that in certain arrangements, one or more of the referenced outputs can be generated in response to one or more inputs, as will be described in greater detail below. It should also be noted that, in certain implementations, the referenced device can be configured to generate/project such audio output(s) (e.g., 'chirp(s),' etc.) irrespective of one or more other settings (e.g., audio settings) associated with the device (so, for example, the device can continue to 'chirp' even when set to silent/vibrate mode).

At step 1812, processor 110 executing one or more of software modules 130, including, preferably, restriction module 171, receives one or more inputs. For example, in certain implementations one or more of the outputs projected by mobile device 105 (such as through speaker 146, as described with reference to step 1811) can, in turn be received, as inputs, at the mobile device, such as through microphone 145D.

By way of further example, in other implementations the one or more inputs can correspond to various user interactions with the device, such as tactile interactions (e.g., with one or more tactile sensors such as one or more buttons, a touchscreen, etc., as describe in detail herein) or device movements. Upon receiving such inputs, one or more outputs can be projected, as described above with respect to step 1811. (It should be understood that in the referenced implementations, the sequence with which steps 1812 and 1811 occur are preferably reversed, such that inputs are received, and then outputs are projected based on such inputs. However, as noted herein, the various steps, operations, etc., that pertain to and/or make up any and all of the various systems and methods described herein should not be understood to be required to be performed in a particular order or sequence. Rather, such steps can be arranged and/or performed in any number of sequences, as can be appreciated by those of ordinary skill in the art, and each such sequence/arrangement should be understood to be encompassed by the methods and systems disclosed herein).

By way of further example, it should be understood that in certain implementations, the systems and methods disclosed herein can be configured such that one or more of the output(s) that the mobile device generates/projects upon/in response to a user input are not readily audible to humans, though such output(s) are perceptible to other electronic devices (e.g., a device used by a teacher and/or in the classroom, such as the teacher's mobile device and/or other devices such as devices configured to perform and/or provide the same or similar functionality), in a manner known to those of ordinary skill in the art. In such scenarios, various devices, such as a device used by a teacher, can be configured to perceive and recognize the referenced output(s) (that is, those output(s) that are not readily audible to humans but which may be in the audible range and not audible by virtue of their short duration (temporal summation) and/or their low volume). Moreover, such device(s), such as a device used by a teacher or administrator, can be configured to generate and/or project another signal, such as a signal that is readily audible to humans. In doing so, the teacher and/or others can be alerted (by way of a human-audible signal/tone) to the fact that a mobile device is in use within the classroom. It can be appreciated that such an implementation can be advantageous in certain situations because in utilizing signals that are not audible to humans, potential distractions arising as a result of periodic/ongoing projection of audible noises (as emitted from chirp-enabled devices) are reduced. Moreover, it should be understood that in certain implementations a device, such as a device used by a teacher, can configure other mobile devices (such as mobile devices belonging to students present in the teacher's classroom and/or students in the teacher's class) not to emit readily audible sounds during times when the teacher sanctions use of mobile devices for his/her students, such as for legitimate learning purposes. It should also be noted that various of the implementations described herein can also be configured such that a mobile device, such as a mobile device belonging to a student, generates/projects output(s) that are readily audible to human.

In certain implementations, the referenced chirp-enabled mobile device(s) (e.g., a device belonging to and/or being used by a student) can be configured to receive a special output (such as a signal, as described herein) originating, for example, from another device, such as a device controlled and/or operated by a teacher. As referenced above, in certain implementations, such output/signal can either be readily or not readily audible to humans, whereupon the mobile devices that receive such signal preferably cease to chirp (that is, to project/emit an output as described herein) when the user interacts with the device for some period of time or until they receive another signal that they should re-initiate chirping when the user interacts with the device (it should be noted that in other implementations the device can, by default, not be in chirp mode, or cannot be in chirp mode on account of the teacher disabling it, and chirp mode in such devices can be subsequently activated by the teacher, such as by projecting the appropriate signal to such devices). It should be noted that such special signal is preferably secure so that it cannot be readily emitted by all devices (e.g., non-Teacher Devices so as to unintentionally or nefariously disable chirping on chirp-enabled mobile devices. Methods of ensuring this security are known to those of ordinary skill in the art. In certain implementations it can also be useful to utilize two-way communication, including various forms of "handshaking" between the mobile device(s) and the "teacher's device," in a manner known to those of ordinary skill in the art.

At step 1815, processor 110 executing one or more of software modules 130, including, preferably, restriction module 171, adjusts one or more aspects of one or more outputs based on one or more of the inputs. That is, in certain implementations the various device(s) can be configured whereby a device chirps in response to one or more external stimuli (e.g., one or more sounds) in a manner that configures the device to chirp more or less frequently and/or more or less loudly. For example, a teacher that hears a chirp, but is unsure as to which device in the classroom emitted the chirp, can use his/her a mobile device or a different electronic device, mechanical device and/or physiological action (e.g., his/her voice or a hand clap) to emit a signal which, upon receipt and processing by chirp enabled devices, causes such devices to chirp, either in their usual manner or in an alternative manner (e.g., in a more frequent and/or a louder manner). Additionally, in certain implementations, one or more aspects of the outputs/chirps can be adjusted based on various determinations, such as a determination the device is operating in a regular/normal fashion for an extended period of time (indicating that the present use of the device is likely permitted), as described in greater detail below.

At step 1820, processor 110 executing one or more of software modules 130, including, preferably, restriction module 171, processes the one or more outputs and the one or more inputs. In doing so, a correlation between the one or more outputs and the one or more inputs can be determined. By way of illustration, in certain implementations a mobile device can be configured to chirp (that is, to generate/project an output), such as in response to a user's tactile input, such as a button press or a tap/gesture at a touchscreen), and the mobile device can, in turn, receive/perceive such chirps by receiving them as inputs via microphone 145D. As such, a correlation can be computed, reflecting the degree to which such outputs (that is, the chirps or signals projected from speaker 146 of mobile device 105) correlate with the inputs (that is, the sound of such chirps/signals) are, in turn, received by microphone 145D. It can be appreciated that if a strong/close correlation can be identified between such outputs/inputs, it is likely that the mobile device is operating properly with respect to projecting and receiving chirp signals. However, if such a strong correlation cannot be determined, it can be determined that the mobile device may have been/has been tampered with, such as in order to prevent the projection of chirp signals (e.g., if the user breaks and/or attempts to muffle/mute speaker 146).

By way of further illustration, in certain implementations the presence/absence of one or more input(s) and/or the presence/absence of a correlation between a first input and a second input can be determined, while the device is within a defined geographic area and/or within a defined date/time window. That is, in certain arrangements restriction module 171 is configured such that one or more inputs (e.g., depressing a button, interaction with the touchscreen, device movement, etc.) cause the outputting referenced above at step 1811. Thus, given that such inputs trigger the projecting of the referenced audio output through speaker 146, it can be appreciated that microphone 145D can be easily configured to have the capacity to detect such an output because the timing in which to look for the signals is exactly known to the device. Accordingly, if a presence of an audio output and/or a presence of a correlation between a first input (e.g., a user depressing a button) and a second input (e.g., detecting the audio output projected by speaker 146 in response to the user's input at microphone 145D) is determined, the restriction scheme (that is a scheme requiring such ongoing 'chirping' in order to prevent covert operation of the mobile device) can be determined to be working properly, and no change or adjustment need be made (given that the restriction(s) are preferably configured, in certain implementations, to allow the device 105, 160 to operate in a conspicuous manner). However, if the presence of an audio output and/or the presence of a correlation between a first input (e.g., a user depressing a button) and a second input (e.g., detecting the audio output projected by speaker 146 in response to the user's input at microphone 145D) is not determined, the restriction scheme can be determined to be unlikely to be working properly. This malfunction can, in certain circumstances, be due to a user attempting to prevent mobile device 105, 160 from functioning properly, perhaps in hopes of avoiding the referenced effects/restrictions. In such a case, where it has been determined that device 105, 160 is not operating properly, one or more restrictions can be employed, modified, and/or removed. In doing so, the framework established can ensure that unauthorized use of the device 105, 160 (e.g., during a class) is effectively precluded, except, in certain circumstances, such as in emergency situations. By way of further illustration, it may be useful for the device to output sound (e.g., frequency, duration, volume) from its speakers and listen for it on its microphone, unrelated to the user's interaction with the device, and where such sounds are similar to the sounds that the teacher devices transmit so that the device will not be blocked from receiving the signals from the teacher's device if and when they are transmitted. If the student device does not receive the signals so transmitted by the student device, i.e., the speaker and/or microphone are not working properly, the device will be restricted.

Moreover, in certain implementations, in response to such previously described external stimuli, only those devices that meet one or more conditions (e.g., devices that have chirped within the last few minutes) are to chirp in response to one or more such external stimuli. For example, a teacher that hears a chirp, but is unsure as to which device in the classroom chirped, can use a device or take an action to emit a output/signal which will cause chirp-enabled phones that meet the referenced condition(s) to chirp in their usual or in an alternative manner.

In certain implementations, the output/signal that the mobile device emits/projects upon user input can consist of two or more elements, at least one of which is preferably audible. For example, the detection/determination as to whether the device's speaker is working properly (as referenced herein) can be performed by having the device emit one or more outputs/signals, with or without connection to the user's interactions with the device, that are not ready/easily audible to humans (e.g., due to their frequency, intensity and/or duration), but which can also be perceived by microphone 145D (the "Detection Signal"), while another output/signal, which preferably enables teachers to identify mobile devices that are in use (the "Teacher Signal"), can be at a frequency in the human audible range. It can be appreciated that by emitting/projecting the detection signal in a range or for durations that are not readily audible to humans, such a signal can optionally be transmitted louder, thus improving the signal to noise ratio (SNR), without distracting others.

Additionally, in certain implementations the Detection Signal and/or the Teacher Signal outputted/emitted from different mobile devices can vary across different devices (it should be understood that in certain other implementations such signals/outputs can actually be the same signal). For example, such outputs can be randomized and/or altered by the user input (e.g., different chirps correspond to different types of inputs, e.g., texting, game playing, etc.). This is useful as it can make the task of detecting the chirp more accurate, easier, more power efficient and/or faster.

At step 1842, processor 110 executing one or more of software modules 130, including, preferably, restriction module 171, adjusts an implementation of one or more restrictions at/in relation to mobile device 105 (that is, employs one or more restrictions, modifies an implementation of one or more previously employed restrictions, removes one or more previously employed restrictions, and/or maintains one or more previously employed restrictions). That is, as referenced above, in a scenario where a close coordination can be identified between one or more inputs and outputs, such a correlation can indicate that the 'chirp' restriction is operating properly at the mobile device, and the employment of such a restriction can be maintained. However, in a scenario where such a close correlation cannot be identified, thus indicating that the device may be malfunctioning and/or has been tampered with. In such a scenario, a further restriction can be employed, such as a restriction deactivating all operation of the device. Finally, in implementations where the teacher's device (or similar) signals to the student's device to disable/enable chirp mode on the student's device, the appropriate changes to the restrictions will be made.

In certain implementations, the student devices can be restricted (e.g., instead of being made conspicuous) as desired based on an instruction originating at a teacher device, i.e., the student device can be put into 'Class Mode,' where one or more functionalities of the device are restricted (e.g., all use is disabled except for emergency calls), while Teacher Mode is on or for some period of time.

Figures 25, 26:
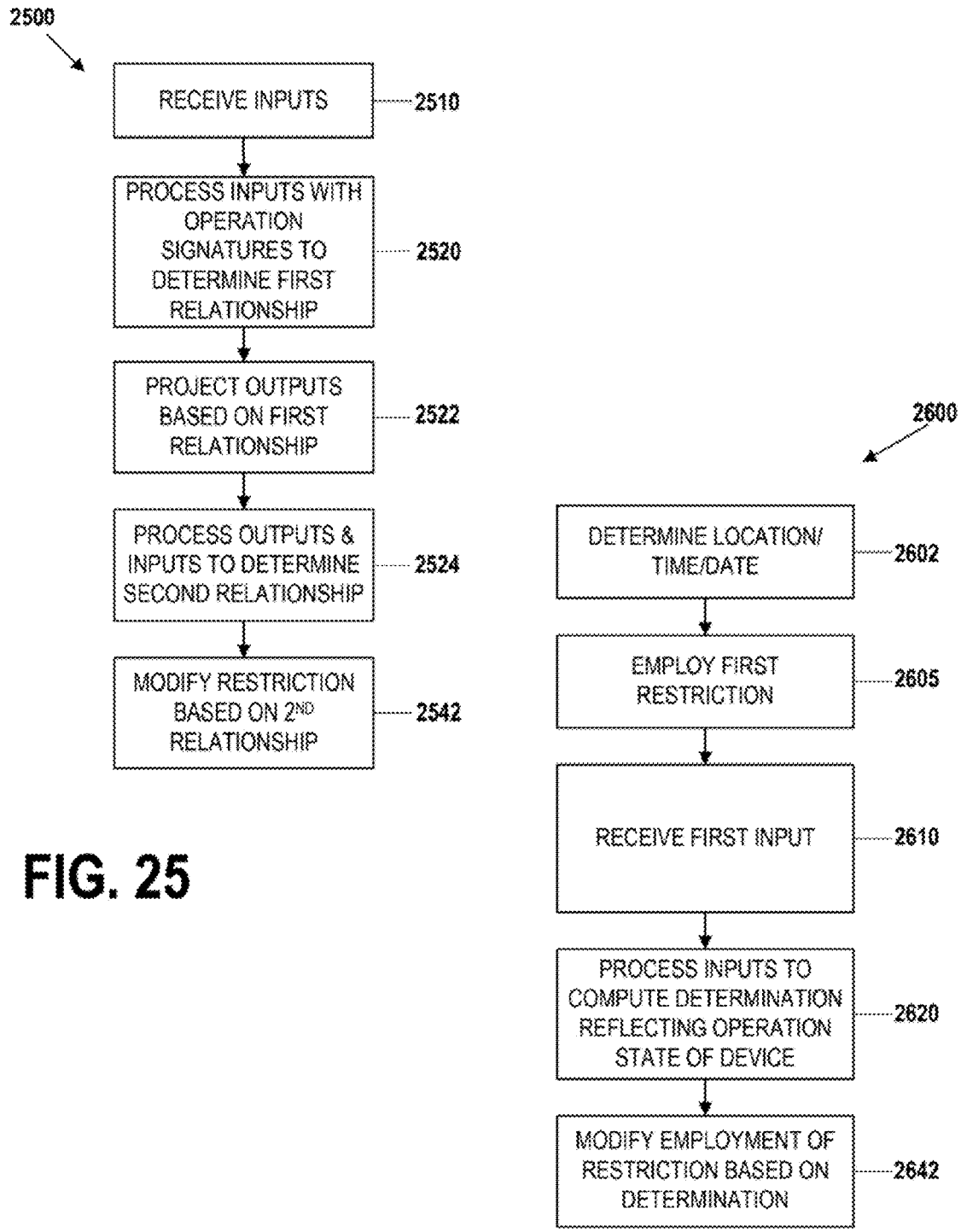
FIG. 25 is a flow diagram showing a routine that illustrates a broad aspect of a method for selectively projecting outputs at a mobile device, in accordance with at least one embodiment disclosed herein.
FIG. 26 is a flow diagram showing a routine that illustrates a broad aspect of a method for selectively configuring overt operation of a mobile device, in accordance with at least one embodiment disclosed herein.

Turning now to FIG. 25, a flow diagram is described showing a routine 2500 that illustrates a broad aspect of a method for selectively projecting outputs at a mobile device 105 in accordance with at least one embodiment disclosed herein.

At step 2510, processor 110 executing one or more of software modules 130, including, preferably, restriction module 171, receives one or more inputs, substantially in the manner describe in detail above with respect to step 1710. For example, such inputs can originate at the accelerometer and/or gyroscope and/or user interface of the mobile device 105, and reflect the movement/motion perceived at the device.

At step 2520, processor 110 executing one or more of software modules 130, including, preferably, restriction module 171, processes the input(s) to determine a first relationship (e.g., a correlation). By way of example, inputs, such as those received at step 2510, can be processed, such as with one or more operation signatures. In doing so, a relationship between the inputs received and the operation signatures can be determined.

By way of illustration, it should be understood that in certain implementations, the 'chirps' referenced herein can be triggered based on the movement of a mobile device, and/or a combination of user input and movement. For example, inputs received from the accelerometer and/or gyroscope of a device (such as at step 2510) can be processed, such as by being processed with/against one or more operation signatures (that is, data that identifies, such as based on mechanical and/or statistical analysis, how a device moves when engaged in certain activities, such as when a user is texting, walking, etc.). It can be appreciated that in doing so, the manner in which the device is being used can be determined (e.g., whether the device is being used to play a game, text, etc.), such as based on a correlation between the inputs and the operation signature, For example, it can be appreciated that the signature of various inputs originating at the various sensors when the device is being used to text, surf and/or play games is easily differentiable from the sensor signature of the device when the device is at rest and/or when the user is walking with the device on his/her person or in a bag, as is known to those of ordinary skill in the art.

At step 2522, processor 110 executing one or more of software modules 130, including, preferably, restriction module 171, projects one or more outputs based on the first relationship. For example, in a scenario where it has been determined (such as based on the relationship computed at step 2520) that the user is texting or playing a video game on his/her mobile device, the device can be configured to project one or more outputs (e.g., chirps), thereby creating a scenario whereby others (such as a teacher) can be made aware of such activity.

At step 2524, processor 110 executing one or more of software modules 130, including, preferably, restriction module 171, processes the one or more outputs (such as those projected at step 2522) and one or more inputs (such as an input received via a microphone, substantially in the manner described above with respect to step 1812). In doing so a second relationship, such as a correlation can be determined that reflects a correlation between the one or more outputs and the one or more inputs, substantially in the manner described above with respect to step 1820. As described in detail above, it can be appreciated that in doing so, it can be determined whether or not the speaker 146 of mobile device 105 is functioning properly (and thus is projecting outputs/chirps, such as those projected at step 2522), or whether the speaker may have been tampered with, as described in detail above.

At step 2542, processor 110 executing one or more of software modules 130, including, preferably, restriction module 171, adjusts an implementation of one or more restrictions at/in relation to mobile device 105 (that is, employs one or more restrictions, modifies an implementation of one or more previously employed restrictions, removes one or more previously employed restrictions, and/or maintains one or more previously employed restrictions), preferably based on the second correlation (as computed at step 2524), substantially in the manner described above with respect to step 1842.

Turning now to FIG. 26, a flow diagram is described showing a routine 2600 that illustrates a broad aspect of a method for selectively configuring overt operation of a mobile device 105 in accordance with at least one embodiment disclosed herein.

At step 2602, processor 110 executing one or more of software modules 130, including, preferably, restriction module 171, determines a location of the mobile device and/or the current time/date. For example, using the GPS sensor of the mobile device, the location of the device can be determined. Specifically, in certain implementations, the location of the mobile device can be determined as being within a defined area or areas, such as within the grounds of a school, using techniques known as geofencing, as are known to those of ordinary skill in the art. In certain implementations, the presence of the device in an area of interest (e.g., the school) can be detected/determined by the device by sensing the presence of the wifi signals associated with the school's wifi transmitters and/or cell towers/base stations that are known to be near the area of interest. By way of further illustration, the current time date can be determined from one or more sources (e.g., the device's internal or remote clock/calendar, and/or a remote/third party source such as the GPS time, the cellular time, the wifi network time, etc.—i.e., sources that a user is potentially less likely to be able to tamper with).

At this juncture, it should be noted that in certain implementations, any or all of the following steps (2605-2642) can be employed based on the determination at step 2602. Thus, by way of example, based on a determination (at step 2602) that a mobile device is within a defined area (e.g., a school) at a certain time (e.g., during school hours), a restriction can be employed at the device, as described with reference to step 2605.

At step 2605, processor 110 executing one or more of software modules 130, including, preferably, restriction module 171, employs a first restriction at the mobile device. It should be understood that the first restriction preferably configures the mobile device to operate in an overt mode. It should be understood that the term "overt mode" as used herein is intended to encompass one or more modes and/or operational states of a mobile device that configure the device to operate in such a way such that operation of such a device by a user, on average, will be more conspicuous to others in the vicinity/presence of the mobile device than if the device were not configured to operate in such a way. An example of such an overt mode is a restriction that configures the device to project an audible 'chirp' tone in response to every (or only certain) user input(s) received at the device, such as in the manner described in detail herein.

By way of further illustration, in certain implementations, an overt mode can include a restriction that restricts the mobile device to receive one or more commands/actions/events (such as the command to send a message or email or open a message, and email editor, or a browser) only through voice commands. It can be appreciated that in doing so a user of the device will only be capable of sending a message by saying (or shouting) 'send' in an audible tone, thereby resulting in overt operation of the device. It should be appreciated that such a restriction can be further employed together with/in parallel to other restrictions, such as restrictions requiring the user to perform one or more tactile gestures (e.g., holding a finger on a region of a touchscreen while saying 'send').

By way of further illustration, in certain implementations, an overt mode can include a restriction that restricts the mobile device to receive one or more commands/actions/events (such as the command to send a message or email or open a message, an email editor, or a browser) only based on a 'shake' gesture (that is, a gesture that can be identified as an ongoing significant deviation from the typical inputs provided by the accelerometer/gyroscope of a device). It can be appreciated that in doing so a user of the device will only be capable of sending a message by shaking his/her device, preferably vigorously, thereby resulting in overt operation of the device. In other implementations, similar gestures, such as large/broad movements of the mobile device, can similarly result in overt operation of the device. It should be appreciated that such restrictions can be further employed together with/in parallel to other restrictions, such as restrictions that entail the simultaneous projection of one or more chirps/signals, as described herein.

At step 2610, processor 110 executing one or more of software modules 130, including, preferably, restriction module 171, receives one or more first inputs, substantially in the manner describe in detail above with respect to step 1710. For example, such inputs can correspond to one or more user interactions with the device, such as the user typing an email, playing a game, etc.

At step 2620, processor 110 executing one or more of software modules 130, including, preferably, restriction module 171, processes the input(s). In doing so, a determination can be computed that reflects an operation state of the mobile device. By way of illustration, based on the location within and/or the time/date during which the device is operating (indicating whether the device is/is not within school grounds, and/or whether the device is/is not operating during school hours) in addition to the inputs received (reflecting a particular operation or action being performed at the mobile device), a determination can be computed reflecting the operation state of the mobile device (e.g., a video game is presently being played in a non-school location during school hours, and/or a text is being sent in a school location during recess hours).

At step 2642, processor 110 executing one or more of software modules 130, including, preferably, restriction module 171, adjusts an implementation of one or more restrictions at/in relation to mobile device 105 (that is, employs one or more restrictions, modifies an implementation of one or more previously employed restrictions, removes one or more previously employed restrictions, and/or maintains one or more previously employed restrictions), preferably based on the determination.

It should be noted that in certain implementations, the transmission of signals to and/or the routing of signals received from all or certain mobile devices within a geo-area (which can be detected, for example, using the device's GPS and/or the wifi and/or the cellular tower/base station and/or location information provided from the cellular carrier such as DOA, AOA, signal strength) and/or in a certain date/time range, that are not chirp-enabled (i.e., not configured to chirp on user input) (and/or restricted such as in the manner described with reference to FIG. 26, such as where movement and/or and audible voice is required), is restricted. For example, a school's wifi network can be configured so that it only transmits to/from mobile devices that were known to the wifi network to be chirp-enabled (and/or restricted such as in the manner described with reference to FIG. 26, such as where movement and/or and audible voice is required), or which mobile devices were on a pre-defined list (e.g., using MAC addresses for teacher devices). In another example, one or more cellular carriers would only transmit (voice, data etc.) to mobile devices that are on a school's premises (e.g., within a geo-area) and in their cellular networks, that were known to the cellular network to be chirp-enabled (and/or restricted such as in the manner described with reference to FIG. 26, such as where movement and/or and audible voice is required) or which mobile devices were on a pre-defined list (e.g., MAC addresses or UDIDs for teacher devices). In both cases there can be exceptions for certain usage (e.g., emergency calls, emergency text-messages) whereby the aforementioned networks will allow such communications to pass through.

The following represents a logical flow that reflects the basic operations of various of the implementations disclosed herein, in a manner that can be appreciated by those of ordinary skill in the art.

```
If chirping application is installed on device
  If during school hours
    If (device sees school wifi || device GPS shows
      in geo-fenced area || device sees certain cell towers)
      Beep when user inputs
        If mic hears beeps
          Allow free use
        Else
          Restrict as per usage policy
    Else if GPS shows outside geo-fenced area
      Allow free use
    Else if no GPS signal
      Assume in geo-fenced area
  Else
    Allow free use
```

At this juncture, it should be noted in certain implementations, various aspects of the outputs/chirps projected by the mobile device can be determined/dictated based upon various determinations that can be computed in relation to such outputs/chirps and the device's usage. For example, it can be appreciated that a device that is being used actively and/or continuously by a user is relatively less likely to be operating in a manner that is improper. As such, upon determining that a device is so operating, the device can be configured to chirp in a different manner (e.g., by adjusting the frequency and/or pattern and/or volume of the outputs/chirps).

At this juncture it should also be noted that the referenced restrictions (e.g., geographic area and/or date/time can be, and preferably are, established by a third party, such as a school administrator or parent. It should also be noted that the required geographic determinations can be achieved using GPS receiver 145C using standard geofencing approaches known to those of ordinary skill in the art. Additionally, in certain implementations, one or more third parties can optionally override various of the restrictions referenced herein. For example, in a scenario where one (or more) of the sensors at a mobile device is broken or malfunctioning, it can be appreciated that various authentication approaches may no longer be possible. As a result, one or more third parties (e.g., a parent, telecommunications provider, etc.) can override such restrictions, in order to account for the malfunctioning/broken sensor, and thus enable the user to use his/her device in an unrestricted manner.

In certain implementations, inputs originating at the magnetometer of a device can be used/processed in order to determine if the device is in a classroom or not by comparing a magnetic map that is presently perceived at a device, such as in its current location, to a database of magnetic maps, such as for a school (or any other such location), and/or a set of rules that define the areas in which students are and are not permitted to use their devices. Based on a determination that the magnetic map of the current location of the device can be matched to the magnetic map of a location in which students are allowed to use their mobile devices, the usage of the device can be allowed. However, based on a determination that the magnetic map of the current location of the device cannot be matched to the magnetic map of a location in which students are allowed to use their mobile devices, the usage of the device can be restricted.

It should also be noted that, in certain implementations, the set of rules defining the allowed and disallowed location(s) may be different for different devices and may change over time (i.e., based upon the day and/or the time of day) and that the magnetic map database may reside locally, i.e., on the device itself, or remotely.

Moreover, in certain implementations, by (a) applying only to a device that is determined to be present on school grounds and/or during the school day, and/or (b) applying to a device that is determined to be in a restricted device usage area, e.g., within a classroom (or at least is not determined to be within a permitted area, e.g., a lunchroom), such restriction (d) can still be bypassed based upon whether and for as long as a teacher has configured the mobile devices in the classroom to allow for their usage, such as in a manner similar to the one in which a teacher may configure devices in the classroom to temporarily not emit sounds as described herein.

It should be noted that whenever there is a signal (audible or inaudible) sent to or from a student device, such signal can also be transmitted via Bluetooth and/or WiFi.

It should also be noted that many of the techniques described herein with regard to reducing the power consumption on the device can apply to the school/classroom setting as well where, in certain implementations, the various sensors of the device and/or other techniques are utilized to determine whether or not the device is on school grounds.

It can be appreciated that people who make noise during movies distract those around them. Mobile devices are a huge source of such unwanted noise. Accordingly, in one implementation, devices in a theater hall can be configured to be selectively restricted while a movie is playing (optionally including its preview and trailers), but without restricting such devices if they are outside the theater hall (e.g., at the popcorn stand, in the bathroom, in the lobby, etc.).

In order to selectively restrict such devices by detecting that they are within a theater hall (e.g., during a movie screening), the microphone(s) of the device can capture(s) and/or pass(es) audio recordings (of some length, frequency, duty cycle, codec, format, filter etc.), such as to a remote server. Such recordings can be processed in order to detect/determine whether the device is in the presence of a screening/movie, such as by identifying sounds associated with a particular movie (such as in the manner performed by Shazam for music), and/or by identifying sounds/patterns that are common to movies (or other media/events) in general. The identity of the particular movie being played can be identified and compared, for example, to a list of currently running movies, such as in order to distinguish it from an older movie (which may be relatively less likely to be screened within a public theater).

This accuracy of such a technique can be improved by selectively employing such techniques if the location of the device (e.g., as determined by its GPS, aGPS, BT, last known GPS, etc.) is first determined to be in or near a movie theater. One way in this can be achieved is to use the GPS, if available, or alternative methods (cell tower, wifi, BT), and/or using the last known GPS location.

It should be noted that while the user may cover the microphone of a device, such as in an attempt to reduce the efficacy of this context-detection technique, the device user will also not be able to effectively engage in a voice conversation (the largest distracted movie watcher problem) with a blocked microphone. It should also be noted that these techniques can also be employed in similar settings, such as where pre-recorded audio is played and/or in settings where known live audio is played, e.g., classical theater, music concerts, speeches (with known text), etc.

In other implementations, a movie attendee who has exited (temporarily or permanently) the theater in which a movie is being screened (e.g., to buy popcorn) and whose device is still in "movie mode" (i.e., is still selectively restricted), can provide a 'self-declaration' of the device/user being outside of the theater (e.g., using tactile, audio and/or visual input methods, such as those described herein), and, in doing so, can cause the movie detection mechanism to immediately (or relatively more quickly) acquire sensor information and/or other information to determine whether or not the device is still within movie context, in a manner that is relatively more expedient than would have ordinarily occurred. Such techniques can be particularly advantageous in cases where, on account of power savings, the various data/information acquired to determine whether or not the user is still viewing a movie are acquired with latency (e.g., with delay, in duty cycles, etc.) and/or at less than the fastest sampling rates possible. Accordingly, acquiring such data relatively more quickly (e.g., by triggering such acquisition via the referenced 'self-declaration') can enable the device of a movie goer who exited a theater to have such a selective restriction lifted faster/sooner. Phrased differently, this technique can allow power-saving techniques to be applied more readily while reducing the degradation to the user experience.

In other implementations, this problem can be solved (client-side only, server-side only or a combination thereof) by utilizing the digital audio watermarks/coded anti-piracy mark embedded within theater films (or inserting a similar or different mark into the film if such is not present within theater films or are otherwise ineffective for such purpose due to their frequency or other reasons) and such client device(s) can be configured to be selectively restricted when (and for as long as) such mark is heard.

Moreover, in theaters within which sufficient network access (such as to cellular networks) is not present for such devices to properly utilize the techniques described herein, such theater complexes can install one or more access points as needed to facilitate such access. Moreover, the BSSIDs of these access points can provide additional location information to geo-locate the devices within the theater complex (e.g., inside a theatre, outside a theatre, etc.).

In other implementations, a hardware device can be installed within each the theater to be protected. While a movie is playing, such a device can continuously (and/or periodically) emit audio signals (inaudible, effectively inaudible and/or non-distracting) that can be perceived, recognized and/or interpreted by an appropriately equipped device to indicate presence within a movie theater having a live movie playing. Such a signal can be emitted at a frequency and/or at a volume that can prevent it from (and/or mitigate the likelihood of its) being heard outside the theater. In another implementation, such signals can be transmitted over the in-theater sound system.

In another implementation, upon determining that the device microphone is being blocked (when in or near a theater) so that the device does not hear the signal(s) necessary for it to identify that it is present within a theater (e.g., the watermark, the special inaudible signal, etc., as described herein), such a device can be restricted or otherwise disabled. For example, the device-based system can default to operating based on an assumption that the device is present in a movie, such as in the same or similar ways described herein with respect to various classroom implementations.

In implementations with respect to which such watermarks or special signal devices may interfere with routine usage of a device in other places/contexts (despite employing optional countermeasures that may also require positive geo-location data to determine that the device is within a theater in order to employ restrictions), thereby causing such devices to operate based on the assumption that they are present within a movie when they are actually not, the referenced in-theater signals can be randomized and/or varied and/or crowd-sourced so that they could not abused. Various additional methods for securely delivering such signals are also contemplated, as known to those of ordinary skill in the art.

It should be understood, with regard to any and all of the implementations described herein, that while various of the implementations have been described herein as being implemented by a mobile device (for example, employing a restriction at a mobile device), it should be understood that any and all such embodiments can be similarly implemented in relation to such a mobile device, such as, for example, in a scenario where such a restriction is initiated/employed by a third party device such as a central machine that is capable of communication with the mobile device. As such, all references provided herein that refer to a particular operation occurring at a mobile device (e.g., preventing a mobile device from a particular operation) should be understood to also encompass operations performed by an external/remote device which, in turn, can affect the operation of the mobile device (whether directly or indirectly), and all such implementations are equally within the scope of the methods and systems described herein.

Additionally, in certain implementations a communications provider (e.g., a cellular carrier) can optionally restrict the usage a device, such as the device operated by a driver of a moving vehicle. This can be achieved by determining if the device is in a moving vehicle and, if so, assuming that the device is a driver's (and restricting it accordingly), unless the device user has authenticated himself/herself as a passenger, as described herein.

In one implementation, a cellular carrier can determine whether the device is in a moving vehicle by analyzing successive location positions of the device (as can be determined by cellular networks), pursuant, among other things, to government regulations/guidelines that require such networks to be able to determine the location of a cellular device (such as in the case of an emergency), using such location positioning techniques known to those of ordinary skill in the art, including but not limited to methods for locating the device such as angle of arrival (AOA), time difference of arrival (TDOA), signal strength (device or cell-tower) and others.

In other implementations, a system/device can be configured to adaptively learn, over time, the context (e.g., moving in vehicle, stationary, etc.) within which a device is present upon receiving (or in the absence of receiving) one or more data signals (e.g., pertaining to WiFi APs, cell-towers, locations or geo-areas, Bluetooth devices, accelerometer signals [e.g., corresponding to walking], etc.) and can then determine the context of the device, alone or in conjunction with other data, upon subsequently receiving (or in the absence of receiving) one or more of such data signals, such as in the future.

For example, if, over the course of a sufficiently long and/or sufficiently recent period of time, it was determined that 98% of the time a device was in range of a particular WiFi access point it was also determined to be present within a moving vehicle, then it can be further determined that, upon subsequently determining that the device is present within range of that same WiFi access point (and, in certain implementations, unless some other data, input, and/or indication to the contrary has been received), the device can be determined to be present within a moving vehicle.

For example, if, over the course of a sufficiently long and/or sufficiently recent period of time, it was determined that 98% of the time a device was in range of a particular WiFi access point and didn't receive a GPS signal (e.g., present deep inside a building) it was determined not to be present within a moving vehicle, then it can further determined that, upon subsequently determining that the device is present within range of that same WiFi access point and not receiving a GPS signal (and, in certain implementations, unless some other data, input, and/or indication to the contrary has been received), the device can be determined not to be present within a moving vehicle.

It should be understood that, in certain implementations, the referenced data can be maintained on a device-by-device basis (or user-by-user basis) and/or aggregated across users (whether non-selectively, or, alternatively, selectively chosen in some manner, e.g., users with similar daily routines, users with similar home or work locations, etc.) such as using one or more 'crowd-sourcing' approaches/techniques, such as in a manner known to those of ordinary skill in the art.

In another implementation, the cellular carrier/operator can receive location and/or speed information from the device itself, consisting of GPS information and/or information from the one or more of the device's sensors. For example, the cellular carrier can send requests to the device's SIM card to query the device's GPS and pass such information back to the carrier. In another example, the carrier can request information from a process running on the device which can obtain such information from the GPS and/or the device's sensors. If no such process is running on the device (and/or if such a process cannot be initialized), the carrier can identify such device to be a driver device and can further apply the associated restrictions, as described herein. The effectiveness of this method can be increased if the process and/or the information coming from the process is authenticated and/or verified, so as to prevent the transmission of erroneous information that might otherwise trick a cellular carrier into thinking that the device is not in a moving vehicle. Such authentication and/or verification can be done in several ways, for example: (a) The GPS values sent from the device can be compared with those obtained directly by the carrier network. If the carrier network is clearly showing that the device is moving, yet the data the device is passing to the carrier shows otherwise, this can indicate a security problem; (b) the device can pass an authentication code to the carrier in a manner known to those of ordinary skill in the art.

Additionally, in order to more accurately and/or more quickly and/or more efficiently determine if the device is in a moving vehicle, the carrier can combine location/speed information sourced from the carrier network with the information sourced from the from the device.

Upon receipt of such device location/speed information, the carrier can determine whether the device is in a moving vehicle. In one implementation, if the speed of the device is greater than a certain threshold speed, it is determined to be in a moving vehicle.

Upon determining that a device is in a moving vehicle and until such time that it is determined that such device is no longer in a moving vehicle, the carrier can restrict (partially or completely) the information that is sent to/from such device unless the device's user has authenticated the device as a passenger device using, among others, any one of the passenger authentication methods described herein. The effectiveness of this method can be increased by ensuring that any passenger authentication is trustworthy, so as to prevent the transmission of erroneous information in order to trick a cellular carrier into thinking that the device is being used by a passenger. This can be done, for example, by authenticating the passenger authentication information, using methods known to those of ordinary skill in the art.

Additionally, the cellular carrier can strengthen any such restrictions by instructing the device's SIM and/or code running on the device itself to further restrict the device (e.g., preventing wi-fi communication).

Moreover, various security measures can be employed to ensure that the device user does not trick the cellular carrier into providing data to the device while the user is the driver. As example, a device that has been 'rooted' or 'jail-broken' may not be allowed to authenticate as a passenger. As an additional example, various security options for centrally (e.g., from a cellular data center) authenticating application data sent from a mobile device can be employed, such as, (a) creating non-repeating data by incorporating in-data timestamps to make it harder to 'replay' data; (b) using a digital signature to sign data on the device before it is sent to the carrier, where a one-time key generation time process can be employed to make this method even harder to hack/override; (c) performing such authentication at the operating system level (e.g., within the kernel) to make it harder to replace the trusted data with altered data; and/or (d) performing the authentication at the hardware level. These techniques and similar ones are known to those of ordinary skill in the art of computer security and cryptography.

It should also be noted that, in certain implementations, some or all of the various techniques and technologies described herein can be incorporated entirely or in part into the operating system of a device. In doing so, various operations can be relatively less susceptible to user interference/intervention, and also make the processes executing with respect to the various techniques relatively more stable and/or more energy efficient.

It should be noted that in some methods of passenger authentication (for example, passenger authentication methods that incorporate a repeated pass-phrase, pass-code and/or pass-action), the effectiveness of such methods can be increased by incorporating a protocol that further enhances security, by (a) running at least one component process of the passenger authenticating process on the device in a manner that allows such component process to be authenticated against a central server using a pre-assigned private key that signs OS information about such components and/or other components by using a signed kernel module; (b) if the component process authentication succeeds, by having a central server send a phrase, code and/or action to the passenger authenticating process on the device which, in turn, displays such phrase, code and/or action to the user; and (c) sending the phrase, code and/or action input/performed by the user back to a central server, whereupon the central server only authenticates the device user as a passenger if the phrase, code and/or actions match those that were sent and are performed in a timely manner.

It can also be appreciated that it can be advantageous to intelligently manage use of energy/power at a mobile device, such as in any or all of the various contexts and settings described herein. Due in part to their small size, mobile devices have energy constraints (e.g., limited battery power). Accordingly, it can be advantageous to identify and control processes running on mobile devices that use energy unwisely/sub-optimally. Moreover, because mobile devices are nomadic, they are easily misplaced. Such misplacement, among other things, presents a security threat.

Accordingly, in certain implementations a context in which a device operates (e.g., one or more of: moving, moving in a vehicle, moving in a particular type of vehicle [e.g., bicycle, car, truck, bus, airplane], connected to a power source, battery state, user presence [as can be determined, for example, by screen state (on/off), lock screen state (on/off), keystrokes, button presses, camera, audio, proximity, heat, etc.], prompting the user to determine if the user believes that the context is such that the use of one or more device resources should be changed, etc.) can be determined. Based upon the determined context(s), one or more resources used by one or more processes on the device can be adjusted (e.g., processes that use screen display, wake locks, sensor calls, camera, speakers, microphone, RF, wifi, data communication, etc.), such as based on the determined context, thereby providing various benefits (e.g., energy savings, increased security, better and/or more accurate information/determinations, etc.).

Figure 33:
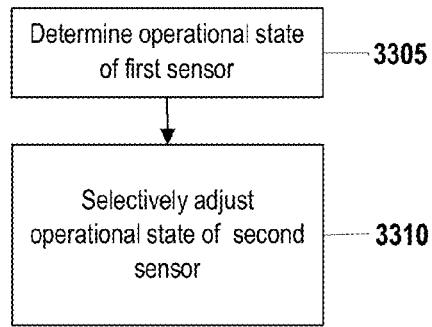
FIG. 33 is a flow diagram showing a routine that illustrates aspects of one or more methods, such as those described in relation to one or more embodiments described herein.

FIG. 33 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 3305 an operational state of a first sensor of a device can be determined. At 3310, an operational state of a second sensor of the device can be selectively adjusted, such as based on the operational state of the first sensor.

Figure 34:
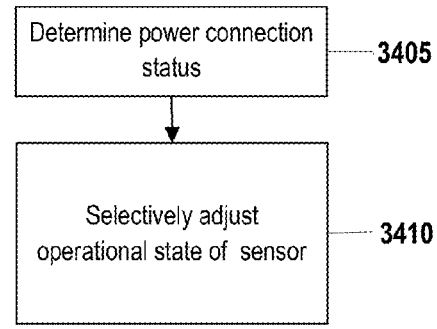
FIG. 34 is a flow diagram showing a routine that illustrates aspects of one or more methods, such as those described in relation to one or more embodiments described herein.

FIG. 34 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 3405 a power connection status of a device can be determined. At

3410, an operational state of a sensor of the device can be selectively adjusted, such as based on the power connection status.

In certain implementations, inputs originating at one or more of the sensors of a device (including but not limited to GPS, RF, Wifi, NFC, BT, accelerometer, gyroscope, camera, microphone, magnetometer, light meter, proximity sensor, temperature sensor, compass, keyboard, buttons, etc.) can be used/processed to determine if the device is moving and/or where the device is located. If it is determined that the device is not moving for more than a certain period of time (e.g., 5 minutes), applications that are employing a 'wake lock' (e.g., a screen wake lock, a CPU wake lock, a GPS wake lock) can be cancelled and/or modified. For example, many navigation applications (e.g., Waze) that run on mobile devices use wake locks to override the screen lock settings of the device in order to keep such applications continuously visible to the device user. Such wake locks are often static, i.e., for as long as the application is running (e.g., in the foreground), the wake lock persists. Accordingly, upon determining that the device is not moving for some period of time (e.g., no significant GPS changes for 5 minutes), a wake lock of such applications can be overridden (thereby enabling the lock to be disabled). Such techniques can be particularly applicable with respect to applications or processes that already acquire and/or use location based information and/or movement based information because little to no or additional energy expenditure is likely to be required to employ the operations disclosed herein. Moreover, such context-based resource management determinations and operations can also enable certain security benefits. For example, in a scenario where a device was running a navigation application (e.g., one that implements a screen/CPU wake lock) and the user forgot the device somewhere (e.g., in a vehicle, in a restaurant, etc.), the screen of the device will not lock (on account of the screen/CPU wake lock which continues to be employed), thereby allowing anyone who finds the device to easily access the information on the device. By adjusting the device resource usage (in this example, the screen usage of the device as a result of its wake lock) based upon its context, it can be determined that this device was not moving and its wake lock can be overridden, thereby preventing access (or further access) to the device by unwanted persons.

In another implementation, a wake lock can be controlled dynamically based upon the location of the device as determined by inputs originating at one or more of its sensors in conjunction with and/or separate from the movement of the device as also determined based on inputs originating at one or more sensors. For example, if the device is determined not to have moved for some period of time, but is determined to be within a certain distance of a specific location (e.g., the home or office of a user), the wake lock can be overridden according to one rule (e.g., wait a relatively longer time before overriding the wake lock is), whereas if the device is not determined to be near such a location, the wake lock can be overridden according to a second, more stringent rule (e.g., wait a relatively shorter time before overriding the wake lock).

It should also be noted that overriding a wake lock can be implemented in various forms (e.g., canceling the wake lock altogether, changing the type of wake lock (e.g., from a bright wake lock to a dim wake lock), and/or canceling the wake lock and taking an action like dimming the screen).

It should also be noted that the ability to control device resources (e.g., by controlling wake locks) based upon their device's context (e.g., by determining if the device is moving and/or it location) so as to reduce energy expenditure and/or improve security can also enable the implementation of processes and/or applications that have heretofore not applied certain resource intensive techniques (e.g., wave locks, sensor sampling) because of the referenced energy consumption and security concerns, thereby enabling responsible/sustainable employment of such resource intensive techniques and, in so doing, allow their users access to better and/or more accurate information and a better user experience.

In certain implementations, if a device is determined to be oriented in a 'flat' orientation (e.g., resting on a table, as can be determined, for example, based on one or more accelerometer inputs) and also 'upside down' (i.e., with the screen of the device facing downwards, such as towards the table, which can also be detected one or more accelerometer inputs), then it can be determined that the user is unlikely to be looking at the screen of the device. Accordingly, based on such a determination (and, in order to save power), the display/screen of the device can be turned off/dimmed, or otherwise deactivated, even before the device's ordinary screen timeout would have otherwise turned it off. Such a state/status with respect to the display/screen can be maintained until, for example (i) the screen is activated (such as upon receipt of an input, button press, etc.), (ii) the orientation of the device is determined to have changed so that it is relatively more likely that the user is using (or may wish to be using) the screen, and/or (iii) the orientation of the device is determined to have changed (as in (ii)) within a certain period of time, otherwise the screen can remain deactivated (despite orientation changes) until the screen is affirmatively activated (as in (i)).

In another implementation one or more of the sensors that are used by any of the processes running on the device can be controlled dynamically based upon the device's context. For example, the accelerometer of the device can be used to determine that the device is not moving, and, as a result, a process that uses the (much higher energy expenditure) GPS can be stopped and/or the rate at which such process uses the GPS can be slowed (in certain implementations, even to zero). Such dynamic control of sensors can be effected in various ways. For example, from within a particular process itself (in the GPS example, the process using the GPS can register to receive GPS information less frequently), through the mechanism that controls the sensor readings and/or the distribution of the information therefrom (in the GPS example, the device can be configured to acquire GPS information relatively less frequently).

In another implementation, power connection state, status, and/or context of a device can be determined, i.e., whether or not the device is connected to a power source. If it is determined not to be, processes running on the device can be notified accordingly and can selectively reduce the resources that they are using. If the device is determined to be connected to a power source, the processes running on the device can also be so notified and can selectively increase the resources that they are using. Determination of the context can be further refined by also taking into account the level of charge of the device's battery. For example, if the device is not connected to power, but its battery is fully charged, it can be reasonable for processes to use resources more aggressively, whereas if the battery not fully charged, processes can be configured to lower their use of power intensive resources.

It should also be noted that the context determination(s) described herein can be implemented within an application/process and/or by another process on the device (e.g., a user process, a system process) which distributes or makes available such context information to other processes, such as those running on the same device (e.g., via an API). Moreover, parts and/or aspects of the context determination(s) can also occur in locations that are external to the device (e.g., one or more nearby mobile devices, other computers, one or more remote computers, etc.).

It should also be noted that many or all of the determinations and/or other operations referenced and/or described herein can be useful (and therefore provided) to other applications or processes running on the same device (and/or external to the device) so that multiple applications do not need to perform the same or similar determinations. Such determination(s) can be provided to such applications or processes (e.g., through an API). For example, a navigation application that wants to prevent a driver from the distraction of inputting a destination while driving but wants to permit a passenger to do so, can be configured to query the application's API as to whether the device is (a) in a trip and/or (b) is being operated by a driver or a passenger.

Many of the techniques described and/or referenced herein can have one or more components that differ for specific devices, such as based upon previously observed behavior of that device and/or that of a user associated with the device and/or an environment/context associated with the device. For example, the angles at which a device is held/oriented (such as those consistent with operation by a driver or a passenger) can be "learned," (e.g., using machine learning techniques are known to those of ordinary skill in the art), the speed at which a user types and the consistency of such speed (as a driver and/or as a passenger) can be learned, the characteristics/patterns with which a device moves/shakes when used by a user can be learned, or practically anything that happens repeatedly, so as to better fit a set of rules to differentiate the role of a user explicitly (e.g., in-vehicle role, ability to perform a task) or implicitly (e.g., from the location of user) for each particular user can be learned.

These one or more varying components can also be classified based upon the different contexts of each user, e.g., when a user is a driver and when the user is a passenger using various techniques (e.g., trained learning and/or untrained learning, clustering) as are known to those of ordinary skill in the art.

In certain implementations a mobile device operated by a bicyclist (or another vulnerable road user like a pedestrian, skateboarder, roller-blader, runner etc.) can transmit the real-time location of the device to a remote server.

Moreover, in certain implementations a mobile device determined to be used within a vehicle (e.g., a car, truck, bus, train) by a user determined to be driver (or passenger) can transmits the real-time location of the device to a remote server (e.g., as is done in crowd-sourced SatNav applications like Waze).

Moreover, in certain implementations an application can determine (and, optionally transmits to a remote sever) the mode of transportation determined (e.g., bicycle, car, etc.), such as with respect to the user of the device. In certain implementations, such determination(s) can be made in a relatively passive manner, e.g., based on the device's sensors (e.g., the accelerometer and/or gyroscope readings, changes and variability thereto and the spectral frequencies thereof). For example, bicycles are always falling and being corrected, whereas most other vehicles are generally balanced on the ground. This distinction can be made using the device's sensors (e.g., accelerometers, gyroscope, magnetometer, etc.). By way of further example, a transportation mode can be determined based on the determined speed (e.g., based on GPS), such as with respect to the change in speed between portions of the road having different gradients (as most vehicles other than bicycles have relatively lower sensitivity to gradient and/or gradient changes). By way of further example, a transportation mode can be determined based on changes of angle in turns (as bicycles angle into turns while four-wheeled vehicles do so much less). By way of further example, a transportation mode can be determined based on the spectral frequencies measured/determined by the sensors of a device, as those determined with respect to a bicycle are relatively different than those of the sensors of a device being used in a car. By way of further illustration, a transportation mode can be determined relatively actively, such as by prompting a user to identify (e.g., with voice, touch, haptic, etc. inputs) the mode of transportation being used, such as prior to the start of (or during) a trip, and/or by virtue of the fact that the information provided in this system can be packaged differently for different use cases (e.g., bicycles vs. drivers) and the transportation mode of the device user can be determined from the application used.

In certain implementations a driver or a cyclist can elect to receive alerts (such as real-time alerts) to their device based on a particular of transportation type, mode, or class. For example, cyclists can select to receive alerts of approaching motor vehicles and motor vehicle drivers can select to receive alerts of nearing cyclists. Such alerts can be delivered to the user by the device visually (e.g., on screen), audibly (device makes a distinctive noise) and/or haptically (device vibrates in some way, e.g., that may be user configurable and can even be integrated into the transportation equipment, e.g., device causes user handlebars to vibrate, device causes the steering wheel to vibrate, etc.).

Figure 38:
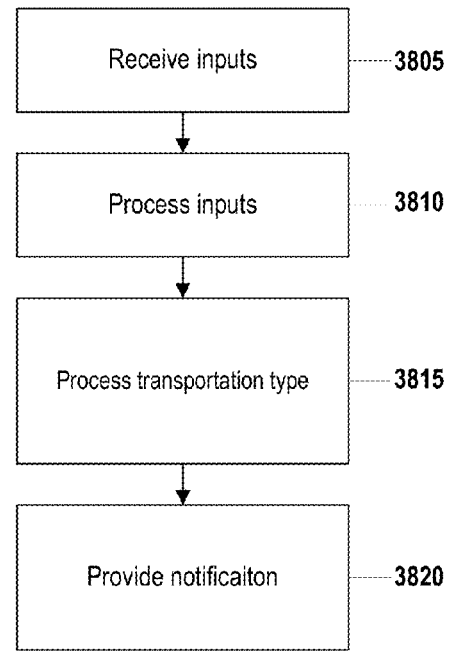
FIG. 38 is a flow diagram showing a routine that illustrates aspects of one or more methods, such as those described in relation to one or more embodiments described herein.

FIG. 38 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 3805 one or more inputs can be received, such as in relation to a user device. At 3810, the one or more inputs can be processed, such as in order to determine a transportation type associated with the user device. At 3815, the transportation type can be processed, such as in relation to one or more aspects associated with one or more other devices. In certain implementations, the transportation type can be processed in order to generate one or more notifications, such as with respect to at least one of (a) the user device or (b) at least one of the one or more devices. In certain implementations, the transportation type can be processed in relation to a visibility condition state. Moreover, in certain implementations the transportation type can be processed in order to generate one or more notifications, such as with respect to the visibility condition state. At 3820, the one or more notifications can be provided, such as to at least one of (a) the user device or (b) at least one of the one or more devices.

Figure 39:
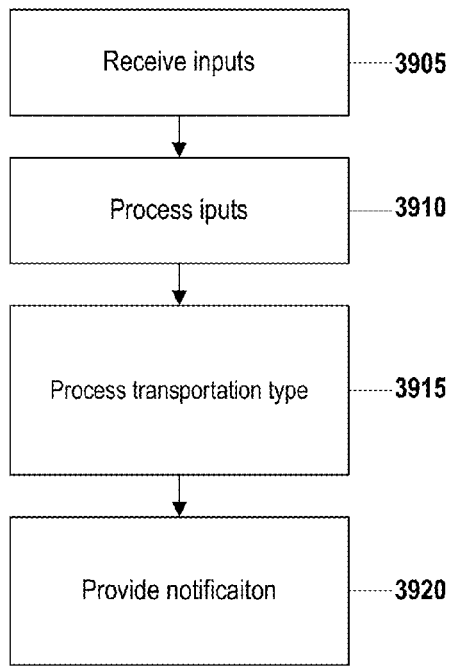
FIG. 39 is a flow diagram showing a routine that illustrates aspects of one or more methods, such as those described in relation to one or more embodiments described herein.

FIG. 39 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 3905 one or more inputs can be received, such as in relation to a user device. At 3910, the one or more inputs can be processed, such as in order to determine a transportation type, such as a transportation type associated with the user device. At 3915, the transportation type can be processed, such as in relation to one or more data items associated with the transportation type. Moreover, in certain implementations the transportation type can be processed in order to generate one or more notifications pertaining to the transportation type. At 3920 the one or more notifications can be provided, such as in relation to the user device.

Moreover, in certain implementations the referenced alerts can be filtered to be operative/employed only in certain areas and/or situations and/or conditions, such as based upon the selection of the device and/or the device user's supervisors (e.g., parents, employer etc.). For example, a cyclist might choose to receive alerts of nearby motor vehicles (a) when she is not near a city, (b) when a particular vehicle is determined to be exhibiting dangerous behavior (e.g., driving above a certain absolute speed, driving above a speed relative to the allowed speed on the current road (e.g., a vehicle travelling more than 20 MPH above the speed limit), swerving, is determined to be a dangerous vehicle based on its current drive or from historical information, etc.), and/or (c) when the road conditions are determined to be dangerous/unsafe (e.g., poor visibility due to weather, night, windy road etc.). In another example, a driver can choose to filter out alerts for nearby bicycles where (a) the bicycle is on the opposite side of the road of the driver's vehicle (e.g., as can be detected/determined by the GPS in one and/or successive readings, by the accelerometer and the road angle (a bicycle climbing on one side of the road and a bicycle descending on the opposite side of the road have different accelerometer readings when fixed to the bicycle with known orientation) and/or (b) the bicycle is determined to be on the sidewalk (e.g., as can be detected from GPS and/or successive GPS readings, from the accelerometer readings as a bicycle riding on the sidewalk approaches and leaves some intersections when the bicycle has to come down from sidewalk and re-elevate to the curbside).

Moreover, various aspects of the information learned/determinations made by/in relation to the various techniques described herein can be incorporated into SatNav (satellite navigation) applications, such as those that provide real-time or near real-time alerts to users (e.g., Waze), such as with respect to road conditions or other information.

Additionally, in certain implementations information relating to the transportation mode, such as of the vehicle within which a device is present/operating, can be generated/provided. For example, device users who are determined to be riding bicycles can be provided information on the nearest bicycle stores (e.g., for repairs), the nearest restaurants (to fuel up), the relevant recommended cyclist spots (e.g., good climbs, good off-roads), etc.

In certain implementations, information pertaining to pedestrians can be provided, for example at crosswalks, where such users can be provided with alerts to approaching vehicles. Moreover, in certain implementations drivers can be alerted to pedestrians nearby to (e.g., in or approaching) a crosswalk area.

It should be noted that while several of the techniques described herein pertain to allowing vehicles and vulnerable road users to better co-exist, many of these techniques can also be implemented in order to improve the co-existence of vehicles with other vehicles or vulnerable users with other vulnerable users. For example, it can be advantageous for vehicle drivers to be aware of/alerted to other vehicles that are approaching/nearing them, such as in situations of poor visibility (e.g., a blind corner or a blind turn, poor visibility conditions like snow, fog, exiting a "hidden driveway," etc.). By way of further example, a vulnerable road user (e.g., a runner) can be alerted when another vulnerable user (e.g., a cyclist) is approaching, such as from behind.

Moreover, while the techniques described herein can be employed in settings in which information is delivered with the involvement of a remote server, any or all of the described operations can also be implemented directly between respective devices (e.g., the bicyclist's device can communicate directly with the driver's device, rather than through a remote server).

Additionally, such techniques can also be employed with respect to a fixed device on the vehicle side (e.g., a vehicle infotainment system, an OBDII system) and/or the bicycle side (e.g., a bicycle computer). Moreover, such a fixed device can provide redundant and/or additional sources of information (e.g., speed) or improved alerts (e.g., via a larger screen, louder speakers, more consistent remote communication, etc.) that can be used to augment (e.g., via increased accuracy and/or functionality), confirm (e.g., via increased accuracy) or replace (e.g., with respect to lower latency and/or power consumption considerations) information otherwise obtained from and/or or determined with respect to a nomadic device (e.g., a portable device such as a smartphone).

It can be appreciated that various SatNav applications (e.g., Waze) provide alerts that are positionally fixed/static (e.g., that a car is stuck on the roadside in location X). Such alerts are either passed to all users or passed to users when they are near the location of the alert. As such, described herein in various implementations are alerts that are positionally dynamic, i.e., alerts to items/occurrences whose position is changing (e.g., a bicycle rider, a wide vehicle, a slow vehicle, etc.). In addition, such dynamic position alerts can be provided by the alertee.

Moreover, various navigation applications (e.g., Waze) include features whereby the locations of various other users can be presented (anonymously or not) to a particular user. Accordingly, using detection/determination techniques such as those described herein and (optionally) further incorporating the ability of a user to self-identify his/her mode of transportation, technologies described herein can be configured, such as in conjunction with a navigation application, to show/indicate/provide alert(s) to the user as to the mode of transportation of other users, whether in total (i.e., showing all modes of transportation for all displayed users), or selectively (e.g., showing/alerting a user only to vulnerable users, e.g., bicycles, pedestrians, etc., that are coming close, showing/alerting a user only to large trucks that are nearby, etc.).

Many of the techniques described herein with respect to reducing the power consumption on the device can be apply to the bicycle/vulnerable road techniques described herein, where, in certain implementations, one or more sensors and/or other methods can be utilized in order to determine whether or not a vehicle (within which a device is present/operating) is within a trip, and/or the mode of transportation used in such trip (e.g., bicycle, walking, rollerblades etc.).

It should also be noted that, in certain implementations, games and/or game-related features can be incorporated into one or more of the technologies described herein. For example, in certain implementations, 'points' or 'credits' can be awarded to a user who initiates the execution of a determination/verification application (e.g., an 'app' capable of determining whether a device user is likely to be a driver or a passenger). In other implementations, such 'points' or 'credits' can be awarded to a user who successfully authenticates as a passenger, and/or such 'points' or 'credits' can be deducted from a user who fails to authenticate.

In certain implementations, it can be advantageous, such as in relation to a navigation application, to notify a user when the route that is usually optimal from their current location to their current destination (as is determined by navigation applications that implement dynamic routing, such as Waze, as well as those using static routing), is determined to be sub-optimal, such as on a temporary basis (e.g., due to road work, heavy traffic, etc.). It should be understood that the referenced 'current destination' of the user can be determined, for example, based on a user input (e.g., audio, touch, visual [e.g., gestures], etc., inputs) into the navigation application, and/or can be determined (or "learned"), such as based on historical routes taken by such user (which can be accounted for based on the days of the week and/or the different times of day during which such routes are determined to be traveled, for example).

Figure 40:
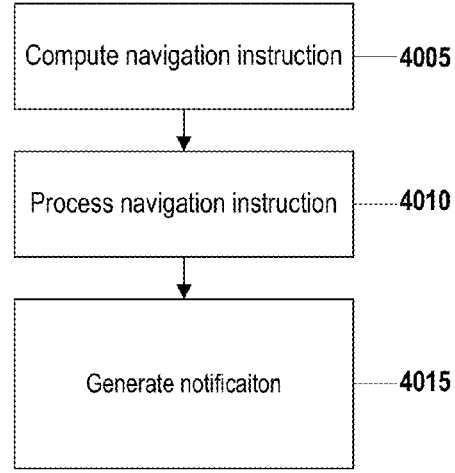
FIG. 40 is a flow diagram showing a routine that illustrates aspects of one or more methods, such as those described in relation to one or more embodiments described herein.

FIG. 40 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 4005 one or more navigation instructions can be computed, such as between a first location and a second location. At 4010, the one or more navigation instructions can be processed, such as in relation to at least one of (a) one or more previously computed navigation instructions between the first location and the second location or (b) a previously traveled route between the first location and the second location. In certain implementations, the one or more navigation instructions can be processed in order to determine one or more disparities, such as between the one or more navigation instructions and the at least one of (a) one or more previously computed navigation instructions between the first location and the second location or (b) a previously traveled route between the first location and the second location. At 4015, one or more notifications can be generated, such as based on the one or more disparities. In certain implementations, the one or more notifications can include one or more navigation instructions that characterize an aspect of the navigation between the first location and the second location in relation to the at least one of (a) one or more previously computed navigation instructions between the first location and the second location or (b) a previously traveled route between the first location and the second location. Moreover, in certain implementations, the one or more notifications can include one or more navigation instructions that characterize an aspect of the navigation between the first location and the second location as an instruction to deviate from at least one aspect of the at least one of (a) one or more previously computed navigation instructions between the first location and the second location or (b) a previously traveled route between the first location and the second location.

Figure 48:
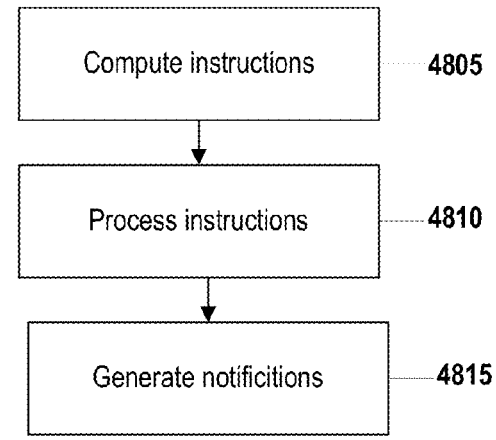
FIG. 48 is a flow diagram showing a routine that illustrates aspects of one or more methods, such as those described in relation to one or more embodiments described herein.

FIG. 48 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 4805 one or more navigation instructions can be computed, such as between a first location and a second location. At 4810, the one or more navigation instructions can be processed, such as in relation to at least one of (a) one or more previously computed navigation instructions between the first location and the second location or (b) a previously traveled route between the first location and the second location to determine one or more disparities between the one or more navigation instructions and the at least one of (a) one or more previously computed navigation instructions between the first location and the second location or (b) a previously traveled route between the first location and the second location. At 4815, one or more notifications can be generated, such as based on the one or more disparities.

Figure 49:
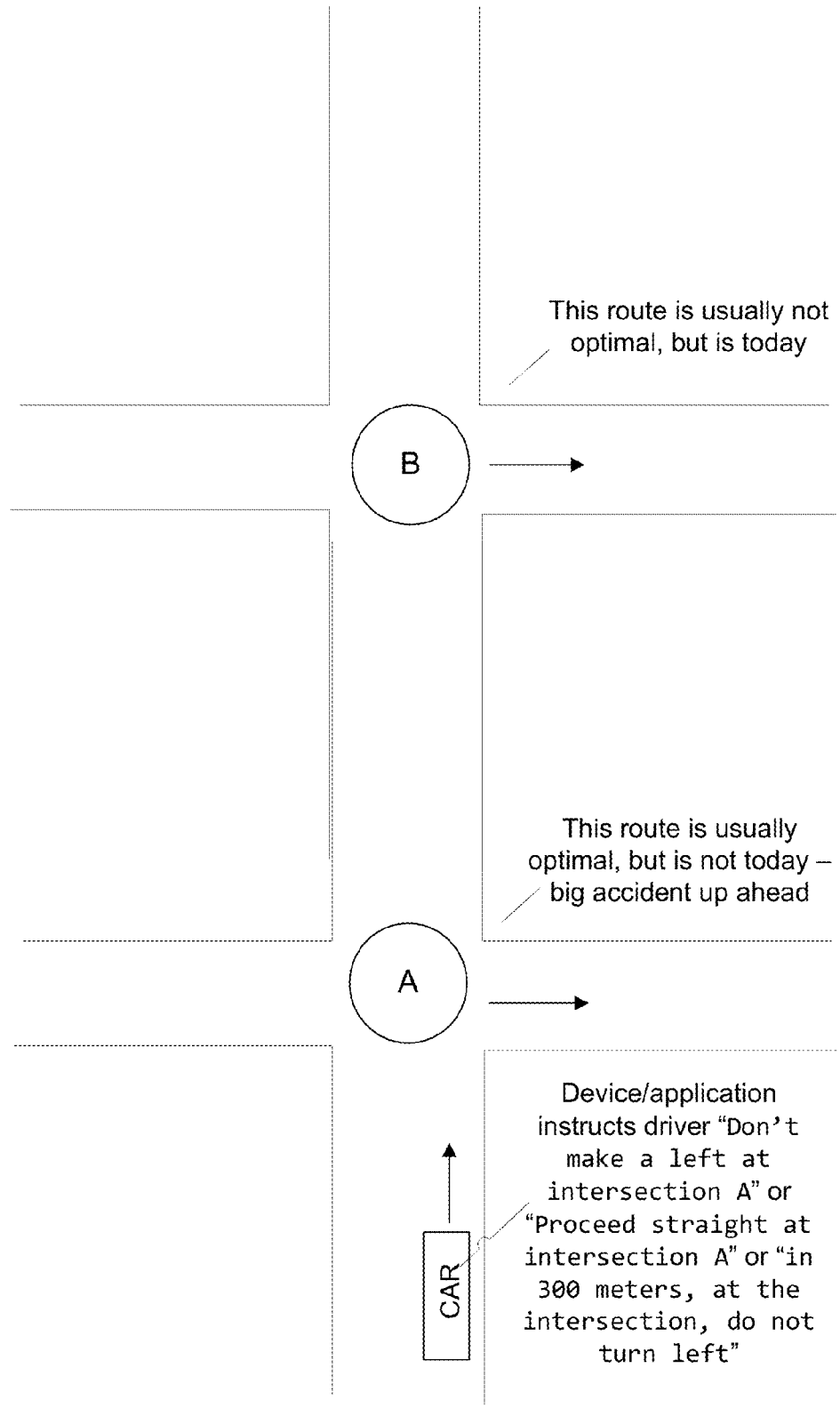
FIG. 49 depicts an exemplary implementation of one or more aspects described herein.

It can be appreciated that navigation applications generally instruct a user when to take certain actions (e.g., "in 800 meters turn right", "at the roundabout take the $2^{nd}$ exit," etc.). Accordingly, in certain implementations such applications can be improved/augmented by configuring them to provide instructions to users pertaining to when not to take certain actions (e.g., "in 800 meters, at the intersection, do not take a left", or "in 800 meters, at the intersection, go straight"). Such functionality can be advantageous to users when a route to their current destination that is usually optimal is temporarily not optimal (e.g., due to road work, heavy traffic, etc.). For example, if the route that is generally fastest from a user's home to the user's place of work included turning left at a particular intersection, but that route was not optimal on a particular day/time (e.g., due to road work, heavy traffic, etc.), and the currently best route involved proceeding straight at such intersection, existing navigation systems might simply omit the "turn left" instructions. However, such an omission may well not be recognized by a user, particularly one who frequently travels such a route (e.g., a commuter), and such user may likely turn left at the referenced intersection by force of habit. Accordingly, providing an explicit negative instruction such as "do not turn left at" or an implicit negative instruction such as "go straight at [the referenced intersection]" and/or any other such technique that can emphasize and/or alerting the user to the recommended change can be advantageous in such situations. Moreover, such techniques can be particularly useful when the user's ordinary routes are learned/observed over time and the instructions/notifications provided by the navigation application are generated and provided relative to such learned routes. In doing so, changes in routes relative to those that the user follows often can include negative instructions, whereas changes to routes that the user knows less well may be omitted (or less prominently emphasized), thereby further improving the user's driving experience. In another implementation, a navigation application can provide such implicit negative instruction(s) by advising a device user to "make a left now instead of at the next intersection". One exemplary implementation is depicted in FIG. 49.

In one implementation, which can be particularly useful to navigation applications where the device user's travelling patterns are determined/learned, one or more notifications/alerts can be provided in advance, such as to the fact that an upcoming trip is likely to take more/less time than usual (e.g. a commute), so that the user can adjust his/her departure time accordingly. Such notification(s) can be generated/determined and/or provided, for example, based on an estimate of the trip travel time that is likely to prevail for a trip that is slated to start at or around the hour that the device user is likely to (or has advised that he/she will) begin his/her trip. Such estimated trip travel time can be determined/derived based on one or more of (a) a comparison of current traffic (e.g., determined today) at one or more points in time along the referenced possible routes for the referenced trip with historical traffic data collected/determined with respect to such times along such routes, (b) acquiring/obtaining data (time, location) pertaining to specific events set (or likely) to occur on that day (e.g., a sporting event, holiday, weather conditions such as rain/snow, etc.) and which may cause changes in traffic patterns along said routes, and/or (c) determining/acquiring data pertaining to vehicular or infrastructure problems/incidents (e.g., crashes, road work, holes in the road, etc.) that may influence/affect traffic patterns along the referenced route(s). It should be noted that the time that the device user is likely to begin such a trip can be determined/derived from one or more factors such as the regular/usual time the user begins such commute, the device's alarm clock settings, entries in the device's/user's calendar and/or user input indicating a desired departure time or destination arrival time.

In certain implementations, opportunities (e.g. for the presentation of advertisements, discount coupons, etc.) and/or advertisements can be generated and/or presented at a device based on a determination of the occurrence of one or more events (e.g., trip start, trip end, speed, trip length, etc.). In contrast to traditional location based advertising, such a technique can use information related to a user's trip to determine when (or what) to provide advertising and/or commercial offers. Determinations as to which of several opportunities to present the user can be made based on/in relation to the determined location, mode of transportation, time of day, day of week, frequency of user visitation to location and/or user preferences. For example, when a trip end is detected at 8:00 AM, a user can be presented with a discount coupon for breakfast. In another example, three hours into the user's bicycle ride, s/he can be offered coupon of a local convenience store to purchase a snack (e.g., a 'PowerBar').

Moreover, in certain implementations directions/instructions provided by SatNav applications to users (e.g., "turn right at the next intersection," etc.) that are actually confusing/ineffective/suboptimal can be determined/discovered. For example, such directions/instructions (e.g., the audio and/or visual prompts that are provided to users while traveling) can be associated with corresponding user actions, such as those that are performed concurrent with/subsequent to the providing of such instructions. Upon determining that concurrent with and/or subsequent to the proving of a particular directions/instruction (or set of directions/instructions) by a SatNav application, one or more users (e.g., relatively more users than is typical/average) can be determined to navigate in a manner that deviates from the instructions provided by the application (as can be determined, for example, as an instance of 'rerouting' by the application, for example based on the user making a 'wrong turn'), it can be further determined that such a direction/instruction is relatively likely to be confusing/unclear to users, and such a direction/instruction can be flagged for improvement.

Figure 37:
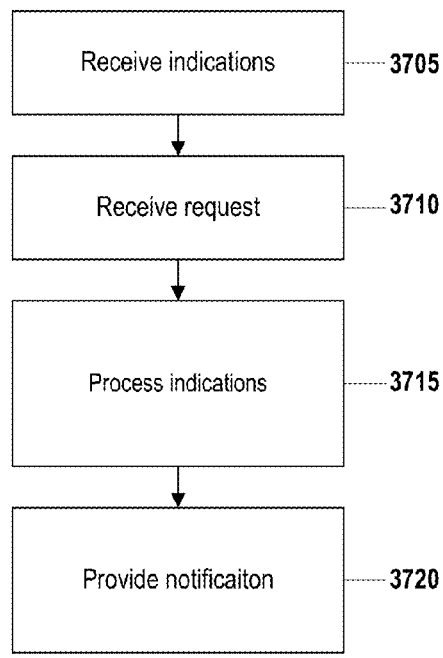
FIG. 37 is a flow diagram showing a routine that illustrates aspects of one or more methods, such as those described in relation to one or more embodiments described herein.

FIG. 37 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 3705 a plurality of indications can be received. In certain implementations, each of the one or more indications can correspond to at least one of: (a) a determination of a start of a trip or (b) a determination of an end of a trip. At 3710, a request for a vacant parking location can be received. At 3715, the plurality of indications can be processed, such as in order to identify one or more vacant parking locations. At 3720, a notification corresponding to at least one of the one or more vacant parking locations can be provided. In certain implementations, such a notification can be provided in response to the request.

A trip can be determined to have ended when a driver parks a vehicle and a trip typically starts when a driver starts a parked vehicle. Accordingly, it can be advantageous to determined and/or maintain parking information related to vehicles (e.g., where vehicles are parked, how long they have been parked, their parking habits, when they vacate their parked position, etc.). Moreover, based on such information, technologies can be implemented whereby vehicles that seek to park in an approximate particular location can be provided with tools to assist them to do so more effectively/efficiently (e.g., faster, with less stress, cheaper, with better alignment between parking rules/regulations and their needs, etc.).

For example, in certain implementations, information related to public parking regulations can be obtained/referenced, such as from a database (built, for example, via crowd-sourcing). Accordingly, upon determining/detecting a 'trip-end' (i.e., the end of a trip, such as in the manner described herein) at/in relation to a mobile device, it can also be determined that a vehicle may have parked in that location. Such determination(s) can be computed with even greater accuracy, for example, based on a determination that the device with respect to which such determinations are made has also been determined to be operated by a user identified as a driver. By way of further example, when a mobile device determines/detects a 'trip-start' (i.e., the start of a trip, such as in the manner described herein) it can also be determined that a vehicle that was parked in that location is likely to have vacated a parking spot.

In one implementation, users that are determined to be leaving their parking location (e.g., as determined, for example, through the use of one or more trip start/end determination techniques, such as those described herein, and/or through the use of a parking payment application such as Pango) can be offered a reward (e.g., a parking discount, cash, credit for future parking, credit or discount from a $3^{rd}$ party, etc.) to remain in their current location for a some period of time, until a certain other vehicle can arrives in order to allow the parking spot to be 'handed off' or transferred from one user to the other. Moreover, in certain implementations, users that are looking for parking spaces can be offered the opportunity to receive (or reserve) a parking space near their desired location in return for providing a payment (e.g., in-app, credit card, e-wallet, etc.).

It can be appreciated that such technologies can be configured such that the cost (e.g., to the 'new' parker) and the payment (e.g., to the current parker) can be static or dynamic (e.g., based on time of day, day of week, day in year, location, number of currently parked users, parking habits of users, etc.).

In one implementation the participation of a user in such a system and/or the payments and costs thereto can be governed by the user's reputation, as can be determined based on the user's previous transactions.

It should also be noted that any or all instructions and/or notifications referenced herein can be delivered audibly and/or haptically and/or visually.

Moreover, any/all of the referenced navigation applications and the improvements described herein can be implemented client-side (e.g., on a device such as a mobile device, on an in-vehicle device, on another type of device, etc.) and/or server-side (i.e., remotely) and/or in a combination of the two.

Figure 41:
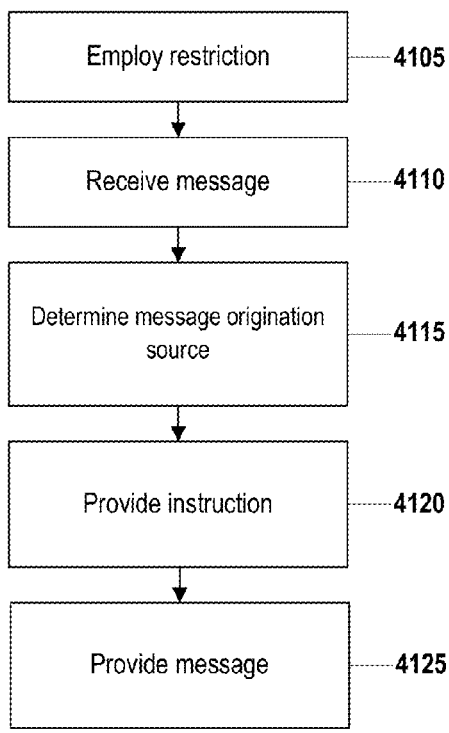
FIG. 41 is a flow diagram showing a routine that illustrates aspects of one or more methods, such as those described in relation to one or more embodiments described herein.

FIG. 41 is a flow diagram of a routine that illustrates aspects of one or more methods, such as those described in relation to one or more embodiments described herein. In various implementations, one or more aspects of the referenced method can be performed by one or more hardware devices/components (such as those depicted in FIG. 1), one or more software elements/components (such as those depicted in FIG. 1), and/or a combination of both. At 4105 one or more restrictions can be employed, such as in relation to a user device. In certain implementations, the one or more restrictions can include a restriction of one or more messaging services, such as in relation to the user device. At 4110, a message associated with a restriction override notification can be received. At 4115, it can be determined that the message originated from one or more designated sources. At 4120, an instruction can be provided, such as to perform one or more actions. At 4125 the message can be provided, such as in relation to the user device. In certain implementations, the message can be provided concurrent with an employment of the one or more restrictions. In certain implementations, the referenced message can be provided in relation to the user device, such as based on a determination that the one or more instructions have been performed.

In another embodiment, a third party can 'page' a vehicle driver through the driver's mobile device. Upon receiving such a 'page,' the device can signal to the driver (e.g., using audio, visual and/or haptic means) that there is an emergency or other such occurrence that the driver must address (in certain implementations by first stopping or slowing down the vehicle). Such techniques can be useful in scenarios where a device operated by a user determined to be likely to be a driver of a vehicle is put into a restricted mode so as to prevent distraction (e.g., otherwise preventing calls, texts, etc.), because such a 'page' can provide a relatively low distraction manner in which to alert the driver that they are urgently needed.

It should be noted that such techniques can also be implemented with respect to devices that are in other forms of "do not disturb" modes, whether they are passenger devices or not even within a vehicle.

In one implementation, such techniques can be employed whereby a party wishing to urgently contact a device user can be provided with a message from the user's device indicating that the device user is currently driving and cannot safely communicate. The party can also be notified as to how to 'page' the user in urgent situations. Such a notification can be provided, for example by/in relation to the user's device (e.g., via a voice message and/or a text message indicating, for example that "I am driving right now and cannot take your call, if you need my attention urgently, please [take a certain action]"), and/or via a third party or object (e.g., as provided by the user's company, the user's spouse, a website containing such information, the user's business card, etc.).

Examples of action(s) to be taken by the party wishing to 'page' the device user include but are not limited to: (i) calling a specified telephone number, (ii) providing a specified code in a voicemail or IVR system (either on the device or remotely), (iii) texting to a special number or emailing to a special address or posting to a certain URL/IP address, and/or (iv) texting/e-mailing/posting a special message or a message containing a special code to the user's device. Such techniques can signal a 'page' to the device directly (e.g., via a text message to the device with a short message such as "page"), and/or indirectly, such as by causing a 'page' to be communicated or signaled to the device (e.g., the party inputs the "page" code on the user's company voice mail menu (e.g., in response to a prompt indicating that "to reach me urgently hit 4", which, in some implementations, may be made available only based on a determination that the user is driving) and, in response, the voice mail program sends a pre-defined signal to the user's device). It should be understood that the referenced 'page' signal(s) can be sent/transmitted in various ways, e.g., via voice, data, RF, etc.

Upon receipt of the referenced 'page' signal, the driver's device can be configured to provide one or more alerts to the driver, such as those that indicated that someone is urgently seeking them. Such alerts may be provided in any of a number of ways, such as, visually (e.g., by causing the device to turn on and have the screen blink red), via audio (e.g., by playing an audio file saying "someone is trying to contact you urgently" with or without the name of such person, if available) and/or haptically (e.g., by providing a special haptic/vibration pattern to indicate a 'page').

In certain implementations the referenced paging feature can be configured to restrict those that can page a device (e.g., only contacts determined to be stored at/in relation to the device), so as to minimize distraction/potential harassment.

In addition, in various implementations one or more of the various functionalities and features described herein can be provided as options which the user can choose to enable or disabled as desired.

Moreover, in certain implementations the device and/or one or more applications executing thereon can be configured to prevent uninstallation of one or more applications, such as of one or more applications that enable one or more aspects of the various functionalities described herein. For example, in one implementation, a first application/module can monitor the ongoing execution of a second application/module. Upon determining that the second application is no longer executing, the first application can initiate the reexecution/reinstallation of the second application. Moreover, in certain implementations a device can be polled (e.g., remotely) to identify applications that are running/installed on the device. Upon identifying that a particular application is not installed/running, such an application can be installed/initiated.

Moreover, in certain implementations one or more of the various technologies described herein can be implemented in scenarios where identifying an existence of/interaction with a human user (as opposed to a computer/non-human user) can be advantageous). For example, in scenarios, such as for event ticket purchases, where vendors wish to ensure that the purchaser of such items (e.g., tickets) are human users (and not computer 'bots' or robots programmed to perform such transactions), one or more of the various techniques described herein can be implemented in conjunction with such a transaction, in order to determine that the purchaser is likely to be a human user (by virtue of various sensor-based determinations, such as those originating at a mobile device, such as is described herein).

It can be appreciated that a tension exists between whether advertiser should pay for 'leads' (e.g., using a cost per click model) or 'acquisitions' (e.g., using a cost per action model). Accordingly, it can be advantageous to provide techniques/technologies that are operative to increase the likelihood that award/promotional points/credits that are converted into a discount coupon/voucher actually result in a sale. In doing so, companies that provide such discount coupons can be paid/compensated more based upon the issuance of the coupon than is currently prevalent in existing systems/frameworks, avoiding the necessity of receiving subsequent reports from the coupon honoror in order to be paid/compensated. To do this, the time for which such a coupon is valid can be limited (a "time bomb"), and user to which the coupon is issued can be required to be within a certain location (e.g., within a certain store) in order to make the conversion that generates the coupon. For example, in order to convert United 'frequent flyer' miles into a coupon for a 20% discount at Marriott (for which United gets paid some amount by Marriott), Marriot may wish to require that, in order to pay United for the mere conversion of the miles into a coupon (and not through Marriott's subsequent definitive confirmation of such a booking), the customer must make the conversion of the miles into the coupon within Marriott's hotel grounds (as can be determined via GPS, WiFi, cell-towers, BT, camera, NFC, and/or any other such determination technique, such as is described herein) and/or the validity of the coupon can also be time-limited (e.g., only valid for redemption within the next 15 minutes).

Moreover, in certain implementations vehicle recognition equipment (e.g., cameras) can be oriented in various locations, such as those where driving is inappropriate/illegal (e.g., oriented in locations with respect to which occurrences such as drivers driving through a gas station in order to gain a few extra minutes during traffic, cutting in line at a highway exit, etc., can be observed). Using such camera(s), one or more vehicles who perform such inappropriate/illegal acts can be identified (e.g., using license plate recognition technologies, as are known to those of ordinary skill in the art). Upon identifying such vehicles (and/or users associated with such vehicles, such as the registered owners/drivers of such vehicles), the identity of such vehicles (and/or users/drivers) can be processed against one or more data items, data sets, databases, etc., such as those referenced herein, in order to determine whether such vehicles (and/or users/drivers) have higher rate of crash or insurance claims than the population at large (or the population having one or more similar/comparable characteristics, e.g., the same/comparable type of car, and/or in the same geographic area, etc.). Moreover, in certain implementations the referenced data and/or determinations can be maintained in a database and insurance policies of drivers determined to be exhibiting (or not exhibiting) the same or comparable behaviors can be priced accordingly (e.g., higher or lower).

It should be noted that U.S. patent application Ser. No. 13/244,978, filed Sep. 26, 2011 (now U.S. Pat. No. 8,290,480), International PCT Application No. PCT/US2011/052655, filed Sep. 21, 2011, and International PCT Application No. PCT/US2012/030017, filed Mar. 21, 2012, (each assigned to the present applicant) may be relevant to various aspects described herein, and each of the referenced applications/patents is hereby incorporated by reference herein in their respective entireties.

At this juncture, it should be noted that although much of the foregoing description has been directed to systems and methods for determining user roles and/or devices usages within the context of vehicular travel, the systems and methods disclosed herein can be similarly deployed and/or implemented in scenarios, situations, and settings far beyond the referenced scenarios. It can be readily appreciated that the user-role determination system 100 can be effectively employed in practically any scenario where the determination and/or identification of a user or usage of a mobile device is of value, such as in the context of exercising or game playing. It should be further understood that any such implementation and/or deployment is within the scope of the systems and methods described herein.

It is to be understood that like numerals in the drawings represent like elements through the several figures, and that not all components and/or steps described and illustrated with reference to the figures are required for all embodiments or arrangements. It should also be understood that the embodiments and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described below. It should be appreciated that according to at least one embodiment, one or more computer programs or applications that when executed perform methods of the present invention need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for selectively restricting a mobile device. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A method comprising:
 receiving one or more inputs in relation to a user device;
 based on a determination of a mobility stoppage in relation to the user device, processing, by a processing device, at least one of the one or more inputs to compute one or more mobility characteristics of the user device; and
 based on the one or more mobility characteristics computed based on the determination of the mobility stoppage in relation to the user device, selectively adjusting one or more restrictions in relation to the user device.

2. The method of claim 1, wherein processing at least one of the one or more inputs comprises processing one or more inputs that are chronologically proximate to the mobility stoppage to determine one or more mobility characteristics of the user device.

3. The method of claim 1, wherein the one or more mobility characteristics comprise at least one of: (a) a permanent stop or (b) a temporary stop.

4. The method of claim 1, wherein processing at least one of the one or more inputs comprises processing at least one of the one or more inputs in relation to one or more data items to determine one or more mobility characteristics of the user device.

5. The method of claim 4, wherein the one or more data items comprise at least one of: map data, traffic signal data, or traffic condition data.

6. The method of claim 1, wherein the one or more mobility characteristics are determined in response to an indication of a completion of a trip in relation to the user device.

7. The method of claim 6, further comprising processing the one or more mobility characteristics in relation to the indication to determine a veracity of the indication.

8. The method of claim 7, wherein selectively adjusting one or more restrictions in relation to the user device comprises selectively adjusting, based on the veracity, one or more restrictions in relation to the user device.

9. A non-transitory computer readable medium having instructions stored thereon that, when executed by a processing device, cause the processing device to perform operations comprising:
 receiving an indication of a completion of a trip in relation to a user device;
 based on the indication of the completion of the trip, processing one or more inputs to compute one or more mobility characteristics of the user device;
 processing, in relation to the indication of the completion of a trip, the one or more mobility characteristics computed based on the determination of the indication of the completion of the trip to determine a veracity of the indication; and
 based on the veracity, selectively adjusting one or more restrictions in relation to the user device.

10. The non-transitory computer readable medium of claim 9, wherein selectively adjusting one or more restrictions in relation to the user device comprises maintaining one or more restrictions irrespective of a subsequent indication of a completion of a trip.

11. The non-transitory computer readable medium of claim 9, wherein processing one or more inputs comprises processing one or more inputs that are chronologically proximate to the indication of a completion of a trip to determine one or more mobility characteristics of the user device.

12. The non-transitory computer readable medium of claim 9, wherein processing one or more inputs comprises processing at least one of the one or more inputs in relation to one or more data items to determine the one or more mobility characteristics of the user device.

13. The non-transitory computer readable medium of claim 12, wherein the one or more data items comprise at least one of: map data, traffic signal data, or traffic condition data.

14. A system comprising:
 a processing device; and
 a memory coupled to the processing device and storing instructions that, when executed by the processing device, cause the system to perform one or more operations comprising:
 receiving one or more inputs in relation to a user device;
 based on a determination of a mobility stoppage in relation to the user device, processing at least one of the one or more inputs to compute one or more mobility characteristics of the user device; and
 based on the one or more mobility characteristics computer based on the determination of the mobility stoppage in relation to the user device, selectively adjusting one or more restrictions in relation to the user device.

15. The system of claim 14, wherein processing at least one of the one or more inputs comprises processing one or more inputs that are chronologically proximate to the mobility stoppage to determine one or more mobility characteristics of the user device.

16. The system of claim 14, wherein the one or more mobility characteristics comprise at least one of: (a) a permanent stop or (b) a temporary stop.

17. The system of claim 14, wherein processing at least one of the one or more inputs comprises processing at least one of the one or more inputs in relation to one or more data items to determine one or more mobility characteristics of the user device.

18. The system of claim 14, wherein the one or more mobility characteristics are determined in response to an indication of a completion of a trip in relation to the user device.

19. The system of claim 18, wherein the memory further stores instructions for causing the system to perform operations comprising processing the one or mobility characteristics in relation to the indication to determine a veracity of the indication.

20. The system of claim 19, wherein selectively adjusting one or more restrictions in relation to the user device comprises selectively adjusting, based on the veracity, one or more restrictions in relation to the user device.

\* \* \* \* \*